US012769434B2

(12) United States Patent
Bignell et al.

(10) Patent No.: US 12,769,434 B2
(45) Date of Patent: Oct. 20, 2026

(54) METHODS AND USER INTERFACES FOR SHARING AND ACCESSING WORKOUT CONTENT

(71) Applicant: Apple Inc., Cupertino, CA (US)

(72) Inventors: Margaret A. Bignell, San Francisco, CA (US); Craig D. Bolton, Manhattan Beach, CA (US); Edward Chao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 18/618,847

(22) Filed: Mar. 27, 2024

(65) Prior Publication Data

US 2024/0402881 A1 Dec. 5, 2024

Related U.S. Application Data

(60) Provisional application No. 63/470,961, filed on Jun. 4, 2023.

(51) Int. Cl.

| | |
|---|---|
| ***G06F 3/048*** | (2013.01) |
| ***A63B 24/00*** | (2006.01) |
| ***A63B 71/06*** | (2006.01) |
| ***G06F 3/0482*** | (2013.01) |
| ***G06F 3/0484*** | (2022.01) |

(52) U.S. Cl.
CPC ........ *G06F 3/0482* (2013.01); *A63B 24/0075* (2013.01); *A63B 71/0622* (2013.01); *G06F 3/0484* (2013.01); *A63B 2071/0655* (2013.01)

(58) Field of Classification Search
None
See application file for complete search history.

(56) References Cited

U.S. PATENT DOCUMENTS

| | | | |
|---|---|---|---|
| 3,480,943 | A | 11/1969 | Manber |
| 4,205,628 | A | 6/1980 | Null |
| 4,842,266 | A | 6/1989 | Sweeney et al. |
| 5,349,962 | A | 9/1994 | Lockard et al. |
| 5,423,863 | A | 6/1995 | Felblinger et al. |
| 5,458,548 | A | 10/1995 | Crossing et al. |
| 5,474,077 | A | 12/1995 | Suga |
| 5,642,731 | A | 7/1997 | Kehr |
| 5,685,723 | A | 11/1997 | Ladin et al. |
| 5,730,141 | A | 3/1998 | Fain et al. |
| 5,788,655 | A | 8/1998 | Yoshimura et al. |
| 5,812,983 | A | 9/1998 | Kumagai |
| 5,845,235 | A | 12/1998 | Luukkanen et al. |
| 5,944,633 | A | 8/1999 | Wittrock |
| 6,013,008 | A | 1/2000 | Fukushima |

(Continued)

FOREIGN PATENT DOCUMENTS

| | | | |
|---|---|---|---|
| AU | 2011302438 | A1 | 5/2013 |
| CA | 2815518 | A1 | 5/2012 |

(Continued)

OTHER PUBLICATIONS

Applicant-Initiated Interview Summary received for U.S. Appl. No. 17/952,236, mailed on Oct. 15, 2024, 2 pages.

(Continued)

*Primary Examiner* — Thanh T Vu
(74) *Attorney, Agent, or Firm* — YHE Law LLP

(57) ABSTRACT

The present disclosure generally relates to sharing and/or accessing workout content.

39 Claims, 28 Drawing Sheets

(56) References Cited

U.S. PATENT DOCUMENTS

| | | | |
|---|---|---|---|
| 6,061,592 | A | 5/2000 | Nigam |
| 6,095,949 | A | 8/2000 | Aral |
| 6,095,984 | A | 8/2000 | Amano et al. |
| 6,097,371 | A | 8/2000 | Siddiqui et al. |
| 6,097,385 | A | 8/2000 | Robinson |
| 6,199,012 | B1 | 3/2001 | Hasegawa |
| 6,244,988 | B1 | 6/2001 | Delman |
| 6,302,789 | B2 | 10/2001 | Harada et al. |
| 6,416,471 | B1 | 7/2002 | Kumar et al. |
| 6,594,654 | B1 | 7/2003 | Salam et al. |
| 6,603,477 | B1 | 8/2003 | Tittle |
| 6,639,584 | B1 | 10/2003 | Li |
| 6,662,023 | B1 | 12/2003 | Helle |
| 6,705,972 | B1 | 3/2004 | Takano et al. |
| 6,837,827 | B1 | 1/2005 | Lee et al. |
| 6,866,613 | B1 | 3/2005 | Brown et al. |
| 6,912,694 | B1 | 6/2005 | Harrison et al. |
| 7,020,514 | B1 | 3/2006 | Wiesel |
| 7,128,693 | B2 | 10/2006 | Brown et al. |
| 7,251,454 | B2 | 7/2007 | White |
| 7,302,272 | B2 | 11/2007 | Ackley |
| 7,302,650 | B1 | 11/2007 | Allyn et al. |
| 7,534,206 | B1 | 5/2009 | Lovitt et al. |
| 7,662,065 | B1 | 2/2010 | Kahn et al. |
| 7,695,406 | B2 | 4/2010 | Waters |
| 7,739,148 | B2 | 6/2010 | Suzuki et al. |
| 7,771,320 | B2 | 8/2010 | Riley et al. |
| 7,773,460 | B2 | 8/2010 | Holt |
| 7,853,428 | B2 | 12/2010 | Usui et al. |
| 7,870,013 | B1 | 1/2011 | Allemann et al. |
| 7,970,827 | B1 | 6/2011 | Cumberbatch et al. |
| 8,060,229 | B2 | 11/2011 | Gupta et al. |
| 8,105,208 | B2 | 1/2012 | Oleson et al. |
| 8,128,503 | B1 | 3/2012 | Haot et al. |
| 8,152,694 | B2 | 4/2012 | Srinivasan et al. |
| 8,200,323 | B2 | 6/2012 | Dibenedetto et al. |
| 8,321,006 | B1 | 11/2012 | Snyder et al. |
| 8,341,557 | B2 | 12/2012 | Pisula et al. |
| 8,379,939 | B1 | 2/2013 | Bourdev et al. |
| 8,462,997 | B2 | 6/2013 | Soldan et al. |
| 8,467,770 | B1 | 6/2013 | Ben |
| 8,475,339 | B2 | 7/2013 | Hwang et al. |
| 8,496,563 | B2 | 7/2013 | Komatsu et al. |
| 8,504,008 | B1 | 8/2013 | Gossweiler et al. |
| 8,543,081 | B2 | 9/2013 | Scott et al. |
| 8,566,403 | B2 | 10/2013 | Pascal et al. |
| 8,595,798 | B2 | 11/2013 | Anand et al. |
| 8,624,836 | B1 | 1/2014 | Miller et al. |
| 8,666,361 | B2 | 3/2014 | Chu et al. |
| 8,676,170 | B2 | 3/2014 | Porrati et al. |
| 8,700,158 | B2 | 4/2014 | Mass et al. |
| 8,734,296 | B1 | 5/2014 | Brumback et al. |
| 8,768,648 | B2 | 7/2014 | Panther et al. |
| 8,784,115 | B1 | 7/2014 | Chuang |
| 8,784,271 | B2 | 7/2014 | Brumback et al. |
| 8,825,445 | B2 | 9/2014 | Hoffman et al. |
| 8,849,610 | B2 | 9/2014 | Molettiere et al. |
| 8,934,963 | B1 | 1/2015 | Farazi |
| 8,947,239 | B1 | 2/2015 | Park |
| 8,948,819 | B2 | 2/2015 | Yun et al. |
| 8,990,006 | B1 | 3/2015 | Wallace et al. |
| 9,011,292 | B2 | 4/2015 | Weast et al. |
| 9,020,538 | B1 | 4/2015 | White et al. |
| 9,063,164 | B1 | 6/2015 | Yuen et al. |
| 9,071,945 | B1 | 6/2015 | Rubin et al. |
| 9,087,234 | B2 | 7/2015 | Hoffman et al. |
| 9,125,566 | B2 | 9/2015 | Libbus et al. |
| 9,148,483 | B1 | 9/2015 | Molettiere et al. |
| 9,164,663 | B1 | 10/2015 | Berard |
| 9,173,576 | B2 | 11/2015 | Yuen et al. |
| 9,224,291 | B2 | 12/2015 | Moll-Carrillo et al. |
| 9,230,076 | B2 | 1/2016 | King et al. |
| 9,338,242 | B1 | 5/2016 | Suchland et al. |
| 9,449,365 | B2 | 9/2016 | Roberts |
| 9,532,734 | B2 | 1/2017 | Hoffman et al. |
| 9,557,881 | B1 | 1/2017 | Jain et al. |
| 9,582,165 | B2 | 2/2017 | Wilson et al. |
| 9,589,445 | B2 | 3/2017 | White et al. |
| 9,600,178 | B2 | 3/2017 | Yun et al. |
| 9,600,630 | B2 | 3/2017 | Keegan et al. |
| 9,712,629 | B2 | 7/2017 | Molettiere et al. |
| 9,723,381 | B2 | 8/2017 | Swanson |
| 9,730,621 | B2 | 8/2017 | Cohen et al. |
| 9,734,477 | B2 | 8/2017 | Weast et al. |
| 9,798,443 | B1 | 10/2017 | Gray |
| 9,800,525 | B1 | 10/2017 | Lerner et al. |
| 9,813,642 | B1 | 11/2017 | Chen et al. |
| 9,817,481 | B2 | 11/2017 | Pantelopoulos et al. |
| 9,854,653 | B1 | 12/2017 | Ackmann et al. |
| 9,880,805 | B1 | 1/2018 | Guralnick |
| 9,904,906 | B2 | 2/2018 | Kim et al. |
| 9,910,571 | B2 | 3/2018 | Chen et al. |
| 9,918,664 | B2 | 3/2018 | Blahnik et al. |
| 9,931,539 | B1 | 4/2018 | De Pablos et al. |
| 9,940,682 | B2 | 4/2018 | Hoffman et al. |
| 10,019,136 | B1 | 7/2018 | Ozog |
| 10,051,103 | B1 | 8/2018 | Gordon et al. |
| 10,056,006 | B1 | 8/2018 | Hsu-Hoffman et al. |
| 10,076,257 | B2 | 9/2018 | Lin et al. |
| 10,105,573 | B2 | 10/2018 | Park et al. |
| 10,220,258 | B2 | 3/2019 | Gu et al. |
| 10,226,195 | B2 | 3/2019 | Briante et al. |
| 10,270,898 | B2 | 4/2019 | Soli et al. |
| 10,272,294 | B2 | 4/2019 | Williams et al. |
| 10,275,116 | B2 | 4/2019 | Decker et al. |
| 10,300,334 | B1 | 5/2019 | Chuang |
| 10,304,347 | B2 | 5/2019 | Wilson et al. |
| 10,339,830 | B2 | 7/2019 | Han et al. |
| 10,398,381 | B1 | 9/2019 | Heneghan et al. |
| 10,425,284 | B2 | 9/2019 | Dellinger et al. |
| 10,489,508 | B2 | 11/2019 | Zhai et al. |
| 10,500,441 | B2 | 12/2019 | Lagree |
| 10,639,521 | B2 | 5/2020 | Foley et al. |
| 10,736,543 | B2 | 8/2020 | Chen et al. |
| 10,777,314 | B1 | 9/2020 | Williams et al. |
| 10,866,619 | B1 | 12/2020 | Bushnell et al. |
| 10,873,786 | B2 | 12/2020 | Folse et al. |
| 10,898,132 | B2 | 1/2021 | White et al. |
| 10,973,422 | B2 | 4/2021 | Pantelopoulos et al. |
| 10,978,195 | B2 | 4/2021 | Blahnik et al. |
| 11,103,161 | B2 | 8/2021 | Williams et al. |
| 11,107,567 | B2 | 8/2021 | Blahnik et al. |
| 11,107,569 | B1 | 8/2021 | Devoto |
| 11,152,100 | B2 | 10/2021 | Crowley et al. |
| 11,202,598 | B2 | 12/2021 | Soli et al. |
| 11,209,957 | B2 | 12/2021 | Dryer et al. |
| 11,216,119 | B2 | 1/2022 | De Vries et al. |
| 11,317,833 | B2 | 5/2022 | Williams et al. |
| 11,360,634 | B1 | 6/2022 | Chang et al. |
| 11,446,548 | B2 | 9/2022 | Devine et al. |
| 11,452,915 | B2 | 9/2022 | Devine et al. |
| 11,458,363 | B2 | 10/2022 | Powers et al. |
| 11,514,813 | B2 | 11/2022 | Bell et al. |
| 11,529,074 | B2 | 12/2022 | Vaterlaus |
| 11,801,423 | B2 | 10/2023 | Bissonnette et al. |
| 12,260,059 | B2 | 3/2025 | Chang et al. |
| 12,390,171 | B1 * | 8/2025 | Amsallem ............ A61B 5/4815 |
| 2001/0031622 | A1 | 10/2001 | Kivela et al. |
| 2001/0049470 | A1 | 12/2001 | Mault et al. |
| 2002/0045960 | A1 | 4/2002 | Phillips et al. |
| 2002/0068600 | A1 | 6/2002 | Chihara et al. |
| 2002/0086774 | A1 | 7/2002 | Warner |
| 2002/0118121 | A1 | 8/2002 | Lehrman et al. |
| 2002/0142734 | A1 | 10/2002 | Wickstead |
| 2003/0002391 | A1 | 1/2003 | Biggs et al. |
| 2003/0023178 | A1 | 1/2003 | Bischoff et al. |
| 2003/0064860 | A1 | 4/2003 | Yamashita et al. |
| 2003/0134714 | A1 | 7/2003 | Oishi et al. |
| 2003/0179229 | A1 | 9/2003 | Van et al. |
| 2003/0181291 | A1 | 9/2003 | Ogawa |
| 2003/0182628 | A1 | 9/2003 | Lira |
| 2003/0216971 | A1 | 11/2003 | Sick et al. |
| 2003/0226695 | A1 | 12/2003 | Mault |
| 2004/0014567 | A1 | 1/2004 | Mendel |

(56) References Cited

U.S. PATENT DOCUMENTS

2004/0077462 A1 4/2004 Brown et al.
2004/0083474 A1 4/2004 Mckinlay et al.
2004/0085316 A1 5/2004 Malik
2004/0128286 A1 7/2004 Yasushi et al.
2004/0168107 A1 8/2004 Sharp et al.
2004/0181771 A1 9/2004 Anonsen et al.
2004/0218472 A1 11/2004 Narayanaswami et al.
2004/0225966 A1 11/2004 Besharat et al.
2004/0236189 A1 11/2004 Hawthorne et al.
2004/0246607 A1 12/2004 Watson et al.
2005/0015803 A1 1/2005 Macrae et al.
2005/0066325 A1 3/2005 Mori et al.
2005/0075214 A1 4/2005 Brown et al.
2005/0079905 A1 4/2005 Martens
2005/0113650 A1 5/2005 Pacione et al.
2005/0124324 A1 6/2005 Thomas et al.
2005/0130802 A1 6/2005 Kinnunen et al.
2005/0139852 A1 6/2005 Chen et al.
2005/0156873 A1 7/2005 Walter et al.
2005/0165627 A1 7/2005 Fotsch et al.
2005/0171410 A1 8/2005 Hjelt et al.
2005/0172311 A1 8/2005 Hjelt et al.
2005/0190059 A1 9/2005 Wehrenberg
2005/0197063 A1 9/2005 White et al.
2005/0202846 A1 9/2005 Glass et al.
2005/0215848 A1 9/2005 Lorenzato et al.
2005/0216867 A1 9/2005 Marvit et al.
2005/0228735 A1 10/2005 Duquette
2005/0272564 A1 12/2005 Pyles et al.
2005/0278757 A1 12/2005 Grossman et al.
2006/0010098 A1 1/2006 Goodnow et al.
2006/0010435 A1 1/2006 Jhanwar et al.
2006/0017692 A1 1/2006 Wehrenberg et al.
2006/0020174 A1 1/2006 Matsumura et al.
2006/0047208 A1 3/2006 Yoon
2006/0048076 A1 3/2006 Vronay et al.
2006/0052727 A1 3/2006 Palestrant
2006/0098109 A1 5/2006 Ooki
2006/0106741 A1 5/2006 Janarthanan
2006/0117014 A1 6/2006 Qi
2006/0122748 A1 6/2006 Nou
2006/0136449 A1 6/2006 Parker et al.
2006/0155578 A1 7/2006 Eisenberger et al.
2006/0160090 A1 7/2006 Macina et al.
2006/0184800 A1 8/2006 Rosenberg
2006/0217104 A1 9/2006 Cho
2006/0218500 A1 9/2006 Sauve et al.
2006/0240959 A1 10/2006 Huang
2006/0242259 A1 10/2006 Vallabh et al.
2006/0250524 A1 11/2006 Roche
2006/0271605 A1 11/2006 Petruzzo
2006/0277118 A1 12/2006 Keohane et al.
2006/0277469 A1 12/2006 Chaudhri et al.
2007/0016091 A1 1/2007 Butt et al.
2007/0021269 A1 1/2007 Shum
2007/0032733 A1 2/2007 Burton
2007/0033069 A1 2/2007 Rao et al.
2007/0056727 A1 3/2007 Newman
2007/0067733 A1 3/2007 Moore et al.
2007/0071256 A1 3/2007 Ito
2007/0101279 A1 5/2007 Chaudhri et al.
2007/0113726 A1 5/2007 Oliver et al.
2007/0135043 A1 6/2007 Hayes et al.
2007/0136093 A1 6/2007 Rankin et al.
2007/0143433 A1 6/2007 Daigle
2007/0143495 A1 6/2007 Porat
2007/0156689 A1 7/2007 Meek et al.
2007/0169614 A1 7/2007 Sasaki et al.
2007/0239801 A1 10/2007 Lee et al.
2007/0249949 A1 10/2007 Hadley
2007/0261537 A1 11/2007 Eronen et al.
2007/0271065 A1 11/2007 Gupta et al.
2007/0271340 A1 11/2007 Goodman et al.
2008/0005734 A1 1/2008 Kendra et al.
2008/0020803 A1 1/2008 Rios et al.
2008/0027586 A1 1/2008 Hern et al.
2008/0027673 A1 1/2008 Trumm
2008/0051919 A1 2/2008 Sakai et al.
2008/0052945 A1 3/2008 Matas et al.
2008/0058626 A1 3/2008 Miyata et al.
2008/0076637 A1 3/2008 Gilley et al.
2008/0077026 A1 3/2008 Banet et al.
2008/0077936 A1 3/2008 Goel et al.
2008/0082145 A1 4/2008 Skwarek et al.
2008/0086318 A1 4/2008 Gilley et al.
2008/0096726 A1 4/2008 Riley et al.
2008/0122796 A1 5/2008 Jobs et al.
2008/0141135 A1 6/2008 Mason et al.
2008/0150731 A1 6/2008 Laukkanen et al.
2008/0161161 A1 7/2008 Pipinich et al.
2008/0161707 A1 7/2008 Farringdon et al.
2008/0177569 A1 7/2008 Chen et al.
2008/0183909 A1 7/2008 Lim et al.
2008/0195600 A1 8/2008 Deakter
2008/0200312 A1 8/2008 Tagliabue
2008/0229226 A1 9/2008 Rowbottom et al.
2008/0247519 A1 10/2008 Abella et al.
2008/0254767 A1 10/2008 Jin
2008/0259829 A1 10/2008 Rosenblatt
2008/0262946 A1 10/2008 Wren
2008/0278333 A1 11/2008 Fennell et al.
2008/0300110 A1 12/2008 Smith et al.
2009/0007017 A1 1/2009 Anzures et al.
2009/0012821 A1 1/2009 Besson et al.
2009/0012988 A1 1/2009 Brown
2009/0047645 A1 2/2009 Dibenedetto et al.
2009/0054743 A1 2/2009 Stewart
2009/0060170 A1 3/2009 Coughlan et al.
2009/0070675 A1 3/2009 Li
2009/0075782 A1 3/2009 Joubert et al.
2009/0106685 A1 4/2009 Care et al.
2009/0113315 A1 4/2009 Fisher et al.
2009/0118100 A1 5/2009 Oliver et al.
2009/0144639 A1 6/2009 Nims et al.
2009/0149299 A1 6/2009 Tchao et al.
2009/0158167 A1 6/2009 Wang et al.
2009/0164567 A1 6/2009 Hara
2009/0170532 A1 7/2009 Lee et al.
2009/0192823 A1 7/2009 Hawkins et al.
2009/0195497 A1 8/2009 Fitzgerald et al.
2009/0198581 A1 8/2009 Lidestri
2009/0205041 A1 8/2009 Michalske
2009/0210078 A1 8/2009 Crowley
2009/0216556 A1 8/2009 Martin et al.
2009/0222056 A1 9/2009 Lindh et al.
2009/0222761 A1 9/2009 Hayashi
2009/0231960 A1 9/2009 Hutcheson
2009/0233771 A1 9/2009 Quatrochi et al.
2009/0249076 A1 10/2009 Reed et al.
2009/0253516 A1 10/2009 Hartmann et al.
2009/0259134 A1 10/2009 Levine
2009/0262088 A1 10/2009 Moll-Carrillo et al.
2009/0268949 A1 10/2009 Ueshima et al.
2009/0276463 A1 11/2009 Miller et al.
2009/0287103 A1 11/2009 Pillai
2009/0291805 A1 11/2009 Blum et al.
2009/0292561 A1 11/2009 Itoh
2009/0300598 A1 12/2009 Choi
2009/0311993 A1 12/2009 Horodezky
2009/0313579 A1 12/2009 Poulson et al.
2009/0319243 A1 12/2009 Suarez-Rivera et al.
2009/0319467 A1 12/2009 Berg et al.
2010/0005008 A1 1/2010 Duncker et al.
2010/0011309 A1 1/2010 Mitra et al.
2010/0030094 A1 2/2010 Lundback
2010/0031202 A1 2/2010 Morris et al.
2010/0042949 A1 2/2010 Chen
2010/0048358 A1 2/2010 Tchao et al.
2010/0054519 A1 3/2010 Mulvey et al.
2010/0060586 A1 3/2010 Pisula et al.
2010/0062818 A1 3/2010 Haughay et al.
2010/0062905 A1* 3/2010 Rottler .............. H04M 1/72403
482/9
2010/0063840 A1 3/2010 Hoyme et al.

(56) References Cited

U.S. PATENT DOCUMENTS

2010/0064255 A1 3/2010 Rottler et al.
2010/0076331 A1 3/2010 Chan et al.
2010/0079291 A1 4/2010 Kroll et al.
2010/0082784 A1 4/2010 Rosenblatt et al.
2010/0103101 A1 4/2010 Song et al.
2010/0121700 A1 5/2010 Wigder et al.
2010/0125785 A1 5/2010 Moore et al.
2010/0130890 A1 5/2010 Matsumura et al.
2010/0137106 A1 6/2010 Oshima et al.
2010/0145209 A1 6/2010 Lee et al.
2010/0151908 A1 6/2010 Skarby et al.
2010/0151918 A1 6/2010 Annambhotla et al.
2010/0152600 A1 6/2010 Droitcour et al.
2010/0157742 A1 6/2010 Relyea et al.
2010/0179832 A1 7/2010 Van et al.
2010/0179833 A1 7/2010 Roizen et al.
2010/0184564 A1 7/2010 Molyneux et al.
2010/0190468 A1 7/2010 Scott et al.
2010/0194692 A1 8/2010 Orr et al.
2010/0197463 A1 8/2010 Haughay et al.
2010/0198453 A1 8/2010 Dorogusker et al.
2010/0202368 A1 8/2010 Hans
2010/0211685 A1 8/2010 Mcdowall et al.
2010/0222645 A1 9/2010 Nadler et al.
2010/0222859 A1 9/2010 Govari et al.
2010/0223563 A1 9/2010 Green
2010/0225962 A1 9/2010 Okigami et al.
2010/0226213 A1 9/2010 Drugge
2010/0231612 A1 9/2010 Chaudhri et al.
2010/0264097 A1 10/2010 Sun et al.
2010/0269055 A1 10/2010 Daikeler et al.
2010/0269157 A1 10/2010 Experton
2010/0273610 A1 10/2010 Johnson
2010/0281374 A1 11/2010 Schulz et al.
2010/0292599 A1 11/2010 Oleson et al.
2010/0292600 A1 11/2010 Dibenedetto et al.
2010/0295795 A1 11/2010 Wilairat
2010/0298899 A1 11/2010 Donnelly et al.
2010/0299601 A1 11/2010 Kaplan et al.
2010/0305965 A1 12/2010 Benjamin et al.
2010/0309149 A1 12/2010 Blumenberg et al.
2010/0311544 A1 12/2010 Robinette et al.
2010/0331145 A1 12/2010 Lakovic et al.
2011/0003665 A1 1/2011 Burton et al.
2011/0004835 A1 1/2011 Yanchar et al.
2011/0010195 A1 1/2011 Cohn et al.
2011/0010200 A1 1/2011 Firozvi et al.
2011/0016120 A1 1/2011 Haughay et al.
2011/0029750 A1 2/2011 Jang et al.
2011/0032105 A1 2/2011 Hoffman et al.
2011/0052005 A1 3/2011 Selner
2011/0059769 A1 3/2011 Brunolli
2011/0061010 A1 3/2011 Wasko et al.
2011/0066051 A1 3/2011 Moon et al.
2011/0071869 A1 3/2011 Obrien et al.
2011/0074699 A1 3/2011 Marr et al.
2011/0083111 A1 4/2011 Forutanpour et al.
2011/0087076 A1 4/2011 Brynelsen et al.
2011/0088086 A1 4/2011 Swink et al.
2011/0093728 A1 4/2011 Das
2011/0098928 A1 4/2011 Hoffman et al.
2011/0106553 A1 5/2011 Tanaka et al.
2011/0106954 A1 5/2011 Chatterjee et al.
2011/0111735 A1 5/2011 Pietrow
2011/0112418 A1 5/2011 Feild et al.
2011/0113337 A1 5/2011 Liu et al.
2011/0113430 A1 5/2011 Fuse
2011/0125041 A1 5/2011 Fischell et al.
2011/0130168 A1 6/2011 Vendrow et al.
2011/0137678 A1 6/2011 Williams
2011/0137836 A1 6/2011 Kuriyama et al.
2011/0159469 A1 6/2011 Hwang et al.
2011/0167369 A1 7/2011 van Os
2011/0193878 A1 8/2011 Seo et al.
2011/0197165 A1 8/2011 Filippov et al.
2011/0201911 A1 8/2011 Johnson et al.
2011/0202883 A1 8/2011 Oh et al.
2011/0205851 A1 8/2011 Harris
2011/0213276 A1 9/2011 Sarussi et al.
2011/0218765 A1 9/2011 Rogers et al.
2011/0227872 A1 9/2011 Huska et al.
2011/0227946 A1 9/2011 Yoshizawa et al.
2011/0230169 A1 9/2011 Ohki
2011/0230986 A1 9/2011 Lafortune et al.
2011/0234152 A1 9/2011 Frossen et al.
2011/0246241 A1 10/2011 Hasan et al.
2011/0246509 A1 10/2011 Migita et al.
2011/0248992 A1 10/2011 Van et al.
2011/0257638 A1 10/2011 Boukhny et al.
2011/0261079 A1 10/2011 Ingrassia et al.
2011/0271223 A1 11/2011 Cruz Moreno et al.
2011/0275940 A1 11/2011 Nims et al.
2011/0276683 A1 11/2011 Goldschlag et al.
2011/0281249 A1 11/2011 Gammell et al.
2011/0296324 A1 12/2011 Goossens et al.
2011/0304685 A1 12/2011 Khedouri et al.
2011/0306389 A1 12/2011 Nagayama
2011/0307821 A1 12/2011 Martens
2011/0307880 A1 12/2011 Hilerio et al.
2012/0001922 A1 1/2012 Escher et al.
2012/0015778 A1 1/2012 Lee et al.
2012/0015779 A1* 1/2012 Powch ................ A61B 5/0022 482/9
2012/0022884 A1 1/2012 Chillemi
2012/0023131 A1 1/2012 Downey et al.
2012/0030623 A1 2/2012 Hoellwarth
2012/0034897 A1 2/2012 Kreitzer et al.
2012/0036220 A1 2/2012 Dare et al.
2012/0036460 A1 2/2012 Cieplinski et al.
2012/0041767 A1 2/2012 Hoffman et al.
2012/0042039 A1 2/2012 Mark
2012/0044062 A1 2/2012 Jersa et al.
2012/0046784 A1 2/2012 Malina et al.
2012/0047447 A1 2/2012 Haq
2012/0059664 A1 3/2012 Georgiev et al.
2012/0059787 A1 3/2012 Brown et al.
2012/0060092 A1 3/2012 Hill et al.
2012/0060118 A1 3/2012 Gupta et al.
2012/0066628 A1 3/2012 Ens et al.
2012/0071770 A1 3/2012 Grey et al.
2012/0079122 A1 3/2012 Brown et al.
2012/0083258 A1 4/2012 Rabii et al.
2012/0083294 A1 4/2012 Bray et al.
2012/0089419 A1 4/2012 Huster et al.
2012/0092379 A1 4/2012 Tsuji et al.
2012/0092383 A1 4/2012 Hysek et al.
2012/0105225 A1 5/2012 Valtonen
2012/0109836 A1 5/2012 Chen et al.
2012/0116550 A1 5/2012 Hoffman et al.
2012/0116684 A1 5/2012 Ingrassia et al.
2012/0117507 A1 5/2012 Tseng et al.
2012/0119911 A1 5/2012 Jeon et al.
2012/0131441 A1 5/2012 Jitkoff et al.
2012/0143013 A1 6/2012 Davis et al.
2012/0143094 A1 6/2012 Jallon
2012/0143095 A1 6/2012 Nakamura
2012/0150446 A1 6/2012 Chang et al.
2012/0150759 A1 6/2012 Tarjan
2012/0159380 A1 6/2012 Kocienda et al.
2012/0169608 A1 7/2012 Forutanpour et al.
2012/0169882 A1 7/2012 Millar et al.
2012/0171649 A1 7/2012 Wander et al.
2012/0179278 A1 7/2012 Riley et al.
2012/0179319 A1 7/2012 Gilman et al.
2012/0197523 A1 8/2012 Kirsch
2012/0209829 A1 8/2012 Thomas et al.
2012/0215328 A1 8/2012 Schmelzer
2012/0226117 A1 9/2012 Lamego et al.
2012/0232414 A1 9/2012 Mollicone et al.
2012/0251079 A1 10/2012 Meschter et al.
2012/0253485 A1 10/2012 Weast et al.
2012/0253488 A1 10/2012 Shaw et al.
2012/0254263 A1 10/2012 Hiestermann et al.
2012/0258684 A1 10/2012 Franz et al.

(56) References Cited

U.S. PATENT DOCUMENTS

2012/0274508 A1 11/2012 Brown et al.
2012/0283855 A1 11/2012 Hoffman et al.
2012/0290109 A1 11/2012 Engelberg et al.
2012/0302840 A1 11/2012 Kubo
2012/0302843 A1 11/2012 Otsubo et al.
2012/0310389 A1 12/2012 Martin
2012/0310674 A1 12/2012 Faulkner et al.
2012/0313776 A1 12/2012 Utter
2012/0317167 A1 12/2012 Rahman et al.
2012/0317430 A1 12/2012 Rahman et al.
2012/0323129 A1 12/2012 Fujita et al.
2012/0324390 A1 12/2012 Tao et al.
2012/0326873 A1 12/2012 Utter
2013/0013327 A1 1/2013 Horseman
2013/0016818 A1 1/2013 Cohn
2013/0017846 A1 1/2013 Schoppe
2013/0027341 A1 1/2013 Mastandrea
2013/0031490 A1 1/2013 Joo et al.
2013/0044072 A1 2/2013 Kobayashi et al.
2013/0050263 A1 2/2013 Khoe et al.
2013/0053990 A1 2/2013 Ackland
2013/0054150 A1 2/2013 Sacks et al.
2013/0054634 A1 2/2013 Chakraborty et al.
2013/0054720 A1 2/2013 Kang et al.
2013/0055147 A1 2/2013 Vasudev et al.
2013/0063383 A1 3/2013 Anderssonreimer et al.
2013/0067050 A1 3/2013 Kotteri et al.
2013/0069893 A1 3/2013 Brinda et al.
2013/0081083 A1 3/2013 Yu et al.
2013/0093715 A1 4/2013 Marsden et al.
2013/0103814 A1 4/2013 Carrasco et al.
2013/0106603 A1 5/2013 Weast et al.
2013/0106684 A1 5/2013 Weast et al.
2013/0110264 A1 5/2013 Weast et al.
2013/0111579 A1 5/2013 Newman et al.
2013/0115583 A1 5/2013 Gordon et al.
2013/0117696 A1 5/2013 Robertson et al.
2013/0132028 A1 5/2013 Crankson et al.
2013/0137073 A1 5/2013 Nacey et al.
2013/0138734 A1 5/2013 Crivello et al.
2013/0141233 A1 6/2013 Jacobs et al.
2013/0142495 A1 6/2013 Terai
2013/0143512 A1 6/2013 Hernandez et al.
2013/0151285 A1 6/2013 Mclaren et al.
2013/0151523 A1 6/2013 Hsi
2013/0158367 A1 6/2013 Pacione et al.
2013/0184613 A1 7/2013 Homsi et al.
2013/0185097 A1 7/2013 Saria et al.
2013/0187923 A1 7/2013 Yoshimoto et al.
2013/0188322 A1 7/2013 Lowe et al.
2013/0190083 A1 7/2013 Toy et al.
2013/0191034 A1 7/2013 Weast et al.
2013/0197679 A1 8/2013 Balakrishnan et al.
2013/0198672 A1 8/2013 Yoon et al.
2013/0203475 A1 8/2013 Shin et al.
2013/0205210 A1 8/2013 Jeon et al.
2013/0209972 A1 8/2013 Carter et al.
2013/0215119 A1 8/2013 Vanhoecke
2013/0217253 A1 8/2013 Golko et al.
2013/0217979 A1 8/2013 Blackadar et al.
2013/0222270 A1 8/2013 Winkler et al.
2013/0223707 A1 8/2013 Stephenson
2013/0225118 A1 8/2013 Jang et al.
2013/0231575 A1 9/2013 Erkkila et al.
2013/0231711 A1 9/2013 Kaib
2013/0233097 A1 9/2013 Hayner et al.
2013/0238287 A1 9/2013 Hoffman et al.
2013/0238360 A1 9/2013 Bhathal
2013/0239063 A1 9/2013 Ubillos et al.
2013/0244633 A1 9/2013 Jacobs et al.
2013/0245966 A1 9/2013 Burroughs et al.
2013/0254685 A1 9/2013 Batraski et al.
2013/0254705 A1 9/2013 Mooring et al.
2013/0260896 A1 10/2013 Miura et al.
2013/0262155 A1 10/2013 Hinkamp
2013/0263719 A1 10/2013 Watterson et al.
2013/0274904 A1 10/2013 Coza et al.
2013/0290013 A1 10/2013 Forrester et al.
2013/0295872 A1 11/2013 Guday et al.
2013/0304276 A1 11/2013 Flies
2013/0310726 A1 11/2013 Miller et al.
2013/0324210 A1 12/2013 Doig et al.
2013/0325358 A1 12/2013 Oshima et al.
2013/0325394 A1 12/2013 Yuen et al.
2013/0325396 A1 12/2013 Yuen et al.
2013/0325758 A1 12/2013 Alphin et al.
2013/0330694 A1 12/2013 Watterson
2013/0332286 A1 12/2013 Medelius et al.
2013/0332856 A1 12/2013 Sanders et al.
2013/0345978 A1 12/2013 Lush et al.
2014/0006769 A1 1/2014 Chory et al.
2014/0022183 A1 1/2014 Ayoub et al.
2014/0025737 A1 1/2014 Kruglick
2014/0035761 A1 2/2014 Burton et al.
2014/0037107 A1 2/2014 Marino et al.
2014/0038781 A1 2/2014 Foley et al.
2014/0039840 A1 2/2014 Yuen et al.
2014/0058812 A1 2/2014 Bender et al.
2014/0059125 A1 2/2014 Hillier
2014/0059493 A1 2/2014 Kim
2014/0067096 A1 3/2014 Aibara
2014/0068520 A1 3/2014 Missig et al.
2014/0073298 A1 3/2014 Rossmann
2014/0074570 A1 3/2014 Hope et al.
2014/0075234 A1 3/2014 Stekkelpak et al.
2014/0081666 A1 3/2014 Teller et al.
2014/0082383 A1 3/2014 De Cesare et al.
2014/0082384 A1 3/2014 De Cesare et al.
2014/0089836 A1 3/2014 Damani et al.
2014/0092101 A1 4/2014 Lee et al.
2014/0101565 A1 4/2014 Mahieu et al.
2014/0107524 A1 4/2014 Brull et al.
2014/0108998 A1 4/2014 Chaudhri et al.
2014/0128021 A1 5/2014 Walker et al.
2014/0129255 A1 5/2014 Woodson et al.
2014/0135955 A1 5/2014 Burroughs
2014/0139637 A1 5/2014 Mistry et al.
2014/0143678 A1 5/2014 Mistry et al.
2014/0143737 A1 5/2014 Mistry et al.
2014/0155154 A1 6/2014 Laakkonen et al.
2014/0156292 A1 6/2014 Kozicki et al.
2014/0171266 A1 6/2014 Hawkins et al.
2014/0172460 A1 6/2014 Kohli
2014/0172864 A1 6/2014 Shum
2014/0176346 A1 6/2014 Brumback et al.
2014/0176475 A1 6/2014 Myers et al.
2014/0179272 A1 6/2014 Zhang et al.
2014/0180786 A1 6/2014 Sullivan
2014/0181205 A1 6/2014 Sherrets et al.
2014/0181558 A1 6/2014 Taha et al.
2014/0187314 A1 7/2014 Perry et al.
2014/0187323 A1 7/2014 Perry
2014/0189584 A1 7/2014 Weng et al.
2014/0195826 A1 7/2014 Wojcik et al.
2014/0197946 A1 7/2014 Park et al.
2014/0200691 A1 7/2014 Lee et al.
2014/0208250 A1 7/2014 Ording et al.
2014/0213415 A1 7/2014 Parker et al.
2014/0218369 A1 8/2014 Yuen et al.
2014/0221790 A1 8/2014 Pacione et al.
2014/0228647 A1 8/2014 Sakamoto et al.
2014/0236459 A1 8/2014 Boesch et al.
2014/0239065 A1 8/2014 Zhou et al.
2014/0240122 A1 8/2014 Roberts et al.
2014/0240349 A1 8/2014 Tuukkanen
2014/0244009 A1 8/2014 Mestas
2014/0245161 A1 8/2014 Yuen et al.
2014/0245177 A1 8/2014 Maklouf et al.
2014/0250391 A1 9/2014 Jong et al.
2014/0257537 A1 9/2014 Stroupe et al.
2014/0266731 A1 9/2014 Malhotra
2014/0274413 A1 9/2014 Chelst
2014/0275852 A1 9/2014 Hong et al.
2014/0275854 A1 9/2014 Venkatraman et al.

(56) References Cited

U.S. PATENT DOCUMENTS

2014/0277628 A1 9/2014 Nieminen et al.
2014/0278229 A1 9/2014 Hong et al.
2014/0280498 A1 9/2014 Frankel et al.
2014/0282103 A1 9/2014 Jerry
2014/0282153 A1 9/2014 Christiansen et al.
2014/0282207 A1 9/2014 Wouhaybi et al.
2014/0287821 A1 9/2014 Barclay et al.
2014/0288680 A1 9/2014 Hoffman et al.
2014/0289660 A1 9/2014 Min
2014/0293755 A1 10/2014 Geiser et al.
2014/0304738 A1 10/2014 Nakaoka et al.
2014/0310598 A1 10/2014 Sprague et al.
2014/0310618 A1 10/2014 Venkatesh
2014/0310643 A1 10/2014 Karmanenko et al.
2014/0317543 A1 10/2014 Kim
2014/0317555 A1 10/2014 Choi et al.
2014/0325384 A1 10/2014 Kobayashi
2014/0325408 A1 10/2014 Leppanen et al.
2014/0331314 A1 11/2014 Fujioka
2014/0336796 A1 11/2014 Agnew
2014/0337041 A1 11/2014 Madden et al.
2014/0337450 A1 11/2014 Choudhary et al.
2014/0337451 A1 11/2014 Choudhary et al.
2014/0344693 A1 11/2014 Reese et al.
2014/0344723 A1 11/2014 Malik et al.
2014/0344862 A1 11/2014 Cho et al.
2014/0344951 A1 11/2014 Brewer
2014/0358012 A1 12/2014 Richards et al.
2014/0358473 A1 12/2014 Goel et al.
2014/0358584 A1 12/2014 Worden et al.
2014/0362056 A1 12/2014 Zambetti et al.
2014/0365913 A1 12/2014 Santamaria et al.
2014/0371887 A1 12/2014 Hoffman et al.
2015/0004578 A1 1/2015 Gilley et al.
2015/0011204 A1 1/2015 Seo et al.
2015/0018632 A1 1/2015 Khair
2015/0026615 A1 1/2015 Choi et al.
2015/0033149 A1 1/2015 Kuchoor
2015/0046814 A1 2/2015 Haughay et al.
2015/0057942 A1 2/2015 Self et al.
2015/0057943 A1 2/2015 Self et al.
2015/0057945 A1 2/2015 White et al.
2015/0058093 A1 2/2015 Jakobs
2015/0058263 A1 2/2015 Landers
2015/0061891 A1 3/2015 Oleson et al.
2015/0065095 A1 3/2015 Seo et al.
2015/0065302 A1 3/2015 Ou et al.
2015/0066172 A1 3/2015 Yi
2015/0067513 A1 3/2015 Zambetti et al.
2015/0067811 A1 3/2015 Agnew et al.
2015/0074571 A1 3/2015 Marti et al.
2015/0080023 A1 3/2015 Yang et al.
2015/0081059 A1 3/2015 Hwang et al.
2015/0081060 A1 3/2015 Hwang et al.
2015/0081529 A1 3/2015 Lee et al.
2015/0082167 A1 3/2015 Yeh et al.
2015/0083970 A1 3/2015 Koh et al.
2015/0098309 A1 4/2015 Adams et al.
2015/0100245 A1 4/2015 Huang et al.
2015/0100982 A1 4/2015 Sirpal et al.
2015/0106025 A1 4/2015 Keller et al.
2015/0112700 A1 4/2015 Sublett et al.
2015/0112990 A1 4/2015 Van Os et al.
2015/0113553 A1 4/2015 Pan
2015/0118657 A1 4/2015 Shrake et al.
2015/0124067 A1 5/2015 Bala et al.
2015/0130830 A1 5/2015 Nagasaki et al.
2015/0133748 A1 5/2015 Edmonds et al.
2015/0142689 A1 5/2015 Squires
2015/0153943 A1 6/2015 Wang
2015/0160856 A1 6/2015 Jang et al.
2015/0164349 A1 6/2015 Gopalakrishnan et al.
2015/0180746 A1 6/2015 Day et al.
2015/0180980 A1 6/2015 Welinder et al.
2015/0181314 A1 6/2015 Swanson
2015/0182843 A1 7/2015 Esposito et al.
2015/0185967 A1 7/2015 Ly et al.
2015/0185995 A1 7/2015 Shoemaker et al.
2015/0193805 A1 7/2015 Filipiak
2015/0196804 A1 7/2015 Koduri et al.
2015/0196805 A1 7/2015 Koduri et al.
2015/0199494 A1 7/2015 Koduri et al.
2015/0205492 A1 7/2015 Nobil
2015/0205509 A1 7/2015 Scriven et al.
2015/0205930 A1 7/2015 Shaanan et al.
2015/0208115 A1 7/2015 Kutsumi et al.
2015/0217163 A1 8/2015 Amis et al.
2015/0220523 A1 8/2015 Lagree
2015/0220883 A1 8/2015 Bfar et al.
2015/0227609 A1 8/2015 Shoemaker et al.
2015/0227782 A1 8/2015 Salvador et al.
2015/0248535 A1 9/2015 Cho
2015/0251053 A1 9/2015 Hoffman et al.
2015/0253740 A1 9/2015 Nishijima et al.
2015/0256491 A1 9/2015 Eatough et al.
2015/0262497 A1 9/2015 Landau et al.
2015/0269848 A1 9/2015 Yuen et al.
2015/0286391 A1 10/2015 Jacobs et al.
2015/0293592 A1 10/2015 Cheong et al.
2015/0294440 A1 10/2015 Roberts
2015/0295901 A1 10/2015 Woodward et al.
2015/0297134 A1 10/2015 Albert et al.
2015/0301506 A1 10/2015 Koumalha
2015/0301691 A1 10/2015 Qin
2015/0317147 A1 11/2015 Nachimuthu et al.
2015/0324751 A1 11/2015 Orenstein et al.
2015/0331589 A1 11/2015 Kawakita
2015/0334546 A1 11/2015 Diamond
2015/0341695 A1 11/2015 Pattan
2015/0343709 A1 12/2015 Gerstle et al.
2015/0347711 A1 12/2015 Soli et al.
2015/0350141 A1 12/2015 Yang et al.
2015/0350861 A1 12/2015 Soli et al.
2015/0351655 A1 12/2015 Coleman
2015/0355804 A1 12/2015 Nguyen et al.
2015/0364057 A1 12/2015 Catani et al.
2015/0374267 A1 12/2015 Laughlin
2015/0374310 A1 12/2015 Lee
2016/0000379 A1 1/2016 Pougatchev et al.
2016/0004393 A1 1/2016 Faaborg et al.
2016/0004432 A1 1/2016 Bernstein et al.
2016/0012294 A1 1/2016 Bouck
2016/0014266 A1 1/2016 Bhatt
2016/0015275 A1 1/2016 Samadani et al.
2016/0019360 A1 1/2016 Pahwa et al.
2016/0022202 A1 1/2016 Peterson et al.
2016/0027282 A1 1/2016 Lee
2016/0027420 A1 1/2016 Eronen
2016/0028869 A1 1/2016 Bhatt
2016/0034133 A1 2/2016 Wilson et al.
2016/0034148 A1 2/2016 Wilson et al.
2016/0038038 A1 2/2016 Kovacs
2016/0044269 A1 2/2016 Kang
2016/0048298 A1 2/2016 Choi et al.
2016/0054841 A1 2/2016 Yang et al.
2016/0058331 A1 3/2016 Keen et al.
2016/0058336 A1 3/2016 Blahnik et al.
2016/0058337 A1 3/2016 Blahnik et al.
2016/0062464 A1 3/2016 Moussette et al.
2016/0062582 A1 3/2016 Wilson et al.
2016/0062589 A1 3/2016 Wan et al.
2016/0063748 A1 3/2016 Kim et al.
2016/0065505 A1 3/2016 Iskander
2016/0066005 A1 3/2016 Davis et al.
2016/0070275 A1 3/2016 Anderson et al.
2016/0072896 A1 3/2016 Petersen et al.
2016/0073034 A1 3/2016 Mukherjee et al.
2016/0085937 A1 3/2016 Dettinger et al.
2016/0098137 A1 4/2016 Kim et al.
2016/0098160 A1 4/2016 Groset
2016/0103970 A1 4/2016 Liu et al.
2016/0107031 A1 4/2016 Palatsi et al.
2016/0135731 A1 5/2016 Drennan
2016/0140828 A1 5/2016 Deforest

(56) References Cited

U.S. PATENT DOCUMENTS

2016/0150063 A1 5/2016 Choi et al.
2016/0156584 A1 6/2016 Hum et al.
2016/0166195 A1 6/2016 Radecka et al.
2016/0180568 A1 6/2016 Bullivant et al.
2016/0187995 A1 6/2016 Rosewall
2016/0188181 A1 6/2016 Smith
2016/0193500 A1 7/2016 Webster et al.
2016/0196635 A1 7/2016 Cho et al.
2016/0196759 A1 7/2016 Kim et al.
2016/0196760 A1 7/2016 Koo et al.
2016/0197773 A1 7/2016 Pandrangi et al.
2016/0199697 A1 7/2016 Orfield
2016/0202889 A1 7/2016 Shin et al.
2016/0203691 A1 7/2016 Arnold et al.
2016/0210099 A1 7/2016 Hampapuram et al.
2016/0210568 A1 7/2016 Krupa et al.
2016/0217601 A1 7/2016 Tsuda et al.
2016/0220175 A1 8/2016 Tam et al.
2016/0220225 A1 8/2016 Wang et al.
2016/0220867 A1 8/2016 Flaherty
2016/0226713 A1 8/2016 Pitschel et al.
2016/0235374 A1 8/2016 Miller et al.
2016/0239724 A1 8/2016 Arfvidsson et al.
2016/0246880 A1 8/2016 Battiah et al.
2016/0249864 A1 9/2016 Kang et al.
2016/0250517 A1 9/2016 Tilvis et al.
2016/0253864 A1 9/2016 Weber et al.
2016/0256082 A1 9/2016 Ely et al.
2016/0256346 A1 9/2016 Stockmaster et al.
2016/0256741 A1 9/2016 Holma et al.
2016/0261675 A1 9/2016 Block et al.
2016/0263435 A1 9/2016 Venkatraman et al.
2016/0270717 A1 9/2016 Luna et al.
2016/0278659 A1 9/2016 Kaib et al.
2016/0278667 A1 9/2016 Villard et al.
2016/0279475 A1 9/2016 Aragones et al.
2016/0296798 A1 10/2016 Balakrishnan et al.
2016/0301794 A1 10/2016 Schlakman et al.
2016/0302680 A1 10/2016 Narusawa et al.
2016/0302717 A1 10/2016 Tawa et al.
2016/0321932 A1 11/2016 Mitchell et al.
2016/0324457 A1 11/2016 Dagum
2016/0327911 A1 11/2016 Eim et al.
2016/0328736 A1 11/2016 Wang et al.
2016/0332025 A1 11/2016 Repka
2016/0346607 A1 12/2016 Rapfogel
2016/0357363 A1 12/2016 Decker et al.
2016/0371464 A1 12/2016 Bricker
2016/0373631 A1 12/2016 Titi et al.
2016/0375306 A1 12/2016 Gu et al.
2016/0379511 A1 12/2016 Dawson et al.
2017/0001073 A1 1/2017 Krueger et al.
2017/0007882 A1 1/2017 Werner
2017/0011210 A1 1/2017 Cheong et al.
2017/0014037 A1 1/2017 Coppola et al.
2017/0021184 A1 1/2017 Pavel et al.
2017/0024399 A1 1/2017 Boyle et al.
2017/0024539 A1 1/2017 Webb et al.
2017/0026430 A1 1/2017 Beckhardt et al.
2017/0032168 A1 2/2017 Kim
2017/0039535 A1 2/2017 Park et al.
2017/0041549 A1 2/2017 Kim et al.
2017/0045866 A1 2/2017 Hou et al.
2017/0046108 A1 2/2017 Kang et al.
2017/0053542 A1 2/2017 Wilson et al.
2017/0056722 A1 3/2017 Singh et al.
2017/0063753 A1 3/2017 Probasco et al.
2017/0065224 A1 3/2017 Rahko et al.
2017/0076619 A1 3/2017 Wallach et al.
2017/0080288 A1 3/2017 Roh et al.
2017/0083189 A1 3/2017 Yang et al.
2017/0087412 A1 3/2017 Blahnik
2017/0087469 A1 3/2017 Hardee et al.
2017/0093769 A1 3/2017 Lind et al.
2017/0093780 A1 3/2017 Lieb et al.
2017/0095695 A1 4/2017 Mangusson et al.
2017/0123571 A1 5/2017 Huang et al.
2017/0124276 A1 5/2017 Tee
2017/0134321 A1 5/2017 Ushio et al.
2017/0140143 A1 5/2017 Ahmad et al.
2017/0143262 A1 5/2017 Kurunmäki et al.
2017/0153606 A1 6/2017 Pitis et al.
2017/0153804 A1 6/2017 Kim et al.
2017/0161014 A1 6/2017 Kikugawa et al.
2017/0161462 A1 6/2017 Parker et al.
2017/0177086 A1 6/2017 Yuen et al.
2017/0209766 A1 7/2017 Riley et al.
2017/0237694 A1 8/2017 Choudhary et al.
2017/0239523 A1 8/2017 Cheng et al.
2017/0239524 A1 8/2017 Lee et al.
2017/0239525 A1 8/2017 Kim et al.
2017/0243508 A1 8/2017 Cheng et al.
2017/0249417 A1 8/2017 Gosieski et al.
2017/0255169 A1 9/2017 Lee et al.
2017/0266494 A1 9/2017 Crankson et al.
2017/0266531 A1 9/2017 Elford et al.
2017/0269792 A1 9/2017 Xu et al.
2017/0274149 A1 9/2017 Aeschlimann
2017/0274267 A1 9/2017 Blahnik
2017/0281026 A1 10/2017 Nick et al.
2017/0281057 A1 10/2017 Blahnik et al.
2017/0294174 A1 10/2017 Albadawi et al.
2017/0300186 A1 10/2017 Kuhar et al.
2017/0301039 A1 10/2017 Dyer et al.
2017/0319941 A1 11/2017 Smith et al.
2017/0329933 A1 11/2017 Brust et al.
2017/0330297 A1 11/2017 Cronin et al.
2017/0333752 A1 11/2017 Korkala et al.
2017/0337033 A1 11/2017 Duyan et al.
2017/0344257 A1 11/2017 Gnedin et al.
2017/0348562 A1 12/2017 Jung et al.
2017/0348576 A1 12/2017 Pajonk-Taylor
2017/0354845 A1 12/2017 Williams et al.
2017/0357520 A1 12/2017 De Vries et al.
2017/0359623 A1 12/2017 Folse et al.
2018/0000426 A1 1/2018 Li
2018/0001184 A1 1/2018 Tran et al.
2018/0032234 A1 2/2018 Michalske
2018/0034765 A1 2/2018 Keszler et al.
2018/0036591 A1 2/2018 King et al.
2018/0039406 A1 2/2018 Kong et al.
2018/0053200 A1 2/2018 Cronin et al.
2018/0056132 A1 3/2018 Foley et al.
2018/0065025 A1 3/2018 Toda et al.
2018/0074462 A1 3/2018 Helder et al.
2018/0074464 A1 3/2018 Essery et al.
2018/0077344 A1 3/2018 Bostick et al.
2018/0077461 A1 3/2018 Li
2018/0078182 A1 3/2018 Chen et al.
2018/0081515 A1 3/2018 Block et al.
2018/0085058 A1 3/2018 Chakravarthi et al.
2018/0121060 A1 5/2018 Jeong et al.
2018/0126248 A1 5/2018 Dion et al.
2018/0133537 A1 5/2018 Montantes
2018/0137937 A1 5/2018 Gass et al.
2018/0140211 A1 5/2018 Nakazawa et al.
2018/0140903 A1 5/2018 Poure et al.
2018/0140927 A1 5/2018 Kito et al.
2018/0143761 A1 5/2018 Choi et al.
2018/0150709 A1 5/2018 Ha
2018/0157452 A1 6/2018 Nelson et al.
2018/0177437 A1 6/2018 Yoshioka
2018/0182491 A1 6/2018 Belliveau et al.
2018/0189077 A1 7/2018 Gupta et al.
2018/0206766 A1 7/2018 Blahnik et al.
2018/0247706 A1 8/2018 Riley et al.
2018/0272190 A1 9/2018 Miura et al.
2018/0294053 A1 10/2018 Runyon et al.
2018/0300037 A1 10/2018 Takeda et al.
2018/0316783 A1 11/2018 Ye et al.
2018/0316964 A1 11/2018 Dillon et al.
2018/0318647 A1 11/2018 Foley et al.
2018/0329584 A1 11/2018 Williams et al.
2018/0339195 A1 11/2018 Bernotas

(56) References Cited

U.S. PATENT DOCUMENTS

2018/0345078 A1 12/2018 Blahnik et al.
2018/0364648 A1 12/2018 Chi et al.
2018/0367484 A1 12/2018 Rodriguez et al.
2019/0008394 A1 1/2019 Rao et al.
2019/0008467 A1 1/2019 Averina et al.
2019/0025995 A1 1/2019 Williams
2019/0026011 A1 1/2019 Wang et al.
2019/0034049 A1 1/2019 Williams et al.
2019/0034050 A1 1/2019 Williams et al.
2019/0072909 A1 3/2019 Misaki et al.
2019/0089701 A1 3/2019 Mercury et al.
2019/0095786 A1* 3/2019 Carbune .................. G06N 7/01
2019/0102049 A1 4/2019 Anzures et al.
2019/0104951 A1 4/2019 Valys et al.
2019/0126099 A1 5/2019 Hoang
2019/0141418 A1 5/2019 Harma et al.
2019/0143194 A1 5/2019 Evancha et al.
2019/0184234 A1 6/2019 Packles et al.
2019/0205010 A1 7/2019 Fujii et al.
2019/0209777 A1 7/2019 O'connell et al.
2019/0220243 A1 7/2019 Decker et al.
2019/0232110 A1 8/2019 Williams et al.
2019/0232111 A1 8/2019 Williams et al.
2019/0240534 A1 8/2019 Black
2019/0240536 A1 8/2019 Dibenedetto et al.
2019/0240537 A1 8/2019 Hisada et al.
2019/0250813 A1 8/2019 Block et al.
2019/0268771 A1 8/2019 Seo et al.
2019/0274565 A1 9/2019 Soli et al.
2019/0279520 A1 9/2019 Wilson et al.
2019/0334782 A1 10/2019 Dellinger et al.
2019/0336044 A1 11/2019 Williams et al.
2019/0336045 A1 11/2019 Williams et al.
2019/0336827 A1 11/2019 Intonato et al.
2019/0339822 A1 11/2019 Devine et al.
2019/0339849 A1 11/2019 Williams et al.
2019/0339860 A1 11/2019 Chen et al.
2019/0342616 A1 11/2019 Domm et al.
2019/0349463 A1 11/2019 Soli et al.
2019/0356614 A1 11/2019 Schubert et al.
2019/0364120 A1 11/2019 Bandela et al.
2019/0387982 A1 12/2019 Buller
2020/0014967 A1 1/2020 Putnam
2020/0026398 A1 1/2020 Kim
2020/0054931 A1 2/2020 Martin et al.
2020/0098278 A1 3/2020 Doti et al.
2020/0101365 A1 4/2020 Wilson et al.
2020/0110814 A1 4/2020 Abuelsaad et al.
2020/0149921 A1 5/2020 Hoffman et al.
2020/0160961 A1 5/2020 Wadhawan et al.
2020/0179757 A1 6/2020 Toivonen et al.
2020/0213437 A1 7/2020 Bhatt
2020/0249632 A1 8/2020 Olwal et al.
2020/0261011 A1 8/2020 Seppänen et al.
2020/0261763 A1 8/2020 Park et al.
2020/0276475 A1 9/2020 Casalini
2020/0289919 A1 9/2020 Gruben
2020/0297249 A1 9/2020 Williams et al.
2020/0341610 A1 10/2020 Quintana et al.
2020/0356242 A1 11/2020 Wilson et al.
2020/0357522 A1 11/2020 Pahwa et al.
2020/0359913 A1 11/2020 Ghodrati et al.
2020/0381100 A1 12/2020 Williams et al.
2020/0382613 A1 12/2020 Sundstrom et al.
2021/0001226 A1 1/2021 Suzuki et al.
2021/0007632 A1 1/2021 Blahnik et al.
2021/0007633 A1 1/2021 Blahnik et al.
2021/0008413 A1* 1/2021 Asikainen ............. G06F 3/0304
2021/0035674 A1* 2/2021 Volosin ................ A61B 5/7435
2021/0042028 A1 2/2021 Block et al.
2021/0042132 A1 2/2021 Park et al.
2021/0092488 A1 3/2021 Folse et al.
2021/0093919 A1 4/2021 Lyke et al.
2021/0101052 A1 4/2021 Gore
2021/0110908 A1 4/2021 Blahnik et al.
2021/0113116 A1 4/2021 Chen et al.
2021/0113137 A1 4/2021 Soli et al.
2021/0145321 A1 5/2021 Chen et al.
2021/0170233 A1 6/2021 Quast et al.
2021/0191584 A1 6/2021 Williams et al.
2021/0191600 A1 6/2021 Lemay et al.
2021/0193293 A1 6/2021 Blahnik et al.
2021/0236903 A1 8/2021 Briel
2021/0252337 A1 8/2021 Devine et al.
2021/0252341 A1 8/2021 Devine et al.
2021/0252369 A1 8/2021 Devine et al.
2021/0255747 A1 8/2021 Devine et al.
2021/0255758 A1 8/2021 Devine et al.
2021/0255826 A1* 8/2021 Devine ................. H04W 12/55
2021/0263700 A1 8/2021 Decker et al.
2021/0289067 A1 9/2021 Dellinger et al.
2021/0294438 A1 9/2021 Yang et al.
2021/0316185 A1 10/2021 Mckenna et al.
2021/0350900 A1 11/2021 Blahnik et al.
2021/0352118 A1 11/2021 Ahn et al.
2021/0366608 A1 11/2021 Podobas et al.
2021/0379447 A1 12/2021 Lee
2021/0394020 A1 12/2021 Killen et al.
2021/0397308 A1 12/2021 Rahman et al.
2022/0047918 A1 2/2022 Williams et al.
2022/0062707 A1 3/2022 Bedekar et al.
2022/0066902 A1 3/2022 Narra et al.
2022/0121299 A1 4/2022 De Vries et al.
2022/0157184 A1 5/2022 Wilson et al.
2022/0160258 A1 5/2022 Williams et al.
2022/0180980 A1 6/2022 Alencar et al.
2022/0262485 A1 8/2022 Meschter et al.
2022/0262509 A1 8/2022 Pahwa et al.
2022/0264184 A1 8/2022 Folse et al.
2022/0287629 A1 9/2022 Forsyth et al.
2022/0328161 A1 10/2022 Gilravi et al.
2022/0336077 A1 10/2022 Chen et al.
2022/0365740 A1 11/2022 Chang et al.
2022/0386901 A1 12/2022 Chen et al.
2023/0012755 A1 1/2023 D'auria et al.
2023/0013809 A1 1/2023 D'auria et al.
2023/0013932 A1 1/2023 Blahnik et al.
2023/0014053 A1 1/2023 Devine et al.
2023/0014290 A1 1/2023 Davydov et al.
2023/0017793 A1 1/2023 Williams et al.
2023/0019337 A1 1/2023 D'auria et al.
2023/0024084 A1 1/2023 D'auria et al.
2023/0025724 A1 1/2023 Gilravi et al.
2023/0027358 A1 1/2023 Williams et al.
2023/0031103 A1 2/2023 Decker et al.
2023/0066552 A1 3/2023 Van Os et al.
2023/0079396 A1 3/2023 Sokolowski
2023/0100610 A1 3/2023 Pastrana Vicente et al.
2023/0107803 A1 4/2023 Dugan
2023/0119253 A1 4/2023 Sundstrom et al.
2023/0136700 A1 5/2023 Williams et al.
2023/0179700 A1 6/2023 Bhatt
2023/0191198 A1 6/2023 Lee et al.
2023/0260416 A1 8/2023 Wilson et al.
2023/0310935 A1 10/2023 Su et al.
2023/0390606 A1 12/2023 Bolton et al.
2023/0390626 A1 12/2023 Bolton et al.
2023/0390627 A1 12/2023 Bolton et al.
2023/0393723 A1 12/2023 Arney et al.
2024/0004521 A1 1/2024 Devine et al.
2024/0077309 A1 3/2024 Felton et al.
2024/0081751 A1 3/2024 Murphy et al.
2024/0139608 A1 5/2024 Bolton et al.
2024/0192845 A1 6/2024 Block et al.
2024/0256115 A1 8/2024 Arney et al.
2024/0257940 A1 8/2024 Williams et al.
2024/0306941 A1 9/2024 Williams et al.
2024/0316404 A1 9/2024 Williams et al.
2024/0325821 A1 10/2024 Yu
2024/0366111 A1 11/2024 Chen et al.
2024/0370137 A1 11/2024 Williams et al.
2024/0371516 A1 11/2024 Mistri et al.
2024/0397323 A1 11/2024 Devine et al.
2024/0399208 A1 12/2024 Mikolay et al.

(56) References Cited

U.S. PATENT DOCUMENTS

| | | | |
|---|---|---|---|
| 2024/0399209 A1 | 12/2024 | Mikolay et al. |
| 2024/0402869 A1 | 12/2024 | Boesel et al. |
| 2024/0402880 A1 | 12/2024 | Lareau et al. |
| 2025/0022570 A1 | 1/2025 | Blahnik et al. |
| 2025/0032886 A1 | 1/2025 | Chao et al. |
| 2025/0047777 A1 | 2/2025 | Bhatt |
| 2025/0117127 A1 | 4/2025 | Arney et al. |
| 2025/0153004 A1 | 5/2025 | Williams et al. |
| 2025/0157646 A1 | 5/2025 | Mistri et al. |
| 2025/0174142 A1 | 5/2025 | Wilson et al. |
| 2025/0195954 A1 | 6/2025 | D'Auria et al. |
| 2025/0312677 A1 | 10/2025 | Bignell et al. |
| 2025/0375690 A1 | 12/2025 | Chao |
| 2025/0377765 A1 | 12/2025 | Lareau et al. |
| 2025/0377776 A1 | 12/2025 | Lareau et al. |
| 2025/0391558 A1 | 12/2025 | Felton et al. |

FOREIGN PATENT DOCUMENTS

| | | | |
|---|---|---|---|
| CA | 2897539 | | 10/2014 |
| CA | 2826239 | C | 1/2017 |
| CN | 1337638 | A | 2/2002 |
| CN | 1397904 | A | 2/2003 |
| CN | 1443427 | A | 9/2003 |
| CN | 1523500 | A | 8/2004 |
| CN | 1536511 | A | 10/2004 |
| CN | 1585943 | A | 2/2005 |
| CN | 1628609 | A | 6/2005 |
| CN | 1767789 | A | 5/2006 |
| CN | 1782685 | A | 6/2006 |
| CN | 1824358 | A | 8/2006 |
| CN | 1997050 | A | 7/2007 |
| CN | 101061484 | A | 10/2007 |
| CN | 101150810 | A | 3/2008 |
| CN | 101219046 | A | 7/2008 |
| CN | 101365127 | A | 2/2009 |
| CN | 101444419 | A | 6/2009 |
| CN | 101505320 | A | 8/2009 |
| CN | 101541387 | A | 9/2009 |
| CN | 101566919 | A | 10/2009 |
| CN | 101651870 | A | 2/2010 |
| CN | 101658423 | A | 3/2010 |
| CN | 101668482 | A | 3/2010 |
| CN | 101822020 | A | 9/2010 |
| CN | 101827363 | A | 9/2010 |
| CN | 101828411 | A | 9/2010 |
| CN | 101836894 | A | 9/2010 |
| CN | 101890217 | A | 11/2010 |
| CN | 101894206 | A | 11/2010 |
| CN | 101910992 | A | 12/2010 |
| CN | 101939740 | A | 1/2011 |
| CN | 101978374 | A | 2/2011 |
| CN | 102193895 | A | 9/2011 |
| CN | 102339201 | A | 2/2012 |
| CN | 102438521 | A | 5/2012 |
| CN | 102448555 | | 5/2012 |
| CN | 102449560 | A | 5/2012 |
| CN | 102449561 | A | 5/2012 |
| CN | 102449566 | A | 5/2012 |
| CN | 102549590 | A | 7/2012 |
| CN | 102646081 | A | 8/2012 |
| CN | 102804238 | A | 11/2012 |
| CN | 102814037 | A | 12/2012 |
| CN | 102834079 | A | 12/2012 |
| CN | 102937970 | A | 2/2013 |
| CN | 102989159 | A | 3/2013 |
| CN | 103003668 | A | 3/2013 |
| CN | 103154954 | A | 6/2013 |
| CN | 103182175 | A | 7/2013 |
| CN | 103210355 | A | 7/2013 |
| CN | 103212197 | A | 7/2013 |
| CN | 103270540 | A | 8/2013 |
| CN | 103282937 | A | 9/2013 |
| CN | 103294124 | A | 9/2013 |
| CN | 103297610 | A | 9/2013 |
| CN | 103370924 | A | 10/2013 |
| CN | 103403627 | A | 11/2013 |
| CN | 203276086 | U | 11/2013 |
| CN | 103577108 | A | 2/2014 |
| CN | 103581456 | A | 2/2014 |
| CN | 103646570 | A | 3/2014 |
| CN | 103682785 | A | 3/2014 |
| CN | 103701504 | A | 4/2014 |
| CN | 103876721 | A | 6/2014 |
| CN | 103902808 | A | 7/2014 |
| CN | 103914238 | A | 7/2014 |
| CN | 103973899 | A | 8/2014 |
| CN | 104122994 | A | 10/2014 |
| CN | 104288983 | A | 1/2015 |
| CN | 104464010 | A | 3/2015 |
| CN | 104501043 | A | 4/2015 |
| CN | 104508426 | A | 4/2015 |
| CN | 104815428 | A | 8/2015 |
| CN | 104857692 | A | 8/2015 |
| CN | 104885107 | A | 9/2015 |
| CN | 104917794 | A | 9/2015 |
| CN | 105187282 | A | 12/2015 |
| CN | 105229650 | A | 1/2016 |
| CN | 105260078 | A | 1/2016 |
| CN | 105308634 | A | 2/2016 |
| CN | 105320454 | A | 2/2016 |
| CN | 105392064 | A | 3/2016 |
| CN | 105681328 | A | 6/2016 |
| CN | 105808959 | A | 7/2016 |
| CN | 105874447 | A | 8/2016 |
| CN | 106310638 | A | 1/2017 |
| CN | 106510719 | A | 3/2017 |
| CN | 106537397 | A | 3/2017 |
| CN | 106575149 | A | 4/2017 |
| CN | 106709235 | A | 5/2017 |
| CN | 106878550 | A | 6/2017 |
| CN | 107122049 | A | 9/2017 |
| CN | 107371044 | A | 11/2017 |
| CN | 107469327 | A | 12/2017 |
| CN | 107491259 | A | 12/2017 |
| CN | 107580776 | A | 1/2018 |
| CN | 107710197 | A | 2/2018 |
| CN | 107749310 | A | 3/2018 |
| CN | 107921317 | A | 4/2018 |
| CN | 108200464 | A | 6/2018 |
| CN | 108211310 | A | 6/2018 |
| CN | 109463001 | A | 3/2019 |
| CN | 110456899 | A | 11/2019 |
| CN | 110456971 | A | 11/2019 |
| CN | 110517749 | A | 11/2019 |
| CN | 110531842 | A | 12/2019 |
| CN | 111787984 | A | 10/2020 |
| CN | 111796657 | A | 10/2020 |
| CN | 113190303 | A | 7/2021 |
| EP | 0943290 | A1 | 9/1999 |
| EP | 1559372 | A1 | 8/2005 |
| EP | 1705883 | A1 | 9/2006 |
| EP | 1935339 | A1 | 6/2008 |
| EP | 1938233 | A1 | 7/2008 |
| EP | 2025368 | A2 | 2/2009 |
| EP | 1964022 | B1 | 3/2010 |
| EP | 2309475 | A1 | 4/2011 |
| EP | 2407219 | A2 | 1/2012 |
| EP | 2426902 | A1 | 3/2012 |
| EP | 2529663 | A1 | 12/2012 |
| EP | 2631830 | A2 | 8/2013 |
| EP | 2632139 | A2 | 8/2013 |
| EP | 2728680 | A1 | 5/2014 |
| EP | 2733578 | A2 | 5/2014 |
| EP | 2770454 | A1 | 8/2014 |
| EP | 2993602 | A1 | 3/2016 |
| EP | 3117767 | A1 | 1/2017 |
| EP | 3122038 | A1 | 1/2017 |
| EP | 3130997 | A1 | 2/2017 |
| EP | 3739439 | B1 | 4/2023 |
| GB | 2550639 | A | 11/2017 |
| JP | 5-288869 | A | 11/1993 |
| JP | 6-187118 | A | 7/1994 |
| JP | 7-334463 | A | 12/1995 |

(56) References Cited

FOREIGN PATENT DOCUMENTS

| | | | |
|---|---|---|---|
| JP | 8-126632 | A | 5/1996 |
| JP | 10-90333 | A | 4/1998 |
| JP | 10-202715 | A | 8/1998 |
| JP | 11-84030 | A | 3/1999 |
| JP | 2001-76078 | A | 3/2001 |
| JP | 2001-133293 | A | 5/2001 |
| JP | 2001-216336 | A | 8/2001 |
| JP | 2001-325372 | A | 11/2001 |
| JP | 2002-73486 | A | 3/2002 |
| JP | 2002-190007 | A | 7/2002 |
| JP | 2002-346013 | A | 12/2002 |
| JP | 2003-102868 | A | 4/2003 |
| JP | 2003-126291 | A | 5/2003 |
| JP | 2003-131655 | A | 5/2003 |
| JP | 2003-157323 | A | 5/2003 |
| JP | 2003-216739 | A | 7/2003 |
| JP | 2003-248721 | A | 9/2003 |
| JP | 2003-296246 | A | 10/2003 |
| JP | 2003-319912 | A | 11/2003 |
| JP | 2003-337863 | A | 11/2003 |
| JP | 2004-102609 | A | 4/2004 |
| JP | 2004-113466 | A | 4/2004 |
| JP | 2004-174006 | A | 6/2004 |
| JP | 2004-523826 | A | 8/2004 |
| JP | 2004-364184 | A | 12/2004 |
| JP | 2005-79814 | A | 3/2005 |
| JP | 3635663 | B2 | 4/2005 |
| JP | 2005-339017 | A | 12/2005 |
| JP | 2006-155104 | A | 6/2006 |
| JP | 2006-180899 | A | 7/2006 |
| JP | 2006-230679 | A | 9/2006 |
| JP | 3830956 | B1 | 10/2006 |
| JP | 2006-338233 | A | 12/2006 |
| JP | 2007-260288 | A | 10/2007 |
| JP | 2007-330513 | A | 12/2007 |
| JP | 2008-104758 | A | 5/2008 |
| JP | 2008-183339 | A | 8/2008 |
| JP | 2008-272301 | A | 11/2008 |
| JP | 2009-50471 | A | 3/2009 |
| JP | 2009-68265 | A | 4/2009 |
| JP | 2009-78134 | A | 4/2009 |
| JP | 2009-88989 | A | 4/2009 |
| JP | 2009-112731 | A | 5/2009 |
| JP | 2009-147889 | A | 7/2009 |
| JP | 2009-211241 | A | 9/2009 |
| JP | 2009-282670 | A | 12/2009 |
| JP | 2010-12335 | A | 1/2010 |
| JP | 2010-88886 | A | 4/2010 |
| JP | 2010-517725 | A | 5/2010 |
| JP | 2010-122901 | A | 6/2010 |
| JP | 2010-162297 | A | 7/2010 |
| JP | 2010-181280 | A | 8/2010 |
| JP | 2010-182287 | A | 8/2010 |
| JP | 2010-186249 | A | 8/2010 |
| JP | 2010-206668 | A | 9/2010 |
| JP | 2011-65500 | A | 3/2011 |
| JP | 2011-514192 | A | 5/2011 |
| JP | 2011-125633 | A | 6/2011 |
| JP | 2011-183101 | A | 9/2011 |
| JP | 2011-192126 | A | 9/2011 |
| JP | 2011-525648 | A | 9/2011 |
| JP | 2011-198184 | A | 10/2011 |
| JP | 2011-206323 | A | 10/2011 |
| JP | 2011-210119 | A | 10/2011 |
| JP | 2011-229141 | A | 11/2011 |
| JP | 2011-259253 | A | 12/2011 |
| JP | 2012-20134 | A | 2/2012 |
| JP | 2012-35071 | A | 2/2012 |
| JP | 2012-53642 | A | 3/2012 |
| JP | 2012-59264 | A | 3/2012 |
| JP | 2012-86088 | A | 5/2012 |
| JP | 2012-203537 | A | 10/2012 |
| JP | 2012-524640 | A | 10/2012 |
| JP | 2012-230503 | A | 11/2012 |
| JP | 2012-232114 | A | 11/2012 |
| JP | 2012-533117 | A | 12/2012 |
| JP | 2013-29925 | A | 2/2013 |
| JP | 2013-54468 | A | 3/2013 |
| JP | 2013-103020 | A | 5/2013 |
| JP | 2013-117690 | A | 6/2013 |
| JP | 2013-146557 | A | 8/2013 |
| JP | 2013-530776 | A | 8/2013 |
| JP | 2013-543156 | A | 11/2013 |
| JP | 5346115 | B1 | 11/2013 |
| JP | 2013-544140 | A | 12/2013 |
| JP | 2014-500740 | A | 1/2014 |
| JP | 2014-45782 | A | 3/2014 |
| JP | 2014-45783 | A | 3/2014 |
| JP | 2014-104139 | A | 6/2014 |
| JP | 2014-112404 | A | 6/2014 |
| JP | 5530320 | B2 | 6/2014 |
| JP | 2014-143473 | A | 8/2014 |
| JP | 2014-168685 | A | 9/2014 |
| JP | 2014-171831 | A | 9/2014 |
| JP | 2014-216001 | A | 11/2014 |
| JP | 2014-216868 | A | 11/2014 |
| JP | 2014-230630 | A | 12/2014 |
| JP | 2015-58218 | A | 3/2015 |
| JP | 2015-507811 | A | 3/2015 |
| JP | 2015-509019 | A | 3/2015 |
| JP | 2015-69430 | A | 4/2015 |
| JP | 2015-509755 | A | 4/2015 |
| JP | 2015-515287 | A | 5/2015 |
| JP | 2015-134111 | A | 7/2015 |
| JP | 2015-531916 | A | 11/2015 |
| JP | 2016-17331 | A | 2/2016 |
| JP | 2016-502875 | A | 2/2016 |
| JP | 2016-508631 | A | 3/2016 |
| JP | 2016-52512 | A | 4/2016 |
| JP | 2016-517329 | A | 6/2016 |
| JP | 2016-158867 | A | 9/2016 |
| JP | 2016-528016 | A | 9/2016 |
| JP | 2016-177151 | A | 10/2016 |
| JP | 2016-185288 | A | 10/2016 |
| JP | 2016-202751 | A | 12/2016 |
| JP | 2017-503264 | A | 1/2017 |
| JP | 2017-83978 | A | 5/2017 |
| JP | 2017-134689 | A | 8/2017 |
| JP | 2017-156267 | A | 9/2017 |
| JP | 2017-531235 | A | 10/2017 |
| JP | 2017-211994 | A | 11/2017 |
| JP | 2017-532069 | A | 11/2017 |
| JP | 2018-102908 | A | 7/2018 |
| JP | 2018-202174 | A | 12/2018 |
| JP | 2019-3670 | A | 1/2019 |
| KR | 2003-0070871 | A | 9/2003 |
| KR | 10-2006-0117570 | A | 11/2006 |
| KR | 10-2009-0065988 | A | 6/2009 |
| KR | 10-2009-0112132 | A | 10/2009 |
| KR | 10-2011-0017076 | A | 2/2011 |
| KR | 10-2011-0121394 | A | 11/2011 |
| KR | 10-2012-0023657 | A | 3/2012 |
| KR | 10-2012-0076559 | A | 7/2012 |
| KR | 10-2012-0098854 | A | 9/2012 |
| KR | 10-2012-0132732 | A | 12/2012 |
| KR | 10-2013-0043698 | A | 5/2013 |
| KR | 10-2013-0097235 | A | 9/2013 |
| KR | 10-2013-0109466 | A | 10/2013 |
| KR | 10-2013-0111569 | A | 10/2013 |
| KR | 10-2013-0111570 | A | 10/2013 |
| KR | 10-2013-0135282 | A | 12/2013 |
| KR | 10-2015-0026635 | A | 3/2015 |
| KR | 10-2015-0062761 | A | 6/2015 |
| KR | 10-2016-0027943 | A | 3/2016 |
| KR | 10-2016-0061303 | A | 5/2016 |
| KR | 10-2016-0084705 | A | 7/2016 |
| KR | 10-1646158 | B1 | 8/2016 |
| KR | 10-2016-0105129 | A | 9/2016 |
| KR | 10-2016-0142418 | A | 12/2016 |
| KR | 10-2017-0003608 | A | 1/2017 |
| KR | 10-2017-0020085 | A | 2/2017 |
| KR | 10-2017-0029014 | A | 3/2017 |
| KR | 10-2017-0032471 | A | 3/2017 |
| KR | 10-2017-0056300 | A | 5/2017 |

(56) References Cited

FOREIGN PATENT DOCUMENTS

| | | | |
|---|---|---|---|
| KR | 10-2018-0026066 | A | 3/2018 |
| KR | 10-2019-0022883 | A | 3/2019 |
| KR | 10-2019-0081500 | A | 7/2019 |
| KR | 10-2019-0129850 | A | 11/2019 |
| KR | 10-2019-0141702 | A | 12/2019 |
| TW | 498240 | B | 8/2002 |
| TW | 200512616 | A | 4/2005 |
| TW | 201210368 | A | 3/2012 |
| TW | 201240499 | A | 10/2012 |
| WO | 97/06492 | A1 | 2/1997 |
| WO | 97/38626 | A1 | 10/1997 |
| WO | 99/41682 | A2 | 8/1999 |
| WO | 00/42911 | A1 | 7/2000 |
| WO | 02/27530 | A2 | 4/2002 |
| WO | 2004/047440 | A2 | 6/2004 |
| WO | 2005/029242 | A2 | 3/2005 |
| WO | 2005/070289 | A1 | 8/2005 |
| WO | 2006/103965 | A1 | 10/2006 |
| WO | 2007/081629 | A2 | 7/2007 |
| WO | 2007/142703 | A1 | 12/2007 |
| WO | 2007/149731 | A1 | 12/2007 |
| WO | 2008/114491 | A1 | 9/2008 |
| WO | 2009/129402 | A1 | 10/2009 |
| WO | 2009/152608 | A1 | 12/2009 |
| WO | 2010/126821 | A1 | 11/2010 |
| WO | 2010/126825 | A1 | 11/2010 |
| WO | 2010/129221 | A1 | 11/2010 |
| WO | 2011/072111 | A2 | 6/2011 |
| WO | 2011/108335 | A1 | 9/2011 |
| WO | 2012/021507 | A2 | 2/2012 |
| WO | 2012/036891 | A2 | 3/2012 |
| WO | 2012/061438 | A2 | 5/2012 |
| WO | 2012/061440 | A2 | 5/2012 |
| WO | 2012/075322 | A2 | 6/2012 |
| WO | 2012/078079 | A2 | 6/2012 |
| WO | 2012/086910 | A1 | 6/2012 |
| WO | 2012/095712 | A1 | 7/2012 |
| WO | 2012/127484 | A1 | 9/2012 |
| WO | 2013/052789 | A1 | 4/2013 |
| WO | 2013/109762 | A1 | 7/2013 |
| WO | 2013/109776 | A1 | 7/2013 |
| WO | 2013/109777 | A1 | 7/2013 |
| WO | 2013/109916 | A1 | 7/2013 |
| WO | 2013/157307 | A1 | 10/2013 |
| WO | 2013/169870 | A1 | 11/2013 |
| WO | 2013/173838 | A2 | 11/2013 |
| WO | 2014/002711 | A1 | 1/2014 |
| WO | 2014/022711 | A1 | 2/2014 |
| WO | 2014/059259 | A1 | 4/2014 |
| WO | 2014/105276 | A1 | 7/2014 |
| WO | 2014/144258 | A2 | 9/2014 |
| WO | 2014/200730 | A1 | 12/2014 |
| WO | 2014/207294 | A1 | 12/2014 |
| WO | 2015/027133 | A1 | 2/2015 |
| WO | 2015/027178 | A1 | 2/2015 |
| WO | 2015/029313 | A1 | 3/2015 |
| WO | 2015/091228 | A1 | 6/2015 |
| WO | 2015/179592 | A1 | 11/2015 |
| WO | 2015/183828 | A1 | 12/2015 |
| WO | 2015/198488 | A1 | 12/2015 |
| WO | 2016/022203 | A1 | 2/2016 |
| WO | 2016/025036 | A1 | 2/2016 |
| WO | 2016/036472 | A1 | 3/2016 |
| WO | 2016/036582 | A2 | 3/2016 |
| WO | 2016/036582 | A3 | 6/2016 |
| WO | 2016/126733 | A1 | 8/2016 |
| WO | 2017/013770 | A1 | 1/2017 |
| WO | 2017/014403 | A1 | 1/2017 |
| WO | 2017/030646 | A1 | 2/2017 |
| WO | 2017/037242 | A1 | 3/2017 |
| WO | 2018/048510 | A1 | 3/2018 |
| WO | 2018/213066 | A1 | 11/2018 |
| WO | 2018/222313 | A1 | 12/2018 |
| WO | 2018/236291 | A1 | 12/2018 |
| WO | 2019/017508 | A1 | 1/2019 |
| WO | 2019/024383 | A1 | 2/2019 |
| WO | 2019/024603 | A1 | 2/2019 |
| WO | 2019/118853 | A1 | 6/2019 |
| WO | 2019/183422 | A1 | 9/2019 |
| WO | 2019/190001 | A1 | 10/2019 |
| WO | 2019/217005 | A1 | 11/2019 |
| WO | 2019/217009 | A1 | 11/2019 |
| WO | 2019/217249 | A2 | 11/2019 |
| WO | 2019/231982 | A1 | 12/2019 |
| WO | 2020/226788 | A1 | 11/2020 |
| WO | 2022/066438 | A1 | 3/2022 |
| WO | 2022/245669 | A1 | 11/2022 |

OTHER PUBLICATIONS

Applicant-Initiated Interview Summary received for U.S. Appl. No. 18/088,309, mailed on Aug. 27, 2024, 2 pages.
Blackburn, Ian, "How Using Custom Workouts on Apple Watch will make you a better Athlete (and everything you need to know about creating them)—The Apple Watch Triathlete", Available online at: https://theapplewatchtriathlete.com/blog-1/2022/8/23/how-using-custom-workouts-on-apple-watch-will-make-you-a-better-athlete-and-everything-you-need-to-know-about-creating-them, Aug. 23, 2022, pp. 1-51.
Corrected Notice of Allowance received for U.S. Appl. No. 17/951,624, mailed on Oct. 3, 2024, 2 pages.
Corrected Notice of Allowance received for U.S. Appl. No. 17/952,181, mailed on Aug. 13, 2024, 2 pages.
Corrected Notice of Allowance received for U.S. Appl. No. 17/952,181, mailed on Aug. 28, 2024, 2 pages.
Corrected Notice of Allowance received for U.S. Appl. No. 18/405,969, mailed on Oct. 1, 2024, 2 pages.
Corrected Notice of Allowance received for U.S. Appl. No. 18/405,969, mailed on Oct. 17, 2024, 2 pages.
Decision on Appeal received for U.S. Appl. No. 14/599,424, mailed on Apr. 3, 2024, 34 pages.
Examiner's Pre-Review Report received for Japanese Patent Application No. 2022-130087, mailed on Sep. 20, 2024, 2 pages (1 page of English Translation and 1 page of Official Copy).
Extended European Search Report received for European Patent Application No. 24179066.6, mailed on Aug. 8, 2024, 10 pages.
Final Office Action received for U.S. Appl. No. 18/088,309, mailed on Aug. 1, 2024, 16 pages.
Immersed, "Immersed on the Quest Pro in AR & VR", XP093203344, Available online at: https://www.youtube.com/watch?v=iWSDNiDtsHE, Oct. 25, 2022, 4 pages.
Invitation to Pay Additional Fees and Partial International Search Report received for PCT Patent Application No. PCT/US2024/031346, mailed on Oct. 14, 2024, 9 pages.
Non-Final Office Action received for U.S. Appl. No. 17/952,236, mailed on Sep. 16, 2024, 16 pages.
Notice of Acceptance received for Australian Patent Application No. 2023210876, mailed on Aug. 20, 2024, 3 pages.
Notice of Allowance received for Chinese Patent Application No. 202111244490.6, mailed on Sep. 23, 2024, 2 pages (1 page of English Translation and 1 page of Official Copy).
Notice of Allowance received for Chinese Patent Application No. 202210312775.7, mailed on Sep. 23, 2024, 5 pages (1 page of English Translation and 4 pages of Official Copy).
Notice of Allowance received for Chinese Patent Application No. 202310828052.7, mailed on Jul. 29, 2024, 4 pages (1 page of English Translation and 3 pages of Official Copy).
Notice of Allowance received for Japanese Patent Application No. 2023-065859, mailed on Aug. 16, 2024, 4 pages (1 page of English Translation and 3 pages of Official Copy).
Notice of Allowance received for Korean Patent Application No. 10-2022-7026884, mailed on Jul. 30, 2024, 8 pages (2 pages of English Translation and 6 pages of Official Copy).
Notice of Allowance received for Korean Patent Application No. 10-2023-7025320, mailed on Jul. 31, 2024, 7 pages (2 pages of English Translation and 5 pages of Official Copy).
Notice of Allowance received for U.S. Appl. No. 17/951,624, mailed on Sep. 20, 2024, 9 pages.

(56) References Cited

OTHER PUBLICATIONS

Notice of Allowance received for U.S. Appl. No. 17/952,181, mailed on Jul. 26, 2024, 5 pages.
Notice of Allowance received for U.S. Appl. No. 18/405,969, mailed on Sep. 19, 2024, 7 pages.
Office Action received for Australian Patent Application No. 2023208169, mailed on Oct. 2, 2024, 3 pages.
Office Action received for Australian Patent Application No. 2023210654, mailed on Sep. 4, 2024, 3 pages.
Office Action received for Australian Patent Application No. 2023214377, mailed on Sep. 25, 2024, 4 pages.
Office Action received for Australian Patent Application No. 2023285859, mailed on Aug. 29, 2024, 2 pages.
Office Action received for Australian Patent Application No. 2024200284, mailed on Sep. 30, 2024, 2 pages.
Office Action received for Chinese Patent Application No. 202110831819.2, mailed on Aug. 17, 2024, 11 pages (5 pages of English Translation and 6 pages of Official Copy).
Office Action received for Chinese Patent Application No. 202210312775.7, mailed on Jun. 19, 2024, 13 pages (6 pages of English Translation and 7 pages of Official Copy).
Office Action received for Chinese Patent Application No. 202211193170.7, mailed on Jul. 12, 2024, 22 pages (12 pages of English Translation and 10 pages of Official Copy).
Office Action received for Chinese Patent Application No. 202310774963.6, mailed on Jul. 17, 2024, 21 pages (13 pages of English Translation and 8 pages of Official Copy).
Office Action received for German Patent Application No. 112015007313.2. mailed on Aug. 6, 2024, 12 pages (6 pages of English Translation and 6 pages of Official Copy).
Office Action received for Japanese Patent Application No. 2023-097896, mailed on Oct. 15, 2024, 8 pages (4 pages of English Translation and 4 pages of Official Copy).
Office Action received for Japanese Patent Application No. 2023-133506, mailed on Sep. 20, 2024, 6 pages (3 pages of English Translation and 3 pages of Official Copy).
Office Action received for Japanese Patent Application No. 2023-158326, mailed on Jul. 25, 2024, 6 pages (3 pages of English Translation and 3 pages of Official Copy).
Office Action received for Japanese Patent Application No. 2023-158326, mailed on Sep. 30, 2024, 3 pages (1 page of English Translation and 2 pages of Official Copy).
Office Action received for Japanese Patent Application No. 2023-168815, mailed on Sep. 6, 2024, 10 pages (5 pages of English Translation and 5 pages of Official Copy).
Applicant-Initiated Interview Summary received for U.S. Appl. No. 18/367,934, mailed on May 29, 2025, 4 pages.
Applicant-Initiated Interview Summary received for U.S. Appl. No. 18/583,787, mailed on May 28, 2025, 2 pages.
Kordiyak et al., "Analytical Review of Medical Mobile Diagnostic Systems", Econtechmod, An International Quarterly Journal, vol. 05, No. 2,, 2016, pp. 11-16.
Notice of Acceptance received for Australian Patent Application No. 2023208169, mailed on May 22, 2025, 3 pages.
Office Action received for European Patent Application No. 23734424.7, mailed on May 22, 2025, 8 pages.
Board Decision received for Chinese Patent Application No. 201910858933.7, mailed on May 7, 2025, 21 pages (5 pages of English Translation and 16 pages of Official Copy).
Corrected Notice of Allowance received for U.S. Appl. No. 18/663,024, mailed on May 20, 2025, 2 pages.
Extended European Search Report received for European Patent Application No. 25156484.5, mailed on May 13, 2025, 8 pages.
Notice of Allowance received for Japanese Patent Application No. 2022-130087, mailed on May 12, 2025, 3 pages (1 page of English Translation and 2 pages of Official Copy).
Notice of Allowance received for U.S. Appl. No. 18/663,024, mailed on May 7, 2025, 9 pages.
Office Action received for Australian Patent Application No. 2024203043, mailed on May 8, 2025, 2 pages.
Final Office Action received for U.S. Appl. No. 18/367,934, mailed on Sep. 2, 2025, 11 pages.
Intention to Grant received for European Patent Application No. 23189089.8, mailed on Aug. 21, 2025, 9 pages.
Office Action received for Australian Patent Application No. 2024200956, mailed on Aug. 20, 2025, 7 pages.
Office Action received for Chinese Patent Application No. 202110363565.6, mailed on Aug. 1, 2025, 24 pages (13 pages of English Translation and 11 pages of Official Copy).
Applicant-Initiated Interview Summary received for U.S. Appl. No. 18/774,704, mailed on Jun. 23, 2025, 2 pages.
Final Office Action received for U.S. Appl. No. 18/583,787, mailed on Jun. 18, 2025, 16 pages.
Notice of Allowance received for Japanese Patent Application No. 2025-033114, mailed on Jun. 16, 2025, 4 pages (1 page of English Translation and 3 pages of Official Copy).
Office Action received for European Patent Application No. 23192409.3, mailed on Jun. 24, 2025, 5 pages.
Office Action received for European Patent Application No. 24152191.3, mailed on Jun. 13, 2025, 6 pages.
Non-Final Office Action received for U.S. Appl. No. 18/789,495, mailed on Aug. 12, 2025, 32 pages.
Office Action received for European Patent Application No. 23218255.0, mailed on Aug. 14, 2025, 6 pages.
Office Action received for Chinese Patent Application No. 202510015302.4, mailed on Aug. 30, 2025, 16 pages (9 pages of English Translation and 7 pages of Official Copy).
Applicant-Initiated Interview Summary received for U.S. Appl. No. 17/735,395, mailed on May 30, 2024, 2 pages.
Applicant-Initiated Interview Summary received for U.S. Appl. No. 17/951,945, mailed on May 30, 2024, 2 pages.
Applicant-Initiated Interview Summary received for U.S. Appl. No. 17/952,133, mailed on Apr. 23, 2024, 3 pages.
Applicant-Initiated Interview Summary received for U.S. Appl. No. 18/088,309, mailed on Jun. 7, 2024, 2 pages.
Corrected Notice of Allowance received for U.S. Appl. No. 17/068,386, mailed on May 20, 2024, 2 pages.
Corrected Notice of Allowance received for U.S. Appl. No. 17/735,395, mailed on Jul. 16, 2024, 3 pages.
Corrected Notice of Allowance received for U.S. Appl. No. 17/892,534, mailed on Jun. 5, 2024, 6 pages.
Corrected Notice of Allowance received for U.S. Appl. No. 17/896,791, mailed on Jun. 7, 2024, 2 pages.
Corrected Notice of Allowance received for U.S. Appl. No. 17/951,945, mailed on Jul. 9, 2024, 2 pages.
Corrected Notice of Allowance received for U.S. Appl. No. 17/952,233, mailed on May 9, 2024, 2 pages.
Corrected Notice of Allowance received for U.S. Appl. No. 18/135,056, mailed on Jul. 17, 2024, 6 pages.
Corrected Notice of Allowance received for U.S. Appl. No. 18/135,056, mailed on Jul. 22, 2024, 3 pages.
Decision to Grant received for European Patent Application No. 17813824.4, mailed on Jun. 13, 2024, 2 pages.
Decision to Grant received for European Patent Application No. 21714460.9, mailed on Jun. 20, 2024, 4 pages.
Decision to Grant received for European Patent Application No. 22150207.3, mailed on Jul. 11, 2024, 2 pages.
Decision to Refuse received for European Patent Application No. 21165295.3, mailed on Apr. 29, 2024, 14 pages.
Decision to Refuse received for Japanese Patent Application No. 2022-130087, mailed on Apr. 30, 2024, 6 pages (3 pages of English Translation and 3 pages of Official Copy).
Extended European Search Report received for European Patent Application No. 23218255.0, mailed on Mar. 27, 2024, 10 pages.
Extended European Search Report received for European Patent Application No. 24152191.3, mailed on Apr. 15, 2024, 11 pages.
Final Office Action received for U.S. Appl. No. 17/031,854, mailed on May 16, 2024, 21 pages.
Final Office Action received for U.S. Appl. No. 18/135,056, mailed on May 2, 2024, 18 pages.
Intention to Grant received for European Patent Application No. 23153898.4, mailed on Jul. 2, 2024, 11 pages.

(56) References Cited

OTHER PUBLICATIONS

Lu et al., "E-health Web Application Framework and Platform Based On The Cloud Technology", Available online at: https://www.diva-portal.org/smash/get/diva2:647835/FULLTEXT01.pdf, 2013, 64 pages.
Minutes of Oral Proceedings received for European Patent Application No. 21165295.3, mailed on Apr. 26, 2024, 6 pages.
Non-Final Office Action received for U.S. Appl. No. 18/088,309, mailed on Aug. 9, 2024, 14 pages.
Notice of Allowance received for Chinese Patent Application No. 202111576661.5, mailed on Mar. 28, 2024, 4 pages (1 page of English Translation and 3 pages of Official Copy).
Notice of Allowance received for Chinese Patent Application No. 202210326960.1, mailed on Jun. 21, 2024, 5 pages (1 page of English Translation and 4 pages of Official Copy).
Notice of Allowance received for Chinese Patent Application No. 202310775734.6, mailed on Apr. 18, 2024, 4 pages (1 page of English Translation and 3 pages of Official Copy).
Notice of Allowance received for Chinese Patent Application No. 202311059240.4, mailed on May 23, 2024, 2 pages (1 page of English Translation and 1 page of Official Copy).
Notice of Allowance received for U.S. Appl. No. 17/068,386, mailed on Apr. 29, 2024, 13 pages.
Notice of Allowance received for U.S. Appl. No. 17/735,395, mailed on Jul. 3, 2024, 11 pages.
Notice of Allowance received for U.S. Appl. No. 17/951,945, mailed on Jun. 26, 2024, 10 pages.
Notice of Allowance received for U.S. Appl. No. 17/952,233, mailed on May 1, 2024, 9 pages.
Notice of Allowance received for U.S. Appl. No. 18/135,056, mailed on Jul. 10, 2024, 10 pages.
Office Action received for Australian Patent Application No. 2023210654, mailed on Jun. 13, 2024, 6 pages.
Office Action received for Australian Patent Application No. 2023210876, mailed on Jun. 21, 2024, 2 pages.
Office Action received for Australian Patent Application No. 2023214377, mailed on Jun. 5, 2024, 4 pages.
Office Action received for Australian Patent Application No. 2023214377, mailed on Mar. 27, 2024, 3 pages.
Office Action received for Chinese Patent Application No. 202080039364.4, mailed on Apr. 9, 2024, 15 pages (7 pages of English Translation and 8 pages of Official Copy).
Office Action received for Chinese Patent Application No. 202110831819.2, mailed on Apr. 16, 2024, 6 pages (3 pages of English Translation and 3 pages of Official Copy).
Office Action received for Chinese Patent Application No. 202111244490.6, mailed on Apr. 3, 2024, 20 pages (11 pages of English Translation and 9 pages of Official Copy).
Office Action received for Chinese Patent Application No. 202210618961.3, mailed on Jun. 21, 2024, 20 pages (7 pages of English Translation and 13 pages of Official Copy).
Office Action received for Chinese Patent Application No. 202310774963.6, mailed on Apr. 21, 2024, 18 pages (11 pages of English Translation and 7 pages of Official Copy).
Office Action received for Chinese Patent Application No. 202310774963.6, mailed on Feb. 8, 2024, 11 pages (5 pages of English Translation and 6 pages of Official Copy).
Office Action received for Chinese Patent Application No. 202311059240.4, mailed on Mar. 19, 2024, 11 pages (5 pages of English Translation and 6 pages of Official Copy).
Office Action received for European Patent Application No. 22152524.9, mailed on Jun. 25, 2024, 7 pages.
Office Action received for European Patent Application No. 22170561.9, mailed on May 23, 2024, 8 pages.
Office Action received for European Patent Application No. 22731852.4, mailed on Jun. 26, 2024, 7 pages.
Office Action received for European Patent Application No. 23153899.2, mailed on Jun. 25, 2024, 11 pages.
Office Action received for European Patent Application No. 23153900.8, mailed on Jun. 26, 2024, 11 pages.
Office Action received for Japanese Patent Application No. 2021-565912, mailed on Jun. 18, 2024, 3 pages (1 page of English Translation and 2 pages of Official Copy).
Office Action received for Japanese Patent Application No. 2023-041035, mailed on Jul. 16, 2024, 4pages (2 pages of English Translation and 2 pages of Official Copy).
Office Action received for Japanese Patent Application No. 2023-077331, mailed on May 31, 2024, 4 pages (2 pages of English Translation and 2 pages of Official Copy).
Office Action received for Japanese Patent Application No. 2023-097896, mailed on Jul. 5, 2024, 10 pages (5 pages of English Translation and 5 pages of Official Copy).
Office Action received for Korean Patent Application No. 10-2021-7036242, mailed on May 31, 2024, 7 pages (2 pages of English Translation and 5 pages of Official Copy).
Office Action received for Korean Patent Application No. 10-2023-0114488, mailed on Apr. 30, 2024, 16 pages (6 pages of English Translation and 10 pages of Official Copy).
Park et al., "The UCONABC Usage Control Model", ACM Transactions on Information and System Security (TISSEC, vol. 7, No. 1), Available online at: https://citeseerx.ist.psu.edu/document?repid=rep1&type=pdf&doi=15a34e494fcfb656c2bcb3897b65b30f00f9fcd1, Feb. 2004, pp. 128-174.
Result of Consultation received for European Patent Application No. 21165295.3, mailed on Apr. 18, 2024, 3 pages.
Workout and Fitness Tracker for Humans, Available online at https://gentler.app/, Retrieved on; May 14, 2024, 11 pages.
Applicant-Initiated Interview Summary received for U.S. Appl. No. 18/583,787, mailed on Jul. 18, 2025, 2 pages.
Corrected Notice of Allowance received for U.S. Appl. No. 18/663,024, mailed on Jul. 15, 2025, 2 pages,.
Corrected Notice of Allowance received for U.S. Appl. No. 18/774,704, mailed on Jul. 15, 2025, 2 pages.
Intention to Grant received for European Patent Application No. 23189089.8, mailed on Jul. 2, 2025, 9 pages.
Notice of Allowance received for U.S. Appl. No. 18/774,704, mailed on Jul. 8, 2025, 10 pages.
Office Action received for Korean Patent Application No. 10-2021-7043369, mailed on Jul. 7, 2025, 13 pages (6 pages of English Translation and 7 pages of Official Copy).
Applicant-Initiated Interview Summary received for U.S. Appl. No. 18/774,704, mailed on Dec. 20, 2024, 2 pages.
Anonymous, "Forerunner 935 Owner's Manual", XP055953951, Available online at: <https://www8.garmin.com/manuals/webhelp/forerunner935/EN-US/GUID-D33F9153-C95D-460A-A165-729F18B5D827-homepage.html>, Jun. 30, 2020, 46 pages.
Applicant-Initiated Interview Summary received for U.S. Appl. No. 18/774,704, mailed on Jan. 29, 2025, 2 pages.
Applicant-Initiated Interview Summary received for U.S. Appl. No. 18/789,495, mailed on Jan. 24, 2025, 6 pages.
Board Decision received for Chinese Patent Application No. 202211193170.7, mailed on Nov. 21, 2024, 17 pages (1 page of English Translation and 16 pages of Official Copy).
Board Opinion received for Chinese Patent Application No. 201910858933.7, mailed on Mar. 24, 2025, 13 pages (5 pages of English Translation and 8 pages of Official Copy).
Corrected Notice of Allowance received for U.S. Appl. No. 18/589,265, mailed on Feb. 26, 2025, 2 pages.
Decision on Appeal received for U.S. Appl. No. 16/389,722, mailed on Mar. 4, 2025, 18 pages.
Decision to Grant received for European Patent Application No. 23153898.4, mailed on Mar. 6, 2025, 4 pages.
Final Office Action received for U.S. Appl. No. 18/774,704, mailed on Jan. 10, 2025, 21 pages.
Final Office Action received for U.S. Appl. No. 18/789,495, mailed on Mar. 4, 2025, 39 pages.
GregglesTV, "Google Photos How To Share Albums With Android and iOS Users", Online Available at: https://www.youtube.com/watch?v=vty3c3DgDnl, Dec. 18, 2015, 3 pages.
Intention to Grant received for European Patent Application No. 22731852.4, mailed on Dec. 17, 2024, 9 pages.

(56) References Cited

OTHER PUBLICATIONS

Intention to Grant received for European Patent Application No. 23189089.8, mailed on Apr. 3, 2025, 9 pages.
International Preliminary Report on Patentability received for PCT Patent Application No. PCT/US2023/024104, mailed on Dec. 19, 2024, 11 pages.
International Preliminary Report on Patentability received for PCT Patent Application No. PCT/US2023/024185, mailed on Dec. 19, 2024, 9 pages.
International Preliminary Report on Patentability received for PCT Patent Application No. PCT/US2023/030718, mailed on Mar. 20, 2025, 8 pages.
Invitation to Pay Search Fee received for European Patent Application No. 23735495.6, mailed on Jan. 28, 2025, 5 pages.
Lafayette Pierre-Antoine, "The 'icon' URI scheme", draft-lafayette-icon-uri-scheme-01, Online available at: https://www.ietf.org/archive/id/draft-lafayette-icon-uri-scheme-01.html, 2010, 7 pages.
Nikoletseas et al., "Decentralizing and Adding Portability to an IoT Test-bed through Smartphones", IEEE International Conference on Distributed Computing in Sensor Systems, Online available at: https://ieeexplore.ieee.org/stamp/stamp.jsp?tp=&arnumber=6846177, 2014, pp. 281-286.
Non-Final Office Action received for U.S. Appl. No. 18/367,934, mailed on Feb. 27, 2025, 12 pages.
Non-Final Office Action received for U.S. Appl. No. 18/583,787, mailed on Mar. 5, 2025, 16 pages.
Non-Final Office Action received for U.S. Appl. No. 18/663,024, mailed on Dec. 18, 2024, 13 pages.
Notice of Acceptance received for Australian Patent Application No. 2024200284, mailed on Jan. 16, 2025, 3 pages.
Notice of Allowance received for Chinese Patent Application No. 202310774963.6, mailed on Feb. 18, 2025, 4 pages (1 page of English Translation and 3 pages of Official Copy).
Notice of Allowance received for Japanese Patent Application No. 2023-097896, mailed on Jan. 31, 2025, 4 pages (1 page of English Translation and 3 pages of Official Copy).
Notice of Allowance received for Japanese Patent Application No. 2023-168815, mailed on Jan. 31, 2025, 4 pages (1 page of English Translation and 3 pages Official.
Notice of Allowance received for Japanese Patent Application No. 2024-032418, mailed on Mar. 21, 2025, 4 pages (1 page English Translation and 3 pages.
Notice of Allowance received for Japanese Patent Application No. 2024-213755, mailed on Mar. 10, 2025, 4 pages (1 page of English Translation and 3 pages of Official Copy).
Notice of Allowance received for Korean Patent Application No. 10-2021-7036242, mailed on Feb. 24, 2025, 7 pages (2 pages of English Translation and 5 pages of Official Copy).
Notice of Allowance received for Korean Patent Application No. 10-2023-0114488, mailed on Jan. 23, 2025, 8 pages (2 pages of English Translation and 6 pages of Official Copy).
Notice of Allowance received for U.S. Appl. No. 17/951,624, mailed on Jan. 15, 2025, 5 pages.
Notice of Allowance received for U.S. Appl. No. 18/135,056, mailed on Jan. 16, 2025, 9 pages.
Notice of Allowance received for U.S. Appl. No. 18/589,265, mailed on Feb. 18, 2025, 10 pages.
Office Action received for Australian Patent Application No. 2023214377, mailed on Jan. 17, 2025, 3 pages.
Office Action received for Australian Patent Application No. 2023258443, mailed on Jan. 15, 2025, 4 pages.
Office Action received for Australian Patent Application No. 2024200956, mailed on Jan. 10, 2025, 6 pages.
Office Action received for Chinese Patent Application No. 202080039364.4, mailed on Jan. 1, 2025, 13 pages (7 pages of English Translation and 6 pages of Official Copy).
Office Action received for Chinese Patent Application No. 202210140789.5, mailed on Jan. 3, 2025, 15 pages (8 pages of English Translation and 7 pages of Official Copy).
Office Action received for Chinese Patent Application No. 202210141337.9, mailed on Dec. 31, 2024, 14 pages (7 pages of English Translation and 7 pages of Official Copy).
Office Action received for Chinese Patent Application No. 202210151291.9, mailed on Jan. 9, 2025, 29 pages (18 pages of English Translation and 11 pages of Official Copy).
Office Action received for Chinese Patent Application No. 202310774963.6, mailed on Feb. 12, 2025, 2 pages (1 page of English Translation and 1 page of Official Copy).
Office Action received for European Patent Application No. 23150297.2, mailed on Feb. 28, 2025, 4 pages.
Office Action received for European Patent Application No. 23153899.2, mailed on Apr. 4, 2025, 4 pages.
Office Action received for European Patent Application No. 23192409.3, mailed on Dec. 10, 2024, 9 pages.
Office Action received for European Patent Application No. 23216484.8, mailed on Mar. 13, 2025, 7 pages.
Office Action received for European Patent Application No. 23735495.6, mailed on Mar. 31, 2025, 13 pages.
Office Action received for Korean Patent Application No. 10-2024-7013569, mailed on Dec. 16, 2024, 11 pages (4 pages of English Translation and 7 pages of Official Copy).
Record of Oral Hearing received for U.S. Appl. No. 16/389,722, mailed on Feb. 26, 2025, 15 pages.
Supplemental Notice of Allowance received for U.S. Appl. No. 18/589,265, mailed on Dec. 18, 2024, 2 pages.
Adeniyi, Samuel, "How to connect a second PS4 controller to a PlayStation 4 console", Online available on: https://www.youtube.com/watch?v=mOZX_SrNISE, May 28, 2017, 2 pages.
Advisory Action received for U.S. Appl. No. 16/144,864, mailed on Jul. 29, 2019, 6 pages.
Advisory Action received for U.S. Appl. No. 14/732,773, mailed on Aug. 23, 2019, 6 pages.
Advisory Action received for U.S. Appl. No. 14/732,773, mailed on Nov. 9, 2018, 6 pages.
Advisory Action received for U.S. Appl. No. 14/839,922, mailed on Mar. 24, 2017, 4 pages.
Advisory Action received for U.S. Appl. No. 14/841,606, mailed on Feb. 28. 2019, 3 pages.
Advisory Action received for U.S. Appl. No. 14/863,099, mailed on Sep. 8, 2016, 3 pages.
Advisory Action received for U.S. Appl. No. 15/554,204, mailed on Mar. 12, 2020, 3 pages.
Advisory Action received for U.S. Appl. No. 16/144,849, mailed on Aug. 12, 2019, 5 pages.
Advisory Action received for U.S. Appl. No. 16/144,864, mailed on Jul. 6, 2020, 6 pages.
Advisory Action received for U.S. Appl. No. 16/145,033, mailed on Nov. 2, 2021, 5 pages.
Advisory Action received for U.S. Appl. No. 16/377,892, mailed on Apr. 9, 2021, 4 pages.
Advisory Action received for U.S. Appl. No. 16/378,136, mailed on Apr. 12, 2021, 4 pages.
Advisory Action received for U.S. Appl. No. 16/389,722, mailed on Jun. 9, 2023, 4 pages.
Advisory Action received for U.S. Appl. No. 16/389,722, mailed on Mar. 9, 2021, 5 pages.
Advisory Action received for U.S. Appl. No. 17/381,570, mailed on May 23, 2023, 5 pages.
Advisory Action received for U.S. Appl. No. 17/591,184, mailed on Nov. 14, 2023, 5 pages.
Advisory Action received for U.S. Appl. No. 17/744,500, mailed on Nov. 14, 2023, 5 pages.
Advisory Action received for U.S. Appl. No. 17/952,133, mailed on Oct. 20, 2023, 7 pages.
Allen, Ray, "Join the Nike Training Club and let your iPhone be your fitness instructor", Apr. 19, 2011, 26 pages.
Allison, Conor, "Working out with Fiit's wearable-powered boutique fitness classes", Online available at: <https://www.wareable.com/wearable-tech/fiit-fitness-classes-review-3849>, May 14, 2018, 8 pages.

(56) References Cited

OTHER PUBLICATIONS

Androidandyuk, "Endomondo Android App Review", Available online at: https://www.youtube.com/watch?v=Wyjyrza-P1E, Jan. 9, 2023 17 pages.
Apple Inc., "iPhone User Guide For iOS 7.1 Software", available online at <https://manuals.info.apple.com/MANUALS/1000/MA1681/en_US/iphone_ios7_user_guide.pdf>, Mar. 10, 2014, pp. 1-162.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Applicant-Initiated Interview Summary received for U.S. Appl. No. 15/554,204, mailed on Jan. 31, 2020, 3 pages.
Applicant-Initiated Interview Summary received for U.S. Appl. No. 15/554,204, mailed on Oct. 11, 2019, 5 pages.
Applicant-Initiated Interview Summary received for U.S. Appl. No. 15/600,243, mailed on Nov. 1, 2019, 6 pages.
Applicant-Initiated Interview Summary received for U.S. Appl. No. 15/608,848, mailed on Apr. 13, 2021, 4 pages.
Applicant-Initiated Interview Summary received for U.S. Appl. No. 15/608,848, mailed on May 12, 2020, 5 pages.
Applicant-Initiated Interview Summary received for U.S. Appl. No. 15/608,848, mailed on Nov. 1, 2019, 3 pages.
Applicant-Initiated Interview Summary received for U.S. Appl. No. 15/608,848, mailed on Oct. 26, 2020, 3 pages.
Applicant-Initiated Interview Summary received for U.S. Appl. No. 15/614,121, mailed on Feb. 13, 2020, 4 pages.
Applicant-Initiated Interview Summary received for U.S. Appl. No. 15/627,069, mailed on Jan. 22, 2021, 4 pages.
Applicant-Initiated Interview Summary received for U.S. Appl. No. 15/627,069, mailed on Jul. 20, 2020, 5 pages.
Applicant-Initiated Interview Summary received for U.S. Appl. No. 15/627,069, mailed on Nov. 4, 2019, 6 pages.
Applicant-Initiated Interview Summary received for U.S. Appl. No. 15/705,849, mailed on Feb. 14, 2020, 3 pages.
Applicant-Initiated Interview Summary received for U.S. Appl. No. 15/705,849, mailed on Jun. 29, 2020, 3 pages.
Applicant-Initiated Interview Summary received for U.S. Appl. No. 15/925,652, mailed on Nov. 3, 2020, 4 pages.
Applicant-Initiated Interview Summary received for U.S. Appl. No. 16/138,809, mailed on Dec. 16, 2020, 7 pages.
Applicant-Initiated Interview Summary received for U.S. Appl. No. 16/138,809, mailed on Jun. 9, 2020, 4 pages.
Applicant-Initiated Interview Summary received for U.S. Appl. No. 16/144,735, mailed on Jun. 18, 2020, 3 pages.
Applicant-Initiated Interview Summary received for U.S. Appl. No. 16/144,753, mailed on Jun. 18, 2020, 3 pages.
Applicant-Initiated Interview Summary received for U.S. Appl. No. 16/144,753, mailed on Nov. 4, 2020, 3 pages.
Applicant-Initiated Interview Summary received for U.S. Appl. No. 16/144,849, mailed on Jan. 21, 2020, 6 pages.
Applicant-Initiated Interview Summary received for U.S. Appl. No. 16/144,864, mailed on Apr. 29, 2020, 4 pages.
Applicant-Initiated Interview Summary received for U.S. Appl. No. 16/144,864, mailed on Jun. 22, 2020, 3 pages.
Applicant-Initiated Interview Summary received for U.S. Appl. No. 16/145,033, mailed on Apr. 30, 2021, 4 pages.
Applicant-Initiated Interview Summary received for U.S. Appl. No. 16/145,033, mailed on Jun. 29, 2020, 5 pages.
Applicant-Initiated Interview Summary received for U.S. Appl. No. 16/145,033, mailed on Nov. 24, 2020, 4 pages.
Applicant-Initiated Interview Summary received for U.S. Appl. No. 16/145,033, mailed on Oct. 7, 2021, 4 pages.
Applicant-Initiated Interview Summary received for U.S. Appl. No. 16/363,945, mailed on Aug. 13, 2020, 5 pages.
Applicant-Initiated Interview Summary received for U.S. Appl. No. 16/377,892, mailed on Mar. 26, 2021, 2 pages.
Applicant-Initiated Interview Summary received for U.S. Appl. No. 16/377,892, mailed on Oct. 13, 2020, 5 pages.
Applicant-Initiated Interview Summary received for U.S. Appl. No. 16/378,136, mailed on Mar. 26, 2021, 2 pages.
Applicant-Initiated Interview Summary received for U.S. Appl. No. 16/378,136, mailed on Oct. 13, 2020, 4 pages.
Applicant-Initiated Interview Summary received for U.S. Appl. No. 16/388,493, mailed on Feb. 17, 2022, 2 pages.
Applicant-Initiated Interview Summary received for U.S. Appl. No. 16/389,722, mailed on Feb. 11, 2021, 4 pages.
Applicant-Initiated Interview Summary received for U.S. Appl. No. 16/389,722, mailed on Feb. 18, 2022, 5 pages.
Applicant-Initiated Interview Summary received for U.S. Appl. No. 16/389,722, mailed on Jul. 7, 2020, 5 pages.
Applicant-Initiated Interview Summary received for U.S. Appl. No. 16/389,722, mailed on May 31, 2023, 4 pages.
Applicant-Initiated Interview Summary received for U.S. Appl. No. 16/389,722, mailed on Nov. 4, 2022, 4 pages.
Applicant-Initiated Interview Summary received for U.S. Appl. No. 16/389,722, mailed on Sep. 7, 2021, 4 pages.
Applicant-Initiated Interview Summary received for U.S. Appl. No. 16/407,590, mailed on Jun. 5, 2020, 3 pages.
Applicant-Initiated Interview Summary received for U.S. Appl. No. 16/407,590, mailed on Nov. 17, 2020, 6 pages.
Applicant-Initiated Interview Summary received for U.S. Appl. No. 16/418,786, mailed on Mar. 30, 2021, 4 pages.
Applicant-Initiated Interview Summary received for U.S. Appl. No. 16/418,786, mailed on May 9, 2022, 2 pages.
Applicant-Initiated Interview Summary received for U.S. Appl. No. 16/418,786, mailed on Sep. 23, 2022, 2 pages.
Applicant-Initiated Interview Summary received for U.S. Appl. No. 16/679,967, mailed on Feb. 10, 2022, 2 pages.
Applicant-Initiated Interview Summary received for U.S. Appl. No. 16/679,967, mailed on Jun. 1, 2022, 2 pages.
Applicant-Initiated Interview Summary received for U.S. Appl. No. 16/679,967, mailed on Oct. 25, 2021, 2 pages.
Applicant-Initiated Interview Summary received for U.S. Appl. No. 16/820,383, mailed on Aug. 12, 2022, 2 pages.
Applicant-Initiated Interview Summary received for U.S. Appl. No. 16/820,383, mailed on Mar. 11, 2021, 2 pages.
Applicant-Initiated Interview Summary received for U.S. Appl. No. 16/820,383, mailed on May 10, 2022, 2 pages.
Applicant-Initiated Interview Summary received for U.S. Appl. No. 16/888,629, mailed on Aug. 4, 2021, 5 pages.
Applicant-Initiated Interview Summary received for U.S. Appl. No. 16/894,309, mailed on Jan. 26, 2021, 3 pages.
Applicant-Initiated Interview Summary received for U.S. Appl. No. 16/894,309, mailed on Jun. 25, 2021, 4 pages.
Applicant-Initiated Interview Summary received for U.S. Appl. No. 16/987,275, mailed on Feb. 3, 2022, 4 pages.
Applicant-Initiated Interview Summary received for U.S. Appl. No. 16/994,352, mailed on Nov. 2, 2021, 4 pages.
Applicant-Initiated Interview Summary received for U.S. Appl. No. 17/030,318, mailed on Jul. 30, 2021, 4 pages.
Applicant-Initiated Interview Summary received for U.S. Appl. No. 17/030,321, mailed on Jul. 30, 2021, 2 pages.
Applicant-Initiated Interview Summary received for U.S. Appl. No. 17/030,337, mailed on Jul. 27, 2022, 2 pages.
Applicant-Initiated Interview Summary received for U.S. Appl. No. 17/031,543, mailed on Apr. 21, 2022, 2 pages.
Applicant-Initiated Interview Summary received for U.S. Appl. No. 17/031,854, mailed on Apr. 6, 2023, 5 pages.
Applicant-Initiated Interview Summary received for U.S. Appl. No. 17/031,854, mailed on Dec. 21, 2023, 5 pages.
Applicant-Initiated Interview Summary received for U.S. Appl. No. 17/031,854, mailed on Feb. 25, 2022, 5 pages.
Applicant-Initiated Interview Summary received for U.S. Appl. No. 17/031,854, mailed on Jan. 24, 2023, 6 pages.
Applicant-Initiated Interview Summary received for U.S. Appl. No. 17/031,854, mailed on Jul. 27, 2022, 5 pages.
Applicant-Initiated Interview Summary received for U.S. Appl. No. 17/031,859, mailed on Aug. 1, 2023, 4 pages.
Applicant-Initiated Interview Summary received for U.S. Appl. No. 17/031,859, mailed on Dec. 27, 2022, 5 pages.
Applicant-Initiated Interview Summary received for U.S. Appl. No. 17/031,859, mailed on Feb. 25, 2022, 4 pages.

(56) References Cited

OTHER PUBLICATIONS

Applicant-Initiated Interview Summary received for U.S. Appl. No. 17/031,859, mailed on Feb. 26, 2021, 4 pages.
Applicant-Initiated Interview Summary received for U.S. Appl. No. 17/031,859, mailed on Jul. 28, 2022, 3 pages.
Applicant-Initiated Interview Summary received for U.S. Appl. No. 17/031,859, mailed on Jun. 30, 2021, 4 pages.
Applicant-Initiated Interview Summary received for U.S. Appl. No. 17/031,859, mailed on Mar. 3, 2023, 5 pages.
Applicant-Initiated Interview Summary received for U.S. Appl. No. 17/031,874, mailed on Feb. 25, 2022, 4 pages.
Applicant-Initiated Interview Summary received for U.S. Appl. No. 17/031,874, mailed on Feb. 26, 2021, 4 pages.
Applicant-Initiated Interview Summary received for U.S. Appl. No. 17/031,874, mailed on Jan. 24, 2023, 5 pages.
Applicant-Initiated Interview Summary received for U.S. Appl. No. 17/031,874, mailed on Jul. 27, 2022, 5 pages.
Applicant-Initiated Interview Summary received for U.S. Appl. No. 17/031,874, mailed on Jun. 30, 2021, 4 pages.
Applicant-Initiated Interview Summary received for U.S. Appl. No. 17/041,438, mailed on Jun. 23, 2023, 4 pages.
Applicant-Initiated Interview Summary received for U.S. Appl. No. 17/068,386, mailed on Apr. 24, 2023, 2 pages.
Applicant-Initiated Interview Summary received for U.S. Appl. No. 17/068,386, mailed on Jan. 13, 2022, 2 pages.
Applicant-Initiated Interview Summary received for U.S. Appl. No. 17/068,386, mailed on Sep. 21, 2021, 2 pages.
Applicant-Initiated Interview Summary received for U.S. Appl. No. 17/116,775, mailed on Nov. 3, 2021, 4 pages.
Applicant-Initiated Interview Summary received for U.S. Appl. No. 17/126,571, mailed on Jan. 27, 2022, 4 pages.
Applicant-Initiated Interview Summary received for U.S. Appl. No. 17/157,728, mailed on Feb. 3, 2022, 5 pages.
Applicant-Initiated Interview Summary received for U.S. Appl. No. 17/192,161, mailed on Dec. 24, 2021, 4 pages.
Applicant-Initiated Interview Summary received for U.S. Appl. No. 17/192,161, mailed on Jun. 29, 2021, 4 pages.
Applicant-Initiated Interview Summary received for U.S. Appl. No. 17/192,161, mailed on Sep. 29, 2021, 3 pages.
Applicant-Initiated Interview Summary received for U.S. Appl. No. 17/327,204, mailed on Jan. 25, 2022, 5 pages.
Applicant-Initiated Interview Summary received for U.S. Appl. No. 17/381,570, mailed on Apr. 6, 2023, 4 pages.
Applicant-Initiated Interview Summary received for U.S. Appl. No. 17/381,570, mailed on Apr. 26, 2022, 5 pages.
Applicant-Initiated Interview Summary received for U.S. Appl. No. 17/381,570, mailed on Aug. 24, 2022, 5 pages.
Applicant-Initiated Interview Summary received for U.S. Appl. No. 17/381,570, mailed on Nov. 28, 2022, 5 pages.
Applicant-Initiated Interview Summary received for U.S. Appl. No. 17/516,537, mailed on Jul. 5, 2022, 4 pages.
Applicant-Initiated Interview Summary received for U.S. Appl. No. 17/516,537, mailed on Nov. 22, 2022, 2 pages.
Applicant-Initiated Interview Summary received for U.S. Appl. No. 17/591,184, mailed on Feb. 27, 2023, 2 pages.
Applicant-Initiated Interview Summary received for U.S. Appl. No. 17/591,184, mailed on Jun. 28, 2023, 2 pages.
Applicant-Initiated Interview Summary received for U.S. Appl. No. 17/591,184, mailed on Oct. 30, 2023, 2 pages.
Applicant-Initiated Interview Summary received for U.S. Appl. No. 17/591,184, mailed on Sep. 23, 2022, 2 pages.
Applicant-Initiated Interview Summary received for U.S. Appl. No. 17/666,301, mailed on Mar. 28, 2023, 4 pages.
Applicant-Initiated Interview Summary received for U.S. Appl. No. 17/735,395, mailed on Apr. 28, 2023, 2 pages.
Applicant-Initiated Interview Summary received for U.S. Appl. No. 17/735,395, mailed on Aug. 1, 2023, 2 pages.
Applicant-Initiated Interview Summary received for U.S. Appl. No. 17/735,395, mailed on Jan. 31, 2024, 2 pages.
Applicant-Initiated Interview Summary received for U.S. Appl. No. 17/735,395, mailed on Nov. 15, 2023, 2 pages.
Applicant-Initiated Interview Summary received for U.S. Appl. No. 17/744,500, mailed on May 30, 2023, 4 pages.
Applicant-Initiated Interview Summary received for U.S. Appl. No. 17/744,500, mailed on Oct. 17, 2023, 4 pages.
Applicant-Initiated Interview Summary received for U.S. Appl. No. 17/862,097, mailed on Mar. 1, 2023, 4 pages.
Applicant-Initiated Interview Summary received for U.S. Appl. No. 17/862,097, mailed on May 18, 2023, 3 pages.
Applicant-Initiated Interview Summary received for U.S. Appl. No. 17/892,534, mailed on Aug. 3, 2023, 3 pages.
Applicant-Initiated Interview Summary received for U.S. Appl. No. 17/892,534, mailed on Feb. 1, 2024, 4 pages.
Applicant-Initiated Interview Summary received for U.S. Appl. No. 17/892,534, mailed on Feb. 6, 2023, 2 pages.
Applicant-Initiated Interview Summary received for U.S. Appl. No. 17/892,534, mailed on Feb. 10, 2023, 2 pages.
Applicant-Initiated Interview Summary received for U.S. Appl. No. 17/896,791, mailed on Oct. 12, 2023, 2 pages.
Applicant-Initiated Interview Summary received for U.S. Appl. No. 17/951,613, mailed on Sep. 8, 2023, 5 pages.
Applicant-Initiated Interview Summary received for U.S. Appl. No. 17/951,624, mailed on Nov. 16, 2023, 3 pages.
Applicant-Initiated Interview Summary received for U.S. Appl. No. 17/951,875, mailed on Feb. 28, 2023, 2 pages.
Applicant-Initiated Interview Summary received for U.S. Appl. No. 17/951,875, mailed on Jun. 27, 2023, 2 pages.
Applicant-Initiated Interview Summary received for U.S. Appl. No. 17/951,945, mailed on Apr. 28, 2023, 2 pages.
Applicant-Initiated Interview Summary received for U.S. Appl. No. 17/951,945, mailed on Aug. 1, 2023, 2 pages.
Applicant-Initiated Interview Summary received for U.S. Appl. No. 17/951,945, mailed on Jan. 31, 2024, 2 pages.
Applicant-Initiated Interview Summary received for U.S. Appl. No. 17/951,945, mailed on Nov. 15, 2023, 2 pages.
Applicant-Initiated Interview Summary received for U.S. Appl. No. 17/951,976, mailed on Aug. 23, 2023, 2 pages.
Applicant-Initiated Interview Summary received for U.S. Appl. No. 17/952,027, mailed on May 30, 2023, 4 pages.
Applicant-Initiated Interview Summary received for U.S. Appl. No. 17/952,027, mailed on Sep. 11, 2023, 3 pages.
Applicant-Initiated Interview Summary received for U.S. Appl. No. 17/952,133, mailed on Jul. 3, 2023, 4 pages.
Applicant-Initiated Interview Summary received for U.S. Appl. No. 17/952,233, mailed on Apr. 2, 2024, 4 pages.
Applicant-Initiated Interview Summary received for U.S. Appl. No. 17/952,233, mailed on May 24, 2023, 5 pages.
Applicant-Initiated Interview Summary received for U.S. Appl. No. 17/952,233, mailed on Sep. 7, 2023, 4 pages.
Applicant-Initiated Interview Summary received for U.S. Appl. No. 17/952,239, mailed on May 31, 2023, 2 pages.
Applicant-Initiated Interview Summary received for U.S. Appl. No. 18/088,309, mailed on Feb. 28, 2024, 2 pages.
Applicant-Initiated Interview Summary received for U.S. Appl. No. 18/088,309, mailed on Oct. 27, 2023, 2 pages.
Applicant-Initiated Interview Summary received for U.S. Appl. No. 18/135,056, mailed on Jan. 3, 2024, 2 pages.
Bagala et al., "Evaluation of Accelerometer-Based Fall Detection Algorithms on Real-World Falls", PloS ONE, vol. 7, No. 5, May 16, 2012, 9 pages.
Board Decision received for Chinese Patent Application No. 201380081349.6, mailed on Nov. 23, 2020, 2 pages (1 page of English Translation and 1 page of Official Copy).
Board Decision received for Chinese Patent Application No. 201510284850.3, mailed on Mar. 3, 2022, 27 pages (1 page of English Translation and 26 pages of Official Copy).
Board Opinion received for Chinese Patent Application No. 201510284850.3, mailed on Jul. 2, 2021, 13 pages (3 pages of English Translation and 10 pages of Official Copy).
Brief Communication Regarding Oral Proceedings received for European Patent Application No. 18727543.3, mailed on Mar. 23, 2023, 1 page.

(56) References Cited

OTHER PUBLICATIONS

Brief Communication Regarding Oral Proceedings received for European Patent Application No. 19724963.4, mailed on Jun. 22, 2021, 2 pages.
Brief Communication Regarding Oral Proceedings received for European Patent Application No. 20182116.2, mailed on Apr. 13, 2022, 3 pages.
Brief Communication Regarding Oral Proceedings received for European Patent Application No. 20203526.7, mailed on Dec. 23, 2022, 4 pages.
Brief Communication Regarding Oral Proceedings received for European Patent Application No. 20203526.7, mailed on Jan. 18, 2023, 1 page.
Brief Communication Regarding Oral Proceedings received for European Patent Application No. 20721342.2, mailed on Oct. 18, 2022, 1 page.
Brief Communication Regarding Oral Proceedings received for European Patent Application No. 21165295.3, mailed on Feb. 27, 2024, 1 page.
CBS This Morning, "This smart mirror puts a personal trainer in your reflection", Available on: https://www.youtube.com/watch?v=nSmTTZcpVGg, Oct. 13, 20218, 4 pages.
Certificate of Examination received for Australian Patent Application No. 2018100158, mailed on Oct. 23, 2018, 2 pages.
Certificate of Examination received for Australian Patent Application No. 2018101855, mailed on Aug. 6, 2019, 2 pages.
Certificate of Examination received for Australian Patent Application No. 2019100490, mailed on Oct. 16, 2019, 2 pages.
Chengcheng et al., "Platform of Development of Motion Control Systems Experimental Software", Experimental Technology and Management, vol. 30, No. 1, Jan. 2013, 3 pages (Official Copy Only) {See Communication Under Rule 37 CFR § 1.98(a) (3)}.
Cho H.S., "Satisfactory Innovative Smartwarch (fitbit force) . . . review after seven days of use, such as the amount of sleep and movement (improving sleep is the object of X-Blue", Online Available at: <https://x-blueuv.blogspot.com/2013/12/fitbit-force.html>, Dec. 3, 2013, 8 pages (2 pages of English Translation and 6 pages of Official Copy).
CNET, "Google Fit's automatic activity tracking is getting smarter on Android Wear", Available online at: https://www.youtube.com/watch?v=lttzlCid_d8, May 18, 2016, 1 page.
Codrington, Simon, "Intuitive Scrolling Interfaces with CSS Scroll Snap Points", Online Available at: https://www.sitepoint.com/intuitive-scrolling-interfaces-with-css-scroll-snap-points/, Dec. 8, 2015, 14 pages.
Communication of the Board of Appeal received for European Patent Application No. 13811085.3, mailed on Jul. 28, 2022, 13 pages.
Communication of the Board of Appeal received for European Patent Application No. 15771747.1, mailed on Aug. 25, 2021, 9 pages.
Corrected Notice of Allowance received for U.S. Appl. No. 14/732,773, mailed on Feb. 10, 2020, 3 pages.
Corrected Notice of Allowance received for U.S. Appl. No. 14/732,773, mailed on Mar. 24, 2020, 3 pages.
Corrected Notice of Allowance received for U.S. Appl. No. 15/183,663, mailed on Feb. 25, 2019, 3 pages.
Corrected Notice of Allowance received for U.S. Appl. No. 15/183,663, mailed on Mar. 27, 2019, 2 pages.
Corrected Notice of Allowance received for U.S. Appl. No. 15/554,204, mailed on Aug. 19, 2020, 3 pages.
Corrected Notice of Allowance received for U.S. Appl. No. 15/600,243, mailed on Feb. 5, 2020, 3 pages.
Corrected Notice of Allowance received for U.S. Appl. No. 15/600,243, mailed on Mar. 13, 2020, 3 pages.
Corrected Notice of Allowance received for U.S. Appl. No. 15/600,243, mailed on Mar. 31, 2020, 5 pages.
Corrected Notice of Allowance received for U.S. Appl. No. 16/145,033, mailed on Jun. 23, 2023, 3 pages.
Corrected Notice of Allowance received for U.S. Appl. No. 16/377,892, mailed on Aug. 11, 2021, 3 pages.
Corrected Notice of Allowance received for U.S. Appl. No. 16/378,136, mailed on Aug. 11, 2021, 2 pages.
Corrected Notice of Allowance received for U.S. Appl. No. 16/378,136, mailed on Jun. 11, 2021, 2 pages.
Corrected Notice of Allowance received for U.S. Appl. No. 16/418,786, mailed on Jan. 5, 2022, 3 pages.
Corrected Notice of Allowance received for U.S. Appl. No. 16/418,786, mailed on Jun. 23, 2022, 2 pages.
Corrected Notice of Allowance received for U.S. Appl. No. 16/820,383, mailed on Apr. 28, 2023, 2 pages.
Corrected Notice of Allowance received for U.S. Appl. No. 16/820,383, mailed on Aug. 13, 2021, 2 pages.
Corrected Notice of Allowance received for U.S. Appl. No. 16/820,383, mailed on Aug. 19, 2021, 2 pages.
Corrected Notice of Allowance received for U.S. Appl. No. 16/820,383, mailed on Mar. 27, 2024, 2 pages.
Corrected Notice of Allowance received for U.S. Appl. No. 16/820,383, mailed on Oct. 5, 2021, 2 pages.
Corrected Notice of Allowance received for U.S. Appl. No. 16/888,629, mailed on Jan. 21, 2022, 2 pages.
Corrected Notice of Allowance received for U.S. Appl. No. 16/987,275, mailed on Jun. 8, 2022, 3 pages.
Corrected Notice of Allowance received for U.S. Appl. No. 17/030,318, mailed on Jan. 24, 2022, 2 pages.
Corrected Notice of Allowance received for U.S. Appl. No. 17/030,318, mailed on Jun. 1, 2023, 3 pages.
Corrected Notice of Allowance received for U.S. Appl. No. 17/030,321, mailed on Aug. 15, 2022, 3 pages.
Corrected Notice of Allowance received for U.S. Appl. No. 17/030,337, mailed on Aug. 31, 2022, 2 pages.
Corrected Notice of Allowance received for U.S. Appl. No. 17/030,337, mailed on Feb. 10, 2023, 2 pages.
Corrected Notice of Allowance received for U.S. Appl. No. 17/030,337, mailed on Feb. 17, 2023, 2 pages.
Corrected Notice of Allowance received for U.S. Appl. No. 17/030,337, mailed on Nov. 3, 2022, 2 pages.
Corrected Notice of Allowance received for U.S. Appl. No. 17/030,337, mailed on Nov. 15, 2022, 2 pages.
Corrected Notice of Allowance received for U.S. Appl. No. 17/030,337, mailed on Oct. 18, 2022, 2 pages.
Corrected Notice of Allowance received for U.S. Appl. No. 17/030,337, mailed on Sep. 21, 2022, 2 pages.
Corrected Notice of Allowance received for U.S. Appl. No. 17/031,543, mailed on Aug. 22, 2022, 2 pages.
Corrected Notice of Allowance received for U.S. Appl. No. 17/031,543, mailed on Jul. 18, 2022, 2 pages.
Corrected Notice of Allowance received for U.S. Appl. No. 17/031,543, mailed on Jun. 8, 2022, 3 pages.
Corrected Notice of Allowance received for U.S. Appl. No. 17/041,438, mailed on Dec. 1, 2023, 2 pages.
Corrected Notice of Allowance received for U.S. Appl. No. 17/041,438, mailed on Mar. 28, 2024, 2 pages.
Corrected Notice of Allowance received for U.S. Appl. No. 17/041,438, mailed on Sep. 27, 2023, 3 pages.
Corrected Notice of Allowance received for U.S. Appl. No. 17/116,775, mailed on Jan. 28, 2022, 2 pages.
Corrected Notice of Allowance received for U.S. Appl. No. 17/157,728, mailed on Apr. 4, 2022, 3 pages.
Corrected Notice of Allowance received for U.S. Appl. No. 17/157,728, mailed on Apr. 14, 2022, 6 pages.
Corrected Notice of Allowance received for U.S. Appl. No. 17/192,161, mailed on Apr. 22, 2022, 2 pages.
Corrected Notice of Allowance received for U.S. Appl. No. 17/192,161, mailed on Mar. 23, 2022, 2 pages.
Corrected Notice of Allowance received for U.S. Appl. No. 17/197,628, mailed on Apr. 27, 2022, 3 pages.
Corrected Notice of Allowance received for U.S. Appl. No. 17/197,628, mailed on Jul. 29, 2022, 2 pages.
Corrected Notice of Allowance received for U.S. Appl. No. 17/744,500, mailed on Jan. 12, 2024, 3 pages.

(56) References Cited

OTHER PUBLICATIONS

Corrected Notice of Allowance received for U.S. Appl. No. 17/896,791, mailed on Jan. 2, 2024, 2 pages.
Corrected Notice of Allowance received for U.S. Appl. No. 17/951,613, mailed on Jan. 2, 2024, 2 pages.
Corrected Notice of Allowance received for U.S. Appl. No. 17/952,027, mailed on Jan. 22, 2024, 3 pages.
Corrected Notice of Allowance received for U.S. Appl. No. 17/952,185, mailed on Mar. 27, 2024, 2 pages.
Corrected Notice of Allowance received for U.S. Appl. No. 17/952,239, mailed on Jul. 12, 2023, 2 pages.
Corrected Notice of Allowance received for U.S. Appl. No. 17/952,239, mailed on Nov. 15, 2023, 2 pages.
Cyclespeed Tours, "The Most Useful Data Fields to Display on Your Garmin", Online Available at: https://www.youtube.com/watch?v=AN0Eo50yxdg. Nov. 16, 2016, 3 pages.
DC Rainmaker, "Garmin Fenix3 New Auto Climb Functionality", Available online at: https://www.youtube.com/watch?v=iuavOSNpVRc, Feb. 19, 2015, 1 page.
Decision on Appeal received for European Patent Application No. 15771747.1, mailed on Dec. 14, 2021, 21 pages.
Decision on Appeal received for Korean Patent Application No. 10-2019-7025538, mailed on Feb. 24, 2021, 20 pages (4 pages of English Translation and 16 pages of Official Copy).
Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision on Appeal received for U.S. Appl. No. 16/145,033, mailed on Apr. 4, 2023, 9 pages.
Decision to Grant received for Danish Patent Application No. PA201670656, mailed on Jun. 21, 2021, 2 pages.
Decision to Grant received for Danish Patent Application No. PA201870379, mailed on Jun. 5, 2019, 2 pages.
Decision to Grant received for Danish Patent Application No. PA201870385, mailed on Mar. 26, 2020, 2 pages.
Decision to Grant received for Danish Patent Application No. PA202070614, mailed on Nov. 10, 2022, 2 pages.
Decision to Grant received for Danish Patent Application No. PA202070615, mailed on Jul. 29, 2022, 2 pages.
Decision to Grant received for Danish Patent Application No. PA202070815, mailed on Dec. 23, 2022, 1 page.
Decision to Grant received for European Patent Application No. 16706081.3, mailed on Nov. 29, 2018, 2 pages.
Decision to Grant received for European Patent Application No. 16762356.3, mailed on Apr. 26, 2022, 2 pages.
Decision to Grant received for European Patent Application No. 16837432.0, mailed on Dec. 21, 2023, 2 pages.
Decision to Grant received for European Patent Application No. 18213157.3, mailed on Feb. 24, 2022, 2 pages.
Decision to Grant received for European Patent Application No. 18727543.3, mailed on Aug. 18, 2023, 2 pages.
Decision to Grant received for European Patent Application No. 19721883.7, mailed on Aug. 31, 2023, 4 pages.
Decision to Grant received for European Patent Application No. 19724963.4, mailed on Feb. 3, 2022, 2 pages.
Decision to Grant received for European Patent Application No. 20182116.2, mailed on Mar. 23, 2023, 3 pages.
Decision to Grant received for European Patent Application No. 20203526.7, mailed on Jun. 22, 2023, 4 pages.
Decision to Grant received for European Patent Application No. 22173249.8, mailed on Dec. 14, 2023, 2 pages.
Decision to Grant received for German Patent Application No. 112015002326.7, mailed on Jun. 15, 2021, 10 pages (1 page of English Translation and 9 pages of Official Copy).
Decision to Grant received for German Patent Application No. 112015007285.3, mailed on Jul. 25, 2023, 11 pages (1 page of English Translation and 10 pages of Official Copy).
Decision to Refuse received for European Patent Application No. 13811085.3, mailed on Sep. 11, 2018, 21 pages.
Decision to Refuse received for European Patent Application No. 15771747.1, mailed on Aug. 10, 2018, 22 pages.
Decision to Refuse received for European Patent Application No. 17810749.6, mailed on Jan. 29, 2021, 24 pages.
Decision to Refuse received for European Patent Application No. 18154145.9, mailed on Feb. 17, 2021, 20 pages.
Decision to Refuse received for European Patent Application No. 20721342.2, mailed on Nov. 10, 2022, 14 pages.
Dharmasena, Anusha, "iMessage-send as text message Option", YouTube, Available online at: <https://www.youtube.com/watch?v=hXG-MdlW6FA>, Feb. 18, 2013, 1 page.
Dicristina, John, "Fitness Monitoring Equipment Goes Wireless", Frontier Technology, China Academic journal Electronic Publishing House, Online Available at: http://www.cnki.net, Dec. 2012, pp. 44-45 (Official Copy Only) {See Communication Under Rule 37 CFR § 1.98(a) (3)}.
DwProgressBar v2: Stepping and Events, davidwalsh.name/dwprogressbar-2-stepping-events-mootools-progress-bar, retrieved from the Wayback Machine, Aug. 31, 2008, 4 pages.
European Search Report received for European Patent Application No. 20182116.2, mailed on Oct. 21, 2020, 4 pages.
European Search Report received for European Patent Application No. 21165295.3, mailed on Jun. 18, 2021, 4 pages.
European Search Report received for European Patent Application No. 21168916.1, mailed on Jul. 14, 2021, 5 pages.
Evergreen et al., "Bar Chart", Better Evaluation, Available Online at: https://www.betterevaluation.org/en/evaluation-options/BarChart, Oct. 31, 2014, 8 pages.
Examiner-Initiated Interview received for U.S. Appl. No. 17/896,791, mailed on Sep. 1, 2023, 2 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Examiner's Answer to Appeal Brief received for U.S. Appl. No. 16/145,033, mailed on Aug. 4, 2022, 10 pages.
Examiner's Answer to Appeal Brief received for U.S. Appl. No. 16/389,722, mailed on Feb. 2, 2024, 8 pages.
Extended European Search Report received for European Patent Application No. 16762356.0, mailed on Nov. 9, 2018, 10 pages.
Extended European Search Report received for European Patent Application No. 16837432.0, mailed on Mar. 11, 2019, 10 pages.
Extended European Search Report received for European Patent Application No. 18154145.9, mailed on Mar. 2, 2018, 8 pages.
Extended European Search Report received for European Patent Application No. 18213157.3, mailed on Apr. 12, 2019, 8 pages.
Extended European Search Report received for European Patent Application No. 19163212.4, mailed on Jun. 25, 2019, 11 pages.
Extended European Search Report received for European Patent Application No. 20203526.7, mailed on Jan. 29, 2021, 13 pages.
Extended European Search Report received for European Patent Application No. 22150207.3, mailed on Apr. 11, 2022, 11 pages.
Extended European Search Report received for European Patent Application No. 22152524.9, mailed on May 2, 2022, 10 pages.
Extended European Search Report received for European Patent Application No. 22170561.9, mailed on Aug. 10, 2022, 11 pages.
Extended European Search Report received for European Patent Application No. 22173249.8, mailed on Aug. 19, 2022, 15 pages.
Extended European Search Report received for European Patent Application No. 22194355.8, mailed on Dec. 23, 2022, 10 pages.
Extended European Search Report received for European Patent Application No. 23150297.2, mailed on Mar. 28, 2023, 8 pages.
Extended European Search Report received for European Patent Application No. 23153898.4, mailed on May 4, 2023, 11 pages.
Extended European Search Report received for European Patent Application No. 23153899.2, mailed on May 4, 2023, 10 pages.
Extended European Search Report received for European Patent Application No. 23153900.8, mailed on May 4, 2023, 10 pages.
Extended European Search Report received for European Patent Application No. 23189089.8, mailed on Nov. 23, 2023, 11 pages.
Extended European Search Report received for European Patent Application No. 23192409.3, mailed on Feb. 20, 2024, 13 pages.

(56) References Cited

OTHER PUBLICATIONS

Extended European Search Report received for European Patent Application No. 23216484.8, mailed on Feb. 28, 2024, 9 pages.
Extended European Search Report received for European Patent Application No. 23217005.0, mailed on Mar. 13, 2024, 12 pages.
Extended European Search Report received for European Patent Application No. 17813824.4, mailed on Dec. 5, 2019, 7 pages.
Final Office Action received for U.S. Appl. No. 12/205,847, mailed on Apr. 25, 2012, 42 pages.
Final Office Action received for U.S. Appl. No. 14/599,424, mailed on Jun. 28, 2018, 12 pages.
Final Office Action received for U.S. Appl. No. 14/599,425, mailed on Jun. 12, 2018, 45 pages.
Final Office Action received for U.S. Appl. No. 14/599,425, mailed on May 19, 2017, 24 pages.
Final Office Action received for U.S. Appl. No. 14/599,425, mailed on Oct. 8, 2015, 20 pages.
Final Office Action received for U.S. Appl. No. 14/732,773, mailed on Jul. 13, 2018, 48 pages.
Final Office Action received for U.S. Appl. No. 14/732,773, mailed on Jun. 21, 2019, 32 pages.
Final Office Action received for U.S. Appl. No. 14/774,664, mailed on Aug. 25, 2017, 23 pages.
Final Office Action received for U.S. Appl. No. 14/839,922, mailed on Dec. 14, 2016, 22 pages.
Final Office Action received for U.S. Appl. No. 14/841,606, mailed on Sep. 7, 2018, 34 pages.
Final Office Action received for U.S. Appl. No. 14/863,069, mailed on Jul. 5, 2018, 19 pages.
Final Office Action received for U.S. Appl. No. 14/863,099, mailed on Apr. 21, 2016, 20 pages.
Final Office Action received for U.S. Appl. No. 14/864,759, mailed on Sep. 4, 2018, 24 pages.
Final Office Action received for U.S. Appl. No. 15/554,204, mailed on Oct. 31, 2019, 22 pages.
Final Office Action received for U.S. Appl. No. 15/608,848, mailed on Aug. 21, 2020, 15 pages.
Final Office Action received for U.S. Appl. No. 15/608,848, mailed on Jun. 26, 2019, 27 pages.
Final Office Action received for U.S. Appl. No. 15/614,121, mailed on Apr. 8, 2019, 32 pages.
Final Office Action received for U.S. Appl. No. 15/627,069, mailed on Mar. 2, 2020, 22 pages.
Final Office Action received for U.S. Appl. No. 15/627,069, mailed on Oct. 20, 2020, 25 pages.
Final Office Action received for U.S. Appl. No. 15/705,849, mailed on May 1, 2020, 17 pages.
Final Office Action received for U.S. Appl. No. 15/925,652, mailed on Aug. 1, 2019, 30 pages.
Final Office Action received for U.S. Appl. No. 16/138,809, mailed on Aug. 27, 2020, 24 pages.
Final Office Action received for U.S. Appl. No. 16/144,735, mailed on May 4, 2020, 12 pages.
Final Office Action received for U.S. Appl. No. 16/144,735, mailed on Sep. 22, 2020, 9 pages.
Final Office Action received for U.S. Appl. No. 16/144,849, mailed on Jun. 7, 2019, 29 pages.
Final Office Action received for U.S. Appl. No. 16/144,864, mailed on May 17, 2019, 24 pages.
Final Office Action received for U.S. Appl. No. 16/144,864, mailed on May 28, 2019, 29 pages.
Final Office Action received for U.S. Appl. No. 16/145,033, mailed on Jul. 6, 2021, 113 pages.
Final Office Action received for U.S. Appl. No. 16/145,033, mailed on Sep. 22, 2020, 49 pages.
Final Office Action received for U.S. Appl. No. 16/377,892, mailed on Jan. 28, 2021, 11 pages.
Final Office Action received for U.S. Appl. No. 16/378,136, mailed on Jan. 28, 2021, 9 pages.
Final Office Action received for U.S. Appl. No. 16/389,722, mailed on Dec. 6, 2021, 19 pages.
Final Office Action received for U.S. Appl. No. 16/389,722, mailed on Dec. 8, 2020, 18 pages.
Final Office Action received for U.S. Appl. No. 16/389,722, mailed on Mar. 17, 2023, 14 pages.
Final Office Action received for U.S. Appl. No. 16/407,590, mailed on Aug. 25, 2020, 14 pages
Final Office Action received for U.S. Appl. No. 16/418,786, mailed on Jan. 13, 2021, 14 pages.
Final Office Action received for U.S. Appl. No. 16/679,967, mailed on Nov. 10, 2021, 14 pages.
Final Office Action received for U.S. Appl. No. 16/820,383, mailed on Jun. 22, 2022, 21 pages.
Final Office Action received for U.S. Appl. No. 16/894,309, mailed on Feb. 24, 2021, 30 pages.
Final Office Action received for U.S. Appl. No. 16/994,352, mailed on Dec. 6, 2021, 14 pages.
Final Office Action received for U.S. Appl. No. 17/030,318, mailed on Nov. 28, 2022, 13 pages.
Final Office Action received for U.S. Appl. No. 17/030,318, mailed on Sep. 30, 2021, 28 pages.
Final Office Action received for U.S. Appl. No. 17/030,321, mailed on Apr. 2, 2021, 28 pages.
Final Office Action received for U.S. Appl. No. 17/031,854, mailed on Feb. 23, 2023, 19 pages.
Final Office Action received for U.S. Appl. No. 17/031,854, mailed on Jun. 10, 2022, 15 pages.
Final Office Action received for U.S. Appl. No. 17/031,859, mailed on Apr. 16, 2021, 14 pages.
Final Office Action received for U.S. Appl. No. 17/031,859, mailed on Feb. 8, 2023, 15 pages.
Final Office Action received for U.S. Appl. No. 17/031,859, mailed on Jun. 10, 2022, 13 pages.
Final Office Action received for U.S. Appl. No. 17/031,859, mailed on Nov. 13, 2023, 15 pages.
Final Office Action received for U.S. Appl. No. 17/031,874, mailed on Apr. 16, 2021, 17 pages.
Final Office Action received for U.S. Appl. No. 17/031,874, mailed on Jun. 2, 2022, 19 pages.
Final Office Action received for U.S. Appl. No. 17/031,874, mailed on Mar. 17, 2023, 24 pages.
Final Office Action received for U.S. Appl. No. 17/068,386, mailed on Mar. 3, 2022, 29 pages.
Final Office Action received for U.S. Appl. No. 17/068,386, mailed on May 8, 2023, 23 pages.
Final Office Action received for U.S. Appl. No. 17/192,161, mailed on Aug. 16, 2021, 22 pages.
Final Office Action received for U.S. Appl. No. 17/192,161, mailed on Oct. 18, 2021, 22 pages.
Final Office Action received for U.S. Appl. No. 17/381,570, mailed on Feb. 10, 2023, 22 pages.
Final Office Action received for U.S. Appl. No. 17/381,570, mailed on Jul. 20, 2022, 22 pages.
Final Office Action received for U.S. Appl. No. 17/516,537, mailed on Oct. 11, 2022, 9 pages.
Final Office Action received for U.S. Appl. No. 17/591,184, mailed on Dec. 23, 2022, 10 pages.
Final Office Action received for U.S. Appl. No. 17/591,184, mailed on Sep. 22, 2023, 19 pages.
Final Office Action received for U.S. Appl. No. 17/735,395, mailed on Dec. 7, 2023, 29 pages.
Final Office Action received for U.S. Appl. No. 17/735,395, mailed on May 17, 2023, 31 pages.
Final Office Action received for U.S. Appl. No. 17/744,500, mailed on Sep. 19, 2023, 35 pages.
Final Office Action received for U.S. Appl. No. 17/862,097, mailed on Apr. 24, 2023, 17 pages.
Final Office Action received for U.S. Appl. No. 17/892,534, mailed on Nov. 9, 2023, 17 pages.
Final Office Action received for U.S. Appl. No. 17/951,624, mailed on Jan. 25, 2024, 48 pages.

(56) References Cited

OTHER PUBLICATIONS

Final Office Action received for U.S. Appl. No. 17/951,875, mailed on May 30, 2023, 12 pages.
Final Office Action received for U.S. Appl. No. 17/951,945, mailed on Dec. 7, 2023, 20 pages.
Final Office Action received for U.S. Appl. No. 17/951,945, mailed on May 18, 2023, 18 pages.
Final Office Action received for U.S. Appl. No. 17/952,027, mailed on Aug. 21, 2023, 47 pages.
Final Office Action received for U.S. Appl. No. 17/952,133, mailed on Sep. 26, 2023, 20 pages.
Final Office Action received for U.S. Appl. No. 17/952,233, mailed on Jun. 26, 2023, 18 pages.
Final Office Action received for U.S. Appl. No. 18/088,309, mailed on Jan. 9, 2024, 13 pages.
"Fitbit App", Available online at: <http://web.archive.org/web/20180114083150/https://www.fitbit.com/au/app>, Jan. 14, 2018, 8 pages.
"Garmin Edge 520, Owner's Manual", online available at: https://www8.garmin.com/manuals/webhelp/edge520/EN-US/Edge_520_OM_EN-US.pdf, 2015 24 pages.
Garmin, "EDGE 520 Plus Owner's Manual", Online Available at: https://www8.garmin.com/manuals/webhelp/edge520plus/EN-US/Edge_520_Plus_OM_EN-US.pdf, 2018, 30 pages.
Garmin, "Fenix 5x Owner's Manual", Online Available at: https://web.archive.org/web/20180127170640/https://static.garmin.com/pumac/fenix5x_OM_EN.pdf, Jan. 27, 2018, 42 pages.
Google, "Android User's Guide", Retrieved from the Internet: https://static.googleusercontent.com/media/www.google.com/en//help/hc/pdfs/mobile/AndroidUsersGuide-30-100.pdf, Feb. 23, 2011, 140 pages.
GPCity, "Garmin Connect 2.0 Overview with GPS City", Available online at: https://www.youtube.com/watch?v=EJ6U10y_8y0, Feb. 28, 2014, 8 pages.
GPSCity, "Garmin Connect Mobile App iOS Overview with GPS City", Available on: https://www.youtube.com/watch?v=rD-KPOJpmOA, 2014, 9 pages.
"Graphs and Charts", online available at: <https://www.teachervision.com/lesson-planning/graph-chart-teacher-resources, retrieved on Dec. 12, 2018, 4 pages.
"Gym Book—Strength Training Planner", Logger and Analyzer, GymBookApp, Available Online at: https://web.archive.org/web/20160401104508/https://gymbookapp.com/, Apr. 1, 2016, 10 pages
Hamilton, Jim, "Peloton Tips", Online available on: <https://www.youtube.com/watch?app=desktop&v=OneXtB0kaD4>, Oct. 22, 2015, 3 pages.
Heinrich, Peter, "More Player Engagement Potential: GameCircle Now Rewards Player Experience across Games", Available online at: https://www.developer.amazon.com/es-mx/blogs/home/tag/badges, Apr. 11, 2014, 9 pages.
"How to Send and Receive files over Bluetooth on an Android Phone", Online Available at: <https://web. archive.org/web/20160529062240/http://www.androidtipsandhacks.com/android/send-receive-files-bluetooth-android-phone/, May 29, 2016, 7 pages.
Intention to Grant received for Danish Patent Application No. PA201570668, mailed on Mar. 27, 2017, 2 pages.
Intention to Grant received for Danish Patent Application No. PA201670656, mailed on Jan. 18, 2021, 2 pages.
Intention to Grant received for Danish Patent Application No. PA201870379, mailed on May 2, 2019, 2 pages.
Intention to Grant received for Danish Patent Application No. PA201870385, mailed on Jan. 24, 2020, 2 pages.
Intention to Grant received for Danish Patent Application No. PA202070614, mailed on Aug. 8, 2022, 2 pages.
Intention to Grant received for Danish Patent Application No. PA202070615, mailed on Jan. 27, 2022, 2 pages.
Intention to Grant received for Danish Patent Application No. PA202070815, mailed on Sep. 13, 2022, 2 pages.
Intention to Grant received for European Patent Application No. 16706081.3, mailed on Jul. 18, 2018, 8 pages.
Intention to Grant received for European Patent Application No. 16706081.3, mailed on Jun. 11, 2018, 7 pages.
Intention to Grant received for European Patent Application No. 16762356.0, mailed on Dec. 23, 2021, 8 pages.
Intention to Grant received for European Patent Application No. 16837432.0, mailed on Apr. 14, 2023, 8 pages.
Intention to Grant received for European Patent Application No. 16837432.0, mailed on Sep. 7, 2023, 9 pages.
Intention to Grant received for European Patent Application No. 17813824.4, mailed on Feb. 1, 2024, 9 pages.
Intention to Grant received for European Patent Application No. 18213157.3, mailed on May 19, 2021, 8 pages.
Intention to Grant received for European Patent Application No. 18213157.3, mailed on Oct. 27, 2021, 8 pages.
Intention to Grant received for European Patent Application No. 18727543.3, mailed on Apr. 12, 2023, 9 pages.
Intention to Grant received for European Patent Application No. 19721883.7, mailed on May 11, 2023, 9 pages.
Intention to Grant received for European Patent Application No. 19724963.4, mailed on Sep. 20, 2021, 7 pages.
Intention to Grant received for European Patent Application No. 20182116.2, mailed on Jun. 2, 2022, 8 pages.
Intention to Grant received for European Patent Application No. 20182116.2, mailed on Nov. 11, 2022, 9 pages.
Intention to Grant received for European Patent Application No. 20203526.7, mailed on Feb. 10, 2023, 9 pages.
Intention to Grant received for European Patent Application No. 201714460.9, mailed on Feb. 8, 2024, 12 pages.
Intention to Grant received for European Patent Application No. 22150207.3, mailed on Mar. 21, 2024, 9 pages.
Intention to Grant received for European Patent Application No. 22173249.8, mailed on Oct. 2, 2023, 9 pages.
International Preliminary Report on Patentability received for PCT Patent Application No. PCT/US2013/073195, mailed on Jun. 16, 2016, 10 pages.
International Preliminary Report on Patentability received for PCT Patent Application No. PCT/US2014/027882, mailed on Sep. 24, 2015, 8 pages.
International Preliminary Report on Patentability received for PCT Patent Application No. PCT/US2015/032474, mailed on Dec. 15, 2016, 7 pages.
International Preliminary Report on Patentability received for PCT Patent Application No. PCT/US2015/047282, mailed on Mar. 16, 2017, 26 pages.
International Preliminary Report on Patentability received for PCT Patent Application No. PCT/US2015/053353, mailed on Sep. 21, 2017, 15 pages.
International Preliminary Report on Patentability received for PCT Patent Application No. PCT/US2016/014997, mailed on Dec. 21, 2017, 16 pages.
International Preliminary Report on Patentability received for PCT Patent Application No. PCT/US2016/016216, mailed on May 4, 2017, 14 pages.
International Preliminary Report on Patentability received for PCT Patent Application No. PCT/US2016/021403, mailed on Sep. 21, 2017, 21 pages.
International Preliminary Report on Patentability received for PCT Patent Application No. PCT/US2016/037686, mailed on Mar. 1, 2018, 12 pages.
International Preliminary Report on Patentability received for PCT Patent Application No. PCT/US2017/035554, mailed on Dec. 20, 2018, 39 pages.
International Preliminary Report on Patentability received for PCT Patent Application No. PCT/US2017/036608, mailed on Dec. 27, 2018, 12 pages.
International Preliminary Report on Patentability received for PCT Patent Application No. PCT/US2018/031662, mailed on Nov. 28, 2019, 12 pages.
International Preliminary Report on Patentability received for PCT Patent Application No. PCT/US2019/024570, mailed on Nov. 19, 2020, 10 pages.

(56) References Cited

OTHER PUBLICATIONS

International Preliminary Report on Patentability received for PCT Patent Application No. PCT/US2019/024790, mailed on Nov. 19, 2020, 11 pages.
International Preliminary Report on Patentability received for PCT Patent Application No. PCT/US2020/025997, mailed on Nov. 18, 2021, 10 pages.
International Preliminary Report on Patentability received for PCT Patent Application No. PCT/US2020/035199, mailed on Dec. 16, 2021, 14 pages.
International Preliminary Report on Patentability received for PCT Patent Application No. PCT/US2021/017736, mailed on Aug. 25, 2022, 19 pages.
International Preliminary Report on Patentability received for PCT Patent Application No. PCT/US2022/029297, mailed on Nov. 30, 2023, 10 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2015/032474, mailed on Aug. 19, 2015, 8 pages.
International Search Report and Written Opinion received for PCT Patent Application No. PCT/US2015/047282, mailed on May 9, 2016, 33 pages.
International Search Report and Written Opinion received for PCT Patent Application No. PCT/US2015/053353, mailed on May 9, 2016, 21 pages.
International Search Report and Written Opinion received for PCT Patent Application No. PCT/US2016/014997, mailed on Aug. 31, 2016, 21 pages.
International Search Report and Written Opinion received for PCT Patent Application No. PCT/US2016/016216, mailed on Jun. 27, 2016, 18 pages.
International Search Report and Written Opinion received for PCT Patent Application No. PCT/US2016/021403, mailed on May 12, 2016, 23 pages.
International Search Report and Written Opinion received for PCT Patent Application No. PCT/US2016/037686, mailed on Sep. 9, 2016, 19 pages.
International Search Report and Written Opinion received for PCT Patent Application No. PCT/US2017/035554, mailed on Sep. 22, 2017, 42 pages.
International Search Report and Written Opinion received for PCT Patent Application No. PCT/US2017/036608, mailed on Oct. 20, 2017, 15 pages.
International Search Report and Written Opinion received for PCT Patent Application No. PCT/US2018/031662, mailed on Sep. 27, 2018, 17 pages.
International Search Report and Written Opinion received for PCT Patent Application No. PCT/US2019/024570, mailed on Aug. 8, 2019, 18 pages.
International Search Report and Written Opinion received for PCT Patent Application No. PCT/US2019/024790, mailed on Sep. 11, 2019, 18 pages.
International Search Report and Written Opinion received for PCT Patent Application No. PCT/US2020/025997, mailed on Jul. 1, 2020, 16 pages.
International Search Report and Written Opinion received for PCT Patent Application No. PCT/US2020/025997, mailed on Jul. 14, 2020, 15 pages.
International Search Report and Written Opinion received for PCT Patent Application No. PCT/US2020/035199, mailed on Oct. 30, 2020, 20 pages.
International Search Report and Written Opinion received for PCT Patent Application No. PCT/US2021/017736, mailed on Sep. 2, 2021, 25 pages.
International Search Report and Written Opinion received for PCT Patent Application No. PCT/US2022/029297, mailed on Aug. 11, 2022, 13 pages.
International Search Report and Written Opinion received for PCT Patent Application No. PCT/US2023/024104, mailed on Oct. 18, 2023, 18 pages.
International Search Report and Written Opinion received for PCT Patent Application No. PCT/US2023/024185, mailed on Sep. 18, 2023, 12 pages.
International Search Report and Written Opinion received for PCT Patent Application No. PCT/US2023/030718, mailed on Jan. 9, 2024, 12 pages.
International Search Report received for PCT Patent Application No. PCT/US2013/073195, mailed on Jun. 23, 2014, 3 pages.
International Written Opinion received for PCT Patent Application No. PCT/US2013/073195, mailed on Jun. 23, 2014, 8 pages.
Internet Blog Post, "[PC] Pre-Customization of Black Desert's Characters", Online Available at: <https://blog.naver.com/hsh6051/220209813968>, Dec. 14, 2014, 41 pages (21 pages of English translation and 20 pages of Official Copy).
Invitation to Pay Addition Fees and Partial International Search Report received for PCT Patent Application No. PCT/US2018/031662, mailed on Jul. 16, 2018, 13 pages.
Invitation to Pay Addition Fees received for PCT Patent Application No. PCT/US2014/027882, mailed on Aug. 5, 2014, 2 pages.
Invitation to Pay Addition Fees received for PCT Patent Application No. PCT/US2015/047282, mailed on Dec. 22, 2015, 7 pages.
Invitation to Pay Addition Fees received for PCT Patent Application No. PCT/US2015/053353, mailed on Jan. 21, 2016, 7 pages.
Invitation to Pay Addition Fees received for PCT Patent Application No. PCT/US2016/014997, mailed on May 2, 2016, 5 pages.
Invitation to Pay Addition Fees received for PCT Patent Application No. PCT/US2016/016216, mailed on Apr. 20, 2016, 6 pages.
Invitation to Pay Addition Fees received for PCT Patent Application No. PCT/US2017/035554, mailed on Jul. 20, 2017, 2 pages.
Invitation to Pay Addition Fees received for PCT Patent Application No. PCT/US2017/036608, mailed on Aug. 14, 2017, 2 pages.
Invitation to Pay Addition Fees received for PCT Patent Application No. PCT/US2019/024790, mailed on Jul. 18, 2019, 10 pages.
Invitation to Pay Addition Fees received for PCT Patent Application No. PCT/US2020/035199, mailed on Sep. 8, 2020, 12 pages.
Invitation to Pay Addition Fees received for PCT Patent Application No. PCT/US2021/017736, mailed on Jun. 15, 2021, 14 pages.
Invitation to Pay Search Fees received for European Patent Application No. 21714460.9, mailed on Aug. 8, 2023, 3 pages.
Invitation to Restrict or Pay Additional Fees received for PCT Patent Application No. PCT/US2016/016216, mailed on Dec. 19, 2016, 9 pages.
Jenbsjourney, "Wondering About a Fitbit?", Available at: https://jenbsjourney.blogspot.kr/2013/08/wondering-about-fitbit-html, Aug. 6, 2013, 12 pages.
Jurick et al., "iPhone Hacks", Tips & Tools for Unlocking the Power of Your iPhone & iPod touch, online: URL: https://api.pageplace.de/preview/DT0400.9780596550974_A23629666/preview-9780596550974_A23629666.pdf >, Apr. 2009, 49 pages.
"Kamcord—Wikipedia", Online Available at : <https://en.wikipedia.org/w/index.php?title=Kamcord&oldid=712263010>, Mar. 28, 2016, 2 pages.
"Kamcord Developers—Quick Start Guide", Online Available at: <https://web.archive.org/web/20140801055705/https://www.kamcord.com/developers/docs/ios/features-and-settings/, Aug. 1, 2014, 10 pages.
"Kamcord Developers", Online Available at: <https://web.archive.org/web/20140827043641 /http://www.kamcord.com/developers/>, Aug. 27, 2014, 7 pages.
Lin et al., "Cooperation Stimulation Strategies for Peer-To-Peer Wireless Video Streaming Social Networks". In IEEE Transactions on Image Processing, vol 19, Issue 17Available Online at: https://dl.acm.org/doi/abs/10.1109/TIP.2010.2045035, 2010, 30 pages.
Li-Yu et al., "Influence of exercise prescription on body composition of college students", Clinical Rehabilitation in China. vol. 9 Issue 24, Jun. 28, 2005, pp. 147-149 (Official Copy only) {See Communication Under Rule 37 CFR § 1.98(a) (3)}.

(56) References Cited

OTHER PUBLICATIONS

Minutes of the Oral Proceedings received for European Patent Application No. 13811085.3, mailed on Sep. 11, 2018, 3 pages.
Minutes of the Oral Proceedings received for European Patent Application No. 15771747.1, mailed on Aug. 10, 2018, 11 pages.
Minutes of the Oral Proceedings received for European Patent Application No. 15771747.1, mailed on Dec. 1, 2021, 4 pages.
Minutes of the Oral Proceedings received for European Patent Application No. 16762356.0, mailed on Dec. 17, 2021, 5 pages.
Minutes of the Oral Proceedings received for European Patent Application No. 17810749.6, mailed on Jan. 26, 2021, 8 pages.
Minutes of the Oral Proceedings received for European Patent Application No. 18154145.9, mailed on Feb. 12, 2021, 8 pages.
Minutes of the Oral Proceedings received for European Patent Application No. 19724963.4, mailed on Sep. 3, 2021, 6 pages.
Minutes of the Oral Proceedings received for European Patent Application No. 20182116.2, mailed on May 24, 2022, 7 pages.
Minutes of the Oral Proceedings received for European Patent Application No. 20721342.2, mailed on Nov. 8, 2022, 5 pages.
Minutes of the Oral Proceedings received for European Patent Application No. 21168916.1, mailed on Jan. 3, 2024, 5 pages.
"Mugs", Online Available at: https://web.archive.org/web/20151029034349/http://le-mugs.com/, Oct. 29, 2015, 14 pages.
"Multi-Set Bar Chart", The Data Visualization Catalogue, Available Online at: https://datavizcatalogue.com/methods/multiset_barchart.html, Feb. 8, 2014, 3 pages.
"My CalStep", http://www.surprisesoftware.com/mycalstep/, retireved from the Wayback Machine, May 9, 2007, 2 pages.
Nakasuji, Yoshito, "Apple Watch", First Edition 1st Printing, Japan, Incorporated Company Technical Hyoronsha, Jun. 15, 2015, 4 pages (Official Copy Only) {See Communication Under Rule 37 CFR § 1.98(a) (3)}.
Non-Final Office Action received for U.S. Appl. No. 12/205,847, mailed on Oct. 3, 2011, 59 pages.
Non-Final Office Action received for U.S. Appl. No. 14/503,372, mailed on Dec. 5, 2014, 11 pages.
Non-Final Office Action received for U.S. Appl. No. 14/599,424, mailed on Jan. 17, 2018, 13 pages.
Non-Final Office Action received for U.S. Appl. No. 14/599,425, mailed on Jan. 11, 2018, 42 pages.
Non-Final Office Action received for U.S. Appl. No. 14/599,425, mailed on Mar. 17, 2015, 16 pages.
Non-Final Office Action received for U.S. Appl. No. 14/599,425, mailed on Oct. 26, 2016, 22 pages.
Non-Final Office Action received for U.S. Appl. No. 14/732,773, mailed on Feb. 8, 2019, 32 pages.
Non-Final Office Action received for U.S. Appl. No. 14/732,773, mailed on Jan. 19, 2018, 45 pages.
Non-Final Office Action received for U.S. Appl. No. 14/774,664, mailed on Mar. 7, 2017, 23 pages.
Non-Final Office Action received for U.S. Appl. No. 14/839,916, mailed on Feb. 4, 2016, 19 pages.
Non-Final Office Action received for U.S. Appl. No. 14/839,916, mailed on May 1, 2017, 18 pages.
Non-Final Office Action received for U.S. Appl. No. 14/839,922, mailed on Aug. 17, 2016, 25 pages.
Non-Final Office Action received for U.S. Appl. No. 14/839,922, mailed on Feb. 25, 2016, 20 pages.
Non-Final Office Action received for U.S. Appl. No. 14/841,606, mailed on Dec. 7, 2017, 30 pages.
Non-Final Office Action received for U.S. Appl. No. 14/841,606, mailed on May 8, 2019, 28 pages.
Non-Final Office Action received for U.S. Appl. No. 14/863,069, mailed on Oct. 5, 2017, 19 pages.
Non-Final Office Action received for U.S. Appl. No. 14/863,069, mailed on Dec. 2, 2015, 12 pages.
Non-Final Office Action received for U.S. Appl. No. 14/864,759, mailed on Mar. 20, 2018, 20 pages.
Non-Final Office Action received for U.S. Appl. No. 15/183,663, mailed on Jul. 9, 2018, 13 pages.
Non-Final Office Action received for U.S. Appl. No. 15/554,204, mailed on Apr. 17, 2019, 19 pages.
Non-Final Office Action received for U.S. Appl. No. 15/600,243, mailed on Jun. 27, 2019, 17 pages.
Non-Final Office Action received for U.S. Appl. No. 15/608,848, mailed on Feb. 6, 2020, 12 pages.
Non-Final Office Action received for U.S. Appl. No. 15/608,848, mailed on Feb. 12, 2021, 14 pages.
Non-Final Office Action received for U.S. Appl. No. 15/608,848, mailed on Nov. 2, 2018, 21 pages.
Non-Final Office Action received for U.S. Appl. No. 15/614,121, mailed on Nov. 4, 2019, 44 pages.
Non-Final Office Action received for U.S. Appl. No. 15/614,121, mailed on Nov. 30, 2018, 28 pages.
Non-Final Office Action received for U.S. Appl. No. 15/627,069, mailed on Jun. 21, 2019, 22 pages.
Non-Final Office Action received for U.S. Appl. No. 15/627,069, mailed on May 26, 2020, 25 pages.
Non-Final Office Action received for U.S. Appl. No. 15/705,849, mailed on Nov. 12, 2019, 15 pages.
Non-Final Office Action received for U.S. Appl. No. 15/925,652, mailed on Apr. 5, 2019, 28 pages.
Non-Final Office Action received for U.S. Appl. No. 15/925,652, mailed on Aug. 7, 2020, 39 pages.
Non-Final Office Action received for U.S. Appl. No. 16/138,809, mailed on Feb. 28, 2020, 22 pages.
Non-Final Office Action received for U.S. Appl. No. 16/144,735, mailed on Feb. 19, 2020, 10 pages.
Non-Final Office Action received for U.S. Appl. No. 16/144,753, mailed on Mar. 5, 2020, 9 pages.
Non-Final Office Action received for U.S. Appl. No. 16/144,849, mailed on Dec. 31, 2018, 28 pages.
Non-Final Office Action received for U.S. Appl. No. 16/144,849, mailed on Sep. 17, 2019, 9 pages.
Non-Final Office Action received for U.S. Appl. No. 16/144,864, mailed on Dec. 18, 2018, 19 pages.
Non-Final Office Action received for U.S. Appl. No. 16/144,864, mailed on Jan. 31, 2020, 29 pages.
Non-Final Office Action received for U.S. Appl. No. 16/145,033, mailed on Feb. 9, 2021, 55 pages.
Non-Final Office Action received for U.S. Appl. No. 16/145,033, mailed on Mar. 4, 2020, 50 pages.
Non-Final Office Action received for U.S. Appl. No. 16/363,945, mailed on Apr. 24, 2020, 13 pages.
Non-Final Office Action received for U.S. Appl. No. 16/377,892, mailed on May 21, 2020, 9 pages.
Non-Final Office Action received for U.S. Appl. No. 16/378,136, mailed on Jun. 2, 2020, 8 pages.
Non-Final Office Action received for U.S. Appl. No. 16/388,493, mailed on Dec. 9, 2021, 7 pages.
Non-Final Office Action received for U.S. Appl. No. 16/389,722, mailed on Apr. 3, 2020, 15 pages.
Non-Final Office Action received for U.S. Appl. No. 16/389,722, mailed on Jul. 7, 2022, 16 pages.
Non-Final Office Action received for U.S. Appl. No. 16/389,722, mailed on Jun. 3, 2021, 17 pages.
Non-Final Office Action received for U.S. Appl. No. 16/407,590, mailed on Apr. 10, 2020, 12 pages.
Non-Final Office Action received for U.S. Appl. No. 16/418,786, mailed on Apr. 24, 2020, 16 pages.
Non-Final Office Action received for U.S. Appl. No. 16/418,786, mailed on Aug. 1, 2022, 18 pages.
Non-Final Office Action received for U.S. Appl. No. 16/418,786, mailed on Mar. 28, 2022, 14 pages.
Non-Final Office Action received for U.S. Appl. No. 16/418,786, mailed on Oct. 4, 2021, 10 pages.
Non-Final Office Action received for U.S. Appl. No. 16/679,967, mailed on Apr. 19, 2022, 13 pages.
Non-Final Office Action received for U.S. Appl. No. 16/679,967, mailed on Sep. 2, 2021, 12 pages.
Non-Final Office Action received for U.S. Appl. No. 16/820,383, mailed on Dec. 14, 2020, 11 pages.

(56) References Cited

OTHER PUBLICATIONS

Non-Final Office Action received for U.S. Appl. No. 16/820,383, mailed on Jan. 10, 2022, 18 pages.
Non-Final Office Action received for U.S. Appl. No. 16/888,629, mailed on Mar. 31, 2021, 14 pages.
Non-Final Office Action received for U.S. Appl. No. 16/894,309, mailed on Oct. 15, 2020, 24 pages.
Non-Final Office Action received for U.S. Appl. No. 16/987,275, mailed on Nov. 23, 2021, 17 pages.
Non-Final Office Action received for U.S. Appl. No. 16/994,352, mailed on Jul. 30, 2021, 11 pages.
Non-Final Office Action received for U.S. Appl. No. 17/030,318, mailed on Apr. 2, 2021, 28 pages.
Non-Final Office Action received for U.S. Appl. No. 17/030,318, mailed on Dec. 3, 2020, 22 pages.
Non-Final Office Action received for U.S. Appl. No. 17/030,318, mailed on Jun. 14, 2022, 9 pages.
Non-Final Office Action received for U.S. Appl. No. 17/030,321, mailed on Dec. 15, 2020, 25 pages.
Non-Final Office Action received for U.S. Appl. No. 17/030,321, mailed on Oct. 18, 2021, 28 pages.
Non-Final Office Action received for U.S. Appl. No. 17/030,337, mailed on Jun. 14, 2022, 13 pages.
Non-Final Office Action received for U.S. Appl. No. 17/030,340, mailed on Jun. 14, 2022, 15 pages.
Non-Final Office Action received for U.S. Appl. No. 17/031,543, mailed on Apr. 1, 2022, 9 pages.
Non-Final Office Action received for U.S. Appl. No. 17/031,854, mailed on Dec. 27, 2021, 13 pages.
Non-Final Office Action received for U.S. Appl. No. 17/031,854, mailed on Oct. 18, 2023, 22 pages.
Non-Final Office Action received for U.S. Appl. No. 17/031,854, mailed on Sep. 26, 2022, 17 pages.
Non-Final Office Action received for U.S. Appl. No. 17/031,859, mailed on Dec. 15, 2020, 13 pages.
Non-Final Office Action received for U.S. Appl. No. 17/031,859, mailed on Dec. 24, 2021, 16 pages.
Non-Final Office Action received for U.S. Appl. No. 17/031,859, mailed on Jul. 10, 2023, 15 pages.
Non-Final Office Action received for U.S. Appl. No. 17/031,859, mailed on Sep. 12, 2022, 17 pages.
Non-Final Office Action received for U.S. Appl. No. 17/031,874, mailed on Dec. 28, 2020, 14 pages.
Non-Final Office Action received for U.S. Appl. No. 17/031,874, mailed on Jan. 24, 2022, 18 pages.
Non-Final Office Action received for U.S. Appl. No. 17/031,874, mailed on Oct. 4, 2022, 20 pages.
Non-Final Office Action received for U.S. Appl. No. 17/041,438, mailed on May 25, 2023, 47 pages.
Non-Final Office Action received for U.S. Appl. No. 17/068,386, mailed on Jan. 30, 2023, 20 pages.
Non-Final Office Action received for U.S. Appl. No. 17/068,386, mailed on Jul. 15, 2021, 16 pages.
Non-Final Office Action received for U.S. Appl. No. 17/068,386, mailed on Oct. 28, 2021, 20 pages.
Non-Final Office Action received for U.S. Appl. No. 17/116,775, mailed on Aug. 24, 2021, 20 pages.
Non-Final Office Action received for U.S. Appl. No. 17/126,571, mailed on Dec. 21, 2021, 19 pages.
Non-Final Office Action received for U.S. Appl. No. 17/157,728, mailed on Nov. 26, 2021, 18 pages.
Non-Final Office Action received for U.S. Appl. No. 17/192,161, mailed on May 13, 2021, 28 pages.
Non-Final Office Action received for U.S. Appl. No. 17/327,204, mailed on Nov. 26, 2021, 13 pages.
Non-Final Office Action received for U.S. Appl. No. 17/381,570, mailed on Apr. 1, 2022, 29 pages.
Non-Final Office Action received for U.S. Appl. No. 17/381,570, mailed on Sep. 28, 2022, 20 pages.
Non-Final Office Action received for U.S. Appl. No. 17/516,537, mailed on May 5, 2022, 8 pages.
Non-Final Office Action received for U.S. Appl. No. 17/566,521, mailed on May 15, 2023, 12 pages.
Non-Final Office Action received for U.S. Appl. No. 17/591,184, mailed on Apr. 21, 2023, 15 pages.
Non-Final Office Action received for U.S. Appl. No. 17/591,184, mailed on Aug. 4, 2022, 18 pages.
Non-Final Office Action received for U.S. Appl. No. 17/666,301, mailed on Feb. 16, 2023, 24 pages.
Non-Final Office Action received for U.S. Appl. No. 17/735,395, mailed on Feb. 10, 2023, 28 pages.
Non-Final Office Action received for U.S. Appl. No. 17/735,395, mailed on Mar. 19, 2024, 32 pages.
Non-Final Office Action received for U.S. Appl. No. 17/735,395, mailed on Sep. 20, 2023, 29 pages.
Non-Final Office Action received for U.S. Appl. No. 17/744,500, mailed on Apr. 19, 2023, 30 pages.
Non-Final Office Action received for U.S. Appl. No. 17/862,097, mailed on Feb. 1, 2023, 16 pages.
Non-Final Office Action received for U.S. Appl. No. 17/892,534, mailed on Dec. 19, 2022, 20 pages.
Non-Final Office Action received for U.S. Appl. No. 17/892,534, mailed on May 10, 2023, 17 pages.
Non-Final Office Action received for U.S. Appl. No. 17/896,791, mailed on Aug. 30, 2023, 11 pages.
Non-Final Office Action received for U.S. Appl. No. 17/951,613, mailed on Aug. 2, 2023, 42 pages.
Non-Final Office Action received for U.S. Appl. No. 17/951,624, mailed on Sep. 19, 2023, 41 pages.
Non-Final Office Action received for U.S. Appl. No. 17/951,875, mailed on Jan. 23, 2023, 12 pages.
Non-Final Office Action received for U.S. Appl. No. 17/951,945, mailed on Mar. 20, 2024, 22 pages.
Non-Final Office Action received for U.S. Appl. No. 17/951,945, mailed on Mar. 24, 2023, 14 pages.
Non-Final Office Action received for U.S. Appl. No. 17/951,945, mailed on Sep. 20, 2023, 19 pages.
Non-Final Office Action received for U.S. Appl. No. 17/951,976, mailed on Aug. 3, 2023, 16 pages.
Non-Final Office Action received for U.S. Appl. No. 17/952,027, mailed on Apr. 28, 2023, 46 pages.
Non-Final Office Action received for U.S. Appl. No. 17/952,075, mailed on Jan. 16, 2024, 27 pages.
Non-Final Office Action received for U.S. Appl. No. 17/952,133, mailed on Feb. 28, 2024, 22 pages.
Non-Final Office Action received for U.S. Appl. No. 17/952,133, mailed on Jun. 2, 2023, 28 pages.
Non-Final Office Action received for U.S. Appl. No. 17/952,181, mailed on Aug. 7, 2023, 18 pages.
Non-Final Office Action received for U.S. Appl. No. 17/952,233, mailed on Apr. 28, 2023, 21 pages.
Non-Final Office Action received for U.S. Appl. No. 17/952,233, mailed on Feb. 2, 2024, 18 pages.
Non-Final Office Action received for U.S. Appl. No. 17/952,239, mailed on Apr. 4, 2023, 45 pages.
Non-Final Office Action received for U.S. Appl. No. 18/088,309, mailed on Sep. 21, 2023, 11 pages.
Non-Final Office Action received for U.S. Appl. No. 18/135,056, mailed on Dec. 7, 2023, 16 pages.
Non-Final Office Action received for U.S. Appl. No. 18/204,217, mailed on Feb. 13, 2024, 21 pages.
Notice of Acceptance received for Australian Patent Application No. 2015267240, mailed on Apr. 10, 2018, 3 pages.
Notice of Acceptance received for Australian Patent Application No. 2015312215, mailed on Oct. 9, 2017, 3 pages.
Notice of Acceptance received for Australian Patent Application No. 2016215440, mailed on Feb. 28, 2019, 3 pages.
Notice of Acceptance received for Australian Patent Application No. 2016229847, mailed on Sep. 12, 2018, 3 pages.
Notice of Acceptance received for Australian Patent Application No. 2017277971, mailed on Feb. 17, 2021, 3 pages.

(56) References Cited

OTHER PUBLICATIONS

Notice of Acceptance received for Australian Patent Application No. 2017286296, mailed on May 1, 2020, 3 pages.
Notice of Acceptance received for Australian Patent Application No. 2018206772, mailed on Mar. 17, 2020, 3 pages.
Notice of Acceptance received for Australian Patent Application No. 2018268972, mailed on Dec. 18, 2020, 3 pages.
Notice of Acceptance received for Australian Patent Application No. 2018279037, mailed on May 13, 2020, 3 pages.
Notice of Acceptance received for Australian Patent Application No. 2019201583, mailed on Jul. 15, 2019, 3 pages.
Notice of Acceptance received for Australian Patent Application No. 2019222943, mailed on May 5, 2020, 3 pages.
Notice of Acceptance received for Australian Patent Application No. 2019250251, mailed on Feb. 18, 2021, 3 pages.
Notice of Acceptance received for Australian Patent Application No. 2019266054, mailed on Nov. 25, 2021, 3 pages.
Notice of Acceptance received for Australian Patent Application No. 2020204153, mailed on Jul. 6, 2020, 3 pages.
Notice of Acceptance received for Australian Patent Application No. 2020204259, mailed on Jun. 11, 2021, 3 pages.
Notice of Acceptance received for Australian Patent Application No. 2020204506, mailed on Apr. 8, 2021, 3 pages.
Notice of Acceptance received for Australian Patent Application No. 2020210234, mailed on Feb. 3, 2022, 3 pages.
Notice of Acceptance received for Australian Patent Application No. 2020239743, mailed on Jan. 13, 2022, 3 pages.
Notice of Acceptance received for Australian Patent Application No. 2020239748, mailed on Mar. 7, 2022, 3 pages.
Notice of Acceptance received for Australian Patent Application No. 2020239752, mailed on Jan. 31, 2022, 3 pages.
Notice of Acceptance received for Australian Patent Application No. 2020256383, mailed on Aug. 3, 2021, 3 pages.
Notice of Acceptance received for Australian Patent Application No. 2020288139, mailed on Feb. 2, 2023, 3 pages.
Notice of Acceptance received for Australian Patent Application No. 2021200787, mailed on Mar. 19, 2021, 3 pages.
Notice of Acceptance received for Australian Patent Application No. 2021201130, mailed on Mar. 28, 2022, 3 pages.
Notice of Acceptance received for Australian Patent Application No. 2021203216, mailed on Jul. 26, 2022, 3 pages.
Notice of Acceptance received for Australian Patent Application No. 2021203636, mailed on Apr. 14, 2022, 3 pages.
Notice of Acceptance received for Australian Patent Application No. 2021204422, mailed on Aug. 15, 2022, 3 pages.
Notice of Acceptance received for Australian Patent Application No. 2021218036, mailed on May 9, 2023, 3 pages.
Notice of Acceptance received for Australian Patent Application No. 2021266294, mailed on Mar. 3, 2023, 3 pages.
Notice of Acceptance received for Australian Patent Application No. 2022200514, mailed on Apr. 17, 2023, 3 pages.
Notice of Acceptance received for Australian Patent Application No. 2022201761, mailed on Jun. 15, 2023, 3 pages.
Notice of Acceptance received for Australian Patent Application No. 2022202977, mailed on Sep. 26, 2023, 3 pages.
Notice of Acceptance received for Australian Patent Application No. 2022203278, mailed on Dec. 4, 2023, 3 pages.
Notice of Acceptance received for Australian Patent Application No. 2022209277, mailed on Apr. 28, 2023, 3 pages.
Notice of Acceptance received for Australian Patent Application No. 2022235614, mailed on Jul. 6, 2023, 3 pages.
Notice of Acceptance received for Australian Patent Application No. 2022235634, mailed on Nov. 2, 2023, 3 pages.
Notice of Acceptance received for Australian Patent Application No. 2023203050, mailed on Oct. 24, 2023, 3 pages.
Notice of Acceptance received for Australian Patent Application No. 2023203776, mailed on Dec. 12, 2023, 3 pages.
Notice of Acceptance received for Australian Patent Application No. 2023237090, mailed on Feb. 23, 2024, 3 pages.
Notice of Allowance received for Chinese Patent Application No. 201380081349.6, mailed on Dec. 17, 2021, 2 pages (1 page of English Translation and 1 page of Official Copy).
Notice of Allowance received for Chinese Patent Application No. 201520358505.5, issued on Jan. 13, 2016, 3 pages (2 pages of English Translation and 1 page of Official Copy).
Notice of Allowance received for Chinese Patent Application No. 201580028677.9, mailed on Apr. 2, 2019, 2 pages (1 page of English Translation and 1 pages of Official Copy).
Notice of Allowance received for Chinese Patent Application No. 201580037927.5, mailed on Oct. 17, 2019, 3 pages (1 page of English Translation and 2 pages of Official Copy).
Notice of Allowance received for Chinese Patent Application No. 201680008151.9, mailed on Jun. 16, 2020, 2 pages (1 page of English Translation and 1 page of Official Copy).
Notice of Allowance received for Chinese Patent Application No. 201680013193.1, mailed on May 7, 2021, 5 pages (1 page of English Translation and 4 pages of Official Copy).
Notice of Allowance received for Chinese Patent Application No. 201680047983.1, mailed on Apr. 28, 2021, 3 pages (1 page of English Translation and 2 pages of Official Copy).
Notice of Allowance received for Chinese Patent Application No. 201710439448.7, mailed on Jan. 26, 2021, 2 pages (1 page of English Translation and 1 page of Official Copy).
Notice of Allowance received for Chinese Patent Application No. 201780034193.4, mailed on Oct. 20, 2021, 4 pages (1 page of English Translation and 3 pages of Official Copy).
Notice of Allowance received for Chinese Patent Application No. 201780034203.4, mailed on Jan. 17, 2022, 2 pages (1 page of English Translation and 1 page of Official Copy).
Notice of Allowance received for Chinese Patent Application No. 201810105846.X, mailed on Feb. 18, 2020, 2 pages (1 page of English Translation and 1 page of Official Copy).
Notice of Allowance received for Chinese Patent Application No. 201811136445.7, mailed on Aug. 11, 2021, 2 pages (1 page of English Translation and 1 page of Official Copy).
Notice of Allowance received for Chinese Patent Application No. 201811303556.2, mailed on Jul. 28, 2023, 2 pages (1 page of English Translation and 1 page of Official Copy).
Notice of Allowance received for Chinese Patent Application No. 201880032190.1, mailed on Oct. 7, 2023, 4 pages (1 page of English Translation and 3 pages of Official Copy).
Notice of Allowance received for Chinese Patent Application No. 201911396643.1, mailed on Jun. 15, 2023, 8 pages (4 pages of English Translation and 4 pages of Official Copy).
Notice of Allowance received for Chinese Patent Application No. 201911396744.9, mailed on Aug. 3, 2023, 5 pages (1 page of English Translation and 4 pages of Official Copy).
Notice of Allowance received for Chinese Patent Application No. 201911396819.3, mailed on Aug. 3, 2023, 5 pages (1 page of English Translation and 4 pages of Official Copy).
Notice of Allowance received for Chinese Patent Application No. 201911396876.1, mailed on Sep. 6, 2023, 5 pages (1 page of English Translation and 4 pages of Official Copy).
Notice of Allowance received for Chinese Patent Application No. 201911401161.0, mailed on Apr. 24, 2023, 11 pages (5 pages of English Translation and 6 pages of Official Copy).
Notice of Allowance received for Chinese Patent Application No. 201911401375.8, mailed on Nov. 26, 2023, 2 pages (1 page of English Translation and 1 page of Official Copy).
Notice of Allowance received for Chinese Patent Application No. 202010606407.4, mailed on Jan. 24, 2022, 2 pages (1 page of English Translation and 1 page of Official Copy).
Notice of Allowance received for Chinese Patent Application No. 202210238202.4, mailed on Jan. 13, 2023, 7 pages (3 pages of English Translation and 4 pages of Official Copy).
Notice of Allowance received for Danish Patent Application No. PA201570666, mailed on Sep. 15, 2016, 1 page.
Notice of Allowance received for Danish Patent Application No. PA201570668, mailed on Oct. 30, 2017, 2 pages.
Notice of Allowance received for Japanese Patent Application No. 2016-535045, mailed on Mar. 2, 2018, 4 pages (1 page of English Translation and 3 pages of Official Copy).

(56) References Cited

OTHER PUBLICATIONS

Notice of Allowance received for Japanese Patent Application No. 2016-557650, mailed on Apr. 9, 2019, 4 pages (1 page of English Translation and 3 pages of Official Copy).
Notice of Allowance received for Japanese Patent Application No. 2016-569945, mailed on Jan. 7, 2020, 4 pages (1 page of English Translation and 3 pages of Official Copy).
Notice of Allowance received for Japanese Patent Application No. 2017-545918, mailed on Jul. 22, 2019, 4 pages (1 page of English Translation and 3 pages of Official Copy).
Notice of Allowance received for Japanese Patent Application No. 2018-014096, mailed on Jan. 5, 2021, 3 pages (1 page of English Translation and 2 pages of Official Copy).
Notice of Allowance received for Japanese Patent Application No. 2018-068846, mailed on Dec. 9, 2019, 4 pages (1 page of English Translation and 3 pages of Official Copy).
Notice of Allowance received for Japanese Patent Application No. 2018-184532, mailed on Jan. 17, 2022, 4 pages (1 page of English Translation and 3 pages of Official Copy).
Notice of Allowance received for Japanese Patent Application No. 2019-044107, mailed on Jul. 11, 2022, 31 pages (1 page of English Translation and 30 pages of Official Copy).
Notice of Allowance received for Japanese Patent Application No. 2019-151358, mailed on Jan. 22, 2021, 4 pages (1 page of English Translation and 3 pages of Official Copy).
Notice of Allowance received for Japanese Patent Application No. 2019-162293, mailed on Apr. 9, 2021, 4 pages (1 page of English Translation and 3 pages of Official Copy).
Notice of Allowance received for Japanese Patent Application No. 2019-563407, mailed on Aug. 20, 2021, 4 pages (1 page of English Translation and 3 pages of Official Copy).
Notice of Allowance received for Japanese Patent Application No. 2020-000492, mailed on Jul. 16, 2021, 4 pages (1 page of English Translation and 3 pages of Official Copy).
Notice of Allowance received for Japanese Patent Application No. 2020-010239, mailed on Sep. 3, 2021, 4 pages (1 page of English Translation and 3 pages of Official Copy).
Notice of Allowance received for Japanese Patent Application No. 2020-104679, mailed on Jan. 4, 2021, 4 pages (1 page of English Translation and 3 pages of Official Copy).
Notice of Allowance received for Japanese Patent Application No. 2020-115940, mailed on Oct. 22, 2021, 4 pages (1 page of English Translation and 3 pages of Official Copy).
Notice of Allowance received for Japanese Patent Application No. 2020-160052, mailed on Jun. 3, 2022, 4 pages (1 page of English Translation and 3 pages of Official Copy).
Notice of Allowance received for Japanese Patent Application No. 2020-160053, mailed on Jan. 16, 2023, 4 pages (1 page of English Translation and 3 pages of Official Copy).
Notice of Allowance received for Japanese Patent Application No. 2020-160054, mailed on Apr. 4, 2022, 4 pages (1 page of English Translation and 3 pages of Official Copy).
Notice of Allowance received for Japanese Patent Application No. 2021-023661, mailed on Apr. 10, 2023, 4 pages (1 page of English Translation and 3 pages of Official Copy).
Notice of Allowance received for Japanese Patent Application No. 2021-131726, mailed on Mar. 17, 2023, 4 pages (1 page of English Translation and 3 pages of Official Copy).
Notice of Allowance received for Japanese Patent Application No. 2021-153558, mailed on Jun. 9, 2023, 4 pages (1 page of English Translation and 3 pages of Official Copy).
Notice of Allowance received for Japanese Patent Application No. 2021-163700, mailed on Mar. 3, 2023, 4 pages (1 page of English Translation and 3 pages of Official Copy).
Notice of Allowance received for Japanese Patent Application No. 2021-188824, mailed on Feb. 13, 2023, 4 pages (1 page of English Translation and 3 pages of Official Copy).
Notice of Allowance received for Japanese Patent Application No. 2021-571468, mailed on May 19, 2023, 4 pages (1 page of English Translation and 3 pages of Official Copy).
Notice of Allowance received for Japanese Patent Application No. 2022-022159, mailed on Aug. 10, 2023, 4 pages (1 page of English Translation and 3 pages of Official Copy).
Notice of Allowance received for Japanese Patent Application No. 2022-076722, mailed on Jul. 28, 2023, 4 pages (1 page of English Translation and 3 pages of Official Copy).
Notice of Allowance received for Japanese Patent Application No. 2022-107902, mailed on Aug. 26, 2022, 4 pages (1 page of English Translation and 3 pages of Official Copy).
Notice of Allowance received for Japanese Patent Application No. 2022-107903, mailed on Sep. 1, 2023, 4 pages (1 page of English Translation and 3 pages of Official Copy).
Notice of Allowance received for Japanese Patent Application No. 2022-110196, mailed on Feb. 13, 2024, 4 pages (1 page of English Translation and 3 pages of Official Copy).
Notice of Allowance received for Korean Patent Application No. 10-2016-7014577, mailed on May 30, 2019, 5 pages (2 pages of English Translation and 3 pages of Official Copy).
Notice of Allowance received for Korean Patent Application No. 10-2016-7033638, mailed on May 31, 2017, 5 pages (2 pages of English Translation and 3 pages of Official Copy).
Notice of Allowance received for Korean Patent Application No. 10-2016-7025538, mailed on Mar. 10, 2021, 5 pages (2 pages of English Translation and 3 pages of Official Copy).
Notice of Allowance received for Korean Patent Application No. 10-2016-7025781, mailed on Jun. 29, 2021, 5 pages (2 pages of English Translation and 3 pages of Official Copy).
Notice of Allowance received for Korean Patent Application No. 10-2016-7029673, mailed on Aug. 3, 2021, 3 pages (1 page of English Translation and 2 pages of Official Copy).
Notice of Allowance received for Korean Patent Application No. 10-2016-7033834, mailed on Jul. 3, 2021, 4 pages (2 page of English Translation and 2 pages of Official Copy).
Notice of Allowance received for Korean Patent Application No. 10-2020-0123815, mailed on Aug. 26, 2022, 7 pages (2 pages of English Translation and 5 pages of Official Copy).
Notice of Allowance received for Korean Patent Application No. 10-2020-0123821, mailed on Mar. 28, 2023, 8 pages (2 pages of English Translation and 6 pages of Official Copy).
Notice of Allowance received for Korean Patent Application No. 10-2020-0123840, mailed on May 26, 2023, 9 pages (2 pages of English Translation and 7 pages of Official Copy).
Notice of Allowance received for Korean Patent Application No. 10-2020-7026035, mailed on Aug. 23, 2021, 4 pages (2 pages of English Translation and 2 pages of Official Copy).
Notice of Allowance received for Korean Patent Application No. 10-2021-7026284, mailed on Jul. 28, 2022, 6 pages (2 pages of English Translation and 4 pages of Official Copy).
Notice of Allowance received for Korean Patent Application No. 10-2021-7031939, mailed on Apr. 5, 2022, 4 pages (1 page of English Translation and 3 pages of Official Copy).
Notice of Allowance received for Korean Patent Application No. 10-2021-7036016, mailed on Sep. 28, 2022, 7 pages (2 pages of English Translation and 5 pages of Official Copy).
Notice of Allowance received for Korean Patent Application No. 10-2021-7038005, mailed on Dec. 14, 2021, 4 pages (2 pages of English Translation and 2 pages of Official Copy).
Notice of Allowance received for Korean Patent Application No. 10-2022-0061486, mailed on Nov. 22, 2022, 7 pages (2 pages of English Translation and 5 pages of Official Copy).
Notice of Allowance received for Korean Patent Application No. 10-2022-7008569, mailed on May 19, 2022, 5 pages (2 pages of English Translation and 3 pages of Official Copy).
Notice of Allowance received for Korean Patent Application No. 10-2022-7017918, mailed on Jun. 13, 2022, 6 pages (2 pages of English Translation and 4 pages of Official Copy).
Notice of Allowance received for Korean Patent Application No. 10-2022-7031866, mailed on May 1, 2023, 7 pages (2 pages of English Translation and 5 pages of Official Copy).
Notice of Allowance received for Korean Patent Application No. 10-2022-7036278, mailed on Jan. 30, 2024, 8 pages (2 pages of English Translation and 6 pages of Official Copy).

(56) References Cited

OTHER PUBLICATIONS

Notice of Allowance received for Korean Patent Application No. 10-2022-7044515, mailed on Feb. 19, 2024, 7 pages (2 pages of English Translation and 5 pages of Official Copy).
Notice of Allowance received for Korean Patent Application No. 10-2023-0023706, mailed on Mar. 27, 2023, 8 pages (2 pages of English Translation and 6 pages of Official Copy).
Notice of Allowance received for Taiwanese Patent Application No. 104117509, mailed on Mar. 31, 2017, 3 pages (Official Copy Only) {See Communication Under Rule 37 CFR § 1.98(a) (3)}.
Notice of Allowance received for Taiwanese Patent Application No. 104128685, mailed on May 3, 2017, 3 pages (Official Copy Only) {See Communication Under Rule 37 CFR § 1.98(a) (3)}.
Notice of Allowance received for U.S. Appl. No. 12/205,847, mailed on Aug. 20, 2012, 13 pages.
Notice of Allowance received for U.S. Appl. No. 14/599,424, mailed on Dec. 13, 2018, 6 pages.
Notice of Allowance received for U.S. Appl. No. 14/599,425, mailed on Dec. 19, 2018, 9 pages.
Notice of Allowance received for U.S. Appl. No. 14/732,773, mailed on Dec. 18, 2019, 21 pages.
Notice of Allowance received for U.S. Appl. No. 14/839,916, mailed on Aug. 31, 2016, 11 pages.
Notice of Allowance received for U.S. Appl. No. 14/839,916, mailed on Jan. 10, 2018, 19 pages.
Notice of Allowance received for U.S. Appl. No. 14/839,922, mailed on Jan. 26, 2018, 2 pages.
Notice of Allowance received for U.S. Appl. No. 14/839,922, mailed on Jul. 6, 2017, 8 pages.
Notice of Allowance received for U.S. Appl. No. 14/839,922, mailed on Nov. 2, 2017, 8 pages.
Notice of Allowance received for U.S. Appl. No. 14/863,069, mailed on Feb. 6, 2019, 6 pages.
Notice of Allowance received for U.S. Appl. No. 14/863,069, mailed on Jun. 18, 2019, 6 pages.
Notice of Allowance received for U.S. Appl. No. 14/864,759, mailed on Dec. 14, 2018, 10 pages.
Notice of Allowance received for U.S. Appl. No. 15/183,663, mailed on Jan. 17, 2019, 6 pages.
Notice of Allowance received for U.S. Appl. No. 15/554,204, mailed on Jul. 13, 2020, 10 pages.
Notice of Allowance received for U.S. Appl. No. 15/600,243, mailed on Dec. 12, 2019, 7 pages.
Notice of Allowance received for U.S. Appl. No. 15/608,848, mailed on Aug. 25, 2021, 9 pages.
Notice of Allowance received for U.S. Appl. No. 15/608,848, mailed on Oct. 29, 2021, 7 pages.
Notice of Allowance received for U.S. Appl. No. 15/614,121, mailed on Aug. 27, 2020, 8 pages.
Notice of Allowance received for U.S. Appl. No. 15/614,121, mailed on Mar. 6, 2020, 8 pages.
Notice of Allowance received for U.S. Appl. No. 15/616,480, mailed on Jan. 3, 2019, 8 pages.
Notice of Allowance received for U.S. Appl. No. 15/627,069, mailed on Jun. 17, 2021, 14 pages.
Notice of Allowance received for U.S. Appl. No. 15/705,849, mailed on Jul. 28, 2020, 10 pages.
Notice of Allowance received for U.S. Appl. No. 15/705,849, mailed on Oct. 16, 2020, 14 pages.
Notice of Allowance received for U.S. Appl. No. 15/925,652, mailed on Mar. 9, 2021, 9 pages.
Notice of Allowance received for U.S. Appl. No. 15/925,652, mailed on Nov. 20, 2020, 9 pages.
Notice of Allowance received for U.S. Appl. No. 16/138,809, mailed on Apr. 16, 2021, 11 pages.
Notice of Allowance received for U.S. Appl. No. 16/138,809, mailed on Jul. 20, 2021, 6 pages.
Notice of Allowance received for U.S. Appl. No. 16/144,671, mailed on Feb. 10, 2020, 17 pages.
Notice of Allowance received for U.S. Appl. No. 16/144,735, mailed on Jul. 21, 2020, 13 pages.
Notice of Allowance received for U.S. Appl. No. 16/144,735, mailed on Oct. 28, 2020, 13 pages.
Notice of Allowance received for U.S. Appl. No. 16/144,753, mailed on Dec. 4, 2020, 22 pages.
Notice of Allowance received for U.S. Appl. No. 16/144,753, mailed on Feb. 10, 2021, 8 pages.
Notice of Allowance received for U.S. Appl. No. 16/144,849, mailed on Apr. 17, 2020, 2 pages.
Notice of Allowance received for U.S. Appl. No. 16/144,849, mailed on Mar. 6, 2020, 9 pages.
Notice of Allowance received for U.S. Appl. No. 16/144,864, mailed on Feb. 9, 2021, 13 pages.
Notice of Allowance received for U.S. Appl. No. 16/144,864, mailed on Jul. 28, 2020, 27 pages.
Notice of Allowance received for U.S. Appl. No. 16/144,864, mailed on Mar. 12, 2021, 2 pages.
Notice of Allowance received for U.S. Appl. No. 16/144,864, mailed on Mar. 30, 2021, 2 pages.
Notice of Allowance received for U.S. Appl. No. 16/144,864, mailed on Sep. 10, 2020, 3 pages.
Notice of Allowance received for U.S. Appl. No. 16/144,864, mailed on Sep. 16, 2020, 2 pages.
Notice of Allowance received for U.S. Appl. No. 16/144,864, mailed on Sep. 29, 2020, 2 pages.
Notice of Allowance received for U.S. Appl. No. 16/145,033, mailed on Aug. 17, 2023, 8 pages.
Notice of Allowance received for U.S. Appl. No. 16/145,033, mailed on May 3, 2023, 5 pages.
Notice of Allowance received for U.S. Appl. No. 16/363,945, mailed on Sep. 23, 2020, 10 pages.
Notice of Allowance received for U.S. Appl. No. 16/377,892, mailed on May 24, 2021, 9 pages.
Notice of Allowance received for U.S. Appl. No. 16/377,892, mailed on Sep. 9, 2021, 9 pages.
Notice of Allowance received for U.S. Appl. No. 16/378,136, mailed on Jun. 3, 2021, 7 pages.
Notice of Allowance received for U.S. Appl. No. 16/378,136, mailed on Sep. 22, 2021, 7 pages.
Notice of Allowance received for U.S. Appl. No. 16/388,493, mailed on Jun. 20, 2022, 5 pages.
Notice of Allowance received for U.S. Appl. No. 16/407,590, mailed on Apr. 9, 2021, 3 pages.
Notice of Allowance received for U.S. Appl. No. 16/407,590, mailed on Dec. 16, 2020, 6 pages.
Notice of Allowance received for U.S. Appl. No. 16/407,590, mailed on Mar. 22, 2021, 6 pages.
Notice of Allowance received for U.S. Appl. No. 16/418,786, mailed on Dec. 9, 2021, 9 pages.
Notice of Allowance received for U.S. Appl. No. 16/418,786, mailed on Jun. 14, 2022, 9 pages.
Notice of Allowance received for U.S. Appl. No. 16/418,786, mailed on Nov. 22, 2022, 6 pages.
Notice of Allowance received for U.S. Appl. No. 16/556,023, mailed on Jan. 13, 2021, 8 pages.
Notice of Allowance received for U.S. Appl. No. 16/556,023, mailed on Oct. 15, 2020, 8 pages.
Notice of Allowance received for U.S. Appl. No. 16/588,950, mailed on Feb. 10, 2020, 9 pages.
Notice of Allowance received for U.S. Appl. No. 16/588,950, mailed on May 5, 2020, 9 pages.
Notice of Allowance received for U.S. Appl. No. 16/679,967, mailed on Jun. 15, 2022, 7 pages.
Notice of Allowance received for U.S. Appl. No. 16/679,967, mailed on Nov. 2, 2022, 7 pages.
Notice of Allowance received for U.S. Appl. No. 16/820,383, mailed on Aug. 2, 2023, 14 pages.
Notice of Allowance received for U.S. Appl. No. 16/820,383, mailed on Dec. 7, 2023, 13 pages.
Notice of Allowance received for U.S. Appl. No. 16/820,383, mailed on Jul. 21, 2021, 11 pages.

(56) References Cited

OTHER PUBLICATIONS

Notice of Allowance received for U.S. Appl. No. 16/820,383, mailed on Mar. 8, 2023, 13 pages.
Notice of Allowance received for U.S. Appl. No. 16/820,383, mailed on Mar. 31, 2021, 11 pages.
Notice of Allowance received for U.S. Appl. No. 16/820,383, mailed on Nov. 22, 2022, 16 pages.
Notice of Allowance received for U.S. Appl. No. 16/888,629, mailed on Nov. 9, 2021, 11 pages.
Notice of Allowance received for U.S. Appl. No. 16/894,309, mailed on Feb. 25, 2022, 9 pages.
Notice of Allowance received for U.S. Appl. No. 16/894,309, mailed on Nov. 5, 2021, 12 pages.
Notice of Allowance received for U.S. Appl. No. 16/987,275, mailed on Jul. 27, 2022, 6 pages.
Notice of Allowance received for U.S. Appl. No. 16/987,275, mailed on May 16, 2022, 7 pages.
Notice of Allowance received for U.S. Appl. No. 16/994,352, mailed on Jun. 3, 2022, 9 pages.
Notice of Allowance received for U.S. Appl. No. 16/994,352, mailed on Mar. 2, 2022, 14 pages.
Notice of Allowance received for U.S. Appl. No. 17/030,318, mailed on Jan. 5, 2022, 8 pages.
Notice of Allowance received for U.S. Appl. No. 17/030,318, mailed on Jan. 25, 2023, 10 pages.
Notice of Allowance received for U.S. Appl. No. 17/030,318, mailed on May 16, 2023, 5 pages.
Notice of Allowance received for U.S. Appl. No. 17/030,321, mailed on Apr. 1, 2022, 8 pages.
Notice of Allowance received for U.S. Appl. No. 17/030,337, mailed on Aug. 22, 2022, 10 pages.
Notice of Allowance received for U.S. Appl. No. 17/030,337, mailed on Dec. 23, 2022, 9 pages.
Notice of Allowance received for U.S. Appl. No. 17/030,340, mailed on Sep. 28, 2022, 7 pages.
Notice of Allowance received for U.S. Appl. No. 17/030,343, mailed on Dec. 15, 2022, 9 pages.
Notice of Allowance received for U.S. Appl. No. 17/030,343, mailed on Sep. 16, 2022, 11 pages.
Notice of Allowance received for U.S. Appl. No. 17/031,543, mailed on May 11, 2022, 6 pages.
Notice of Allowance received for U.S. Appl. No. 17/041,438, mailed on Jan. 22, 2024, 10 pages.
Notice of Allowance received for U.S. Appl. No. 17/041,438, mailed on Oct. 19, 2023, 2 pages.
Notice of Allowance received for U.S. Appl. No. 17/041,438, mailed on Sep. 20, 2023, 11 pages.
Notice of Allowance received for U.S. Appl. No. 17/068,386, mailed on Dec. 13, 2023, 12 pages.
Notice of Allowance received for U.S. Appl. No. 17/116,775, mailed on Jan. 18, 2022, 10 pages.
Notice of Allowance received for U.S. Appl. No. 17/126,571, mailed on Mar. 11, 2022, 9 pages.
Notice of Allowance received for U.S. Appl. No. 17/157,728, mailed on Feb. 24, 2022, 7 pages.
Notice of Allowance received for U.S. Appl. No. 17/192,161, mailed on Feb. 16, 2022, 8 pages.
Notice of Allowance received for U.S. Appl. No. 17/192,161, mailed on May 27, 2022, 8 pages.
Notice of Allowance received for U.S. Appl. No. 17/197,628, mailed on Jun. 24, 2022, 8 pages.
Notice of Allowance received for U.S. Appl. No. 17/197,628, mailed on Mar. 23, 2022, 35 pages.
Notice of Allowance received for U.S. Appl. No. 17/327,204, mailed on May 18, 2022, 18 pages.
Notice of Allowance received for U.S. Appl. No. 17/381,570, mailed on Jul. 26, 2023, 14 pages.
Notice of Allowance received for U.S. Appl. No. 17/516,537, mailed on Apr. 17, 2023, 8 pages.
Notice of Allowance received for U.S. Appl. No. 17/516,537, mailed on Dec. 27, 2022, 7 pages.
Notice of Allowance received for U.S. Appl. No. 17/591,184, mailed on Dec. 11, 2023, 9 pages.
Notice of Allowance received for U.S. Appl. No. 17/591,184, mailed on Feb. 22, 2023, 5 pages.
Notice of Allowance received for U.S. Appl. No. 17/666,301, mailed on May 4, 2023, 10 pages.
Notice of Allowance received for U.S. Appl. No. 17/739,664, mailed on Dec. 7, 2022, 8 pages.
Notice of Allowance received for U.S. Appl. No. 17/744,500, mailed on Dec. 22, 2023, 38 pages.
Notice of Allowance received for U.S. Appl. No. 17/852,020, mailed on Jul. 12, 2023, 9 pages.
Notice of Allowance received for U.S. Appl. No. 17/892,534, mailed on Feb. 21, 2024, 7 pages.
Notice of Allowance received for U.S. Appl. No. 17/896,791, mailed on Dec. 15, 2023, 9 pages.
Notice of Allowance received for U.S. Appl. No. 17/896,791, mailed on Mar. 13, 2024, 8 pages.
Notice of Allowance received for U.S. Appl. No. 17/951,613, mailed on Dec. 8, 2023, 13 pages.
Notice of Allowance received for U.S. Appl. No. 17/951,613, mailed on Feb. 2, 2024, 5 pages.
Notice of Allowance received for U.S. Appl. No. 17/951,875, mailed on Dec. 26, 2023, 7 pages.
Notice of Allowance received for U.S. Appl. No. 17/951,875, mailed on Jul. 26, 2023, 7 pages.
Notice of Allowance received for U.S. Appl. No. 17/951,875, mailed on Oct. 20, 2023, 8 pages.
Notice of Allowance received for U.S. Appl. No. 17/951,976, mailed on Mar. 12, 2024, 5 pages.
Notice of Allowance received for U.S. Appl. No. 17/951,976, mailed on Nov. 17, 2023, 9 pages.
Notice of Allowance received for U.S. Appl. No. 17/952,027, mailed on Dec. 29, 2023, 6 pages.
Notice of Allowance received for U.S. Appl. No. 17/952,027, mailed on Oct. 4, 2023, 13 pages.
Notice of Allowance received for U.S. Appl. No. 17/952,181, mailed on Sep. 27, 2023, 9 pages.
Notice of Allowance received for U.S. Appl. No. 17/952,185, mailed on Aug. 30, 2023, 12 pages.
Notice of Allowance received for U.S. Appl. No. 17/952,185, mailed on Dec. 13, 2023, 9 pages.
Notice of Allowance received for U.S. Appl. No. 17/952,239, mailed on Jun. 23, 2023, 5 pages.
Notice of Allowance received for U.S. Appl. No. 17/952,239, mailed on Oct. 20, 2023, 5 pages.
Notice of Allowance received for U.S. Appl. No. 18/204,217, mailed on Mar. 26, 2024, 7 pages.
Office Action received for Australian Patent Application No. 2015100734, issued on Jul. 29, 2015, 5 pages.
Office Action received for Australian Patent Application No. 2015267240, mailed on Apr. 10, 2017, 5 pages.
Office Action received for Australian Patent Application No. 2015267240, mailed on Mar. 21, 2018, 5 pages.
Office Action received for Australian Patent Application No. 2015312215, mailed on Oct. 13, 2016, 3 pages.
Office Action received for Australian Patent Application No. 2016215440, mailed on Jan. 22, 2019, 2 pages.
Office Action received for Australian Patent Application No. 2016215440, mailed on Mar. 13, 2018, 3 pages.
Office Action received for Australian Patent Application No. 2016229847, mailed on Jul. 3, 2018, 4 pages.
Office Action received for Australian Patent Application No. 2017100667, mailed on Aug. 3, 2017, 9 pages.
Office Action received for Australian Patent Application No. 2017277971, mailed on Aug. 12, 2020, 3 pages.
Office Action received for Australian Patent Application No. 2017277971, mailed on Jun. 3, 2020, 3 pages.
Office Action received for Australian Patent Application No. 2017286296, mailed on May 8, 2019, 4 pages.

(56) References Cited

OTHER PUBLICATIONS

Office Action received for Australian Patent Application No. 2018100158, mailed on Apr. 23, 2018, 5 pages.
Office Action received for Australian Patent Application No. 2018101855, mailed on Feb. 22, 2019, 4 pages.
Office Action received for Australian Patent Application No. 2018200428, mailed on Mar. 7, 2018, 4 pages.
Office Action received for Australian Patent Application No. 2018200428, mailed on Nov. 15, 2018, 4 pages.
Office Action received for Australian Patent Application No. 2018206772, mailed on Apr. 1, 2019, 4 pages.
Office Action received for Australian Patent Application No. 2018206772, mailed on Feb. 6, 2020, 4 pages.
Office Action received for Australian Patent Application No. 2018206772, mailed on Nov. 6, 2019, 4 pages.
Office Action received for Australian Patent Application No. 2018268972, mailed on Jul. 9, 2020, 4 pages.
Office Action received for Australian Patent Application No. 2018279037, mailed on Jan. 17, 2020, 4 pages.
Office Action received for Australian Patent Application No. 2018279037, mailed on Jun. 18, 2019, 5 pages.
Office Action received for Australian Patent Application No. 2019100490, mailed on Jul. 26, 2019, 4 pages.
Office Action received for Australian Patent Application No. 2019100495, mailed on Mar. 6, 2020, 3 pages.
Office Action received for Australian Patent Application No. 2019100495, mailed on Mar. 16, 2020, 3 pages.
Office Action received for Australian Patent Application No. 2019100495, mailed on Sep. 17, 2019, 7 pages.
Office Action received for Australian Patent Application No. 2019222943, mailed on Oct. 3, 2019, 3 pages.
Office Action received for Australian Patent Application No. 2019250251, mailed on Aug. 6, 2020, 3 pages.
Office Action received for Australian Patent Application No. 2019266054, mailed on Aug. 23, 2021, 4 pages.
Office Action received for Australian Patent Application No. 2019266054, mailed on Jun. 29, 2021, 3 pages.
Office Action received for Australian Patent Application No. 2020204259, mailed on Nov. 30, 2020, 8 pages.
Office Action received for Australian Patent Application No. 2020204506, mailed on Dec. 7, 2020, 6 pages.
Office Action received for Australian Patent Application No. 2020210234, mailed on Jul. 30, 2021, 7 pages.
Office Action received for Australian Patent Application No. 2020239743, mailed on Mar. 25, 2021, 8 pages.
Office Action received for Australian Patent Application No. 2020239743, mailed on Sep. 3, 2021, 4 pages.
Office Action received for Australian Patent Application No. 2020239748, mailed on Apr. 21, 2021, 6 pages.
Office Action received for Australian Patent Application No. 2020239748, mailed on Feb. 11, 2022, 2 pages.
Office Action received for Australian Patent Application No. 2020239748, mailed on Sep. 1, 2021, 4 pages.
Office Action received for Australian Patent Application No. 2020239752, mailed on Jun. 4, 2021, 8 pages.
Office Action received for Australian Patent Application No. 2020239752, mailed on Oct. 25, 2021, 5 pages.
Office Action received for Australian Patent Application No. 2020256383, mailed on Jun. 4, 2021, 3 pages.
Office Action received for Australian Patent Application No. 2020268150, mailed on Aug. 24, 2023, 5 pages.
Office Action received for Australian Patent Application No. 2020268150, mailed on Feb. 6, 2023, 5 pages.
Office Action received for Australian Patent Application No. 2020268150, mailed on May 8, 2023, 4 pages.
Office Action received for Australian Patent Application No. 2020268150, mailed on Nov. 3, 2022, 4 pages.
Office Action received for Australian Patent Application No. 2020288139, mailed on Oct. 31, 2022, 3 pages.
Office Action received for Australian Patent Application No. 2021201130, mailed on Jan. 27, 2022, 2 pages.
Office Action received for Australian Patent Application No. 2021203216, mailed on Mar. 7, 2022, 8 pages.
Office Action received for Australian Patent Application No. 2021203636, mailed on Mar. 23, 2022, 3 pages.
Office Action received for Australian Patent Application No. 2021204422, mailed on May 31, 2022, 2 pages.
Office Action received for Australian Patent Application No. 2021218036, mailed on Apr. 13, 2023, 3 pages.
Office Action received for Australian Patent Application No. 2021218036, mailed on Jun. 21, 2022, 5 pages.
Office Action received for Australian Patent Application No. 2021218036, mailed on Nov. 16, 2022, 4 pages.
Office Action received for Australian Patent Application No. 2021266294, mailed on Nov. 11, 2022, 3 pages.
Office Action received for Australian Patent Application No. 2022200514, mailed on Feb. 15, 2023, 2 pages.
Office Action received for Australian Patent Application No. 2022200514, mailed on Jan. 17, 2023, 3 pages.
Office Action received for Australian Patent Application No. 2022201761, mailed on Feb. 28, 2023, 5 pages.
Office Action received for Australian Patent Application No. 2022202977, mailed on Jul. 21, 2023, 3 pages.
Office Action received for Australian Patent Application No. 2022202977, mailed on May 2, 2023, 5 pages.
Office Action received for Australian Patent Application No. 2022203278, mailed on Aug. 12, 2023, 5 pages.
Office Action received for Australian Patent Application No. 2022203278, mailed on May 10, 2023, 4 pages.
Office Action received for Australian Patent Application No. 2022209277, mailed on Mar. 10, 2023, 6 pages.
Office Action received for Australian Patent Application No. 2022235614, mailed on May 9, 2023, 2 pages.
Office Action received for Australian Patent Application No. 2022235634, mailed on May 25, 2023, 4 pages.
Office Action received for Australian Patent Application No. 2023203050, mailed on Sep. 1, 2023, 3 pages.
Office Action received for Australian Patent Application No. 2023203776, mailed on Nov. 7, 2023, 2 pages.
Office Action received for Australian Patent Application No. 2023237090, mailed on Oct. 18, 2023, 3 pages.
Office Action received for Chinese Patent Application No. 201380081349.6, mailed on Feb. 26, 2019, 12 pages (6 pages of English Translation and 6 pages of Official Copy).
Office Action received for Chinese Patent Application No. 201380081349.6, mailed on Jan. 5, 2021, 16 pages (7 pages of English Translation and 9 pages of Official Copy).
Office Action received for Chinese Patent Application No. 201380081349.6, mailed on Jan. 16, 2020, 11 pages (6 pages of English Translation and 5 pages of Official Copy).
Office Action received for Chinese Patent Application No. 201380081349.6, mailed on Jul. 15, 2019, 10 pages (5 pages of English Translation and 5 pages of Official Copy).
Office Action received for Chinese Patent Application No. 201380081349.6, mailed on Jul. 15, 2020, 9 pages (4 pages of English Translation and 5 pages of Official Copy).
Office Action received for Chinese Patent Application No. 201380081349.6, mailed on Jun. 2, 2021, 17 pages (8 pages of English Translation and 9 pages of Official Copy).
Office Action received for Chinese Patent Application No. 201510284850.3, mailed on Jul. 9, 2018, 11 pages (2 pages of English Translation and 9 pages of Official Copy).
Office Action received for Chinese Patent Application No. 201510284850.3, mailed on Jun. 21, 2019, 10 pages (4 pages of English Translation and 6 pages of Official Copy).
Office Action received for Chinese Patent Application No. 201510284850.3, mailed on Nov. 28, 2017, 15 pages (5 pages of English Translation and 10 pages of Official Copy).
Office Action received for Chinese Patent Application No. 201580028677.9, mailed on May 25, 2018, 14 pages (4 pages of English Translation and 10 pages of Official Copy).

(56) References Cited

OTHER PUBLICATIONS

Office Action received for Chinese Patent Application No. 201580037927.5, mailed on Apr. 22, 2019, 9 pages (4 pages of English Translation and 5 pages of Official Copy).
Office Action received for Chinese Patent Application No. 201580037927.5, mailed on Jul. 20, 2018, 21 pages (6 pages of English Translation and 15 pages of Official Copy).
Office Action received for Chinese Patent Application No. 201680008151.9, mailed on Apr. 20, 2020, 6 pages (3 pages of English Translation and 3 pages of Official Copy).
Office Action received for Chinese Patent Application No. 201680008151.9, mailed on Aug. 27, 2019, 24 pages (11 pages of English Translation and 13 pages of Official Copy).
Office Action received for Chinese Patent Application No. 201680013193.1, mailed on Feb. 1, 2021, 8 pages (3 pages of English Translation and 5 pages of Official Copy).
Office Action received for Chinese Patent Application No. 201680013193.1, mailed on Mar. 25, 2020, 21 pages (8 pages of English Translation and 13 pages of Official Copy).
Office Action received for Chinese Patent Application No. 201680013193.1, mailed on Sep. 7, 2020, 6 pages (3 pages of English Translation and 3 pages of Official Copy).
Office Action received for Chinese Patent Application No. 201680047983.1, mailed on Feb. 1, 2021, 6 pages (3 pages of English Translation and 3 pages of Official Copy).
Office Action received for Chinese Patent Application No. 201680047983.1, mailed on Jul. 1, 2020, 6 pages (3 pages of English Translation and 3 pages of Official Copy).
Office Action received for Chinese Patent Application No. 201680047983.1, mailed on Mar. 18, 2019, 18 pages (6 pages of English Translation and 12 pages of Official Copy).
Office Action received for Chinese Patent Application No. 201680047983.1, mailed on Nov. 28, 2019, 9 pages (4 pages of English Translation and 5 pages of Official Copy).
Office Action received for Chinese Patent Application No. 201710439448.7, mailed on Mar. 27, 2020, 13 pages (7 pages of English Translation and 6 pages of Official Copy).
Office Action received for Chinese Patent Application No. 201710439448.7, mailed on Oct. 10, 2020, 19 pages (8 pages of English Translation and 11 pages of Official Copy).
Office Action received for Chinese Patent Application No. 201780034193.4, mailed on Jun. 8, 2021, 16 pages (7 pages of English Translation and 9 pages of Official Copy).
Office Action received for Chinese Patent Application No. 201780034203.4, mailed on Jul. 14, 2021, 12 pages (5 pages of English Translation and 7 pages of Official Copy).
Office Action received for Chinese Patent Application No. 201780034203.4, mailed on Sep. 24, 2021, 7 pages (3 pages of English Translation and 4 pages of Official Copy).
Office Action received for Chinese Patent Application No. 201810105846.X, mailed on Aug. 27, 2019, 12 pages (5 pages of English Translation and 7 pages of Official Copy).
Office Action received for Chinese Patent Application No. 201810105846.X, mailed on Feb. 25, 2019, 10 pages (5 pages of English Translation and 5 pages of Official Copy).
Office Action received for Chinese Patent Application No. 201810105846.X, mailed on Nov. 28, 2019, 9 pages (5 pages of English Translation and 4 pages of Official Copy).
Office Action received for Chinese Patent Application No. 201811136445.7, mailed on Apr. 14, 2021, 7 pages (4 pages of English Translation and 3 pages of Official Copy).
Office Action received for Chinese Patent Application No. 201811136445.7, mailed on Oct. 28, 2020, 17 pages (10 pages of English Translation and 7 pages of Official Copy).
Office Action received for Chinese Patent Application No. 201811303556.2, mailed on May 19, 2023, 6 pages (3 pages of English Translation and 3 pages of Official Copy).
Office Action received for Chinese Patent Application No. 201811303556.2, mailed on Nov. 28, 2022, 18 pages (7 pages of English Translation and 11 pages of Official Copy).
Office Action received for Chinese Patent Application No. 201880032190.1, mailed on May 31, 2023, 20 pages (12 pages of English Translation and 8 pages of Official Copy).
Office Action received for Chinese Patent Application No. 201880032190.1, mailed on Nov. 14, 2022, 23 pages (12 pages of English Translation and 11 pages of Official Copy).
Office Action received for Chinese Patent Application No. 201910858933.7, mailed on Aug. 18, 2020, 14 pages (7 pages of English Translation and 7 pages of Official Copy).
Office Action received for Chinese Patent Application No. 201910858933.7, mailed on Dec. 30, 2021, 9 pages (4 pages of English Translation and 5 pages of Official Copy).
Office Action received for Chinese Patent Application No. 201910858933.7, mailed on Jun. 29, 2021, 8 pages (3 pages of English Translation and 5 pages of Official Copy).
Office Action received for Chinese Patent Application No. 201911396643.1, mailed on Apr. 6, 2023, 26 pages (15 pages of English Translation and 11 pages of Official Copy).
Office Action received for Chinese Patent Application No. 201911396744.9, mailed on Apr. 6, 2023, 19 pages (7 pages of English Translation and 12 pages of Official Copy).
Office Action received for Chinese Patent Application No. 201911396819.3, mailed on Apr. 6, 2023, 21 pages (10 pages of English Translation and 11 pages of Official Copy).
Office Action received for Chinese Patent Application No. 201911396876.1, mailed on Apr. 7, 2023, 16 pages (9 pages of English Translation and 7 pages of Official Copy).
Office Action received for Chinese Patent Application No. 201911401161.0, mailed on Aug. 9, 2022, 17 pages (9 pages of English Translation and 8 pages of Official Copy).
Office Action received for Chinese Patent Application No. 201911401161.0, mailed on Dec. 15, 2022, 14 pages (7 pages of English Translation and 7 pages of Official Copy).
Office Action received for Chinese Patent Application No. 201911401161.0, mailed on Jan. 24, 2022, 6 pages (3 pages of English Translation and 3 pages of Official Copy).
Office Action received for Chinese Patent Application No. 201911401375.8, mailed on Apr. 7, 2023, 10 pages (5 pages of English Translation and 5 pages of Official Copy).
Office Action received for Chinese Patent Application No. 201911401375.8, mailed on Sep. 26, 2023, 13 pages (6 pages of English Translation and 7 pages of Official Copy).
Office Action received for Chinese Patent Application No. 202010606407.4, mailed on Jan. 27, 2021, 16 pages (7 pages of English Translation and 9 pages of Official Copy).
Office Action received for Chinese Patent Application No. 202010606407.4, mailed on Jun. 2, 2021, 12 pages (5 pages of English Translation and 7 pages of Official Copy).
Office Action received for Chinese Patent Application No. 202010606407.4, mailed on Nov. 18, 2021, 6 pages (3 pages of English Translation and 3 pages of Official Copy).
Office Action received for Chinese Patent Application No. 202110363565.6, mailed on May 7, 2022, 12 pages (7 pages of English Translation and 5 pages of Official Copy).
Office Action received for Chinese Patent Application No. 202110363565.6, mailed on Nov. 16, 2021, 16 pages (9 pages of English Translation and 7 pages of Official Copy).
Office Action received for Chinese Patent Application No. 202110783860.7, mailed on Mar. 10, 2022, 15 pages (5 pages of English Translation and 10 pages of Official Copy).
Office Action received for Chinese Patent Application No. 202110783860.7, mailed on Nov. 15, 2022, 8 pages (2 pages of English Translation and 6 pages of Official Copy).
Office Action received for Chinese Patent Application No. 202111576661.5, mailed on Dec. 1, 2023, 13 pages (6 pages of English Translation and 7 pages of Official Copy).
Office Action received for Chinese Patent Application No. 202211193170.7, mailed on Jan. 6, 2024, 13 pages (6 pages of English Translation and 7 pages of Official Copy).
Office Action received for Chinese Patent Application No. 202211193170.7, mailed on Jun. 30, 2023, 19 pages (9 pages of English Translation and 10 pages of Official Copy).

(56) References Cited

OTHER PUBLICATIONS

Office Action received for Chinese Patent Application No. 202310775734.6, mailed on Mar. 2, 2024, 11 pages (5 pages of English Translation and 6 pages of Official Copy).
Office Action received for Chinese Patent Application No. 202310828052.7, mailed on Mar. 6, 2024, 16 pages (7 pages of English Translation and 9 pages of Official Copy).
Office Action received for Danish Patent Application No. PA201570666, mailed on Feb. 2, 2016, 9 pages.
Office Action received for Danish Patent Application No. PA201570666, mailed on Jun. 27, 2016, 4 pages.
Office Action received for Danish Patent Application No. PA201570668, mailed on Apr. 8, 2016, 8 pages.
Office Action received for Danish Patent Application No. PA201570668, mailed on Sep. 9, 2016, 3 pages.
Office Action received for Danish Patent Application No. PA201670656, mailed on Jul. 1, 2020, 4 pages.
Office Action received for Danish Patent Application No. PA201670656, mailed on Jun. 14, 2017, 3 pages.
Office Action received for Danish Patent Application No. PA201670656, mailed on May 2, 2019, 4 pages.
Office Action received for Danish Patent Application No. PA201670656, mailed on May 30, 2018, 5 pages.
Office Action received for Danish Patent Application No. PA201670656, mailed on Nov. 3, 2016, 8 pages.
Office Action received for Danish Patent Application No. PA201770191, mailed on Jan. 25, 2018, 3 pages.
Office Action received for Danish Patent Application No. PA201770191, mailed on Nov. 21, 2018, 4 pages.
Office Action received for Danish Patent Application No. PA201770191, mailed on Oct. 25, 2019, 4 pages.
Office Action received for Danish Patent Application No. PA201770423, mailed on Jun. 12, 2018, 7 pages.
Office Action received for Danish Patent Application No. PA201770423, mailed on Mar. 29, 2019, 6 pages.
Office Action received for Danish Patent Application No. PA201870378, mailed on Feb. 25, 2019, 3 pages.
Office Action received for Danish Patent Application No. PA201870378, mailed on Jan. 6, 2020, 3 pages.
Office Action received for Danish Patent Application No. PA201870379, mailed on Feb. 28, 2019, 3 pages.
Office Action received for Danish Patent Application No. PA201870380, mailed on Mar. 5, 2020, 2 pages.
Office Action received for Danish Patent Application No. PA201870380, mailed on Mar. 27, 2019, 4 pages.
Office Action received for Danish Patent Application No. PA201870380, mailed on Sep. 11, 2018, 9 pages.
Office Action received for Danish Patent Application No. PA201870385, mailed on Aug. 23, 2019, 3 pages.
Office Action received for Danish Patent Application No. PA201970532, mailed on May 29, 2020, 3 pages.
Office Action received for Danish Patent Application No. PA202070612, mailed on Mar. 1, 2022, 2 pages.
Office Action received for Danish Patent Application No. PA202070612, mailed on May 10, 2022, 2 pages.
Office Action received for Danish Patent Application No. PA202070612, mailed on Sep. 12, 2022, 3 pages.
Office Action received for Danish Patent Application No. PA202070613, mailed on May 10, 2022, 2 pages.
Office Action received for Danish Patent Application No. PA202070613, mailed on Oct. 13, 2022, 7 pages.
Office Action received for Danish Patent Application No. PA202070613, mailed on Sep. 30, 2021, 4 pages.
Office Action received for Danish Patent Application No. PA202070614, mailed on Apr. 28, 2022, 4 pages.
Office Action received for Danish Patent Application No. PA202070614, mailed on Sep. 28, 2021, 4 pages.
Office Action received for Danish Patent Application No. PA202070615, mailed on Nov. 16, 2021, 4 pages.
Office Action received for Danish Patent Application No. PA202070616, mailed on Jan. 27, 2022, 2 pages.
Office Action received for Danish Patent Application No. PA202070616, mailed on May 5, 2022, 3 pages.
Office Action received for Danish Patent Application No. PA202070815, mailed on Jun. 14, 2022, 3 pages.
Office Action received for Danish Patent Application No. PA202070815, mailed on Oct. 18, 2021, 2 pages.
Office Action received for Danish Patent Application No. PA202170113, mailed on Apr. 15, 2021, 2 pages.
Office Action received for Danish Patent Application No. PA202170113, mailed on Aug. 18, 2022, 2 pages.
Office Action received for Danish Patent Application No. PA202170113, mailed on May 3, 2022, 2 pages.
Office Action received for European Patent Application No. 13811085.3, mailed on Apr. 20, 2018, 15 pages.
Office Action received for European Patent Application No. 15730890.9, mailed on Aug. 3, 2017, 4 pages.
Office Action received for European Patent Application No. 16762356.0, mailed on Dec. 11, 2020, 7 pages.
Office Action received for European Patent Application No. 16837432.0, mailed on Jan. 10, 2020, 7 pages.
Office Action received for European Patent Application No. 16837432.0, mailed on Jan. 27, 2021, 7 pages.
Office Action received for European Patent Application No. 17810749.6, mailed on Aug. 20, 2019, 9 pages.
Office Action received for European Patent Application No. 17813824.4, mailed on Nov. 30, 2021, 8 pages.
Office Action received for European Patent Application No. 18154145.9, mailed on Apr. 3, 2018, 6 pages.
Office Action received for European Patent Application No. 18213157.3, mailed on May 15, 2020, 7 pages.
Office Action received for European Patent Application No. 18727543.3, mailed on Mar. 26, 2021, 7 pages.
Office Action received for European Patent Application No. 19163212.4, mailed on Oct. 12, 2020, 4 pages.
Office Action received for European Patent Application No. 19721883.7, mailed on Jan. 10, 2020, 4 pages.
Office Action received for European Patent Application No. 19721883.7, mailed on Jun. 15, 2021, 9 pages.
Office Action received for European Patent Application No. 19721883.7, mailed on May 28, 2020, 11 pages.
Office Action received for European Patent Application No. 19724963.4, mailed on Jul. 28, 2020, 6 pages.
Office Action received for European Patent Application No. 20182116.2, mailed on May 25, 2021, 9 pages.
Office Action received for European Patent Application No. 20182116.2, mailed on Nov. 6, 2020, 9 pages.
Office Action received for European Patent Application No. 20203526.7, mailed on Nov. 23, 2021, 9 pages.
Office Action received for European Patent Application No. 20721342.2, mailed on Nov. 4, 2021, 9 pages.
Office Action received for European Patent Application No. 20733174.5, mailed on Dec. 18, 2023, 9 pages.
Office Action received for European Patent Application No. 21165295.3, mailed on Jul. 1, 2021, 10 pages.
Office Action received for European Patent Application No. 21168916.1, mailed on Aug. 23, 2021, 8 pages.
Office Action received for European Patent Application No. 21714460.9, mailed on Oct. 24, 2023, 13 pages.
Office Action received for European Patent Application No. 22152524.9, mailed on Dec. 5, 2023, 8 pages.
Office Action received for European Patent Application No. 15771747.1, mailed on Oct. 31, 2017, 7 pages.
Office Action received for German Patent Application No. 112015002326.7, mailed on Feb. 20, 2019, 7 pages (2 pages of English Translation and 5 pages of Offical Copy).
Office Action received for German Patent Application No. 112015007285.3, mailed on Mar. 7, 2023, 15 pages (5 pages of English Translation and 10 pages of Offical Copy).
Office Action received for Indian Patent Application No. 202014041563, mailed on Dec. 30, 2021, 6 pages.

(56) References Cited

OTHER PUBLICATIONS

Office Action received for Indian Patent Application No. 202014041571, mailed on Dec. 17, 2021, 5 pages.
Office Action received for Japanese Patent Application No. 2016-535045, mailed on May 12, 2017, 10 pages (5 pages of English Translation and 5 pages of Official Copy).
Office Action received for Japanese Patent Application No. 2016-557650, mailed on Apr. 13, 2018, 9 pages (5 pages of English Translation and 4 pages of Official Copy).
Office Action received for Japanese Patent Application No. 2016-557650, mailed on Aug. 10, 2017, 10 pages (5 pages of English Translation and 5 pages of Official Copy).
Office Action received for Japanese Patent Application No. 2016-557650, mailed on Nov. 9, 2018, 6 pages (3 pages of English Translation and 3 pages of Official Copy).
Office Action received for Japanese Patent Application No. 2016-569945, mailed on Jul. 29, 2019, 6 pages (3 pages of English Translation and 3 pages of Official Copy).
Office Action received for Japanese Patent Application No. 2016-569945, mailed on Nov. 10, 2017, 8 pages (4 pages of English Translation and 4 pages of Official Copy).
Office Action received for Japanese Patent Application No. 2016-569945, mailed on Sep. 10, 2018, 11 pages (6 pages of English Translation and 5 pages of Official Copy).
Office Action received for Japanese Patent Application No. 2017-545918, mailed on Sep. 14, 2018, 12 pages (7 pages of English Translation and 5 pages of Official Copy).
Office Action received for Japanese Patent Application No. 2018-014096, mailed on Aug. 28, 2020, 4 pages (2 pages of English Translation and 2 pages of Official Copy).
Office Action received for Japanese Patent Application No. 2018-014096, mailed on Jan. 6, 2020, 17 pages (8 pages of English Translation and 9 pages of Official Copy).
Office Action received for Japanese Patent Application No. 2018-014096, mailed on Jun. 29, 2018, 20 pages (11 pages of English Translation and 9 pages of Official Copy).
Office Action received for Japanese Patent Application No. 2018-014096, mailed on May 8, 2019, 14 pages (7 pages of English Translation and 7 pages of Official Copy).
Office Action received for Japanese Patent Application No. 2018-014096, mailed on Nov. 6, 2018, 15 pages (7 pages of English Translation and 8 pages of Official Copy).
Office Action received for Japanese Patent Application No. 2018-068846, mailed on Jan. 8, 2019, 6 pages (3 pages of English Translation and 3 pages of Official Copy),.
Office Action received for Japanese Patent Application No. 2018-184532, mailed on Mar. 1, 2021, 11 pages (6 pages of English Translation and 5 pages of Official Copy).
Office Action received for Japanese Patent Application No. 2019-044107, mailed on Jul. 30, 2021, 9 pages (5 pages of English Translation and 4 pages of Official Copy).
Office Action received for Japanese Patent Application No. 2019-044107, mailed on May 29, 2020, 6 pages (3 pages of English Translation and 3 pages of Official Copy).
Office Action received for Japanese Patent Application No. 2019-151358, mailed on Oct. 2, 2020, 5 pages (2 pages of English Translation and 3 pages of Official Copy).
Office Action received for Japanese Patent Application No. 2019-162293, mailed on Jan. 31, 2020, 8 pages (4 pages of English Translation and 4 pages of Official Copy).
Office Action received for Japanese Patent Application No. 2019-162293, mailed on Jul. 27, 2020, 9 pages (5 pages of English Translation and 4 pages of Official Copy).
Office Action received for Japanese Patent Application No. 2019-563407, mailed on Feb. 5, 2021, 5 pages (2 pages of English Translation and 3 pages of Official Copy).
Office Action received for Japanese Patent Application No. 2020-000492, mailed on Dec. 11, 2020, 6 pages (3 pages of English Translation and 3 pages of Official Copy).
Office Action received for Japanese Patent Application No. 2020-010239, mailed on Jan. 4, 2021, 6 pages (3 pages of English Translation and 3 pages of Official Copy).
Office Action received for Japanese Patent Application No. 2020-104679, mailed on Sep. 18, 2020, 13 pages (7 pages of English Translation and 6 pages of Official Copy).
Office Action received for Japanese Patent Application No. 2020-115940, mailed on May 7, 2021, 3 pages (1 page of English Translation and 2 pages of Official Copy).
Office Action received for Japanese Patent Application No. 2020-160052, mailed on Dec. 17, 2021, 10 pages (5 pages of English Translation and 5 pages of Official Copy).
Office Action received for Japanese Patent Application No. 2020-160053, mailed on Aug. 1, 2022, 8 pages (4 pages of English Translation and 4 pages of Official Copy).
Office Action received for Japanese Patent Application No. 2020-160053, mailed on Jan. 31, 2022, 8 pages (4 pages of English Translation and 4 pages of Official Copy).
Office Action received for Japanese Patent Application No. 2020-160054, mailed on Jan. 21, 2022, 8 pages (4 pages of English Translation and 4 pages of Official Copy).
Office Action received for Japanese Patent Application No. 2021-023661, mailed on Feb. 25, 2022, 6 pages (3 pages of English Translation and 3 pages of Official Copy).
Office Action received for Japanese Patent Application No. 2021-023661, mailed on Oct. 3, 2022, 8 pages (4 pages of English Translation and 4 pages of Official Copy).
Office Action received for Japanese Patent Application No. 2021-131726, mailed on Aug. 22, 2022, 8 pages (4 pages of English Translation and 4 pages of Official Copy).
Office Action received for Japanese Patent Application No. 2021-131726, mailed on Dec. 2, 2022, 4 pages (2 pages of English Translation and 2 pages of Official Copy).
Office Action received for Japanese Patent Application No. 2021-153558, mailed on Nov. 21, 2022, 8 pages (4 pages of English Translation and 4 pages of Official Copy).
Office Action received for Japanese Patent Application No. 2021-163700, mailed on Oct. 7, 2022, 4 pages (2 pages of English Translation and 2 pages of Official Copy).
Office Action received for Japanese Patent Application No. 2021-565912, mailed on Jan. 12, 2023, 9 pages (5 pages of English Translation and 4 pages of Official Copy).
Office Action received for Japanese Patent Application No. 2021-565912, mailed on Jun. 26, 2023, 3 pages (1 page of English Translation and 2 pages of Official Copy).
Office Action received for Japanese Patent Application No. 2021-571468, mailed on Jan. 5, 2023, 14 pages (7 pages of English Translation & 7 pages of Official Copy).
Office Action received for Japanese Patent Application No. 2022-022159, mailed on Feb. 20, 2023, 10 pages (5 pages of English Translation and 5 pages of Official Copy).
Office Action received for Japanese Patent Application No. 2022-076722, mailed on Mar. 13, 2023, 6 pages (3 pages of English Translation and 3 pages of Official Copy).
Office Action received for Japanese Patent Application No. 2022-130087, mailed on Oct. 2, 2023, 12 pages (6 pages of English Translation and 6 pages of Official Copy).
Office Action received for Japanese Patent Application No. 2023-041035, mailed on Feb. 9, 2024, 13 pages (6 pages of English Translation and 7 pages of Official Copy).
Office Action received for Japanese Patent Application No. 2023-065859, mailed on Mar. 11, 2024, 8 pages (4 pages of English Translation and 4 pages of Official Copy).
Office Action received for Japanese Patent Application No. 2023-110196, mailed on Nov. 6, 2023, 4 pages (2 pages of English Translation and 2 pages of Official Copy).
Office Action received for Korean Patent Application No. 10-2016-7014577, mailed on Dec. 26, 2017, 14 pages (6 pages of English Translation and 8 pages of Official Copy).
Office Action received for Korean Patent Application No. 10-2016-7014577, mailed on Oct. 31, 2018, 11 pages (5 pages of English Translation and 6 pages of Official Copy).

(56) References Cited

OTHER PUBLICATIONS

Office Action received for Korean Patent Application No. 10-2016-7033638, mailed on Jan. 31, 2017, 6 pages (2 pages of English Translation and 4 pages of Official Copy).
Office Action received for Korean Patent Application No. 10-2017-7024570, mailed on Jul. 10, 2019, 6 pages (3 pages of English Translation and 3 pages of Official Copy).
Office Action received for Korean Patent Application No. 10-2017-7024570, mailed on Sep. 28, 2018, 14 pages (6 pages of English Translation and 8 pages of Official Copy).
Office Action received for Korean Patent Application No. 10-2019-7025538, mailed on Aug. 15, 2020, 8 pages (4 pages of English Translation and 4 pages of Official Copy).
Office Action received for Korean Patent Application No. 10-2019-7025538, mailed on Feb. 17, 2020, 12 pages (6 pages of English Translation and 6 pages of Official Copy).
Office Action received for Korean Patent Application No. 10-2019-7025781, mailed on Nov. 26, 2019, 10 pages (4 pages of English Translation and 6 pages of Official Copy).
Office Action received for Korean Patent Application No. 10-2019-7025781, mailed on Oct. 30, 2020, 10 pages (4 pages of English Translation and 6 pages of Official Copy).
Office Action received for Korean Patent Application No. 10-2019-7029673, mailed on Apr. 8, 2021, 7 pages (3 pages of English Translation and 4 pages of Official Copy).
Office Action received for Korean Patent Application No. 10-2019-7029673, mailed on Nov. 5, 2019, 10 pages (4 pages of English Translation and 6 pages of Official Copy).
Office Action received for Korean Patent Application No. 10-2019-7029673, mailed on Sep. 3, 2020, 9 pages (4 pages of English Translation and 5 pages of Official Copy).
Office Action received for Korean Patent Application No. 10-2019-7033834, mailed on Jan. 22, 2021, 13 pages (6 pages of English Translation and 7 pages of Official Copy).
Office Action received for Korean Patent Application No. 10-2020-0123815, mailed on May 31, 2022, 10 pages (5 pages of English Translation and 5 pages of Official Copy).
Office Action received for Korean Patent Application No. 10-2020-0123821, mailed on Sep. 20, 2022, 11 pages (5 pages of English Translation and 6 pages of Official Copy).
Office Action received for Korean Patent Application No. 10-2020-0123840, mailed on Nov. 21, 2022, 18 pages (8 pages of English Translation and 10 pages of Official Copy).
Office Action received for Korean Patent Application No. 10-2020-7026035, mailed on Feb. 19, 2021, 13 pages (6 pages of English Translation and 7 pages of Official Copy).
Office Action received for Korean Patent Application No. 10-2021-7026284, mailed on Aug. 31, 2021, 10 pages (4 pages of English Translation and 6 pages of Official Copy).
Office Action received for Korean Patent Application No. 10-2021-7031939, mailed on Oct. 19, 2021, 11 pages (5 pages of English Translation and 6 pages of Official Copy).
Office Action received for Korean Patent Application No. 10-2021-7036016, mailed on Nov. 10, 2021, 13 pages (6 pages of English Translation and 7 pages of Official Copy).
Office Action received for Korean Patent Application No. 10-2021-7036242, mailed on Sep. 19, 2023, 13 pages (6 pages of English Translation and 7 pages of Official Copy).
Office Action received for Korean Patent Application No. 10-2022-0061486, mailed on Aug. 29, 2022, 5 pages (2 pages of English Translation and 3 pages of Official Copy).
Office Action received for Korean Patent Application No. 10-2022-7031866, mailed on Nov. 18, 2022, 11 pages (5 pages of English Translation and 6 pages of Official Copy).
Office Action received for Korean Patent Application No. 10-2022-7036275, mailed on Jun. 30, 2023, 10 pages (4 pages of English Translation and 6 pages of Official Copy).
Office Action received for Korean Patent Application No. 10-2022-7044515, mailed on Aug. 21, 2023, 11 pages (5 pages of English Translation and 6 pages of Official Copy).
Office Action received for Korean Patent Application No. 10-2023-7025320, mailed on Mar. 11, 2024, 9 pages (4 pages of English Translation and 5 pages of Official Copy).
Office Action received for Taiwanese Patent Application No. 104117509, issued on Aug. 22, 2016, 6 pages (3 pages of English Translation and 3 pages of Official Copy).
Office Action received for Taiwanese Patent Application No. 104128685, mailed on Jan. 4, 2017, 40 pages (15 pages of English Translation and 25 pages of Official Copy).
Office Action received for Taiwanese Patent Application No. 104132636, issued on Dec. 13, 2018, 26 pages (9 pages of English Translation and 17 pages of Official Copy).
Office Action received for Taiwanese Patent Application No. 104132636, issued on Mar. 23, 2017, 25 pages (10 pages of English Translation and 15 pages of Official Copy).
Office Action received for Taiwanese Patent Application No. 104132636, issued on Oct. 31, 2017, 10 pages (4 pages of English Translation and 6 pages of Official Copy).
Partial Supplementary European Search Report received for European Patent Application No. 17810749.6, mailed on Apr. 25, 2019, 8 pages.
Phandroid, "How to record & stream using YouTube Gaming", Available online at: https://www.youtube.com/watch?v=8H5Q1L9M_ql, Jun. 1, 2016, 3 pages.
Prasad et al., "Understanding Sharing Preferences and Behavior for Mhealth Devices", Proceedings of the 2012 ACM workshop on Privacy in the electronic society, Available online at: https://dl.acm.org/doi/10.1145/2381966.2381983, Oct. 15, 2012, pp. 117-128.
Pre-Appeal Review Report received for Japanese Patent Application No. 2021-565912, mailed on Oct. 12, 2023, 5 pages (2 pages of English Translation and 3 pages of Official Copy).
Preliminary Opinion received for European Patent Application No. 15730890.9, mailed on Mar. 7, 2019, 4 pages.
"Programmatically download APK from google play store", Retrieved from the Internet: ://stackoverflow.com/questions/13703982/prog ram maticallydownload-apk-from-google-play-store/13704021#13704021, Dec. 10, 2012, 2 pages.
Puryear, Blake, "A modular framework for home healthcare monitoring", Online available at: https://scholarworks.uark.edu/cgi/viewcontent.cgi?article=1009&context=csceuht, May 2012, 92 pages.
RazykdReviews, "In Depth Review of Apple Watch Activity and Workout App", available at <URL: https://www.youtube.com/watch?v=GkKI3qlK0ow>, Category: X Claims: 1-5, Category: L Reason: Internet citation/video, May 11, 2015, 1 page.
Record of Oral Hearing received for U.S. Appl. No. 16/145,033, mailed on Apr. 19, 2023, 16 pages.
Result of Consultation received for European Patent Application No. 16762356.0, mailed on Nov. 29, 2021, 3 pages.
Result of Consultation received for European Patent Application No. 17810749.6, mailed on Dec. 15, 2020, 3 pages.
Result of Consultation received for European Patent Application No. 17810749.6, mailed on Jan. 18, 2021, 3 pages.
Result of Consultation received for European Patent Application No. 17810749.6, mailed on Jan. 21, 2021, 18 pages.
Result of Consultation received for European Patent Application No. 18154145.9, mailed on Nov. 30, 2020, 17 pages.
Result of Consultation received for European Patent Application No. 18154145.9, mailed on Sep. 4, 2020, 3 pages.
Result of Consultation received for European Patent Application No. 18727543.3, mailed on Mar. 15, 2023, 6 pages.
Result of Consultation received for European Patent Application No. 19721883.7, mailed on Oct. 7, 2020, 3 pages.
Result of Consultation received for European Patent Application No. 19724963.4, mailed on Jul. 8, 2021, 3 pages.
Result of Consultation received for European Patent Application No. 19724963.4, mailed on May 31, 2021, 3 pages.
Result of Consultation received for European Patent Application No. 20203526.7, mailed on Jan. 13, 2023, 3 pages.
Result of Consultation received for European Patent Application No. 20721342.2, mailed on Oct. 18, 2022, 3 pages.
Result of Consultation received for European Patent Application No. 21168916.1, mailed on Dec. 11, 2023, 25 pages.

(56) References Cited

OTHER PUBLICATIONS

Rizknows, "Garmin Connect Mobile App—Review #2", https://www.youtube.com/watch?v=7my3wMpeRbE, Category: X Claims: 1-5, Category: L Reason: Internet citation/video, Oct. 22, 2015, 1 page.
Rizknows, "TomTom Multisport Cardio Review", Online available at: https://www.youtube.com/watch?v=WoVCzLrSN9A, Sep. 4, 2015, 1 page.
Sansford Steve, "Streaming Android Games with OBS On Linux", Available online at: https://www.youtube.com/watch?v=twyh32Ud8vQ, May 20, 2016, 3 pages.
Search Report and Opinion received for Danish Patent Application No. PA201770191, mailed on Jun. 30, 2017, 9 pages.
Search Report and Opinion received for Danish Patent Application No. PA201770423, mailed on Oct. 4, 2017, 10 pages.
Search Report and Opinion received for Danish Patent Application No. PA201870378, mailed on Sep. 10, 2018, 9 pages.
Search Report and Opinion received for Danish Patent Application No. PA201870379, mailed on Sep. 14, 2018, 9 pages.
Search Report and Opinion received for Danish Patent Application No. PA201870385, mailed on Nov. 16, 2018, 10 pages.
Search Report and Opinion received for Danish Patent Application No. PA201970532, mailed on Nov. 8, 2019, 9 pages.
Search Report and Opinion received for Danish Patent Application No. PA202070612, mailed on Jun. 7, 2021, 9 pages.
Search Report and Opinion received for Danish Patent Application No. PA202070613, mailed on Jan. 22, 2021, 9 pages.
Search Report and Opinion received for Danish Patent Application No. PA202070614, mailed on Jan. 14, 2021, 9 pages.
Search Report and Opinion received for Danish Patent Application No. PA202070615, mailed on Jan. 22, 2021, 9 pages.
Search Report and Opinion received for Danish Patent Application No. PA202070616, mailed on Feb. 3, 2021, 8 pages.
Search Report and Opinion received for Danish Patent Application No. PA202070815, mailed on Mar. 16, 2021, 8 pages.
Search Report and Opinion received for Danish Patent Application No. PA202170113, mailed on Nov. 30, 2021, 9 pages.
Smith, "Garmin Fenix 5 Activity/Smart Watch Review", Online Available at: https://www.youtube.com/watch?v=6PkQxXQxpoU, Sep. 2, 2017, 1 pages.
Sportstechguides, "Garmin Fenix 5: How to Add Power Data Fields", Online Available at: https://www.youtube.com/watch?v=ZkPptnnXEiQ, Apr. 29, 2017, 2 pages.
Sportstechguides, "Garmin Fenix 5: How to Set Up Run Alerts", Online Available at: https://www.youtube.com/watch?v=gSMwv8vlhB4, May 13, 2017, 2 pages.
Summons to Attend Oral Proceedings received for European Patent Application No. 13811085.3, mailed on Jan. 26, 2018, 14 pages.
Summons to Attend Oral Proceedings received for European Patent Application No. 13811085.3, mailed on Mar. 3, 2022, 3 pages.
Summons to Attend Oral Proceedings received for European Patent Application No. 15730890.9, mailed on Sep. 10, 2018, 11 pages.
Summons to Attend Oral Proceedings received for European Patent Application No. 15771747.1, mailed on Apr. 29, 2021, 8 pages.
Summons to Attend Oral Proceedings received for European Patent Application No. 15771747.1, mailed on May 25, 2018, 7 pages.
Summons to Attend Oral Proceedings received for European Patent Application No. 16762356.0, mailed on May 10, 2021, 10 pages.
Summons to Attend Oral Proceedings received for European Patent Application No. 17810749.6, mailed on Aug. 12, 2020, 11 pages.
Summons to Attend Oral Proceedings received for European Patent Application No. 18154145.9, mailed on Sep. 17, 2020, 11 pages.
Summons to Attend Oral Proceedings received for European Patent Application No. 18727543.3, mailed on Oct. 25, 2022, 8 pages.
Summons to Attend Oral Proceedings received for European Patent Application No. 19163212.4, mailed on Dec. 15, 2021, 9 pages.
Summons to Attend Oral Proceedings received for European Patent Application No. 19724963.4, mailed on Dec. 23, 2020, 8 pages.
Summons to Attend Oral Proceedings received for European Patent Application No. 20182116.2, mailed on Dec. 21, 2021, 7 pages.
Summons to Attend Oral Proceedings received for European Patent Application No. 20203526.7, mailed on Jun. 23, 2022, 9 pages.
Summons to Attend Oral Proceedings received for European Patent Application No. 20721342.2, mailed on May 20, 2022, 11 pages.
Summons to Attend Oral Proceedings received for European Patent Application No. 21165295.3, mailed on Jul. 25, 2023, 14 pages.
Summons to Attend Oral Proceedings received for European Patent Application No. 21168916.1, mailed on Jul. 14, 2023, 12 pages.
Supplemental Notice of Allowance received for U.S. Appl. No. 14/863,069, mailed on Aug. 15, 2019, 3 pages.
Supplemental Notice of Allowance received for U.S. Appl. No. 14/863,069, mailed on Mar. 29, 2019, 3 pages.
Supplemental Notice of Allowance received for U.S. Appl. No. 14/863,069, mailed on Mar. 1, 2019, 3 pages.
Supplemental Notice of Allowance received for U.S. Appl. No. 15/616,480, mailed on Mar. 28, 2019, 2 pages.
Supplemental Notice of Allowance received for U.S. Appl. No. 15/627,069, mailed on Jul. 12, 2021, 2 pages.
Supplemental Notice of Allowance received for U.S. Appl. No. 15/925,652, mailed on Feb. 17, 2021, 3 pages.
Supplemental Notice of Allowance received for U.S. Appl. No. 15/925,652, mailed on Jan. 6, 2021, 3 pages.
Supplemental Notice of Allowance received for U.S. Appl. No. 15/925,652, mailed on Jan. 26, 2021, 3 pages.
Supplemental Notice of Allowance received for U.S. Appl. No. 16/144,849, mailed on Mar. 31, 2020, 2 pages.
Supplemental Notice of Allowance received for U.S. Appl. No. 16/556,023, mailed on Feb. 3, 2021, 2 pages.
Supplemental Notice of Allowance received for U.S. Appl. No. 16/588,950, mailed on Apr. 1, 2020, 2 pages.
Supplemental Notice of Allowance received for U.S. Appl. No. 16/588,950, mailed on Jul. 29, 2020, 2 pages.
Supplemental Notice of Allowance received for U.S. Appl. No. 16/588,950, mailed on Jun. 18, 2020, 2 pages.
Supplemental Notice of Allowance received for U.S. Appl. No. 16/894,309, mailed on Apr. 8, 2022, 3 pages.
Supplemental Notice of Allowance received for U.S. Appl. No. 16/894,309, mailed on Dec. 24, 2021, 2 pages.
Supplemental Notice of Allowance received for U.S. Appl. No. 16/894,309, mailed on Jan. 25, 2022, 2 pages.
Supplemental Notice of Allowance received for U.S. Appl. No. 16/994,352, mailed on Jun. 20, 2022, 2 pages.
Supplemental Notice of Allowance received for U.S. Appl. No. 17/030,318, mailed on Apr. 4, 2022, 2 pages.
Supplemental Notice of Allowance received for U.S. Appl. No. 17/030,318, mailed on Feb. 22, 2022, 2 pages.
Supplemental Notice of Allowance received for U.S. Appl. No. 17/030,318, mailed on Mar. 16, 2022, 2 pages.
Supplemental Notice of Allowance received for U.S. Appl. No. 17/030,321, mailed on Apr. 15, 2022, 2 pages.
Supplemental Notice of Allowance received for U.S. Appl. No. 17/030,321, mailed on Jul. 27, 2022, 2 pages.
Supplemental Notice of Allowance received for U.S. Appl. No. 17/030,321, mailed on Jun. 10, 2022, 2 pages.
Supplemental Notice of Allowance received for U.S. Appl. No. 17/030,321, mailed on May 27, 2022, 2 pages.
Supplemental Notice of Allowance received for U.S. Appl. No. 17/030,343, mailed on Jan. 6, 2023, 2 pages.
Supplemental Notice of Allowance received for U.S. Appl. No. 17/030,343, mailed on Nov. 9, 2022, 2 pages.
Supplemental Notice of Allowance received for U.S. Appl. No. 17/030,343, mailed on Oct. 5, 2022, 2 pages.
Supplemental Notice of Allowance received for U.S. Appl. No. 17/192,161, mailed on Jun. 13, 2022, 2 pages.
Supplemental Notice of Allowance received for U.S. Appl. No. 17/192,161, mailed on May 13, 2022, 2 pages.
Supplemental Notice of Allowance received for U.S. Appl. No. 17/381,570, mailed on Aug. 11, 2023, 2 pages.
Supplemental Notice of Allowance received for U.S. Appl. No. 17/381,570, mailed on Sep. 13, 2023, 2 pages.
Supplemental Notice of Allowance received for U.S. Appl. No. 17/666,301, mailed on Jun. 5, 2023, 2 pages.

(56) References Cited

OTHER PUBLICATIONS

Supplemental Notice of Allowance received for U.S. Appl. No. 17/666,301, mailed on May 17, 2023, 2 pages.
Supplemental Notice of Allowance received for U.S. Appl. No. 17/852,020, mailed on Aug. 4, 2023, 2 pages.
Supplemental Notice of Allowance received for U.S. Appl. No. 17/951,875, mailed on Aug. 25, 2023, 2 pages.
Supplemental Notice of Allowance received for U.S. Appl. No. 17/952,181, mailed on Dec. 20, 2023, 2 pages.
Supplemental Notice of Allowance received for U.S. Appl. No. 17/952,181, mailed on Oct. 6, 2023, 2 pages.
Supplemental Notice of Allowance received for U.S. Appl. No. 17/952,181, mailed on Oct. 27, 2023, 2 pages.
Supplemental Notice of Allowance received for U.S. Appl. No. 17/952,185, mailed on Nov. 30, 2023, 2 pages.
Supplemental Notice of Allowance received for U.S. Appl. No. 17/952,185, mailed on Oct. 2, 2023, 2 pages.
Supplementary European Search Report received for European Patent Application No. 17810749.6, mailed on Aug. 6, 2019, 6 pages.
"Suunto Spartan Trainer Wrist HR 1.12", Online Available at :—https://web.archive.org/web/20180127155200/https://ns.suunto.com/Manuals/Spartan_Trainer_WristHR/Userguides/Suunto_Spartan_Trainer_WristHR_UserGuide_EN.pdf, Jan. 17, 2018, 47 pages.
Suunto, "Suunto Spartan—Heart Rate Zones", Online Available at: https://www.youtube.com/watch?v=aixfoCnS0OU, Mar. 19, 2018, 2 pages.
Teunmo, "Data field: Visual Pace Alarm", Garmin Forum: Available online at: https://forums.garmin.com/forum/developers/connect-iq/connect-iq-showcase/115996-data-field-visual-pace-alarm, Nov. 17, 2015, 10 pages.
TomTom, "TomTom Runner & Multi-Sport Reference Guide", Online available at: https://web.archive.org/web/20150908075934/http://download.tomtom.com/open/manuals/Runner_Multi-Sport/refman/TomTom-Runner-Multi-Sport-RG-en-gb-pdf, Sep. 8, 2015, 44 pages.
Tweedie Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
Updated Notice of Allowance received for U.S. Appl. No. 17/030,318, mailed on Feb. 23, 2023, 3 pages.
Updated Notice of Allowance received for U.S. Appl. No. 17/030,340, mailed on Dec. 2, 2022, 2 pages.
Updated Notice of Allowance received for U.S. Appl. No. 17/030,340, mailed on Nov. 2, 2022, 2 pages.
Updated Notice of Allowance received for U.S. Appl. No. 17/030,340, mailed on Nov. 10, 2022, 2 pages.
"Utilization of Galaxy S4-S Health, ChatOn and Samsung Hub", Available at: http://seeit.kr/1263, Jun 12 2013, 25 pages (Official copy only) {See Communication Under Rule 37 CFR § 1.98(a) (3)}.
Venusivenus, "Nike Training Club", Available online at: https://www.youtube.com/watch?v=_pe6fqJPA04, Mar. 28, 2011, 6 pages.
Vicky's Blog, "Hot to Log in to PS4 Automatically with Particular User?", Online avaiable on: https://www.youtube.com/watch?v=kqdlzXAvOkY, May 30, 2018, 3 pages.
"Visual Pace Alarm app", Available Online at: https://apps.garmin.com/en-US/apps/3940f3a2-4847-4078-a911-d77422966c82, Oct. 19, 2016, 1 pages.
Wesley, "Apple Watch Series 1", online available at: http://toolbox.info/blog/archives/1737-unknown.html, May 28, 2015, 5 pages (Official copy only) {See Communication Under Rule 37 CFR § 1.98(a) (3)}.
Whitwam Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Wikipedia, "Enhanced Multi-Level Precedence and Pre-emption Service", Available online at: https://de.wikipedia/org/w/index.php?%20title=Enhanced%20Multi%E3%83%BCLevel_Precedence_And_Pre-emption_Service%oldid=123047429, Oct. 2013, 2 pages (Official Copy Only) {See Communication Under Rule 37 CFR § 1.98(a) (3)}.
Willem, Jonker, "Secure Data Management", Online available at: http://ndl.ethernet.edu.et/bitstream/123456789/21649/1/291.pdf, Sep. 17, 2010, 177 pagesl
Written Opinion Issued from International Preliminary Examining Authority for PCT Application No. PCT/US2016/016216, mailed on Feb. 20, 2017, 12 pages.
Xiaoli, Wan, "Research on sharing and collaboration technology for P2P instant messaging", Wan Fang's dissertation, Aug. 11, 2008, 64 pages (Official Copy Only) (See Communication Under Rule 37 CFR § 1.98(a) (3)}.
Xzulas, "PS4 to Twitch—How to Broadcast Gameplay—Camera and Audio Settings", Available online at: https://www.youtube.com/watch?v=TyTR64RF0wl, Nov. 3, 2014, 4 pages.
Yang, Yang, "Design and implementation of P2P-based video live broadcast function on iOS system", CNKI Excellent Master's Thesis Full Text Database, Apr. 15, 2015, 64 pages (Official Copy Only) {See Communication Under Rule 37 CFR § 1.98(a) (3)}.
Youtube, "Apple Watch Series 3", Online available at: https://www.youtube.com/watch?v=iBPr9gEfkK8, Nov. 21, 2017, 15 pages (Official Copy Only) {See Communication Under Rule 37 CFR § 1.98(a) (3)}.
Yoyodavid, "How to Use Multiple Accounts on the Playstation 4", Online available at: https://www.youtube.com/watch?v=5V21obRMeKE, Jan. 9, 2014, 3 pages.
Yuling et al., "Research on Motion Modeling of Virtual Gear Measuring Center", Tool Technology, vol. 43, No. 2, 2009, pp. 85-87 (Official Copy Only) {See Communication Under Rule 37 CFR § 1.98(a) (3)}.
Zlelik, "Garmin Fenix 5 Open Water Swimming Activity Demo", Online Available at: https://www.youtube.com/watch?v=iSVhdvw2dcs, Jun. 9, 2017, 1 page.
Decision to Grant received for European Patent Application No. 22731852.4, mailed on Apr. 17, 2025, 3 pages.
Intention to Grant received for European Patent Application No. 23153900.8, mailed on Apr. 16, 2025, 11 pages.
Non-Final Office Action received for U.S. Appl. No. 18/774,704, mailed on May 5, 2025, 20 pages.
Applicant-Initiated Interview Summary received for U.S. Appl. No. 18/789,495, mailed on Jun. 5, 2025, 5 pages.
Extended European Search Report received for European Patent Application No. 25164739.2, mailed on Jun. 2, 2025, 8 pages.
Office Action received for Japanese Patent Application No. 2025-033114, mailed on May 12, 2025, 4 pages (2 pages of English Translation and 2 pages of Official Copy).
Result of Consultation received for European Patent Application No. 23189089.8, mailed on Jun. 2, 2025, 3 pages.
Cerebral Gardens Inc.. , "All the Rings", Online Available at: URL:https://web.archive.org/web/20220528160010/https://alltherings.fit/XP093314242, May 28, 2022, 3 pages.
Office Action received for European Patent Application No. 23734424.7, mailed on Sep. 18, 2025, 9 pages.
Notice of Allowance received for Korean Patent Application No. 10-2025-7017071, mailed on Sep. 16, 2025, 7 pages (2 pages of English Translation and 5 pages of Official Copy).
Office Action received for Chinese Patent Application No. 202510130289.7, mailed on Sep. 19, 2025, 18 pages (9 pages of English Translation and 9 pages of Official Copy).
Notice of Allowance received for U.S. Appl. No. 18/663,024, mailed on Jul. 31, 2025, 9 pages.
Office Action received for Chinese Patent Application No. 202080039364.4, mailed on Jul. 10, 2025, 17 pages (9 pages of English Translation and 8 pages of Official Copy).
Summons to Oral Proceedings received for European Patent Application No. 21165295.3, mailed on Jul. 21, 2025, 11 pages.

(56) References Cited

OTHER PUBLICATIONS

Anonymous, "Application Development Discussions", Available online at: https://community.sap.com/t5/application-development-discussions/skip-selection-screen/m-p/2769825, Sep. 10, 2007, 10 pages.
Applicant-Initiated Interview Summary received for U.S. Appl. No. 18/135,056, mailed on Nov. 19, 2024, 2 pages.
Corrected Notice of Allowance received for U.S. Appl. No. 17/952,181, mailed on Nov. 12, 2024, 2 pages.
Corrected Notice of Allowance received for U.S. Appl. No. 18/405,969, mailed on Nov. 13, 2024, 2 pages.
Corrected Notice of Allowance received for U.S. Appl. No. 18/633,120, mailed on Nov. 12, 2024, 9 pages.
Decision to Grant received for German Patent Application No. 112015007313.2, mailed on Nov. 6, 2024, 7 pages (1 page of English Translation and 6 pages of Official Copy).
Decision to Grant received for Japanese Patent Application No. 2021-565912, mailed on Nov. 14, 2024, 12 pages (1 page of English Translation and 11 pages of Official Copy).
Decision to Grant received for Japanese Patent Application No. 2023-158326, mailed on Nov. 12, 2024, 3 pages (1 pages of English Translation and 2 page of Official Copy).
Extended European Search Report received for European Patent Application No. 24186217.6, mailed on Oct. 31, 2024, 11 pages.
Intention to Grant received for European Patent Application No. 23153898.4, mailed on Nov. 12, 2024, 10 pages.
International Search Report and Written Opinion received for PCT Patent Application No. PCT/US2024/023603, mailed on Aug. 14, 2024, 17 pages.
International Search Report and Written Opinion received for PCT Patent Application No. PCT/US2024/027314, mailed on Aug. 23, 2024, 13 pages.
International Search Report and Written Opinion received for PCT Patent Application No. PCT/US2024/028414, mailed on Nov. 11, 2024, 20 pages.
International Search Report and Written Opinion received for PCT Patent Application No. PCT/US2024/031346, mailed on Dec. 6, 2024, 17 pages.
Invitation to Pay Additional Fees and Partial International Search Report received for PCT Patent Application No. PCT/US2024/028414, mailed on Sep. 20, 2024, 12 pages.
LimegamingTV, "How To Upload Ps4 Share Clips To Youtube!", Available online at: https://www.youtube.com/watch?v=ZAYFajRWIMA, Oct. 30, 2014, 3 pages.
Malatesta Francesco, "How to Implement User Log-in with PayPal", Available online at: https://www.sitepoint/com/implement-user-log-paypal/, Dec. 23, 2014, 16 pages.
Non-Final Office Action received for U.S. Appl. No. 18/135,056, mailed on Oct. 25, 2024, 17 pages.
Non-Final Office Action received for U.S. Appl. No. 18/628,586, mailed on Dec. 2, 2024, 13 pages.
Non-Final Office Action received for U.S. Appl. No. 18/774,704, mailed on Nov. 25, 2024, 13 pages.
Non-Final Office Action received for U.S. Appl. No. 18/789,495, mailed on Oct. 22, 2024, 37 pages.
Notice of Acceptance received for Australian Patent Application No. 2023285859, mailed on Nov. 28, 2024, 3 pages.
Notice of Allowance received for Chinese Patent Application No. 202110831819.2, mailed on Oct. 28, 2024, 4 pages (1 page of English Translation and 3 pages of Official Copy).
Notice of Allowance received for Chinese Patent Application No. 202210312598.2, mailed on Nov. 6, 2024, 4 pages (1 page of English Translation and 3 pages of Official Copy).
Notice of Allowance received for Chinese Patent Application No. 202210618961.3, mailed on Oct. 30, 2024, 5 pages (1 page of English Translation and 4 pages of Official Copy).
Notice of Allowance received for Chinese Patent Application No. 202311811912.2, mailed on Dec. 1, 2024, 5 pages (1 page of English Translation and 4 pages of Official Copy).
Notice of Allowance received for Japanese Patent Application No. 2023-041035, mailed on Nov. 8, 2024, 4 pages (1 page of English Translation and 3 pages of Official Copy).
Notice of Allowance received for Japanese Patent Application No. 2023-077331, mailed on Nov. 29, 2024, 4 pages (1 page of English Translation and 3 pages of Official Copy).
Notice of Allowance received for Japanese Patent Application No. 2023-133506, mailed on Nov. 22, 2024, 4 pages (1 page of English Translation and 3 pages of Official Copy).
Notice of Allowance received for U.S. Appl. No. 17/952,181, mailed on Oct. 31, 2024, 5 pages.
Notice of Allowance received for U.S. Appl. No. 17/952,236, mailed on Nov. 25, 2024, 10 pages.
Notice of Allowance received for U.S. Appl. No. 18/589,265, mailed on Dec. 6, 2024, 9 pages.
Notice of Allowance received for U.S. Appl. No. 18/633,120, mailed on Nov. 5, 2024, 12 pages.
Office Action received for Australian Patent Application No. 2023208169, mailed on Dec. 5, 2024, 3 pages.
Office Action received for Australian Patent Application No. 2023210654, mailed on Nov. 26, 2024, 4 pages.
Office Action received for Australian Patent Application No. 2023258443, mailed on Oct. 21, 2024, 4 pages.
Office Action received for Chinese Patent Application No. 202080039364.4, mailed on Sep. 28, 2024, 17 pages (9 pages of English Translation and 8 pages of Official Copy).
Office Action received for Chinese Patent Application No. 202210312598.2, mailed on Jun. 27, 2024, 22 pages (7 pages of English Translation and 15 pages of Official Copy).
Office Action received for Chinese Patent Application No. 202310774963.6, mailed on Oct. 31, 2024, 19 pages (12 pages of English Translation and 7 pages of Official Copy).
Office Action received for European Patent Application No. 22194355.8, mailed on Dec. 6, 2024, 10 pages.
Office Action received for European Patent Application No. 23735495.6, mailed on Nov. 22, 2024, 7 pages.
Office Action received for Korean Patent Application No. 10-2021-7043369, mailed on Nov. 18, 2024, 14 pages (6 pages of English Translation and 8 pages of Offcial Copy).
Playstation Europe, "How to stream your gameplay | Inside PS4 | #4ThePlayers", Available online at: https://www.youtube.com/watch?v=eaQzxZa_BVE, Sep. 10, 2014, 3 pages.
Intention to Grant received for European Patent Application No. 20733174.5, mailed on Oct. 17, 2025, 9 pages.
Non-Final Office Action received for U.S. Appl. No. 18/153,940, mailed on Oct. 24, 2025, 17 pages.
Non-Final Office Action received for U.S. Appl. No. 19/024,210, mailed on Nov. 3, 2025, 18 pages.
Office Action received for Chinese Patent Application No. 202110363565.6, mailed on Sep. 30, 2025, 20 pages (1 page of English Translation and 19 pages of Official Copy).
Office Action received for Chinese Patent Application No. 202510170130.8, mailed on Sep. 9, 2025, 14 pages (8 pages of English Translation and 6 pages of Official Copy).
Office Action received for European Patent Application No. 23735495.6, mailed on Oct. 16, 2025, 11 pages.
Extended European Search Report received for European Patent Application No. 25194373.4, mailed on Oct. 27, 2025, 7 pages.
Intention to Grant received for European Patent Application No. 23192409.3, mailed on Dec. 9, 2025, 9 pages.
International Preliminary Report on Patentability received for PCT Patent Application No. PCT/US2024/028414, mailed on Dec. 11, 2025, 14 pages.
International Search Report and Written Opinion received for PCT Patent Application No. PCT/US2025/028698, mailed on Aug. 13, 2025, 14 pages.
International Search Report and Written Opinion received for PCT Patent Application No. PCT/US2025/029323, mailed on Oct. 2, 2025, 21 pages.
International Search Report and Written Opinion received for PCT Patent Application No. PCT/US2025/031653, mailed on Nov. 17, 2025, 17 pages.

(56) References Cited

OTHER PUBLICATIONS

International Search Report and Written Opinion received for PCT Patent Application No. PCT/US2025/032123, mailed on Sep. 26, 2025, 13 pages.
Invitation to Pay Additional Fees and Partial International Search Report received for PCT Patent Application No. PCT/US2025/029323, mailed on Aug. 11, 2025, 14 pages.
Ifun, "Apple Photo Stream: Setting up an iCloud photo share from your iPhone—ifun.de", Retrieved from the Internet: URL:https://www.youtube.com/watch?v=gBqenU5BsG0, Nov. 26, 2013, 2 pages (1 page of English Translation and 1 page of Official Copy).
Non-Final Office Action received for U.S. Appl. No. 18/611,377, mailed on Dec. 10, 2025, 19 pages.
Office Action received for Chinese Patent Application No. 202080039364.4, mailed on Nov. 4, 2025, 24 pages (3 pages of English Translation and 21 pages of Official Copy).
Office Action received for Chinese Patent Application No. 202510183070.3, mailed on Nov. 2, 2025, 12 pages (6 pages of English Translation and 6 pages of Official Copy).
Office Action received for European Patent Application No. 23216484.8, mailed on Dec. 8, 2025, 7 pages.
International Preliminary Report on Patentability received for PCT Patent Application No. PCT/US2024/023603, mailed on Dec. 18, 2025, 11 pages.
International Preliminary Report on Patentability received for PCT Patent Application No. PCT/US2024/027314, mailed on Dec. 18, 2025, 8 pages.
International Preliminary Report on Patentability received for PCT Patent Application No. PCT/US2024/031346, mailed on Dec. 18, 2025, 11 pages.
Iseminger David, "Windows 2000 Active Directory Developer Reference Library", vol. 1, edited by Esemeg, mechanical Industry Press, Dec. 31, 2001, 2 pages (Official Copy only). {See Communication under Rule 37 CFR § 1.98(a) (3)}.
Jianming et al., "CR, DR Imaging Technology", China Medical Science and Technology Press, Sep. 2009, pp. 666-677 (Official Copy Only). {See Communication under Rule 37 CFR § 1.98(a) (3)}.
Lagen et al., "Basic Quality and Skills of Modern Inspectorate", Jiangxi Science and Technology Press, Feb. 2009, 1 page (Official Copy Only), {See Communication under Rule 37 CFR § 1.98(a) (3)}.
Notice of Allowance received for Korean Patent Application No. 10-2025-0035740, mailed on Jul. 23, 2025, 8 pages (2 pages of English Translation and 6 pages of Official Copy).
Office Action received for Australian Patent Application No. 2024200956, mailed on Dec. 17, 2025, 6 pages.
Office Action received for Chinese Patent Application No. 202110363565.6, mailed on Sep. 30, 2025, 38 pages (19 pages of English Translation and 19 pages of Official Copy).
Office Action received for Chinese Patent Application No. 202210140789.5, mailed on Jul. 4, 2025, 14 pages (8 pages of English Translation and 6 pages of Official Copy).
Office Action received for Chinese Patent Application No. 202210141337.9, mailed on Aug. 7, 2025, 13 pages (7 pages of English Translation and 6 pages of Official Copy).
Office Action received for Chinese Patent Application No. 202210141337.9, mailed on Jun. 20, 2025, 14 pages (8 pages of English Translation and 6 pages of Official Copy).
Office Action received for Chinese Patent Application No. 202210151291.9, mailed on Sep. 3, 2025, 13 pages (8 pages of English Translation and 5 pages of Official Copy).
Office Action received for Chinese Patent Application No. 202411076243.3, mailed on Aug. 7, 2025, 9 pages (5 pages of English Translation and 4 pages of Official Copy).
Office Action received for European Patent Application No. 25156484.5, mailed on Dec. 17, 2025, 9 pages.
Office Action received for Japanese Patent Application No. 2024-217399, mailed on Nov. 4, 2025, 3 pages (1 page of English Translation and 2 pages of Official Copy).
Xi et al., "Bank Financial Management Workbook", Heilongjiang People's Press, Apr. 1993, 7 pages (Official Copy Only). {See Communication under Rule 37 CFR § 1.98(a) (3)}.
Xiaoming et al., "Multimedia Grid", Beijing University of Posts and Telecommunications Press, Jul. 2011, 2 pages (Official Copy only). {See Communication under Rule 37 CFR § 1.98(a) (3)}.
Yu et al., "Computer Network Security Technology", Beijing University of Technology Press, Aug. 2005, 2 pages (Official Copy Only). {See Communication under Rule 37 CFR § 1.98(a) (3)}.
Yuqing et al., "Outlook and Development Strategy in Medical Imaging", Zhejiang Science and Technology Press, Dec. 2001, pp. 195-196 (Official Copy Only). {See Communication under Rule 37 CFR § 1.98(a) (3)}.
Han et al., "Plan, Implementation and Maintenance of the Windows Server 2003 Active Directory Structure", Red Flag Press, Feb. 2005, 1 page (Official Copy Only). {See Communication Under Rule 37 CFR § 1.98(a)(3)}.
Intention to Grant received for European Patent Application No. 23153899.2, mailed on Jan. 2, 2026, 12 pages.
Notice of Allowance received for U.S. Appl. No. 18/367,934, mailed on Jan. 6, 2026, 12 pages.
Office Action received for Chinese Patent Application No. 202210140789.5, mailed on Sep. 9, 2025, 13 pages (7 pages of English Translation and 6 pages of Official Copy).
Applicant-Initiated Interview Summary received for U.S. Appl. No. 18/367,934, mailed on Nov. 20, 2025, 4 pages.
Applicant-Initiated Interview Summary received for U.S. Appl. No. 18/789,495, mailed on Nov. 13, 2025, 5 pages.
Non-Final Office Action received for U.S. Appl. No. 18/583,787, mailed on Nov. 5, 2025, 17 pages.
Office Action received for Australian Patent Application No. 2025201394, mailed on Nov. 14, 2025, 3 pages.
Intention to Grant received for European Patent Application No. 23153900.8, mailed on Sep. 9, 2025, 10 pages.
Notice of Allowance received for Korean Patent Application No. 10-2024-7013569, mailed on Aug. 25, 2025, 8 pages (2 pages of English Translation and 6 pages of Official Copy).

* cited by examiner

750

900

METHODS AND USER INTERFACES FOR SHARING AND ACCESSING WORKOUT CONTENT

CROSS-REFERENCE TO RELATED APPLICATIONS

This application claims priority to U.S. Provisional Patent Application No. 63/470,961, entitled "METHODS AND USER INTERFACES FOR SHARING AND ACCESSING WORKOUT CONTENT," filed on Jun. 4, 2023, the contents of which is hereby incorporated by reference in its entirety.

FIELD

The present disclosure relates generally to computer user interfaces, and more specifically to techniques for sharing and/or accessing workout content.

BACKGROUND

Electronic devices can be used to access and share workout content, such as fitness guidance, including multimedia fitness guidance.

BRIEF SUMMARY

Some techniques for sharing and/or accessing workout content using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for sharing and/or accessing workout content. Such methods and interfaces optionally complement or replace other methods for sharing and/or accessing workout content. Such methods and interfaces reduce the cognitive burden on a user and produce a more efficient human-machine interface. For battery-operated computing devices, such methods and interfaces conserve power and increase the time between battery charges.

In accordance with some embodiments, a method that is performed at a computer system that is in communication with one or more display generation components and one or more input devices, is described. The method comprising: displaying, via the one or more display generation components, a messaging user interface corresponding to an asynchronous messaging session between a user of the computer system and one or more other participants in the asynchronous messaging session including a first participant; receiving first information that corresponds to a first workout that is shared into the asynchronous messaging session by the first participant; in response to receiving the first information, displaying, via the one or more display generation components and within the messaging user interface, a first object corresponding to the first workout that is shared into the asynchronous messaging session by the first participant; while displaying the first object corresponding to the first workout, receiving, via the one or more input devices, a first input corresponding to selection of the first object; and in response to receiving the first input: displaying a first user interface corresponding to the first workout.

In accordance with some embodiments, a non-transitory computer-readable storage medium storing one or more programs configured to be executed by one or more processors of a computer system that is in communication with one or more display generation components and one or more input devices, is described. The one or more programs including instructions for: displaying, via the one or more display generation components, a messaging user interface corresponding to an asynchronous messaging session between a user of the computer system and one or more other participants in the asynchronous messaging session including a first participant; receiving first information that corresponds to a first workout that is shared into the asynchronous messaging session by the first participant; in response to receiving the first information, displaying, via the one or more display generation components and within the messaging user interface, a first object corresponding to the first workout that is shared into the asynchronous messaging session by the first participant; while displaying the first object corresponding to the first workout, receiving, via the one or more input devices, a first input corresponding to selection of the first object; and in response to receiving the first input: displaying a first user interface corresponding to the first workout.

In accordance with some embodiments, a transitory computer-readable storage medium storing one or more programs configured to be executed by one or more processors of a computer system that is in communication with one or more display generation components and one or more input devices, is described. The one or more programs including instructions for: displaying, via the one or more display generation components, a messaging user interface corresponding to an asynchronous messaging session between a user of the computer system and one or more other participants in the asynchronous messaging session including a first participant; receiving first information that corresponds to a first workout that is shared into the asynchronous messaging session by the first participant; in response to receiving the first information, displaying, via the one or more display generation components and within the messaging user interface, a first object corresponding to the first workout that is shared into the asynchronous messaging session by the first participant; while displaying the first object corresponding to the first workout, receiving, via the one or more input devices, a first input corresponding to selection of the first object; and in response to receiving the first input: displaying a first user interface corresponding to the first workout.

In accordance with some embodiments, a computer system configured to communicate with one or more display generation components and one or more input devices, is described. The computer comprising: one or more processors; and memory storing one or more programs configured to be executed by the one or more processors. The one or more programs including instructions for: displaying, via the one or more display generation components, a messaging user interface corresponding to an asynchronous messaging session between a user of the computer system and one or more other participants in the asynchronous messaging session including a first participant; receiving first information that corresponds to a first workout that is shared into the asynchronous messaging session by the first participant; in response to receiving the first information, displaying, via the one or more display generation components and within the messaging user interface, a first object corresponding to the first workout that is shared into the asynchronous messaging session by the first participant; while displaying the first object corresponding to the first workout, receiving, via the one or more input devices, a first input corresponding to selection of the first object; and in response to receiving the first input: displaying a first user interface corresponding to the first workout.

In accordance with some embodiments, a computer system configured to communicate with one or more display generation components and one or more input devices, is described. The computer system comprising: means for displaying, via the one or more display generation components, a messaging user interface corresponding to an asynchronous messaging session between a user of the computer system and one or more other participants in the asynchronous messaging session including a first participant; means for receiving first information that corresponds to a first workout that is shared into the asynchronous messaging session by the first participant; means, in response to receiving the first information, for displaying, via the one or more display generation components and within the messaging user interface, a first object corresponding to the first workout that is shared into the asynchronous messaging session by the first participant; means, while displaying the first object corresponding to the first workout, for receiving, via the one or more input devices, a first input corresponding to selection of the first object; and means, in response to receiving the first input, for: displaying a first user interface corresponding to the first workout.

In accordance with some embodiments, a computer program product, comprising one or more programs configured to be executed by one or more processors of a computer system that is in communication with one or more display generation components and one or more input devices, is described. The one or more programs including instructions for: displaying, via the one or more display generation components, a messaging user interface corresponding to an asynchronous messaging session between a user of the computer system and one or more other participants in the asynchronous messaging session including a first participant; receiving first information that corresponds to a first workout that is shared into the asynchronous messaging session by the first participant; in response to receiving the first information, displaying, via the one or more display generation components and within the messaging user interface, a first object corresponding to the first workout that is shared into the asynchronous messaging session by the first participant; while displaying the first object corresponding to the first workout, receiving, via the one or more input devices, a first input corresponding to selection of the first object; and in response to receiving the first input: displaying a first user interface corresponding to the first workout.

In accordance with some embodiments, A method that is performed at a computer system that is in communication with one or more display generation components and one or more input devices, is described. The method comprising: receiving, via the one or more input devices, a first set of user inputs corresponding to a user request to generate a first custom workout; receiving, via the one or more input devices, a second set of user inputs corresponding to a user request to share the first custom workout into a first asynchronous messaging session; and in response to receiving the second set of user inputs, displaying, via the one or more display generation components, a messaging user interface corresponding to the first asynchronous messaging session, including: displaying, within the messaging user interface, a first object corresponding to the first custom workout and that is selectable to display a first user interface corresponding to the first custom workout.

In accordance with some embodiments, a non-transitory computer-readable storage medium storing one or more programs configured to be executed by one or more processors of a computer system that is in communication with one or more display generation components and one or more input devices, is described. The one or more programs including instructions for: receiving, via the one or more input devices, a first set of user inputs corresponding to a user request to generate a first custom workout; receiving, via the one or more input devices, a second set of user inputs corresponding to a user request to share the first custom workout into a first asynchronous messaging session; and in response to receiving the second set of user inputs, displaying, via the one or more display generation components, a messaging user interface corresponding to the first asynchronous messaging session, including: displaying, within the messaging user interface, a first object corresponding to the first custom workout and that is selectable to display a first user interface corresponding to the first custom workout.

In accordance with some embodiments, a transitory computer-readable storage medium storing one or more programs configured to be executed by one or more processors of a computer system that is in communication with one or more display generation components and one or more input devices, is described. The one or more programs including instructions for: receiving, via the one or more input devices, a first set of user inputs corresponding to a user request to generate a first custom workout; receiving, via the one or more input devices, a second set of user inputs corresponding to a user request to share the first custom workout into a first asynchronous messaging session; and in response to receiving the second set of user inputs, displaying, via the one or more display generation components, a messaging user interface corresponding to the first asynchronous messaging session, including: displaying, within the messaging user interface, a first object corresponding to the first custom workout and that is selectable to display a first user interface corresponding to the first custom workout.

In accordance with some embodiments, a computer system configured to communicate with one or more display generation components and one or more input devices, is described. The computer system comprising: one or more processors; and memory storing one or more programs configured to be executed by the one or more processors. The one or more programs including instructions for: receiving, via the one or more input devices, a first set of user inputs corresponding to a user request to generate a first custom workout; receiving, via the one or more input devices, a second set of user inputs corresponding to a user request to share the first custom workout into a first asynchronous messaging session; and in response to receiving the second set of user inputs, displaying, via the one or more display generation components, a messaging user interface corresponding to the first asynchronous messaging session, including: displaying, within the messaging user interface, a first object corresponding to the first custom workout and that is selectable to display a first user interface corresponding to the first custom workout.

In accordance with some embodiments, a computer system configured to communicate with one or more display generation components and one or more input devices, is described. The computer system comprising: means for receiving, via the one or more input devices, a first set of user inputs corresponding to a user request to generate a first custom workout; means for receiving, via the one or more input devices, a second set of user inputs corresponding to a user request to share the first custom workout into a first asynchronous messaging session; and means, in response to receiving the second set of user inputs, for displaying, via the one or more display generation components, a messaging user interface corresponding to the first asynchronous messaging session, including: displaying, within the messaging user interface, a first object corresponding to the first custom workout and that is selectable to display a first user interface corresponding to the first custom workout.

In accordance with some embodiments, a computer program product, comprising one or more programs configured to be executed by one or more processors of a computer system that is in communication with one or more display generation components and one or more input devices, is described. The one or more programs including instructions for: receiving, via the one or more input devices, a first set of user inputs corresponding to a user request to generate a first custom workout; receiving, via the one or more input devices, a second set of user inputs corresponding to a user request to share the first custom workout into a first asynchronous messaging session; and in response to receiving the second set of user inputs, displaying, via the one or more display generation components, a messaging user interface corresponding to the first asynchronous messaging session, including: displaying, within the messaging user interface, a first object corresponding to the first custom workout and that is selectable to display a first user interface corresponding to the first custom workout.

In accordance with some embodiments, a method that is performed at a computer system that is in communication with one or more display generation components and one or more input devices, is described. The method comprising: receiving, from a first entity, a first workout schedule that includes a plurality of scheduled workouts; subsequent to receiving the first workout schedule, displaying, via the one or more display generation components, a first user interface corresponding to the first entity that includes: a first object corresponding to a first workout that is scheduled for a current date according to the first workout schedule; and one or more objects corresponding to one or more future scheduled workouts in the first workout schedule, including a second object corresponding to a second workout that is scheduled for a first future date according to the first workout schedule; and while displaying the first user interface that includes the first object and the second object, receiving, via the one or more input devices, a first set of user inputs; and in response to receiving the first set of user inputs: in accordance with a determination that the first set of user inputs correspond to selection of the first object, initiating a process for initiating a workout session corresponding to the first workout.

In accordance with some embodiments, a non-transitory computer-readable storage medium storing one or more programs configured to be executed by one or more processors of a computer system that is in communication with one or more display generation components and one or more input devices, is described. The one or more programs including instructions for: receiving, from a first entity, a first workout schedule that includes a plurality of scheduled workouts; subsequent to receiving the first workout schedule, displaying, via the one or more display generation components, a first user interface corresponding to the first entity that includes: a first object corresponding to a first workout that is scheduled for a current date according to the first workout schedule; and one or more objects corresponding to one or more future scheduled workouts in the first workout schedule, including a second object corresponding to a second workout that is scheduled for a first future date according to the first workout schedule; and while displaying the first user interface that includes the first object and the second object, receiving, via the one or more input devices, a first set of user inputs; and in response to receiving the first set of user inputs: in accordance with a determination that the first set of user inputs correspond to selection of the first object, initiating a process for initiating a workout session corresponding to the first workout.

In accordance with some embodiments, a transitory computer-readable storage medium storing one or more programs configured to be executed by one or more processors of a computer system that is in communication with one or more display generation components and one or more input devices, is described. The one or more programs including instructions for: receiving, from a first entity, a first workout schedule that includes a plurality of scheduled workouts; subsequent to receiving the first workout schedule, displaying, via the one or more display generation components, a first user interface corresponding to the first entity that includes: a first object corresponding to a first workout that is scheduled for a current date according to the first workout schedule; and one or more objects corresponding to one or more future scheduled workouts in the first workout schedule, including a second object corresponding to a second workout that is scheduled for a first future date according to the first workout schedule; and while displaying the first user interface that includes the first object and the second object, receiving, via the one or more input devices, a first set of user inputs; and in response to receiving the first set of user inputs: in accordance with a determination that the first set of user inputs correspond to selection of the first object, initiating a process for initiating a workout session corresponding to the first workout.

In accordance with some embodiments, a computer system configured to communicate with one or more display generation components and one or more input devices, is described. The computer system comprising: one or more processors; and memory storing one or more programs configured to be executed by the one or more processors. The one or more programs including instructions for: receiving, from a first entity, a first workout schedule that includes a plurality of scheduled workouts; subsequent to receiving the first workout schedule, displaying, via the one or more display generation components, a first user interface corresponding to the first entity that includes: a first object corresponding to a first workout that is scheduled for a current date according to the first workout schedule; and one or more objects corresponding to one or more future scheduled workouts in the first workout schedule, including a second object corresponding to a second workout that is scheduled for a first future date according to the first workout schedule; and while displaying the first user interface that includes the first object and the second object, receiving, via the one or more input devices, a first set of user inputs; and in response to receiving the first set of user inputs: in accordance with a determination that the first set of user inputs correspond to selection of the first object, initiating a process for initiating a workout session corresponding to the first workout.

In accordance with some embodiments, a computer system configured to communicate with one or more display generation components and one or more input devices, is described. The computer system comprising: means for receiving, from a first entity, a first workout schedule that includes a plurality of scheduled workouts; means, subsequent to receiving the first workout schedule, for displaying, via the one or more display generation components, a first user interface corresponding to the first entity that includes: a first object corresponding to a first workout that is scheduled for a current date according to the first workout schedule; and one or more objects corresponding to one or more future scheduled workouts in the first workout schedule, including a second object corresponding to a second workout that is scheduled for a first future date according to the first workout schedule; and means, while displaying the first user interface that includes the first object and the second object, for receiving, via the one or more input devices, a first set of user inputs; and means, in response to receiving the first set of user inputs, for: in accordance with a determination that the first set of user inputs correspond to selection of the first object, initiating a process for initiating a workout session corresponding to the first workout.

In accordance with some embodiments, a computer program product, comprising one or more programs configured to be executed by one or more processors of a computer system that is in communication with one or more display generation components and one or more input devices, is described. The one or more programs including instructions for: receiving, from a first entity, a first workout schedule that includes a plurality of scheduled workouts; subsequent to receiving the first workout schedule, displaying, via the one or more display generation components, a first user interface corresponding to the first entity that includes: a first object corresponding to a first workout that is scheduled for a current date according to the first workout schedule; and one or more objects corresponding to one or more future scheduled workouts in the first workout schedule, including a second object corresponding to a second workout that is scheduled for a first future date according to the first workout schedule; and while displaying the first user interface that includes the first object and the second object, receiving, via the one or more input devices, a first set of user inputs; and in response to receiving the first set of user inputs: in accordance with a determination that the first set of user inputs correspond to selection of the first object, initiating a process for initiating a workout session corresponding to the first workout.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for sharing and/or accessing workout content, thereby increasing the effectiveness, efficiency, and user satisfaction with such devices. Such methods and interfaces may complement or replace other methods for sharing and/or accessing workout content.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for sharing and/or accessing workout content. Such techniques can reduce the cognitive burden on a user who share and/or access workout content, thereby enhancing productivity. Further, such techniques can reduce processor and battery power otherwise wasted on redundant user inputs.

Figure 6A:
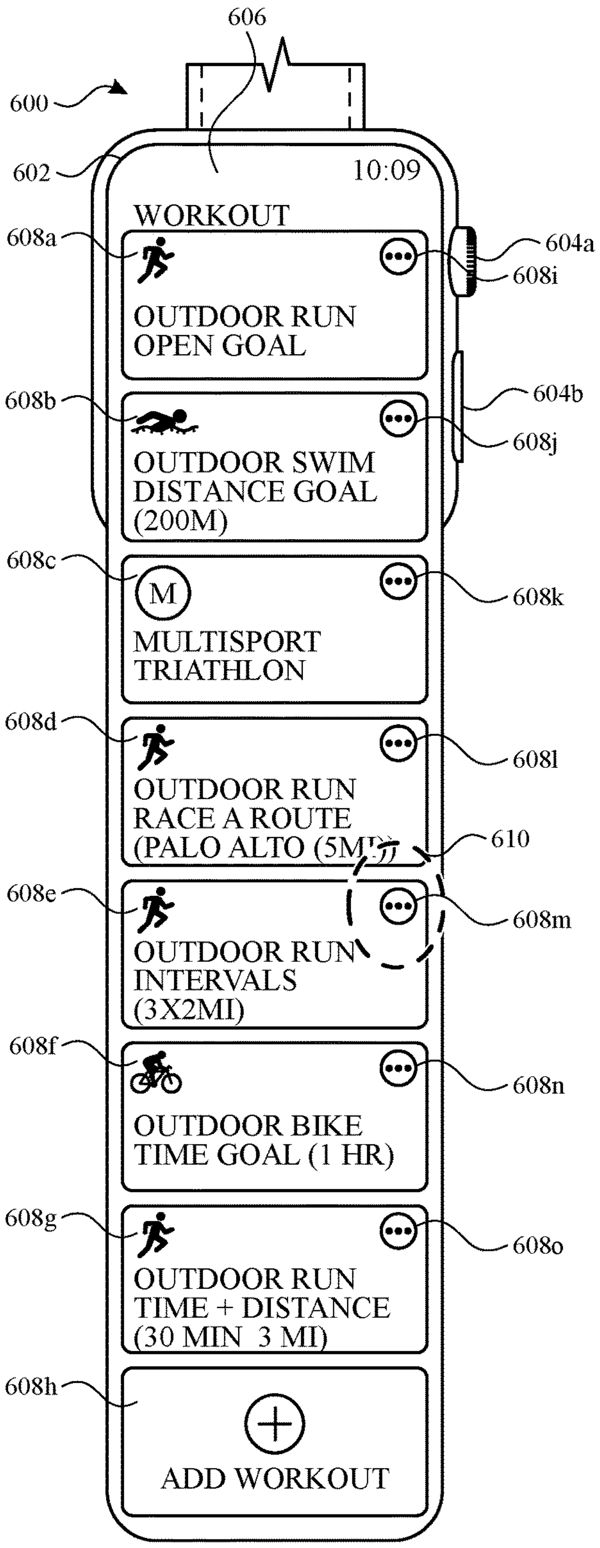
FIGS. 6A-6AF illustrate exemplary user interfaces for sharing and accessing workout content, in accordance with some embodiments.
Figure 7A:
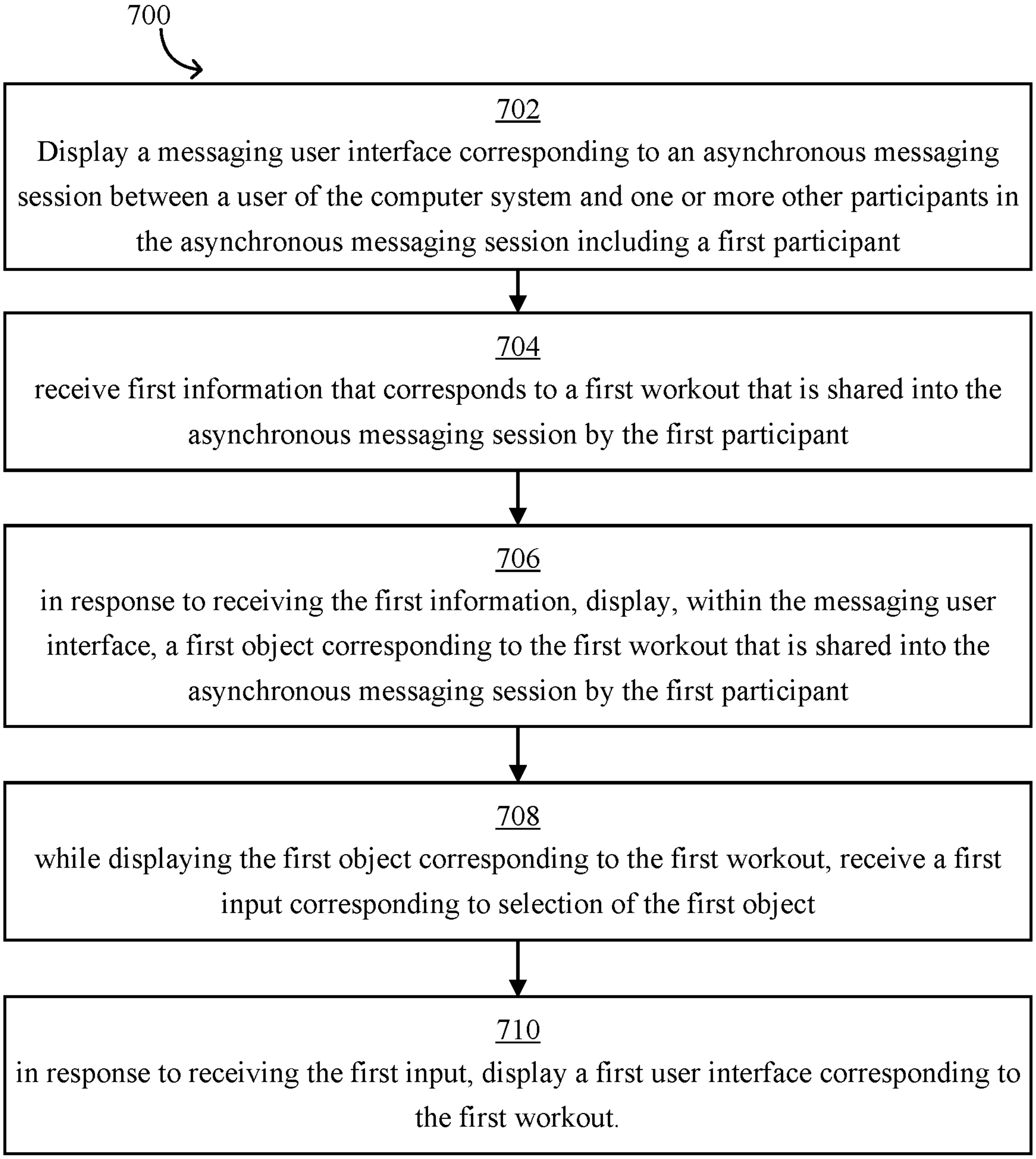
FIG. 7A illustrates a flow diagram depicting a method for accessing workout content, in accordance with some embodiments.
Figure 7B:
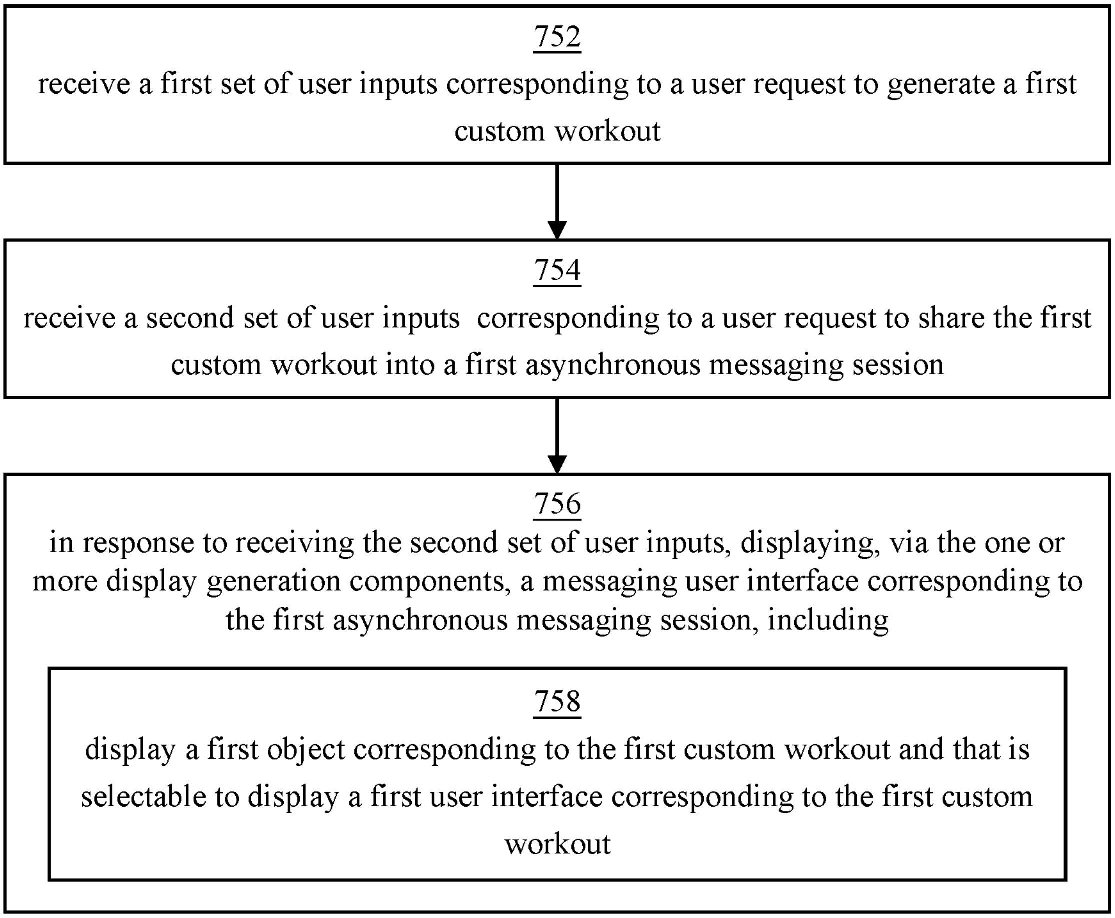
FIG. 7B illustrates a flow diagram depicting a method for sharing workout content, in accordance with some embodiments.

Below, FIGS. 1A-1B, 2, 3, 4A-4B, and 5A-5B provide a description of exemplary devices for performing the techniques for managing event notifications. FIGS. 6A-6AF illustrate exemplary user interfaces for sharing and accessing workout content, in accordance with some embodiments. FIG. 7A illustrates a flow diagram depicting a method for accessing workout content, in accordance with some embodiments. FIG. 7B illustrates a flow diagram depicting a method for sharing workout content, in accordance with some embodiments. The user interfaces in FIGS. 6A-6AF are used to illustrate the processes described below, including the processes in FIGS. 7A and 7B. FIGS. 8A-8K illustrate exemplary user interfaces for accessing workout content. FIG. 9 illustrates a flow diagram depicting a method for accessing workout content, in accordance with some embodiments. The user interfaces in FIGS. 8A-8K are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
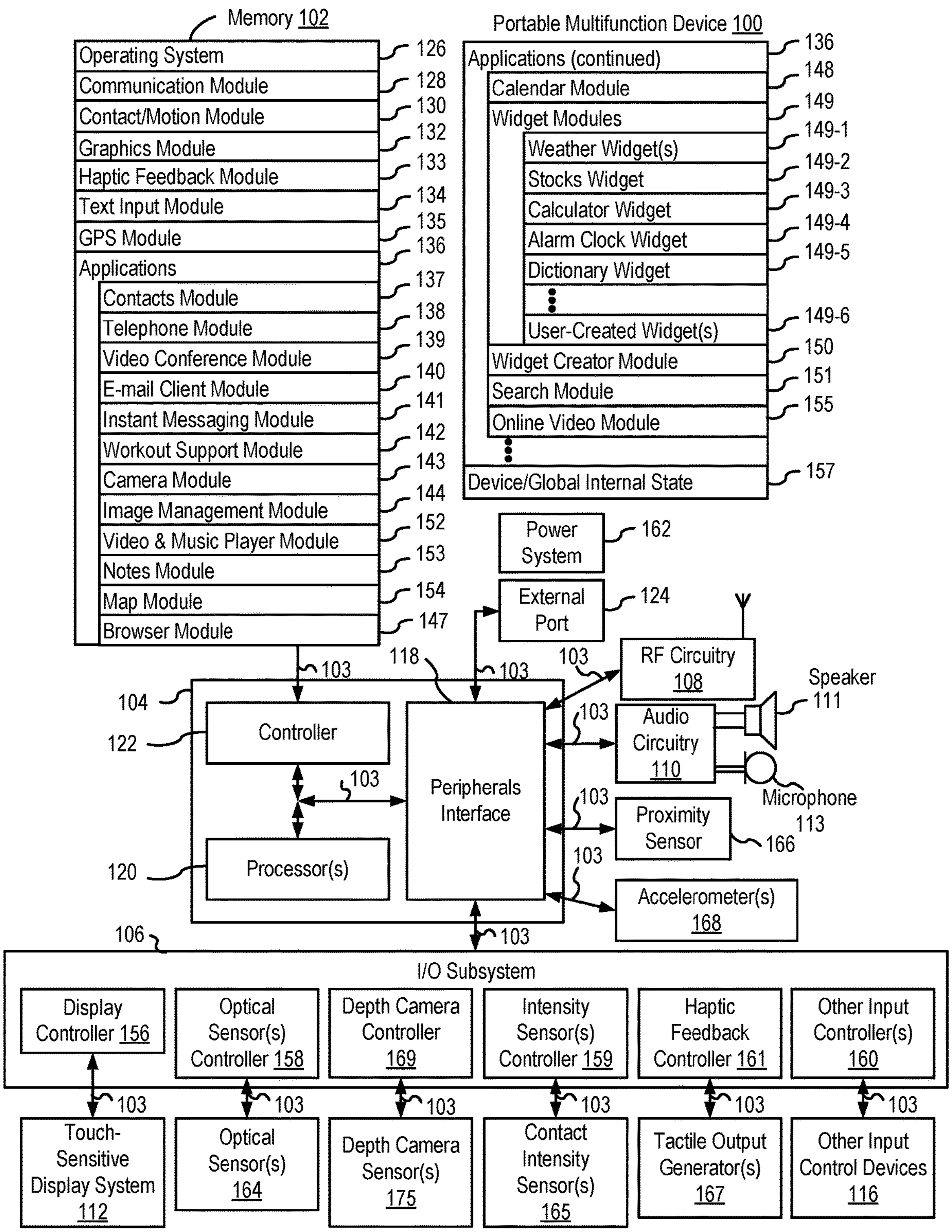
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
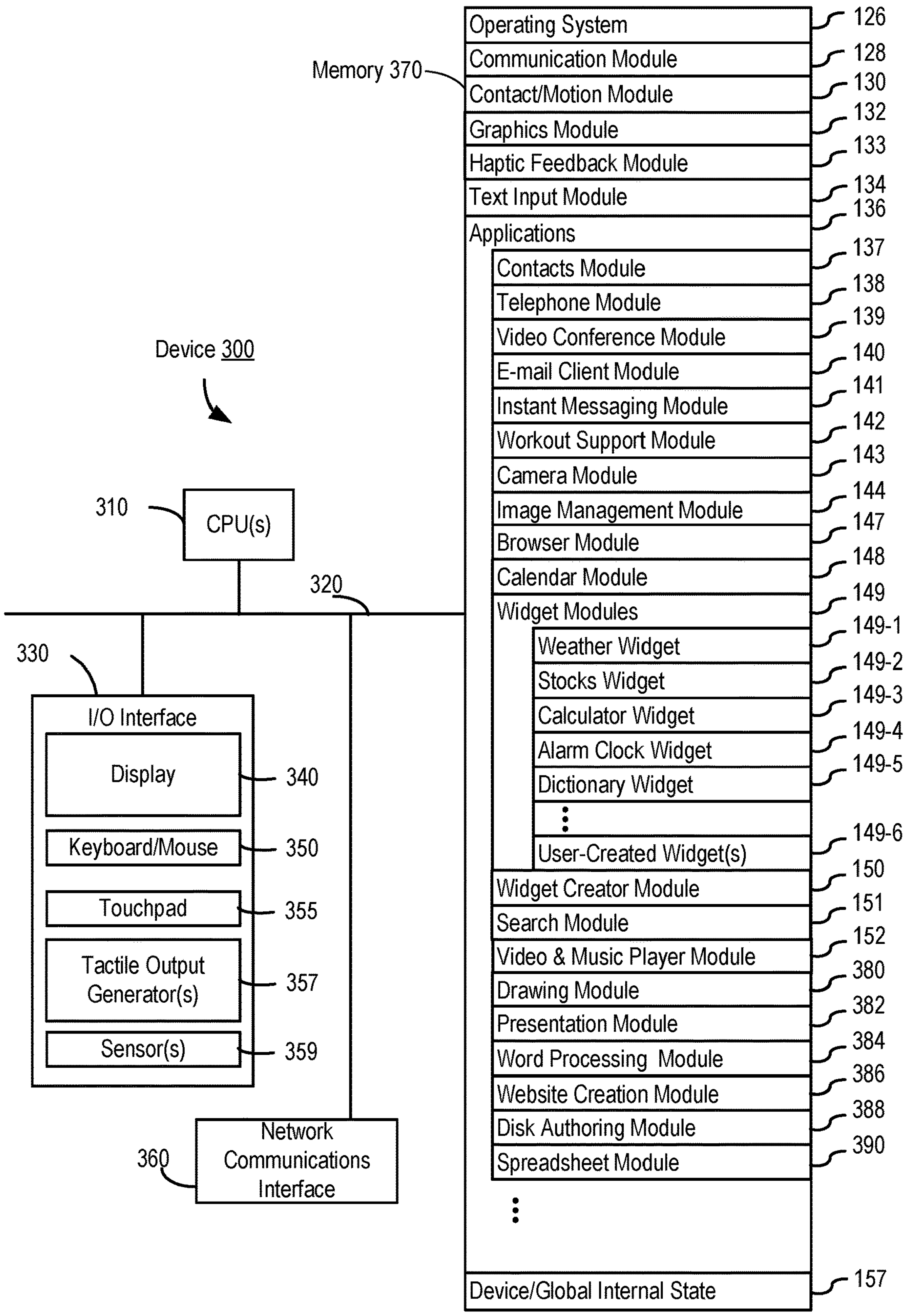
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts mode 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
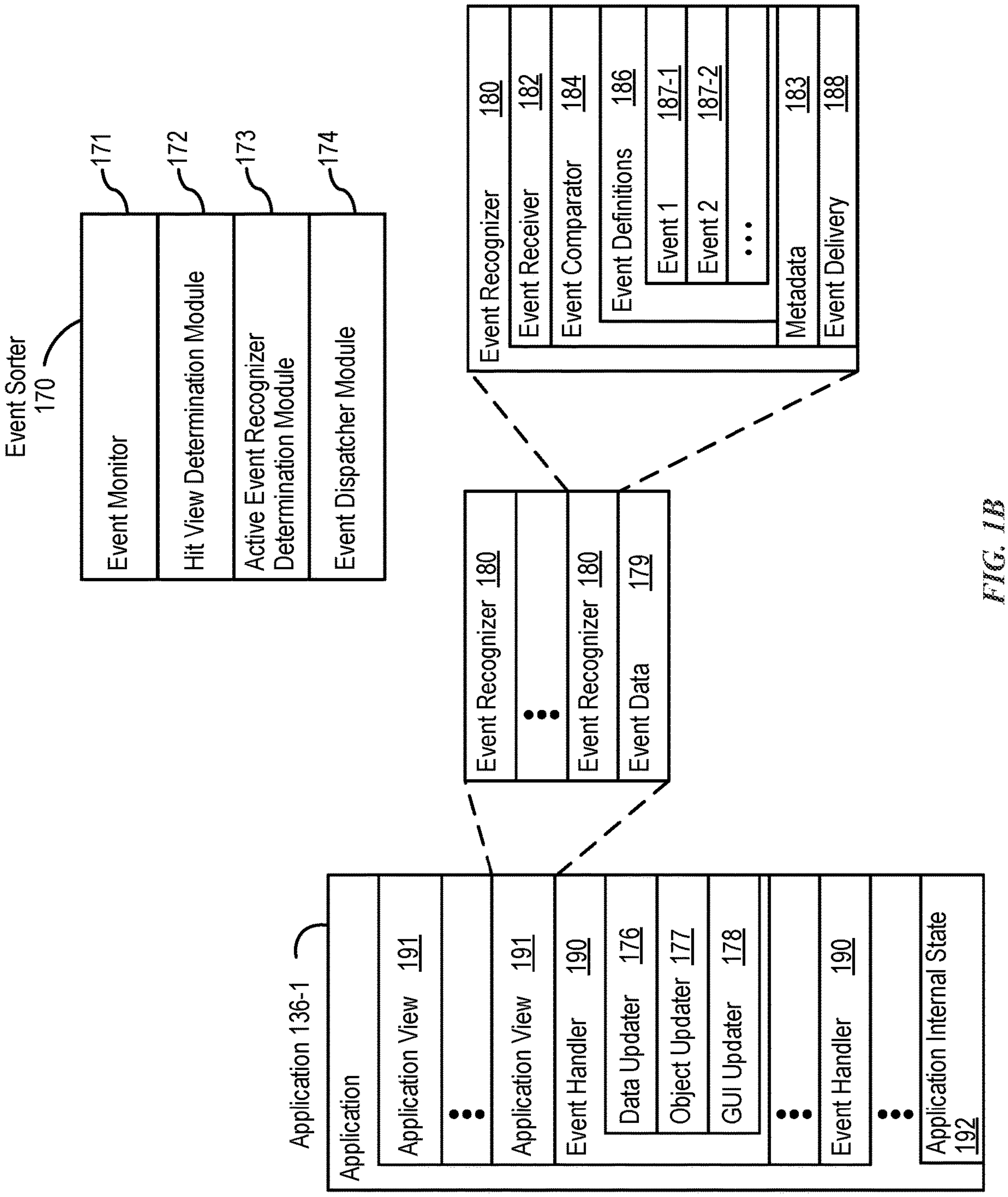
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
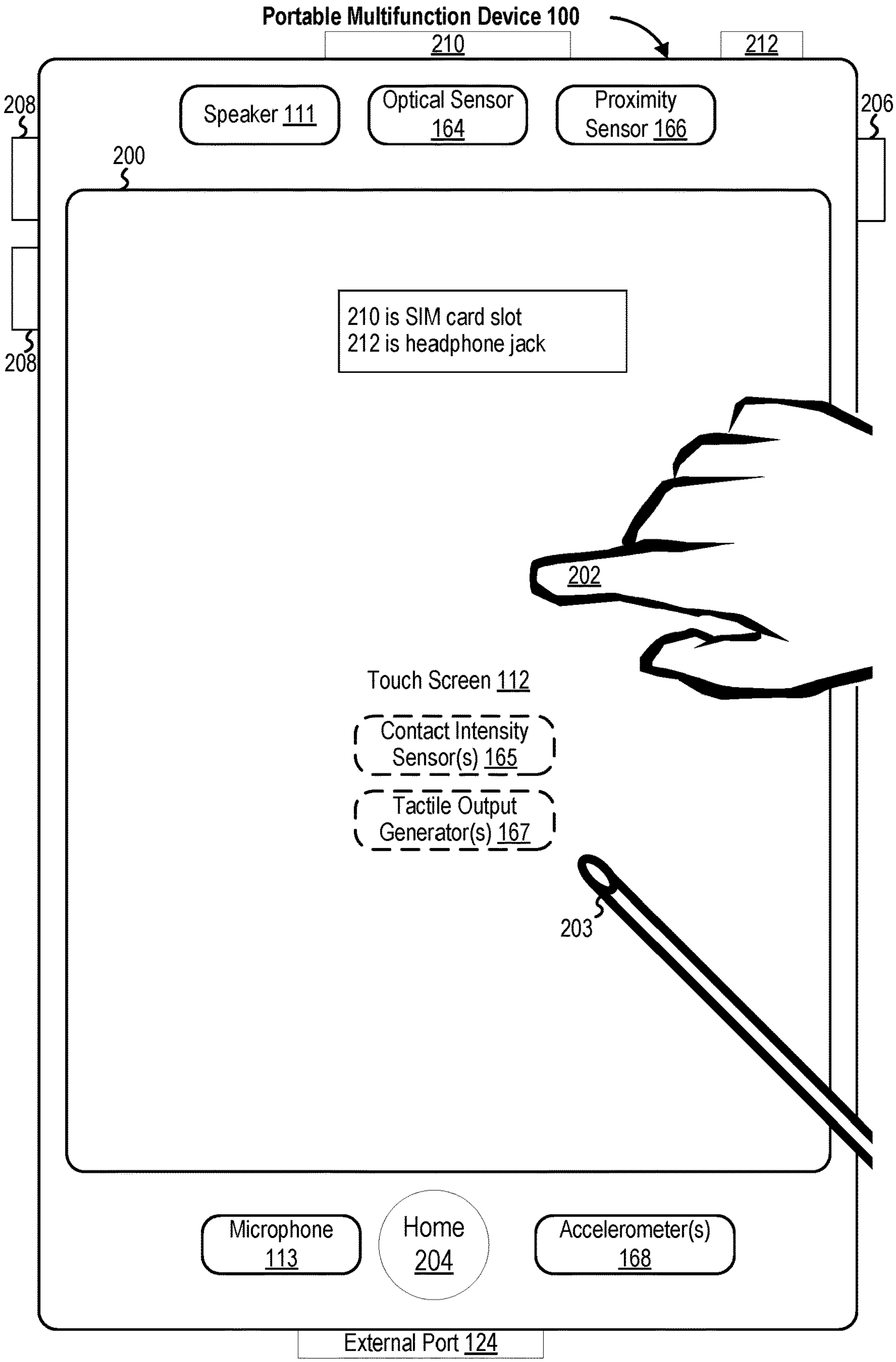
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as “home” or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child’s learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
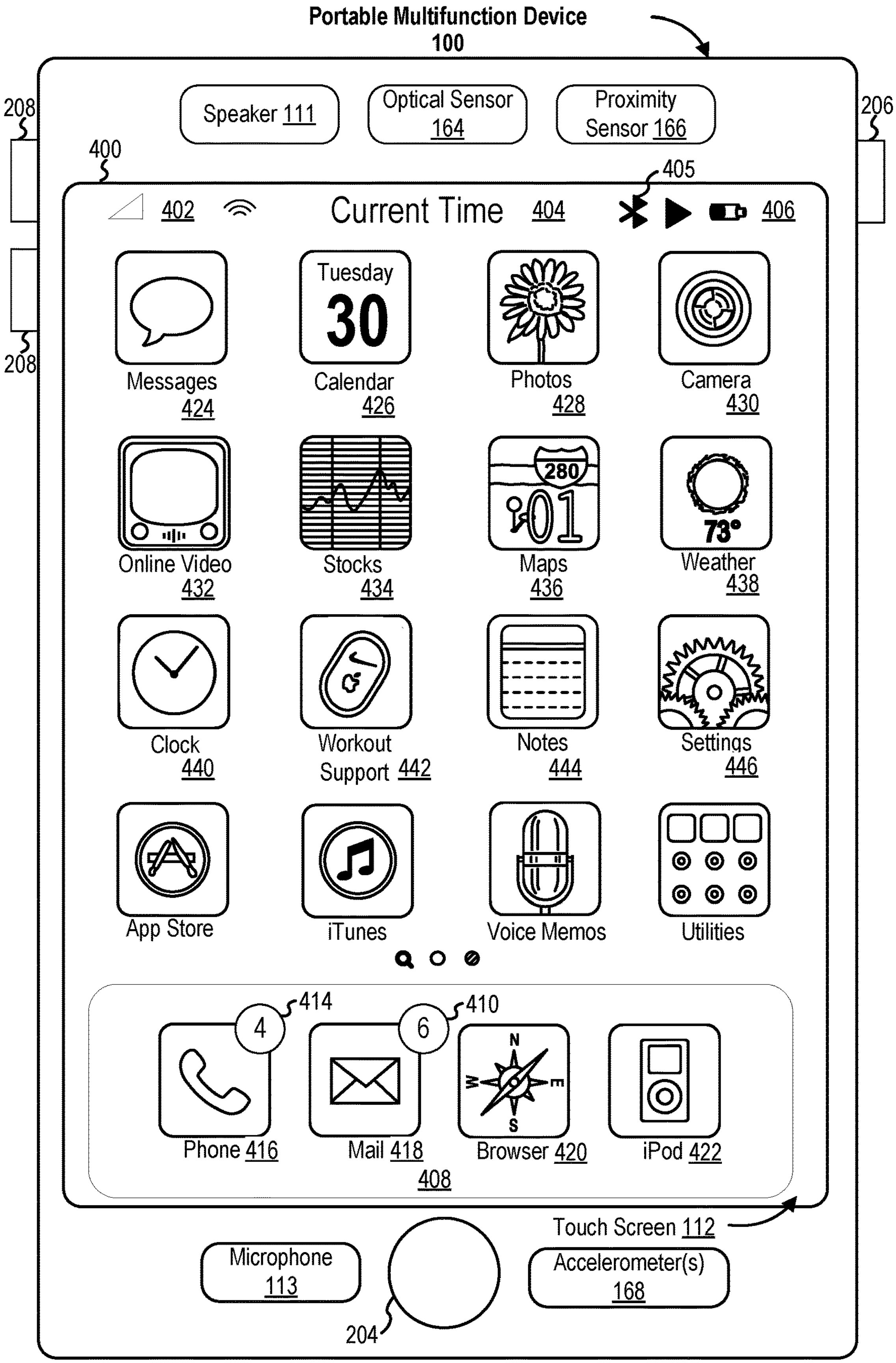
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled “Phone,” which optionally includes an indicator 414 of the number of missed calls or voicemail messages;
  - Icon 418 for e-mail client module 140, labeled “Mail,” which optionally includes an indicator 410 of the number of unread e-mails;
  - Icon 420 for browser module 147, labeled “Browser;” and
  - Icon 422 for video and music player module 152, also referred to as iPod (trademark of Apple Inc.) module 152, labeled “iPod;” and
- Icons for other applications, such as:
  - Icon 424 for IM module 141, labeled “Messages;”
  - Icon 426 for calendar module 148, labeled “Calendar;”
  - Icon 428 for image management module 144, labeled “Photos;”
  - Icon 430 for camera module 143, labeled “Camera;”
  - Icon 432 for online video module 155, labeled “Online Video;”
  - Icon 434 for stocks widget 149-2, labeled “Stocks;”
  - Icon 436 for map module 154, labeled “Maps;”
  - Icon 438 for weather widget 149-1, labeled “Weather;”
  - Icon 440 for alarm clock widget 149-4, labeled “Clock;”
  - Icon 442 for workout support module 142, labeled “Workout Support;”
  - Icon 444 for notes module 153, labeled “Notes;” and
  - Icon 446 for a settings application or module, labeled “Settings,” which provides access to settings for device 100 and its various applications 136.

It should be noted that the icon labels illustrated in FIG. 4A are merely exemplary. For example, icon 422 for video and music player module 152 is labeled “Music” or “Music Player.” Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
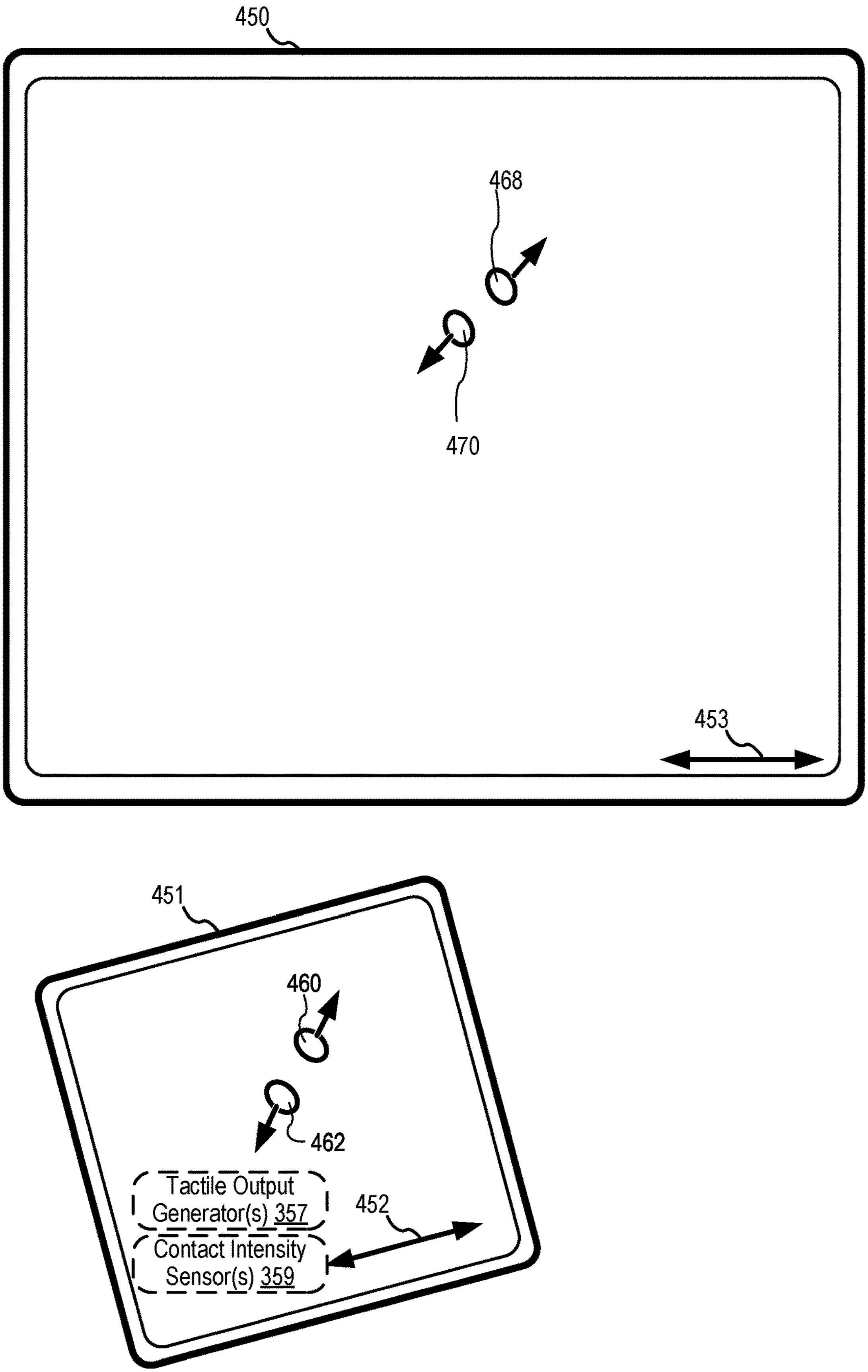
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
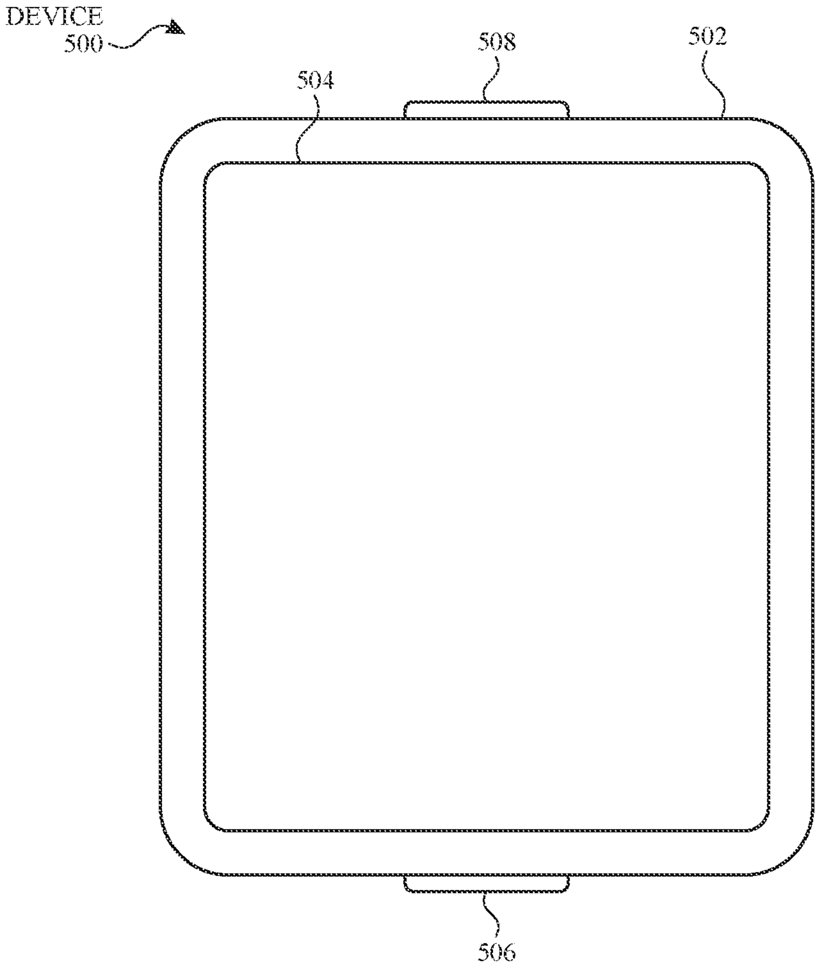
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
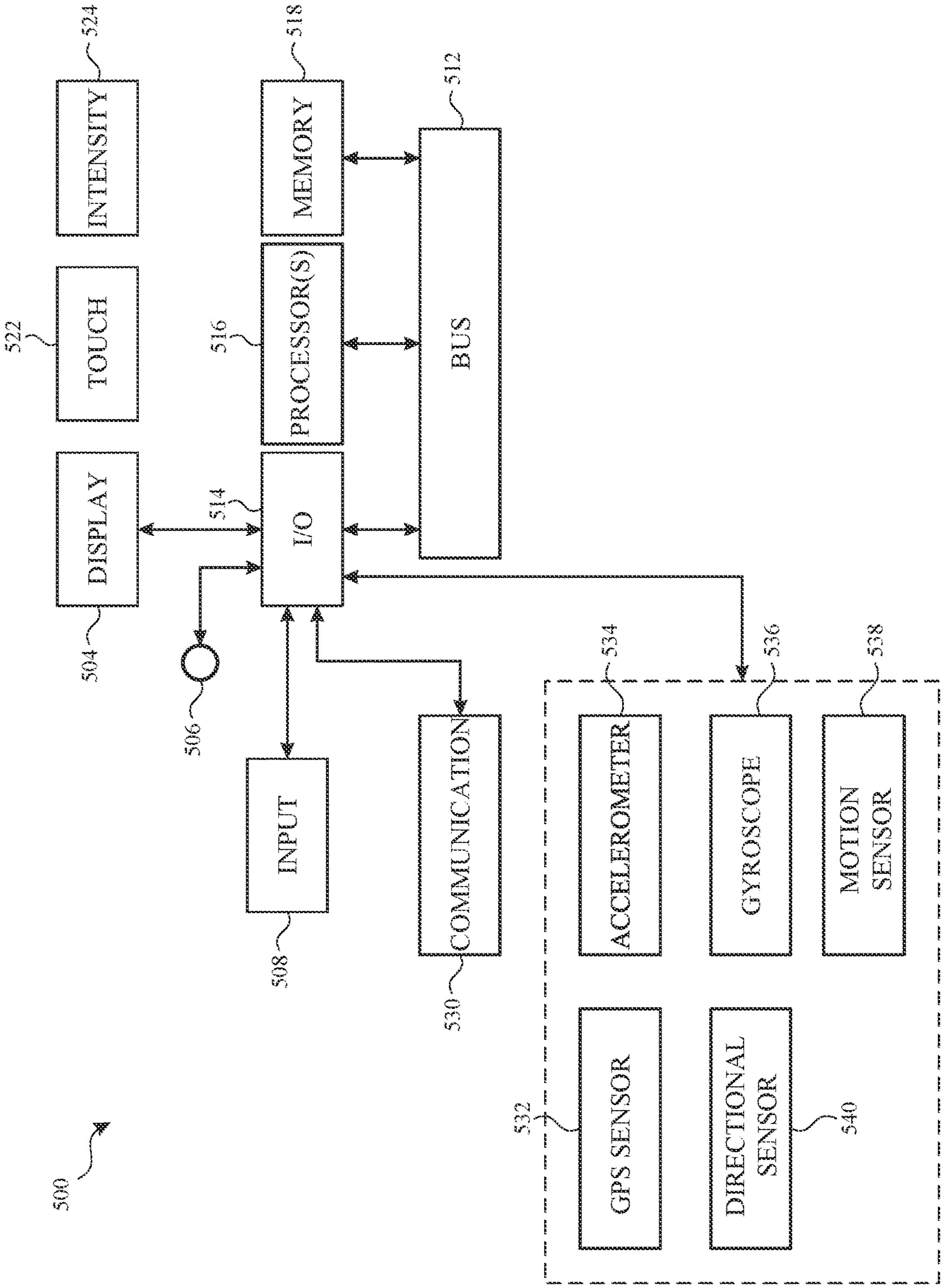
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 750, and 900 (FIGS. 7A, 7B, and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

FIGS. 6A-6AF illustrate exemplary user interfaces for sharing and accessing workout content, in accordance with some embodiments. The user interfaces in these figures are used to illustrate the processes described below, including the processes in FIGS. 7A and 7B.

FIG. 6A illustrates electronic device 600, which is a smartwatch with touch-sensitive display 602, rotatable and depressible input mechanism 604*a*, and button 604*b*. At FIG. 6A, electronic device 600 displays workout selection user interface 606. Workout selection user interface 606 includes various workout options 608*a*-608*g*, with each workout option 608*a*-608*g* corresponding to a particular workout (e.g., a preconfigured workout). Workout selection user interface 606 also includes option 608*h* that is selectable to initiate a process for creating and/or defining a new workout. In some embodiments, creating a new workout includes selecting a modality type for the workout, selecting a goal type for the workout and, if needed, defining a goal value for the selected goal type, as will be described in greater detail below.

In some embodiments, a workout includes (e.g., is defined by and/or is defined partially by) a modality type and a goal type. Furthermore, for certain goal types, a workout includes a goal value. For example, workout option 608*a* has outdoor run as its modality type, and open goal as its goal type. In some embodiments, an open goal workout does not have any defined duration or goal, so there is no goal value associated with an open goal workout. Workout option 608*b* has outdoor swim as its modality type, and distance goal as its goal type, and a goal value of 200 meters. Workout option 608*c* has multisport as its modality type. In some embodiments, workouts with multisport as their modality type do not have a goal type, but rather are defined by an ordered sequence of a plurality of workout segments, with each workout segment having its own modality type. For example, in FIG. 6A, workout option 608*c* is a preconfigured "triathlon" multisport workout that has three segments: an outdoor swim segment, an outdoor cycle segment, and an outdoor run segment. Option 608*d* is a workout that has outdoor run as its modality type, and race a route as its goal type, which is a workout in which a user races against a previous instance in which the user ran a particular route, and the goal value corresponds to the route the user completed previously (identified in FIG. 6A as "Palo Alto (5 MI)"). Option 608*e* corresponds to a workout with outdoor run as its modality type, and intervals as its goal type, and 3 by 2 miles as its goal value. Option 608*f* corresponds to a workout with outdoor bike as its modality type, time goal as its goal type, and 1 hour as its goal value. Option 608*g* corresponds to a workout with outdoor run as its modality type, time and distance as its goal type, and 30 minutes and 3 miles as its goal values.

In some embodiments, workout options 608*a*-608*g* are sorted and/or ordered based on one or more factors. In various embodiments, the one or more factors include one or more of: how recently the workout was completed by the user (e.g., workouts performed more recently by the user are given preference (e.g., a higher score and/or a higher ranking)), how recently the workout was created (e.g., workouts created more recently are given preference), how many times the user has completed the workout (e.g., workouts performed more often by the user are given preference), and/or other situational information (e.g., if the user is nearby a route that the user previously completed in a workout, a race-a-route workout option corresponding to the previously completed route is given preference). Furthermore, in some embodiments, electronic device 600 has more preconfigured workouts than what is shown in workout selection user interface 606, but a subset of those preconfigured workouts are presented in and/or included in workout selection user interface 606 based on the sorting and/or ranking of preconfigured workouts (e.g., the top x workouts are selected for display in workout selection user interface 606).

In the depicted embodiment, each workout option 608*a*-608*g* is selectable to initiate a corresponding workout session (e.g., a workout session corresponding to the workout represented by the workout option). Furthermore, each workout option 608*a*-608*g* has a corresponding option 608*i*-6080 that is selectable to view additional options corresponding to the selected workout. For example, for workout option 608*a*, a user is able to select workout option 608*a* to initiate an open goal outdoor run workout session (and display a corresponding in-workout user interface), or select option 608*i* to display additional options corresponding to the outdoor run open goal workout. At FIG. 6A, electronic device 600 detects user input 610 (e.g., a tap input) corresponding to selection of option 608*m*.

Figure 6B:
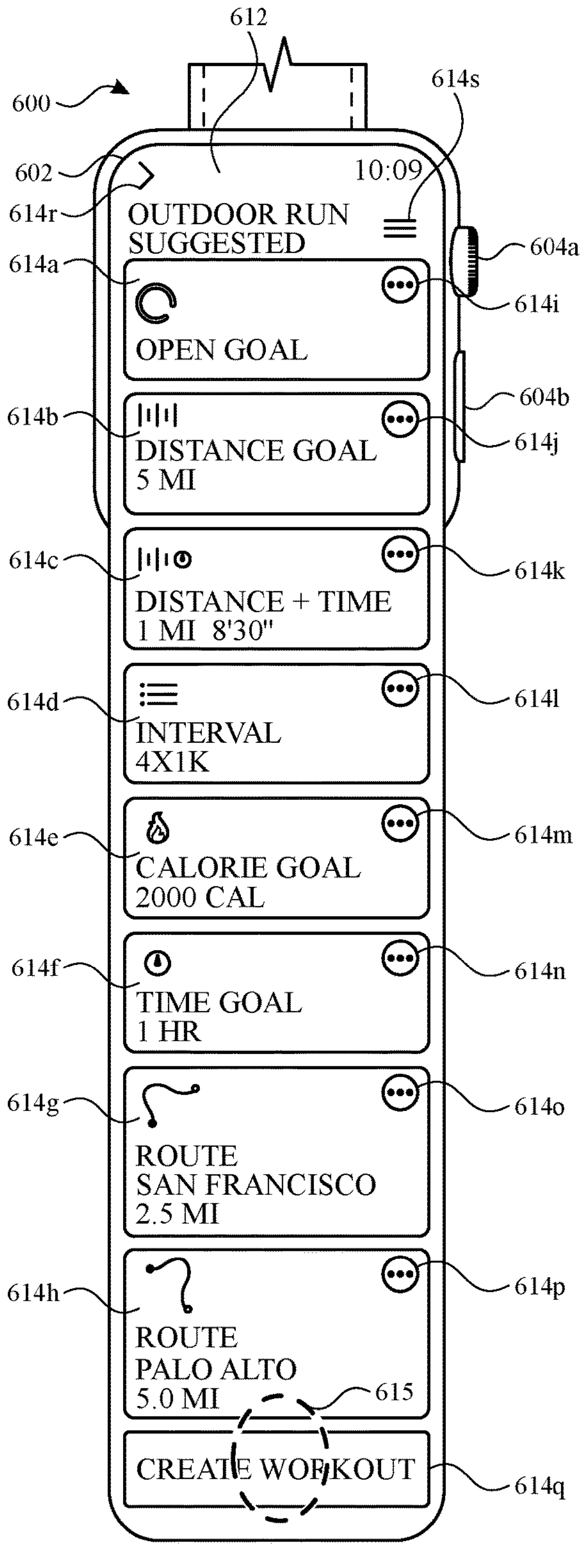

At FIG. 6B, in response to user input 610, electronic device displays outdoor run room user interface 612 (e.g., based on the fact that option 608*m* corresponds to a preconfigured workout that has outdoor run as its modality type). In FIG. 6B, outdoor run room user interface 612 includes options 614*a*-614*h* corresponding to a plurality of preconfigured workouts of the outdoor run modality type. Each option 614*a*-614*h* is selectable to initiate a workout session (and, in some embodiments, display a corresponding in-workout user interface) for the selected workout. Furthermore, each option 614*a*-614*h* includes a corresponding option 614*i*-614*p* that is selectable to display one or more options for modifying one or more aspects of the selected workout. Outdoor run room user interface 612 also includes option 614*q* that is selectable to create a new outdoor run interval workout. At FIG. 6B, electronic device 600 detects user input 615 corresponding to selection of option 614*q*.

Figure 6C:
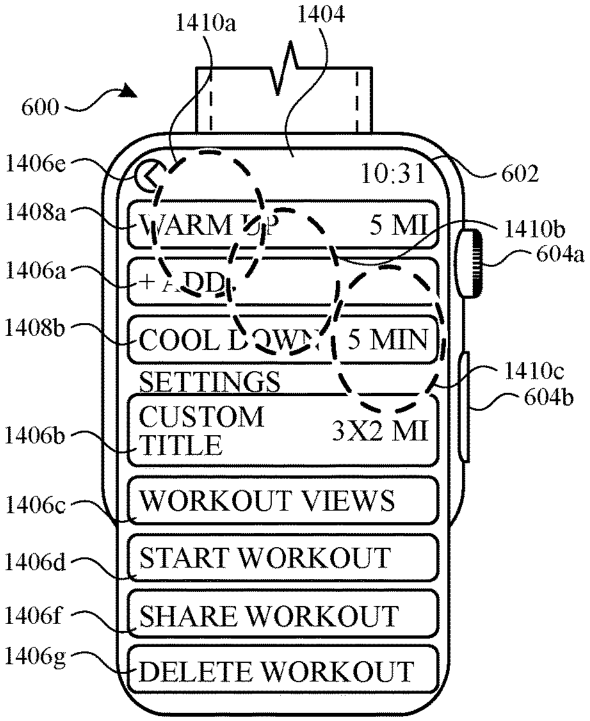

At FIG. 6C, in response to user input 615, electronic device 600 displays interval workout creation user interface 1404. Interval workout creation user interface 1404 includes segment representation 1408*a* corresponding to a warm up segment of the interval workout and segment representation 1408*b* corresponding to a cool down segment of the interval workout.

In FIG. 6C, interval workout creation user interface 1404 also includes selectable options 1406*a*-1406*g*. Option 1406*a* is selectable to initiate a process for adding a segment to the interval workout. Option 1406*b* is selectable to modify a title of the interval workout. Option 1406*b* displays the current title, "3×2 MI." Option 1406*c* is selectable to modify one or more workout metrics and/or workout metrics user interfaces that are accessible during the interval workout. Option 1406*d* is selectable to initiate a workout session for the interval workout as it is currently configured (in FIG. 6C, it is configured with only a 5 mile warm up and a 5 minute cool down). Option 1406*f* is selectable to share the workout with another person, as will be described in greater detail below. Option 1406*g* is selectable to delete the interval workout. Option 1406*e* is selectable to return to outdoor run room user interface 612. At FIG. 6C, electronic device 600 detects user input 1410*a* (e.g., a tap input) corresponding to selection of segment representation 1408*a*, user input 1410*b* (e.g., a tap input) corresponding to selection of option 1406*a*, and user input 1410*c* (e.g., a tap input) corresponding to selection of segment representation 1408*b*. Each of these user inputs will be discussed below.

Figure 6D:
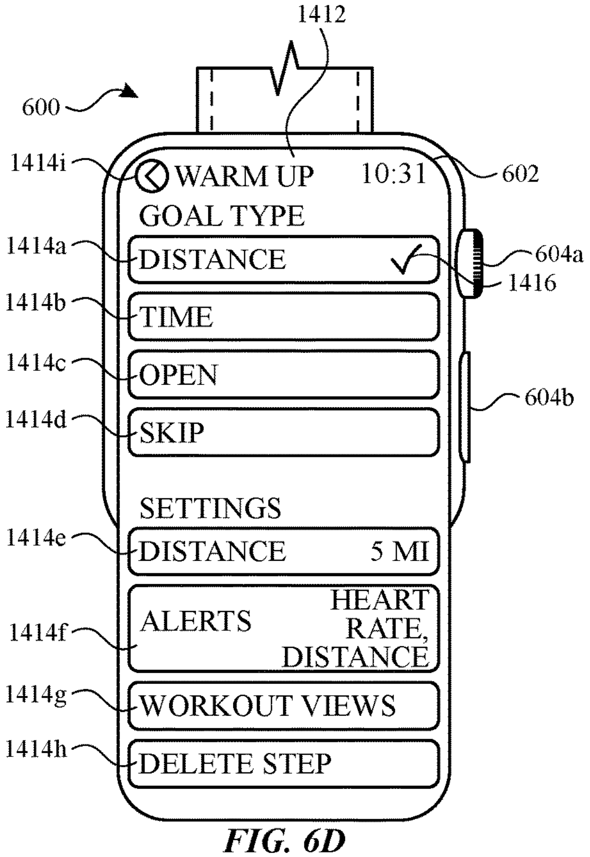

At FIG. 6D, in response to user input 1410*a*, electronic device 600 displays warm up segment configuration user interface 1412. Warm up segment configuration user interface 1412 includes options 1414*a*-1414*d* that are selectable to set a goal type for the warm up segment. Indication 1416 indicates that distance goal is the currently selected goal type for the warm up segment. In some embodiments, in an interval workout, each segment of the workout is associated with a goal type and a goal value, and the segment of the workout automatically ends once the goal value is achieved. For example, in FIG. 6D, the warm up segment has distance goal as its goal type, and goal value of 5 miles, such that once the user has run 5 miles (e.g., as determined by electronic device 600), electronic device 600 automatically ends the warm up segment and transitions to a next segment of the workout. Warm up segment configuration user interface 1412 also includes selectable options 1414*e*-1414*i*. Option 1414*e* is selectable to define a goal value for the workout segment. Option 1414*f* is selectable to modify one or more alerts that are to be output during the segment. Option 1414*g* is selectable to modify one or more workout metrics and/or workout metrics user interfaces that are accessible during the workout segment. In some embodiments, the user can define alerts and/or workout metrics for each individual segment of the interval workout. Option 1414*h* is selectable to delete the workout segment from the interval workout. Option 1414*i* is selectable to return to interval workout creation user interface 1404.

Figure 6E:
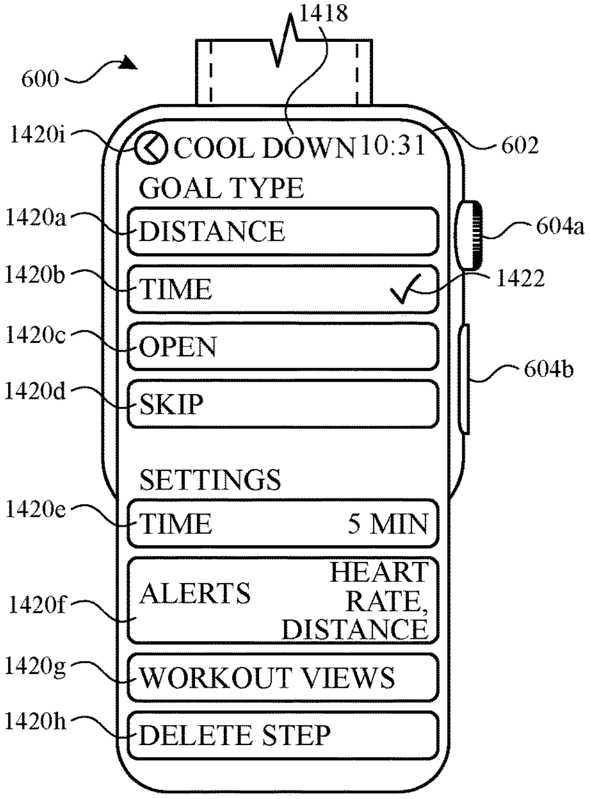

At FIG. 6E, in response to user input 1410*c* (in FIG. 6C), electronic device 600 displays cool down segment configuration user interface 1418, which is substantially similar to warm up segment configuration user interface 1412. Options 1420*a*-1420*d* are selectable to choose a goal type for the cool down segment, and option 1420*e* is selectable to define a goal value for the cool down segment. Currently, the cool down segment is configured as a time goal segment with a time goal value of 5 minutes. Option 1420*f* is selectable to modify alerts to be output during the cool down segment, option 1420*g* is selectable to modify workout metrics that are accessible during the cool down segment, option 1420*h* is selectable to remove the cool down segment from the interval workout, and option 1420*i* is selectable to return to interval workout creation user interface 1404.

Figure 6F:
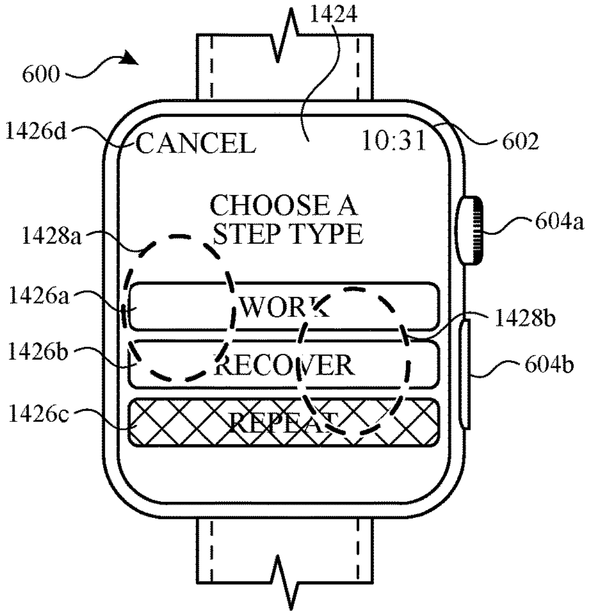

At FIG. 6F, in response to user input 1410*b* (in FIG. 6C), electronic device 600 displays segment type user interface 1424, which includes options 1426*a*-1426*d*. Option 1426*a* is selectable to add a work step to the interval workout and option 1426*b* is selectable to add a recovery step to the interval workout. In some embodiments, segment type user interface 1424 includes options to add other segment types, such as a warm up segment, a cool down segment, or other segments. In FIG. 6F, step type user interface includes option 1426*c*, which is made to be not selectable in FIG. 6F because the interval workout does not have any repeatable segments (e.g., the warm up segment and the cool down segment are the only segments current in the interval workout, and, in the depicted embodiment, they are non-repeatable segments). Accordingly, repeat option 1426*c* is not selectable in FIG. 6F. Option 1426*d* is selectable to return to interval workout creation user interface 1404. At FIG. 6F, electronic device 600 detects user input 1428*a* (e.g., a tap input) corresponding to selection of option 1426*a*, and user input 1428*b* (e.g., a tap input) corresponding to selection of option 1426*b*.

Figure 6G:
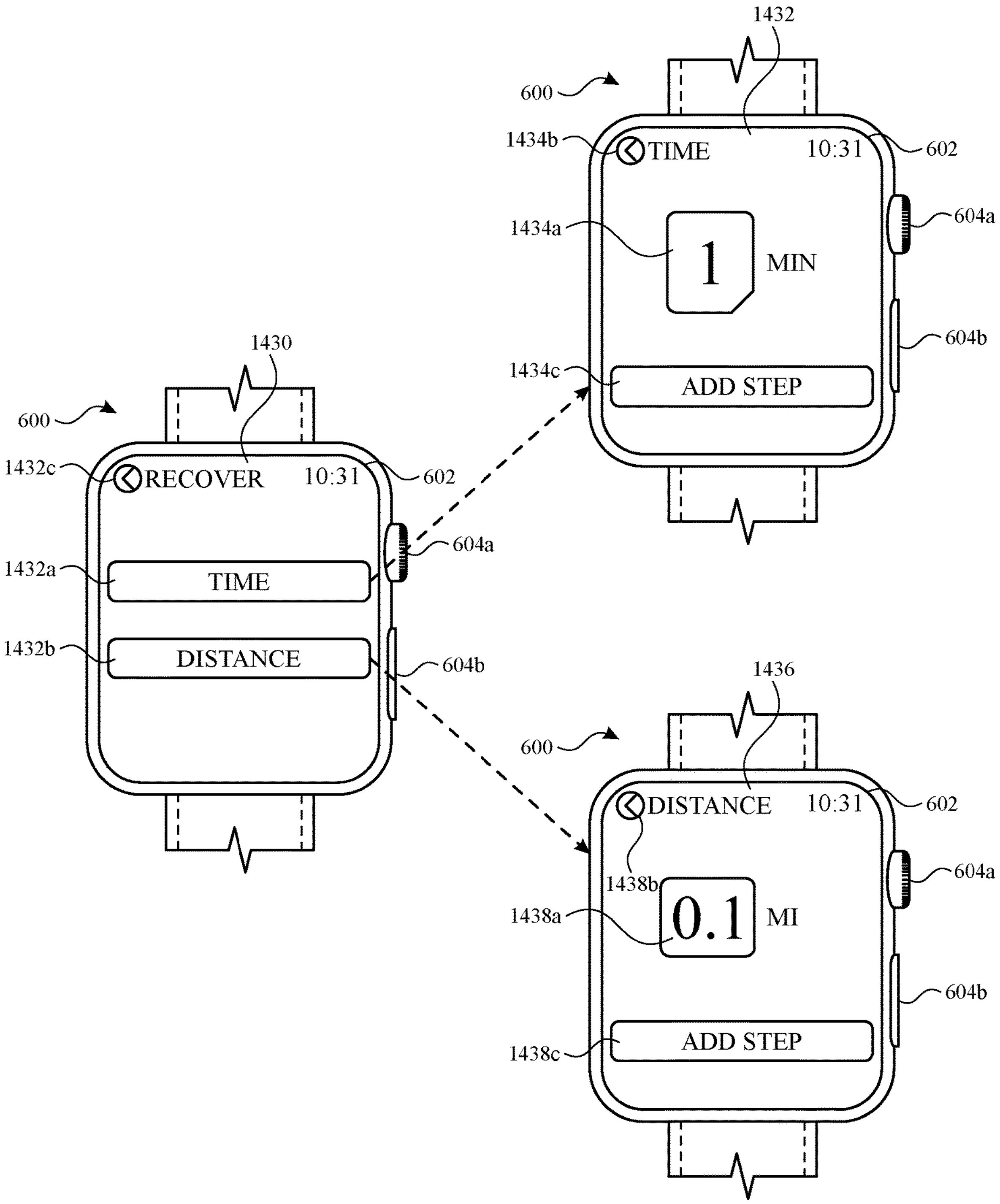

At FIG. 6G, in response to user input 1426*b*, electronic device 600 displays user interface 1430, which allows the user to select a goal type for the recovery segment the user would like to add to the interval workout. Option 1432*a* is selectable to add a recovery step with a time goal as its goal type, and option 1432*b* is selectable to add a recovery step with a distance goal as its goal type. Selecting option 1432*a* causes electronic device 600 to display user interface 1432 to define a goal value for the time goal, and selecting option 1432*b* causes electronic device 600 to display user interface 1436 to define a goal value for the distance goal. Selection of option 1434*c* results in a time-based recovery step being added to the interval workout, and selection of option 1438*c* results in a distance-based recovery step being added to the interval workout.

Figure 6H:
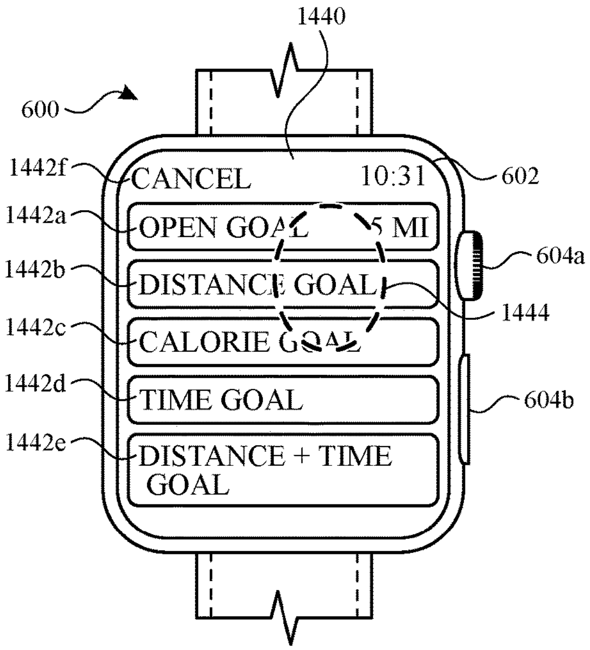

At FIG. 6H, in response to user input 1426*a* (in FIG. 6F), electronic device 600 displays user interface 1440 which allows a user to select a goal type for the work step the user would like to add to the interval workout. Option 1442*a* corresponds to an open goal goal type, option 1442*b* corresponds to a distance goal goal type, option 1442*c* corresponds to a calorie goal goal type, option 1442*d* corresponds to a time goal goal type, and option 1442*e* corresponds to a distance+time goal goal type. Option 1442*f* is selectable to return to interval workout creation user interface 1404. At FIG. 6H, electronic device 600 detects user input 1444 (e.g., a tap input) corresponding to selection of option 1442*b*.

Figure 6I:
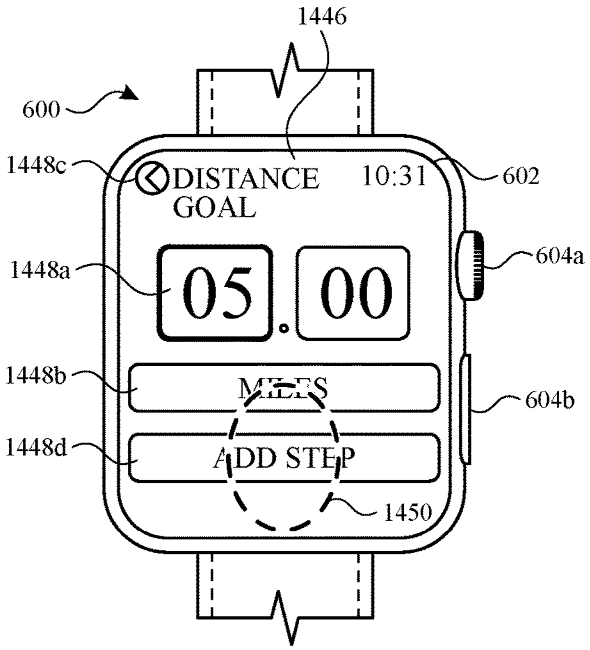

At FIG. 6I, in response to user input 1444, electronic device 600 displays user interface 1446 which prompts the user to set a distance goal value. Had the user chosen a different goal type in FIG. 6H, electronic device 600 would display a different user interface prompting the user to define a goal value for the selected goal type. In some embodiments, the user can adjust the goal value up or down by, for example, rotating rotatable input mechanism 604*a*. In FIG. 6I, electronic device 600 detects user input 1450 (e.g., a tap input) corresponding to selection of option 1448*d*.

Figure 6J:
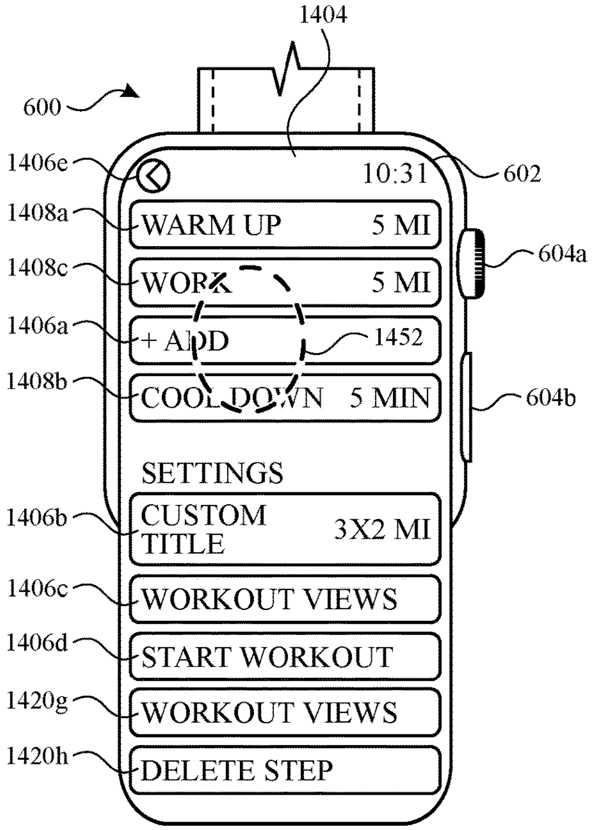

At FIG. 6J, in response to user input 1450, electronic device 600 displays interval workout creation user interface 1404 with a new segment representation 1408*c* representing the 5-mile work segment that was added in response to user input 1450. At FIG. 6J, electronic device 600 detects user input 1452 (e.g., a tap input) corresponding to selection of option 1406*a*.

Figure 6K:
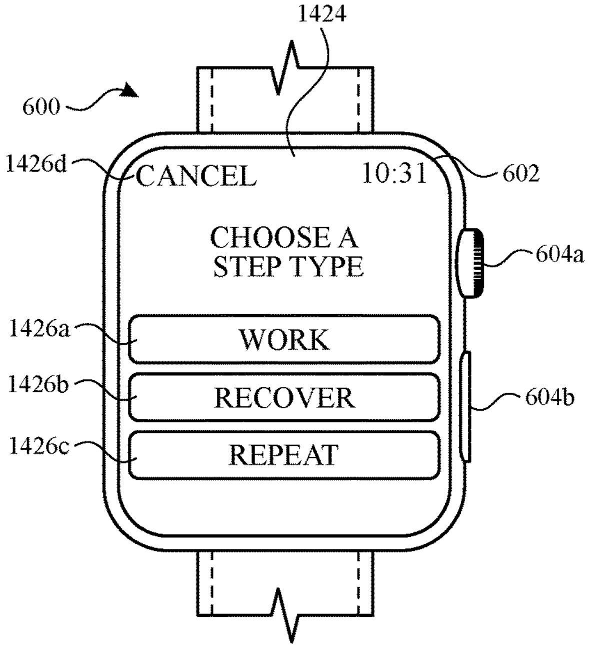

At FIG. 6K, in response to user input 1452, electronic device 600 displays segment type user interface 1424. However, now that a repeatable segment has been added to the interval workout (e.g., the 5-mile work step represented by representation 1408*c*), segment type user interface 1424 now includes selectable option 1426*c*. Details of selectable option 1426*c* will be explored in the next few figures.

Figure 6L:
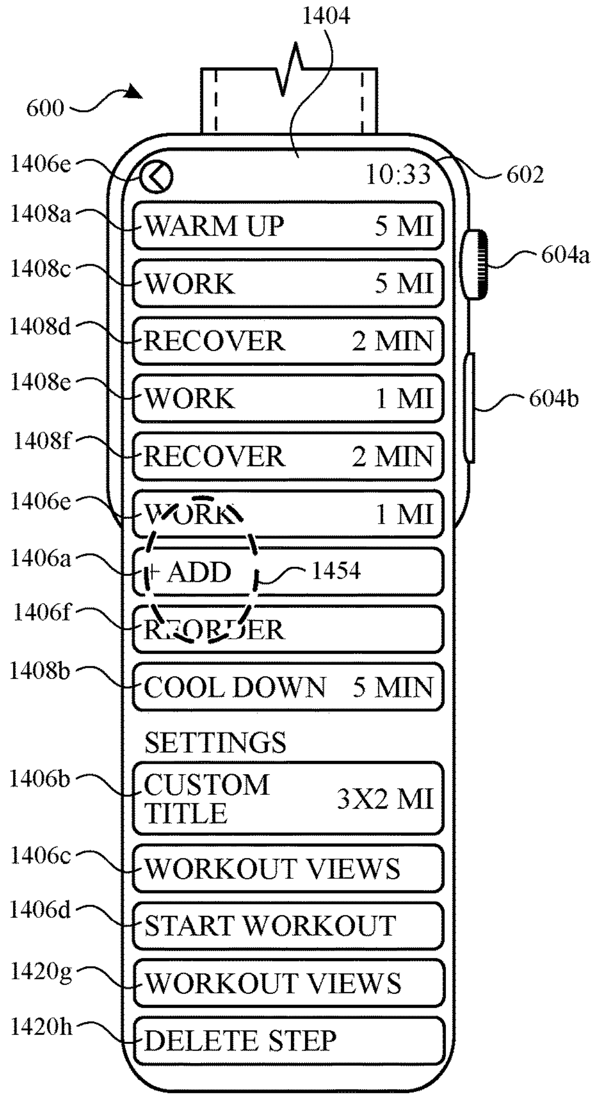

At FIG. 6L, the user has added four additional segments represented by segment representations 1408*d*-1408*g* (e.g., using the steps described above with reference to FIGS. 6C-6J). At FIG. 6L, electronic device 600 detects user input 1455 (e.g., a tap input) corresponding to selection of option 1406*a*.

Figure 6M:
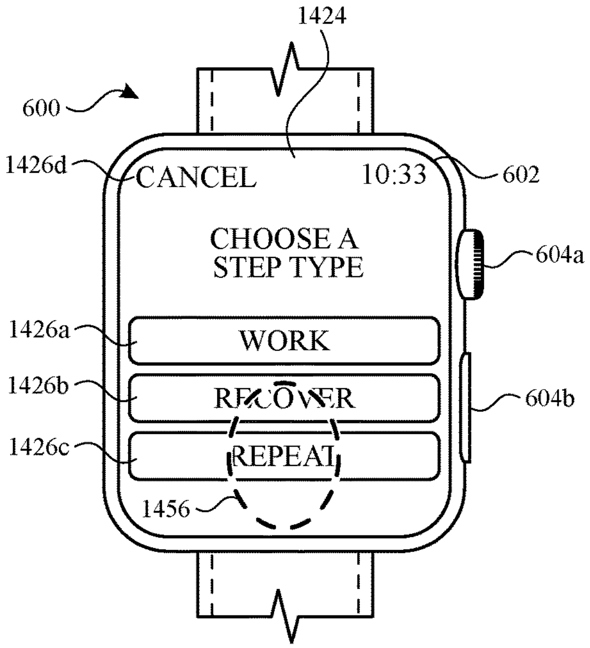

At FIG. 6M, in response to user input 1455, electronic device 600 displays segment type user interface 1424 which, in accordance with a determination that the interval workout includes one or more repeatable segments, including selectable option 1426*c*. At FIG. 6M, electronic device 600 detects user input 1456 (e.g., a tap input) corresponding to selection of option 1426*c*.

Figure 6N:
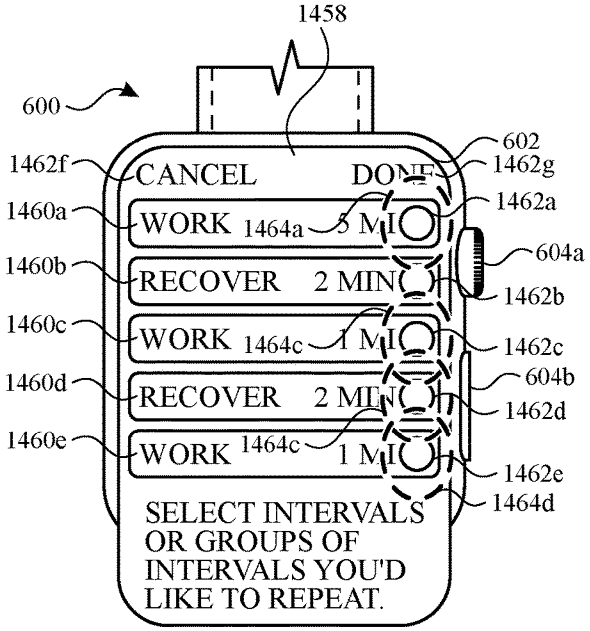

At FIG. 6N, in response to user input 1456, electronic device displays user interface 1458, which displays options 1462*a*-1462*e* corresponding to each repeatable segment in the interval workout. By interacting with user interface 1458, the user is able to identify which repeatable segment the user would like to repeat in the interval workout. At FIG. 6N, electronic device 600 detects user input 1464*a* (e.g., a tap input) corresponding to selection of option 1462*a*, user input 1464*c* (e.g., a tap input) corresponding to selection of option 1462*c*, user input 1464*d* (e.g., a tap input) corresponding to selection of option 1462*d*, and user input 1464*e* (e.g., a tap input) corresponding to selection of option 1462*e*.

Figure 6O:
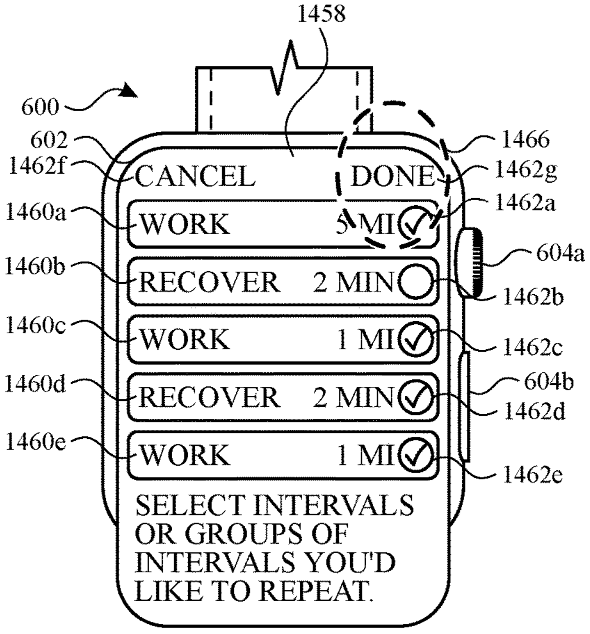

At FIG. 6O, in response to user inputs 1464*a*, 1464*c*, 1464*d*, and 1464*c*, electronic device 600 displays user interface 1458 with options 1462*a*, 1462*c*, 1462*d*, and 1462*e* displayed in a manner indicating that their corresponding segments have been selected for repetition. At FIG. 6O, electronic device 600 detects user input 1466 corresponding to selection of done option 1462*g*.

Figure 6P:
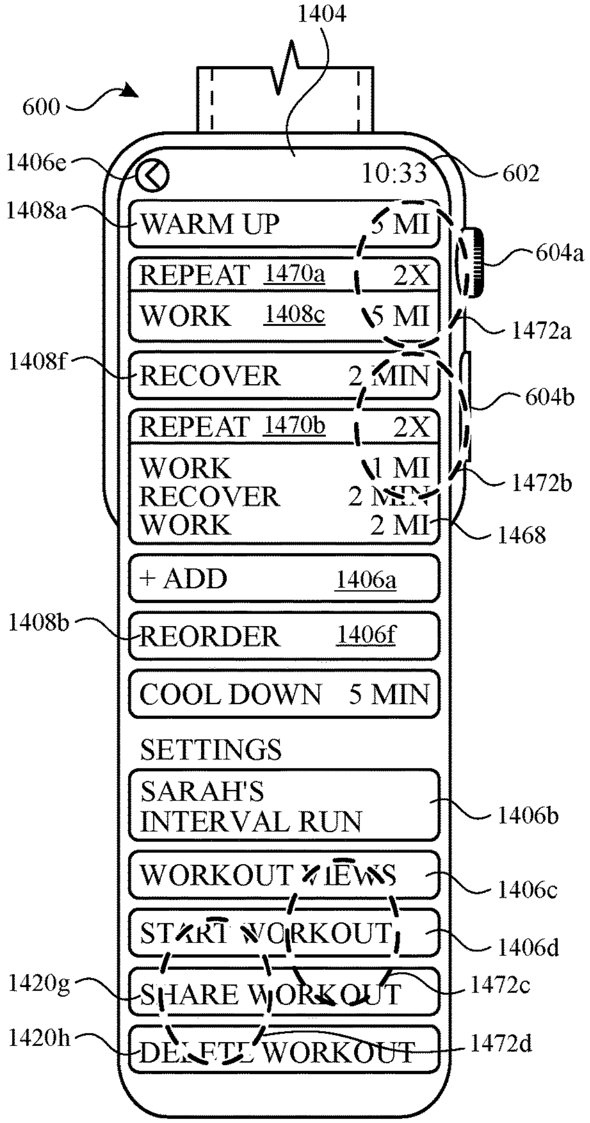

At FIG. 6P, in response to user input 1466, electronic device 600 displays interval workout creation user interface 1404 with various modifications. Segment representation 1408*c* is now display with indication 1470*a* indicating that the workout segment corresponding to segment representation 1408*c* is to be repeated two times. Additionally, in accordance with a determination that segment representations 1408*e*, 1408*f*, and 1408*g* were selected for repetition and are adjacent to one another, segment representations 1408*e*, 1408*f*, 1408*g*, are grouped into a single grouping 1468, and grouping 1468 is displayed with indication 1470*b* indicating that the entire grouping 1468 is to be repeated two times during the interval workout.

Figure 6Q:
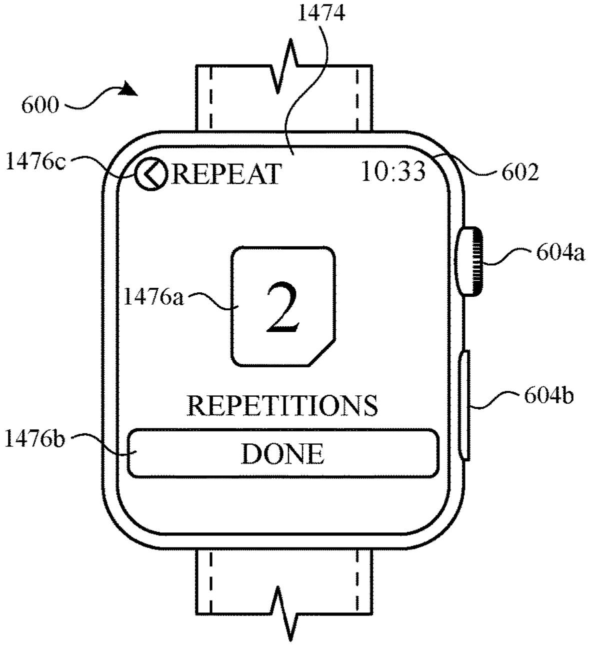

At FIG. 6P, electronic device 600 detects user input 1472*a* (e.g., a tap input) corresponding to selection of indication 1470*a*, and user input 1472*b* (e.g., a tap input) corresponding to selection of indication 1470*b*. At FIG. 6Q, in response to user input 1472*a* and/or in response to user input 1472*b*, electronic device 600 displays user interface 1474, that allows the user to define how many times the segment and/or the group of segments should be repeated. In some embodiments, a user defines the number of repetitions by, for example, rotating rotatable input mechanism 604*a* to adjust repetition indication 1476*a*, and selecting done option 1476*b*.

Returning to FIG. 6P, electronic device 600 further detects user input 1472*c* (e.g., a tap input) corresponding to selection of option 1406*d* and user input 1472*d* (e.g., a tap input) corresponding to selection of option 1406*g*.

Figure 6R:
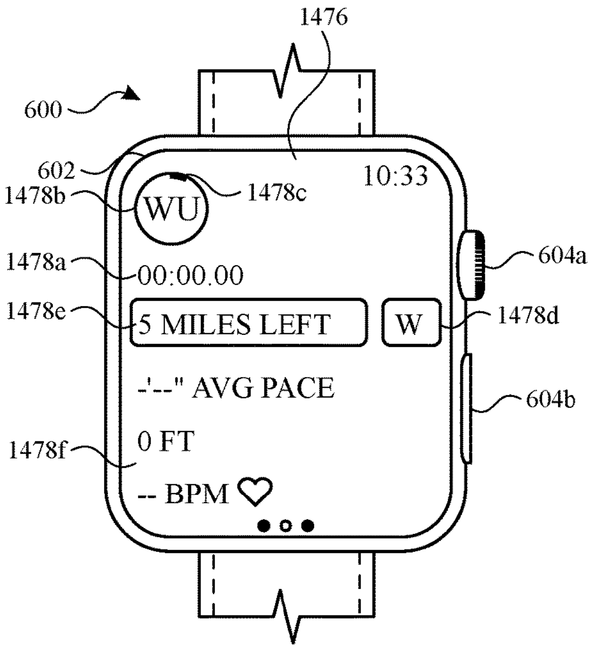

At FIG. 6R, in response to user input 1472*c*, electronic device 600 displays interval workout in-workout user interface 1477. Interval workout in-workout user interface includes a set of workout metrics 1478*f*. In some embodiments, the user can display different workout metrics by, for example, rotating rotatable input mechanism 604*a*. Interval workout in-workout user interface 1477 also includes segment type indication 1478*b*, which identifies the type of segment that is currently taking place (e.g., WU in FIG. 6R indicates that the current segment is a warm up segment). Segment type indication 1478*b* is surrounded by segment progress indication 1478*c*, which is indicative of the progress the user has made in completing the current workout segment. Interval workout in-workout user interface 1477 also includes indication 1478*c*, which indicates how close the user is to completing the current workout segment (e.g., based on the goal value of the current workout segment). For example, in FIG. 6R, indication 1478*c* indicates that there are 5 miles left until the next workout segment. If the warm up segment had been a time-based warm up segment, indication 1478*e* could indicate that there are 5 minutes left until the next workout segment. Interval workout in-workout user interface 1477 also includes next interval indication 1478*d*, which indicates the segment type for the next upcoming workout segment (e.g., W in FIG. 6R indicates that the next upcoming workout segment is a work type workout segment), as well as elapsed time indication 1478*a* which indicates how much time has elapsed in the workout.

Figure 6S:
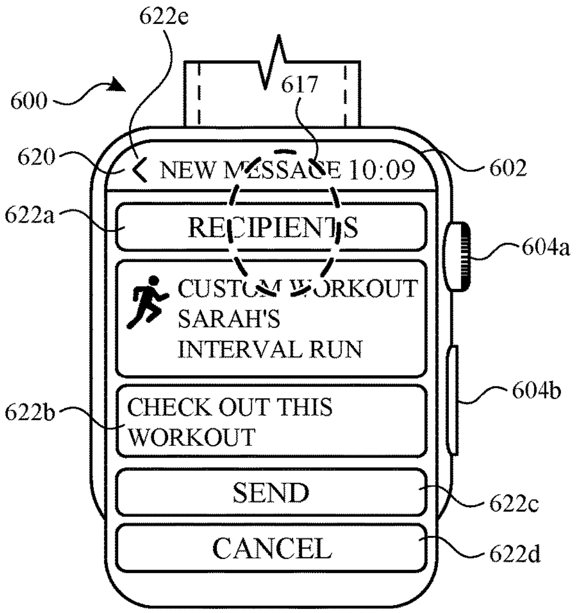

At FIG. 6S, in response to user input 1472*d*, electronic device 600 displays workout sharing user interface 620. Workout sharing user interface 620 includes options 622*a*-622*e*. Option 622*a* is selectable to identify one or more contacts to send the interval workout to. Option 622*b* is selectable to modify a message that is transmitted with the interval workout. Option 622*c* is selectable to send the interval workout to another user. Option 622*d* is selectable to cease display of workout sharing user interface 620 without sending and/or sharing the workout. Option 622*e* is selectable to return to user interface 1404 without sending and/or sharing the workout. At FIG. 6S, electronic device 600 detects user input 617 (e.g., a tap input) corresponding to selection of option 622*a*.

Figure 6T:
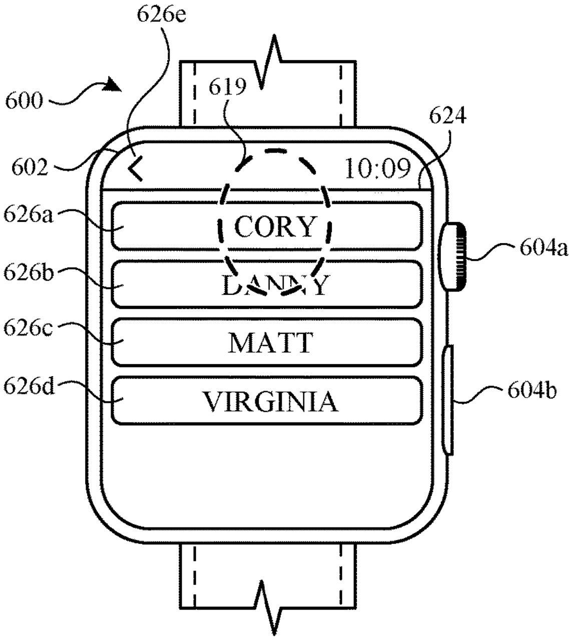

At FIG. 6T, in response to user input 617, electronic device 600 displays contact selection user interface 624. Contact selection user interface 624 includes options 626*a*-626*d* corresponding to different contacts. At FIG. 6T, electronic device 600 detects user input 619 (e.g., a tap input) corresponding to selection of option 626*a*, which corresponds to a contact named Cory.

Figure 6U:
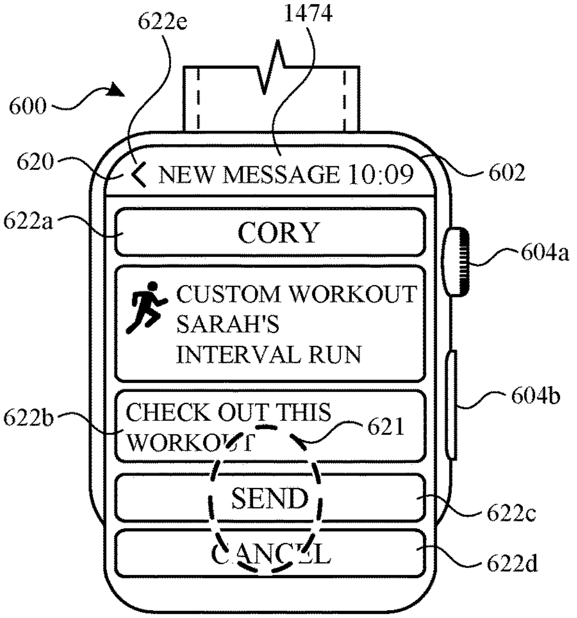

At FIG. 6U, in response to user input 619, electronic device 600 re-displays workout sharing user interface 620 with Cory displayed in option 622*a*. At FIG. 6U, electronic device 600 detects user input 621 (e.g., a tap input) corresponding to selection of option 622*c*.

Figure 6V:
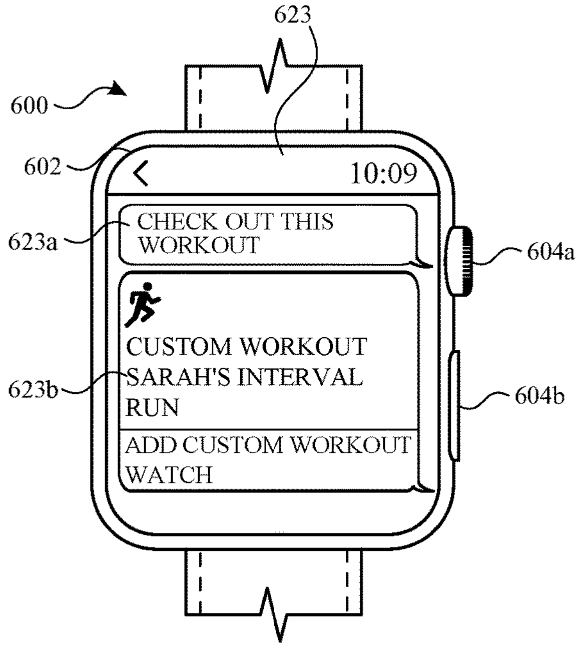

At FIG. 6V, in response to user input 621, electronic device 600 displays message transcript user interface 623 that corresponds to an asynchronous messaging session (e.g., a text messaging session) between the user of electronic device 600 and the contact Cory. In some embodiments, message transcript user interface 623 includes one or more messages that were previously exchanged between the user of electronic device 600 and the contact Cory. In FIG. 6V, message transcript user interface 623 displays messages 623*a*-623*b*. Message 623*a* is the message that was displayed in option 622*b* in FIG. 6U, and message 623*b* is an object that corresponds to the interval workout that was shared to Cory, entitled "Sarah's Interval Run."

Figure 6W:
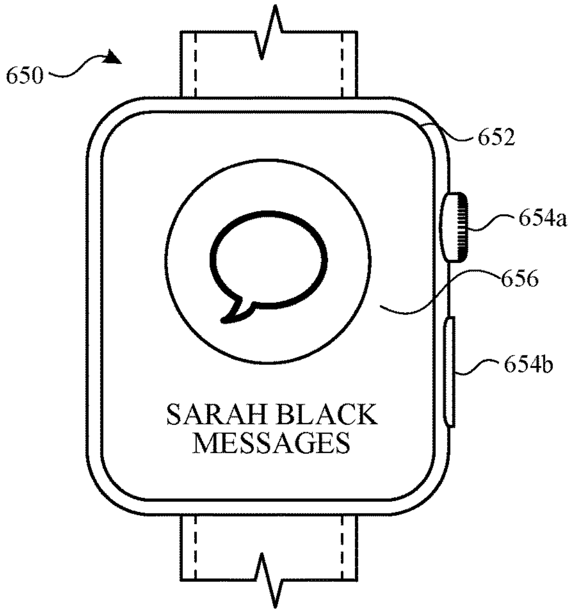
Figure 6X:
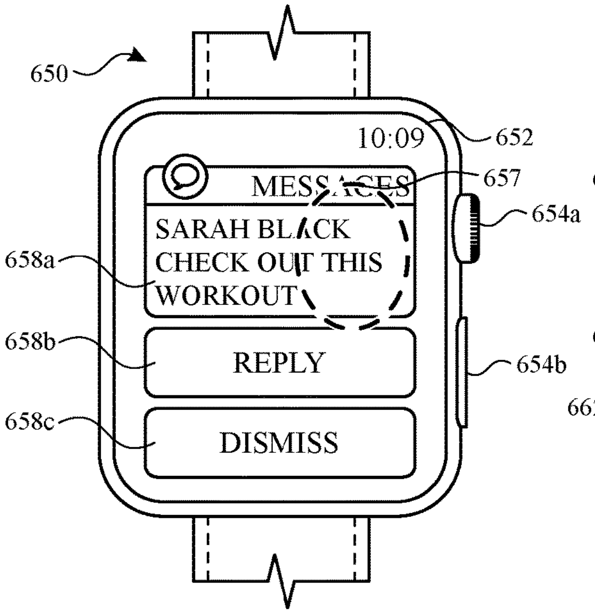

FIG. 6W depicts a second electronic device 650, which is a smart watch with touch-sensitive display 652, rotatable and depressible input mechanism 654 and button 654*b*. Electronic device 650 is Cory's device. At FIG. 6W, electronic device 650 receives information corresponding to one or more new messages received from electronic device 600 and, in response, displays notification 656. At FIG. 6X, electronic device 650 displays notification 658*a* indicative of a new message received from the user of electronic device 600 (Sarah Black). At FIG. 6X, electronic device 650 detects user input 657 corresponding to selection of notification 658*a*.

Figure 6Y:
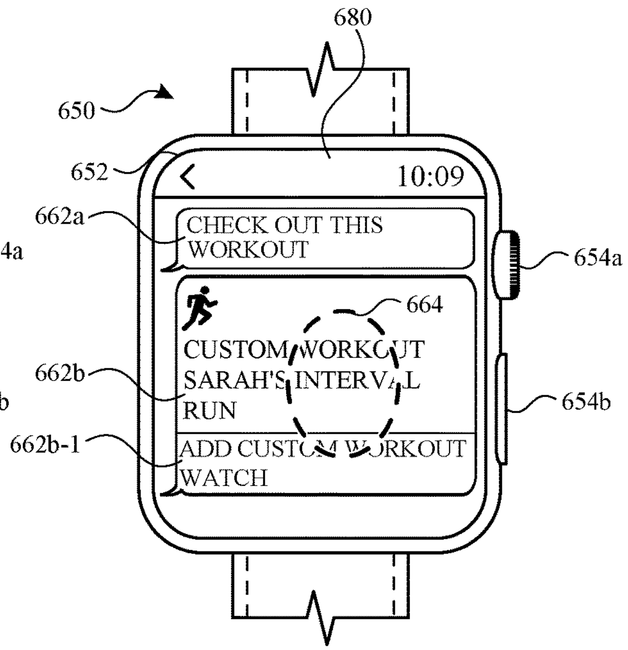

At FIG. 6Y, in response to user input 657, electronic device 650 displays message transcript user interface 680 that corresponds to the asynchronous messaging session between Cory and Sarah Black, which includes messages 662*a*, 662*b*. Message 662*b* is an object that corresponds to a workout that Sarah Black has shared with Cory. Object 662*b* includes option 662*b*-1 that is selectable to add the shared workout to electronic device 650, as will be described in greater detail below. At FIG. 6Y, electronic device 650 detects user input 664 (e.g., a tap input) corresponding to selection of object 662*b*.

Figure 6Z:
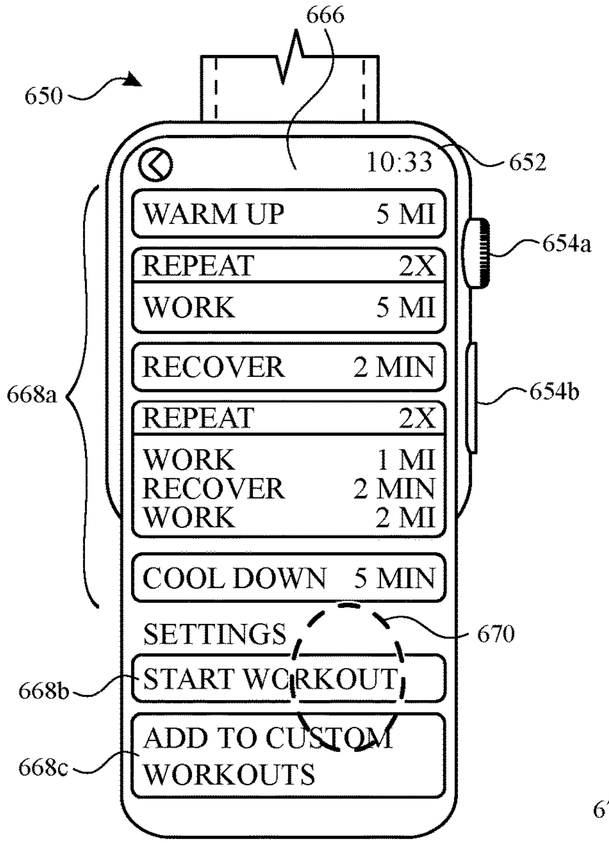
Figure 6A:
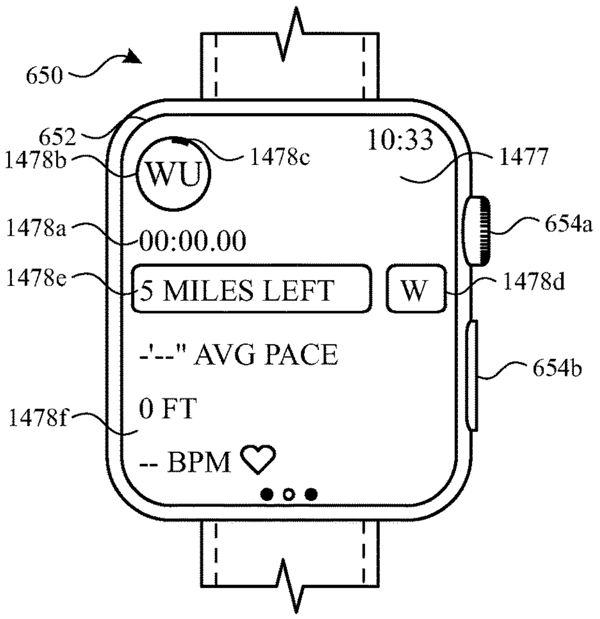
Figure 6A:
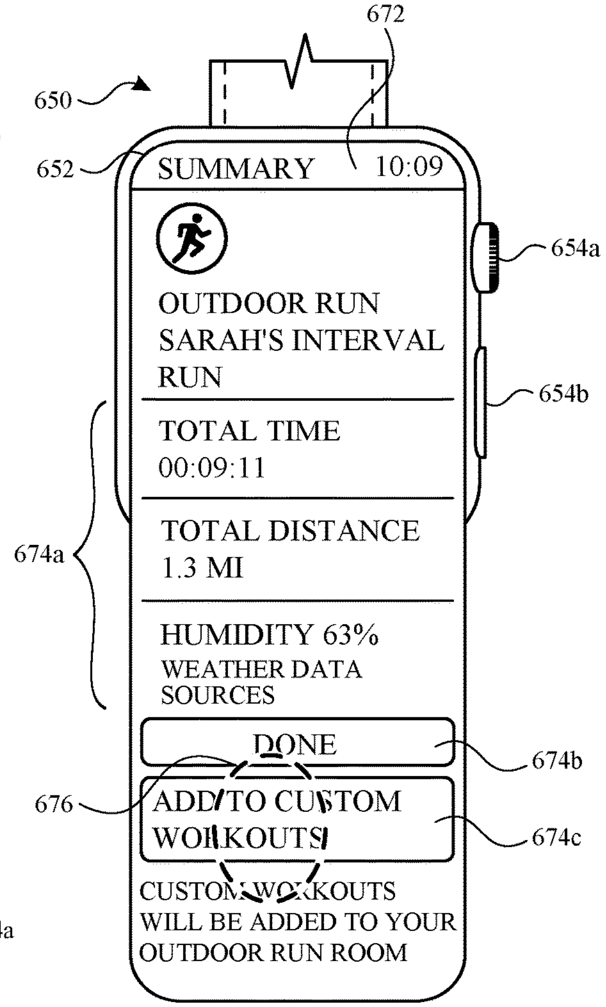
Figure 6A:
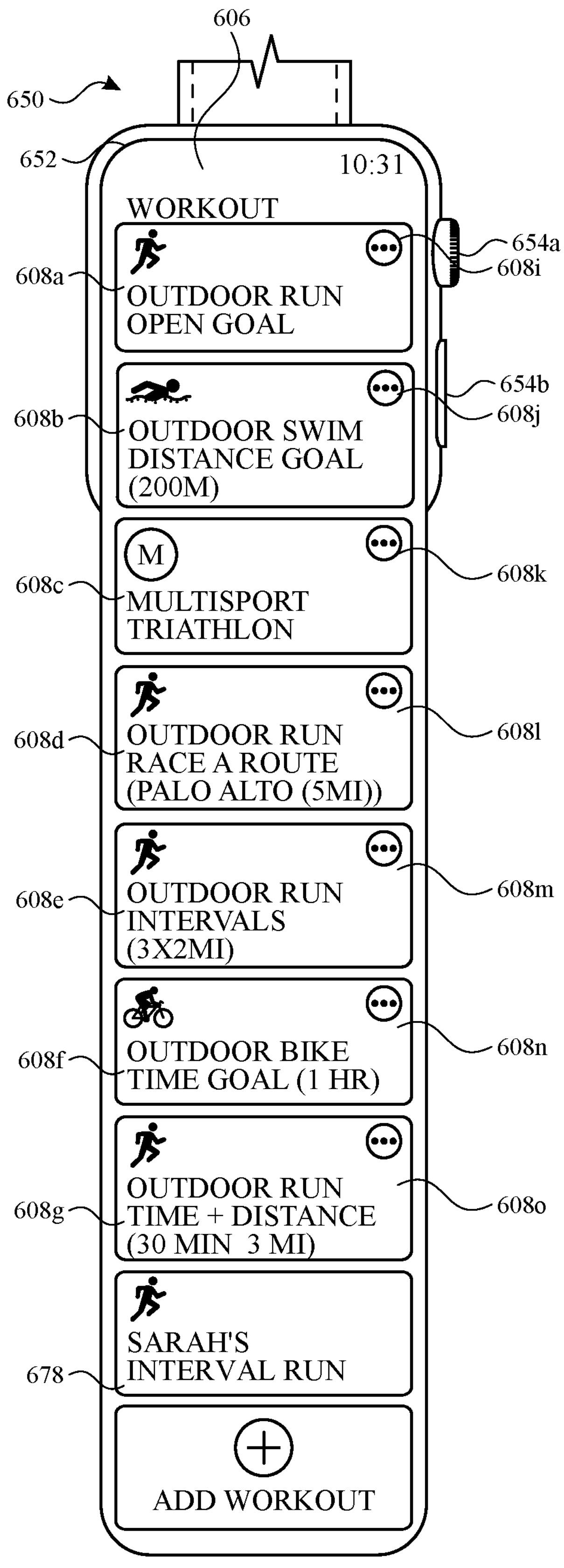
Figure 6A:
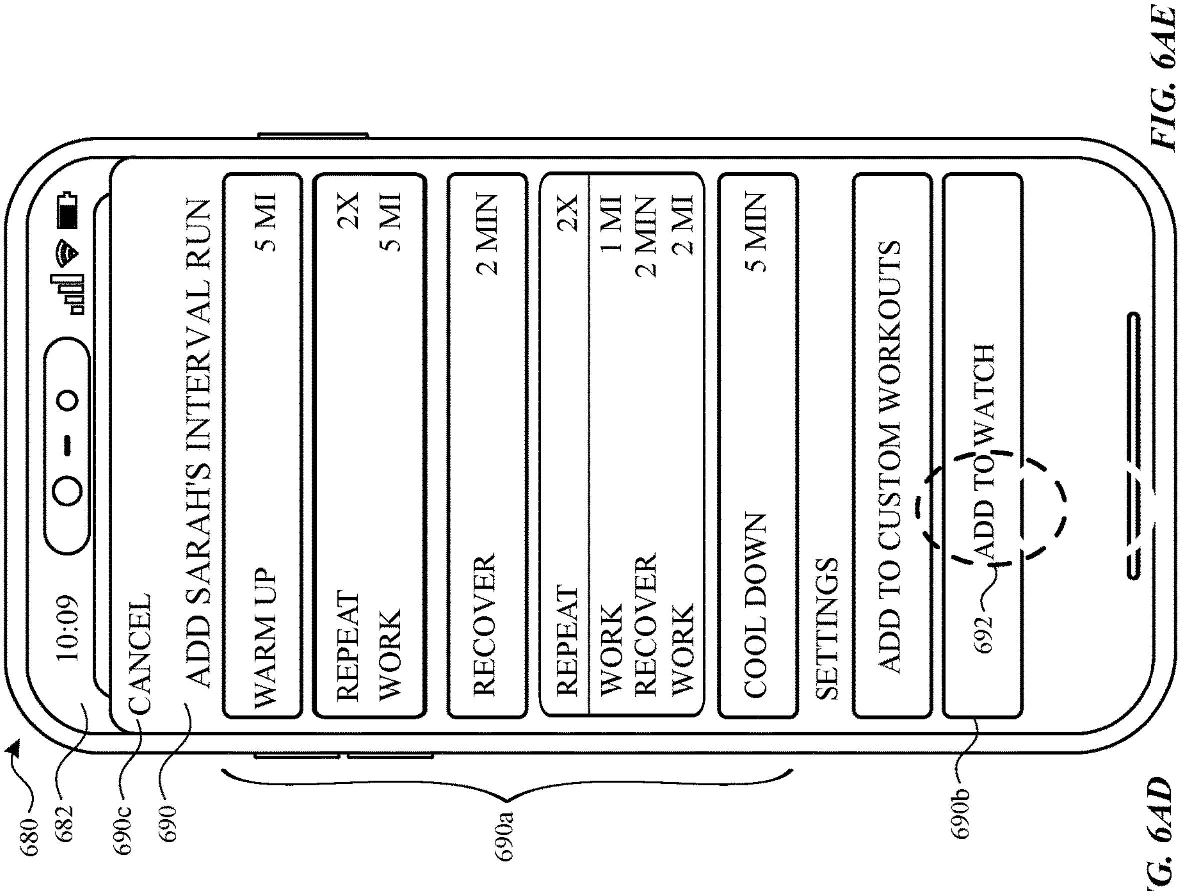
Figure 6A:
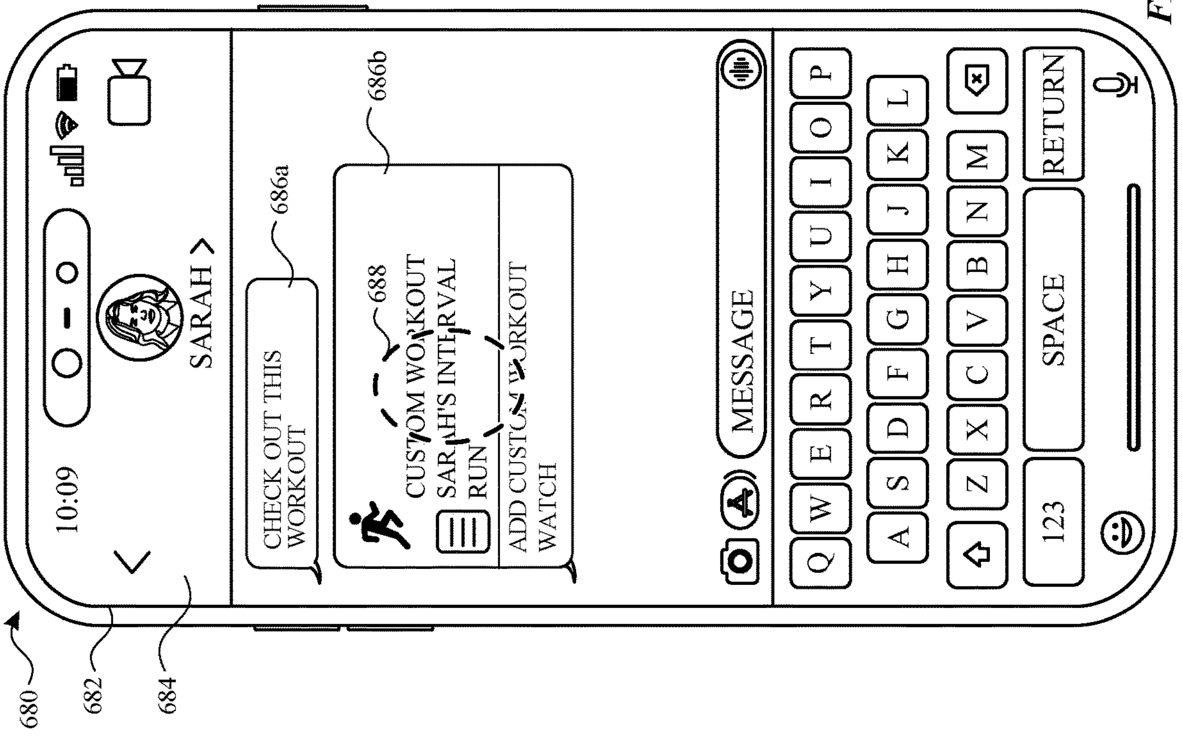
Figure 6A:
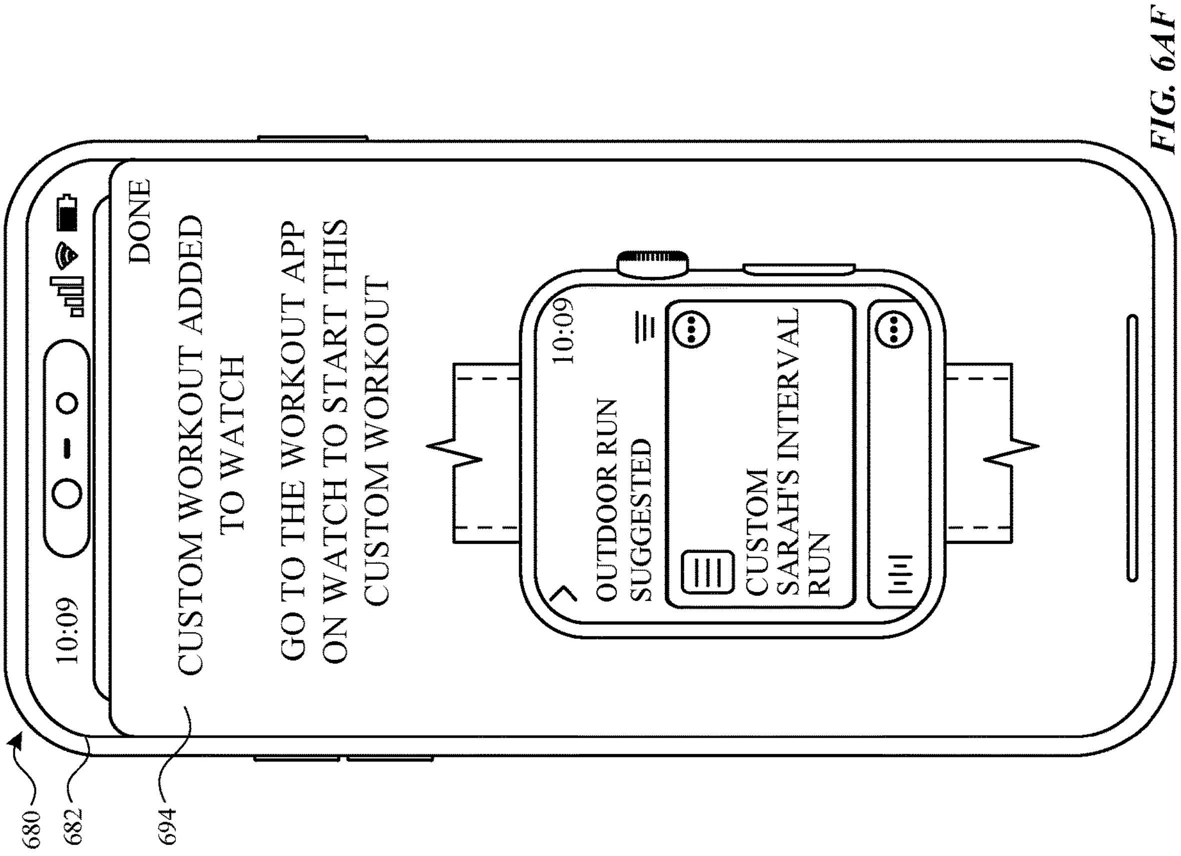

At FIG. 6Z, in response to user input 664, electronic device 650 displays workout details user interface 666. Workout details user interface 666 includes workout information 668*a*, which displays information about the intervals and/or segments that make up the shared interval workout. Workout details user interface 666 also includes options 668*b*-66*c*. Option 668*b* is selectable to initiate a workout session corresponding to the workout. Option 668*c* is selectable to add the workout to electronic device 650. At FIG. 6Z, electronic device 650 detects user input 670 (e.g., a tap input) corresponding to selection of option 668*b*.

At FIG. 6AA, in response to user input 670, electronic device 600 initiates a workout session corresponding to the shared workout, and displays interval workout in-workout user interface 1476, which was discussed above with reference to FIG. 6R. At FIG. 6AB, the user of electronic device 650 (Cory) has completed the workout session corresponding to the shared interval workout (Sarah's Interval Run), and electronic device 650 displays workout summary user interface 672. Workout summary user interface 672 includes workout metrics 674*a* corresponding to the workout session. Workout summary user interface 672 also includes options 674, 674*c*. Option 674*b* is selectable to cease display of workout summary user interface 672. Option 674*c* is selectable to save the shared interval workout (Sarah's Interval Run) to electronic device 650. At FIG. 6AB, electronic device 650 detects user input 676 (e.g., a tap input) corresponding to selection of option 674*c*.

At FIG. 6AC, in response to user input 676, electronic device 650 saves the shared interval workout to electronic device 650. In some embodiments, saving the shared interval workout to electronic device 650 causes a representation of the now-saved workout to be displayed in a workout selection user interface (wherein it was not previously displayed in the workout selection user interface). At FIG. 6AC, electronic device 650 displays workout selection user interface 606, which was previously discussed above with reference to FIG. 6A (in which electronic device 600 was displaying workout selection user interface 606). At FIG. 6AC, based on the user saving the shared interval workout to electronic device 650, representation 678 corresponding to the shared interval workout is displayed within workout selection user interface 606.

FIG. 6AD depicts electronic device 680, which is a smart phone with touch-sensitive display 682. In the depicted scenario, electronic device 650 and electronic device 680 correspond to the same user (e.g., Cory). For example, in some embodiments, electronic device 650 and electronic device 680 are logged into the same user account corresponding to the user Cory. FIGS. 6W-AC depicted an example scenario in which Cory receives a message with a shared workout on his smart watch. In FIG. 6AD, Cory receives the message with the shared workout on his smart phone. At FIG. 6AD, electronic device 680 displays message transcript user interface 684 that corresponds to an asynchronous messaging session (e.g., a text messaging session) between the user of electronic device 680 (Cory) and the user of electronic device 600 (Sarah). Message transcript user interface 684 includes messages 686*a*-686*b*. Message 686*b* is an object that corresponds to a shared workout that the user of electronic device 600 has sent to the user of electronic device 680. Object 686*b* includes option 686*b*-1, which is selectable to save the shared workout to electronic device 650 (e.g., as described above with reference to FIGS. 6AB-6AC). At FIG. 6AD, electronic device 680 detects user input 688 (e.g., a tap input) corresponding to selection of object 686*b*.

At FIG. 6AE, in response to user input 688, electronic device 680 displays workout information user interface 690. Workout information user interface 690 includes information 690*a* about the shared workout (e.g., the intervals and/or segments that make up the shared workout). Workout information user interface 690 also includes option 690*b* that is selectable to add the shared workout to electronic device 650. At FIG. 6AE, electronic device 680 detects user input 692 (e.g., a tap input) corresponding to selection of option 690*b*.

At FIG. 6AF, in response to user input 692, electronic device 680 displays confirmation user interface 694, which indicates that the saved workout has been saved to electronic device 650.

FIG. 7A is a flow diagram illustrating a method for accessing workout content using a computer system in accordance with some embodiments. Method 700 is performed at a computer system (e.g., 100, 300, 500) that is in communication with one or more display generation components (e.g., a display, a touch-sensitive display, a monitor, a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). Some operations in method 700 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for accessing workout content. The method reduces the cognitive burden on a user for accessing workout content, thereby creating a more efficient human-machine interface. For battery-operated computing devices, enabling a user to access workout content faster and more efficiently conserves power and increases the time between battery charges.

The computer system (e.g., 600 and/or 650) displays (702), via the one or more display generation components (e.g., 602 and/or 652), a messaging user interface (e.g., 623 and/or 680) corresponding to an asynchronous messaging session between a user of the computer system and one or more other participants in the asynchronous messaging session (e.g., one or more other participants using one or more external computer systems separate from and/or different from the computer system) including a first participant (in some embodiments, the messaging user interface includes representations of a plurality of messages transmitted into the asynchronous messaging session by the user of the computer system and/or the one or more other participants in the asynchronous messaging session);

The computer system receives (704) first information that corresponds to a first workout that is shared into the asynchronous messaging session by the first participant (e.g., FIGS. 6V-6Y).

The computer system (e.g., 650), in response to receiving the first information, displays (706), via the one or more display generation components and within the messaging user interface (e.g., 680), a first object (e.g., 662*b*) corresponding to the first workout that is shared into the asynchronous messaging session by the first participant (in some embodiments, the messaging user interface also includes representations of a plurality of messages transmitted into the asynchronous messaging session by the user of the computer system and/or the one or more other participants in the asynchronous messaging session).

While displaying the first object (e.g., 662*b*) corresponding to the first workout, the computer system receives (708), via the one or more input devices, a first input (e.g., 664) (e.g., one or more touch inputs, one or more mechanical inputs (e.g., one or more presses of a button and/or rotations of a rotatable input mechanism), and/or one or more other inputs) corresponding to selection of the first object.

In response to receiving the first input, the computer system displays (710) a first user interface (e.g., 666) corresponding to the first workout. In some embodiments, the first user interface includes a first option (e.g., 668*b*) that is selectable to initiate a workout session corresponding to the first workout. In some embodiments, in response to receiving the first input, the computer system initiates a workout session corresponding to the first workout (in some embodiments, initiating the workout session includes initiating recording of one or more physical activity metrics (e.g., heartrate, workout time elapsed, distance traversed, and/or calories burned) for the workout session (e.g., via one or more sensors in communication with the computer system)) (in some embodiments, initiating the workout session includes recording one or more physical activity metrics at a greater frequency than prior to initiation of the workout session). In some embodiments, the first user interface (e.g., 1477) includes one or more workout metrics corresponding to the first workout and/or one or more workout metrics corresponding to the workout session (e.g., one or more workout metrics recorded during the workout session and/or one or more workout metrics indicative of a level of physical activity during the workout session (e.g., heart rate, calories burned, distance traveled, and/or power output (e.g., running power and/or cycling power)). Enabling users to share custom workouts with one another via a messaging user interface enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first user interface (e.g., 666) corresponding to the first workout comprises displaying a start workout object (e.g., 668*b*) within the first user interface. While displaying the first user interface including the start workout object, the computer system receives, via the one or more input devices, a selection input (e.g., 670) (e.g., one or more touch inputs, one or more mechanical inputs (e.g., one or more presses of a button and/or rotations of a rotatable input mechanism), and/or one or more other inputs) corresponding to selection of the start workout object, and in response to receiving the selection input corresponding to selection of the start workout object: the computer system initiates a workout session corresponding to the first workout (e.g., a workout session of a first modality and/or a workout session of a first goal type), including initiating recording (e.g., tracking and/or measuring) of one or more physical activity metrics for the workout session corresponding to the first workout (e.g., one or more physical activity metrics indicative of a physical activity level of the user during the workout session (e.g., heart rate, calories burned, steps taken, and/or distance traversed)); and the computer system displays a first workout session user interface (e.g., 1477) indicative of an active workout session (e.g., indicative of a currently active and/or in-progress workout session) (in some embodiments, the first workout session user interface displays one or more workout performance metrics that are indicative of a physical activity level of the user during the current workout session). Enabling users to share custom workouts with one another via a messaging user interface, and allowing users to initiate the workout with one or more user inputs from the messaging user interface, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the workout session is initiated and the first workout session user interface (e.g., 1477) is displayed in response to receiving the selection input (e.g., 670) corresponding to selection of the start workout object without adding the first workout to a first set of workouts (e.g., a first set of workouts that are displayed in a workout user interface (e.g., a workout user interface that includes representations of a plurality of different workouts (e.g., representations that are selectable to initiate a workout session corresponding to the respective selected workout)); a first set of workouts that are saved on the computer system; and/or a first set of workouts that are accessible within a fitness application) (e.g., without saving the first workout to a first fitness application and/or a first workout application). Enabling users to share custom workouts with one another via a messaging user interface, and allowing users to initiate the workout with one or more user inputs from the messaging user interface, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first user interface (e.g., 666) corresponding to the first workout further comprises displaying a save workout object (e.g., 668*c*) within the first user interface (e.g., displaying the save workout object concurrently with the start workout object). In some embodiments, while displaying the first user interface including the save workout object, the computer system receives, via the one or more input devices, a selection input (e.g., one or more touch inputs, one or more mechanical inputs (e.g., one or more presses of a button and/or rotations of a rotatable input mechanism), and/or one or more other inputs) corresponding to selection of the save workout object, and in response to receiving the selection input corresponding to selection of the save workout object, the computer system adds the first workout to the first set of workouts (e.g., a first set of workouts that are displayed in a workout user interface (e.g., a workout user interface that includes representations of a plurality of different workouts (e.g., representations that are selectable to initiate a workout session corresponding to the respective selected workout)) (in some embodiments, adding the first workout to the first set of workouts causes a representation of the first workout to be displayed within the workout user interface (e.g., a representation that is selectable to initiate a workout session corresponding to the first workout)); a first set of workouts that are saved on the computer system; and/or a first set of workouts that are accessible within a fitness application) (and, optionally, without initiating a workout session corresponding to the first workout). Enabling users to share custom workouts with one another via a messaging user interface, and allowing users to add the workout to their own device via one or more user inputs from the messaging user interface, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to completion of the workout session corresponding to the first workout (e.g., in response to completion of the workout session corresponding to the first workout) (e.g., completion of the workout session corresponding to the first workout based on one or more user inputs requesting to end the workout session and/or based on completion of all workout content contained within the first workout), the computer system displays, via the one or more display generation components, a first save workout option (e.g., 674*c*) (in some embodiments, the first add workout option is displayed within a workout summary user interface that is indicative of completion of the workout session corresponding to the first workout). While displaying the first save workout object, the computer system receives, via the one or more input devices, a selection input (e.g., one or more touch inputs, one or more mechanical inputs (e.g., one or more presses of a button and/or rotations of a rotatable input mechanism), and/or one or more other inputs) corresponding to selection of the first save workout object, and in response to receiving the selection input corresponding to selection of the first save workout object, the computer system adds the first workout to a first collection of workouts (e.g., a first collection of workouts that are displayed in a workout user interface (e.g., a workout user interface that includes representations of a plurality of different workouts (e.g., representations that are selectable to initiate a workout session corresponding to the respective selected workout)) (in some embodiments, adding the first workout to the first collection of workouts causes a representation of the first workout to be displayed within the workout user interface (e.g., a representation that is selectable to initiate a workout session corresponding to the first workout)); a first collection of workouts that are saved on the computer system; and/or a first collection of workouts that are accessible within a fitness application). Displaying a save workout object that allows a user to save a workout to the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first user interface (e.g., 666) corresponding to the first workout comprises displaying an add workout object (e.g., 668*c*) within the first user interface. While displaying the first user interface including the add workout object, the computer system receives, via the one or more input devices, a selection input (e.g., one or more touch inputs, one or more mechanical inputs (e.g., one or more presses of a button and/or rotations of a rotatable input mechanism), and/or one or more other inputs) corresponding to selection of the add workout object, and in response to receiving the selection input corresponding to selection of the add workout object, the computer system adds the first workout to a set of workouts (e.g., a set of workouts that are displayed in a workout user interface (e.g., a workout user interface that includes representations of a plurality of different workouts (e.g., representations that are selectable to initiate a workout session corresponding to the respective selected workout)) (in some embodiments, adding the first workout to the set of workouts causes a representation of the first workout to be displayed within the workout user interface (e.g., a representation that is selectable to initiate a workout session corresponding to the first workout)); a set of workouts that are saved on the computer system; and/or a set of workouts that are accessible within a fitness application). Displaying an add workout object that allows a user to save a workout to the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, at a first time prior to adding the first workout to the set of workouts, the computer system (e.g., 650) displays, via the one or more display generation components, a workout selection user interface (e.g., 606), wherein the workout selection user interface includes a first plurality of workout platters (e.g., 608*a*-608*g*) corresponding to a first plurality of different workouts, including: a first workout platter (e.g., 608*a*-608*g*) (e.g., user interface object and/or affordance) associated with a second workout different from the first workout (in some embodiments, a second workout of a second workout type (e.g., a second workout modality and/or a second workout goal type)), and a second workout platter (e.g., 608*a*-608*g*) (e.g., user interface object and/or affordance) associated with a third workout different from the first workout and the second workout (in some embodiments, a third workout of a third workout type (e.g., a third workout modality and/or a third workout goal type)) (in some embodiments, a third workout platter distinct from and/or separate from the second workout platter), wherein, at the first time, the workout selection user interface does not include a representation of the first workout (e.g., does not include 678) (e.g., does not include a workout platter corresponding to the first workout (e.g., the first plurality of workout platters does not include a workout platter corresponding to the first workout)); and at a second time subsequent to adding the first workout to the set of workouts, displaying, via the one or more display generation components, the workout selection user interface (e.g., 606), wherein, at the second time, the workout selection user interface includes a second plurality of workout platters corresponding to a second plurality of different workouts, including a third workout platter (e.g., 678) associated with the first workout (e.g., a workout platter that is selectable to initiate a workout session corresponding to the first workout). Providing an option that allows a user to save a workout to the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, at the second time, the workout selection user interface (e.g., 606) includes the first workout platter (e.g., 608*a*-608*g*) associated with the second workout, and the second workout platter (e.g., 608*a*-608*g*) associated with the third workout; the first workout corresponds to a first workout type (e.g., a first workout modality); the second workout corresponds to a second workout type (e.g., a second workout modality) different from the first workout type; and the third workout corresponds to a third workout type (e.g., a third workout modality) different from the first workout type and the second workout type. Displaying an option that allows a user to save a workout to the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the second workout type is selected from a group consisting of: running, cycling, swimming, yoga, HIIT, and strength; and the third workout type is selected from the group consisting of: running, cycling, swimming, yoga, HIIT, and strength. Displaying an add workout object that allows a user to save a workout to the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the second workout (e.g., 608*a*-608*g*) is a custom workout created by a user of the computer system, wherein the second workout comprises a plurality of intervals, including: a first interval having a first interval type (e.g., work, recover, cool down, and/or warm up) selected by the user and a first interval duration specified by the user (e.g., a time goal duration (e.g., a user-specified duration of time for the first interval), a distance goal duration (e.g., a user-specified distance to be traversed in the first interval), and/or a calorie goal duration (e.g., a user-specified number of calories to be burned during the first interval)); and a second interval different from the first interval, the second interval having a second interval type (e.g., work, recover, cool down, and/or warm up) selected by the user and a second interval duration specified by the user (e.g., a time goal duration (e.g., a user-specified duration of time for the second interval), a distance goal duration (e.g., a user-specified distance to be traversed in the second interval), and/or a calorie goal duration (e.g., a user-specified number of calories to be burned during the second interval)). In some embodiments the first workout is a custom workout created by a remote user different from the user of the computer system (e.g., created by the first participant). In some embodiments, the first workout includes a first plurality of intervals, including: a third interval having a third interval type (e.g., work, recover, cool down, and/or warm up) selected by the remote user and a third interval duration specified by the remote user (e.g., a time goal duration (e.g., a user-specified duration of time for the third interval), a distance goal duration (e.g., a user-specified distance to be traversed in the third interval), and/or a calorie goal duration (e.g., a user-specified number of calories to be burned during the third interval)); and a fourth interval different from the third interval, the fourth interval having a fourth interval type (e.g., work, recover, cool down, and/or warm up) selected by the remote user and a fourth interval duration specified by the remote user (e.g., a time goal duration (e.g., a user-specified duration of time for the fourth interval), a distance goal duration (e.g., a user-specified distance to be traversed in the fourth interval), and/or a calorie goal duration (e.g., a user-specified number of calories to be burned during the fourth interval)). Allowing users to create custom workouts enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the third workout is a custom workout created by a remote user different from the user of the computer system (e.g., 678), wherein the third workout comprises a third plurality of intervals, including: a third interval having a third interval type (e.g., work, recover, cool down, and/or warm up) selected by the remote user and a third interval duration specified by the remote user (e.g., a time goal duration (e.g., a user-specified duration of time for the third interval), a distance goal duration (e.g., a user-specified distance to be traversed in the third interval), and/or a calorie goal duration (e.g., a user-specified number of calories to be burned during the third interval)); and a fourth interval different from the third interval, the fourth interval having a fourth interval type (e.g., work, recover, cool down, and/or warm up) selected by the remote user and a fourth interval duration specified by the remote user (e.g., a time goal duration (e.g., a user-specified duration of time for the fourth interval), a distance goal duration (e.g., a user-specified distance to be traversed in the fourth interval), and/or a calorie goal duration (e.g., a user-specified number of calories to be burned during the fourth interval)). Allowing users to create and share custom workouts enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first workout is a custom workout (e.g., 608*c*) created by the first participant (or, in some embodiments, a different remote user different from the first participant and the user of the computer system), wherein the first workout comprises a plurality of intervals, including: a first respective interval having a first respective interval type (e.g., work, recover, cool down, and/or warm up) selected by the first participant and a first respective interval duration specified by the first participant (e.g., a time goal duration (e.g., a user-specified duration of time for the first respective interval), a distance goal duration (e.g., a user-specified distance to be traversed in the first respective interval), and/or a calorie goal duration (e.g., a user-specified number of calories to be burned during the first respective interval)); and a second respective interval different from the first respective interval, the second respective interval having a second respective interval type (e.g., work, recover, cool down, and/or warm up) selected by the first participant and a second respective interval duration specified by the first participant (e.g., a time goal duration (e.g., a user-specified duration of time for the second respective interval), a distance goal duration (e.g., a user-specified distance to be traversed in the second respective interval), and/or a calorie goal duration (e.g., a user-specified number of calories to be burned during the second respective interval)); and displaying the first user interface comprises displaying, within the first user interface, workout interval information corresponding to the plurality of intervals of the first workout, including: first information identifying the first respective interval type and the first respective interval duration; and second information identifying the second respective interval type and the second respective interval duration. Enabling users to share custom workouts with one another via a messaging user interface, and allowing users to view information about shared workouts via one or more user inputs in the messaging user interface, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first user interface (e.g., 690) corresponding to the first workout comprises displaying a remote add workout object (e.g., 690*b*) within the first user interface. While displaying the first user interface including the remote add workout object, the computer system receives, via the one or more input devices, a selection input (e.g., one or more touch inputs, one or more mechanical inputs (e.g., one or more presses of a button and/or rotations of a rotatable input mechanism), and/or one or more other inputs) corresponding to selection of the remote add workout object, and in response to receiving the selection input corresponding to selection of the remote add workout object, the computer system causes the first workout to be added to a first remote device separate from the computer system (e.g., a wearable device (e.g., a watch and/or other wearable device)) (e.g., a first remote device that is associated with and/or corresponds to the computer system (e.g., a first remote device that is associated with the same user and/or a first remote device that is logged into the same user account as the computer system)) (in some embodiments, adding the first workout to the first remote device causes a representation of the first workout to be displayed within a workout user interface that is displayed on, displayable on, and/or accessible on the first remote device). Displaying a remote add workout object that allows a user to save the first workout to a remote device enhances the operability of the system and makes the user-system interface more efficient (e.g., by helping the user to provide proper inputs and reducing errors) which, additionally, reduces power usage and improves battery life of the device by enabling the user to use the system more quickly and efficiently.

Note that details of the processes described above with respect to method 700 (e.g., FIG. 7A) are also applicable in an analogous manner to the methods described below. For example, method 750 optionally includes one or more of the characteristics of the various methods described above with reference to method 700. For example, in some embodiments, the computer system recited in method 700 receives the first custom workout shared by the computer system in method 750. For brevity, these details are not repeated below.

FIG. 7B is a flow diagram illustrating a method for sharing workout content using a computer system in accordance with some embodiments. Method 750 is performed at a computer system (e.g., 100, 300, 500, 600, and/or 650) that is in communication with one or more display generation components (e.g., 602 and/or 652) (e.g., a display, a touch-sensitive display, a monitor, a visual output device, a 3D display, a display having at least a portion that is transparent or translucent on which images can be projected (e.g., a see-through display), a projector, a heads-up display, and/or a display controller) and one or more input devices (e.g., 602 and/or 652) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). Some operations in method 750 are, optionally, combined, the orders of some operations are, optionally, changed, and some operations are, optionally, omitted.

In some embodiments, the electronic device (e.g., 600 and/or 650) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 750 provides an intuitive way for sharing workout content. The method reduces the cognitive burden on a user for sharing workout content, thereby creating a more efficient human-machine interface. For battery-operated computing devices, enabling a user to share workout content faster and more efficiently conserves power and increases the time between battery charges.

The computer system (e.g., 600 and/or 650) receives (752), via the one or more input devices, a first set of user inputs (e.g., FIGS. 6A-6P) (e.g., one or more touch inputs, one or more non-touch inputs, and/or one or more gestures) corresponding to a user request to generate a first custom workout (e.g., a workout that includes a user-specified number of segments (e.g., a plurality of segments and/or one or more segments); a workout that includes, for at least some segments of the user-specified number of segments, a user-specified workout type (e.g., a user-specified workout modality (e.g., swim, run, cycle, HIIT, strength, and/or yoga), a user-specified work segment, and/or a user-specified rest segment); and/or a workout that includes, for at least some segments of the user-specified number of segments, a user-specified goal (e.g., a time goal (e.g., a user-specified duration of time), a calorie goal (e.g., a user-specified number of calories), and/or a distance goal (e.g., a user-specified distance)).

The computer system receives (754), via the one or more input devices, a second set of user inputs (e.g., FIGS. 6P-6U) (e.g., one or more touch inputs, one or more non-touch inputs, and/or one or more gestures)) corresponding to a user request to share the first custom workout into a first asynchronous messaging session (e.g., an asynchronous messaging session that includes one or more messages transmitted between a user of the computer system and one or more other participants (e.g., one or more other participants using one or more external computer systems separate from and/or different from the computer system) including a first participant).

In response to receiving the second set of user inputs, the computer system displays (756), via the one or more display generation components, a messaging user interface (e.g., 623) corresponding to the first asynchronous messaging session (in some embodiments, the messaging user interface also includes representations of a plurality of messages transmitted into the asynchronous messaging session by the user of the computer system and/or the one or more other participants in the asynchronous messaging session), including: displaying (758), within the messaging user interface, a first object (e.g., 623*b*) corresponding to the first custom workout and that is selectable (e.g., on the computer system and/or by a user of the computer system; and/or on one or more external computer systems corresponding to the one or more other participants of the first asynchronous messaging session) to display a first user interface (e.g., 666) corresponding to (e.g., representative of) the first custom workout. Enabling users to create custom workouts, and share custom workouts with one another via a messaging user interface, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first object is selectable to initiate a process for initiating a workout session corresponding to the first custom workout (in some embodiments, initiating the workout session includes initiating recording of one or more physical activity metrics (e.g., heartrate, workout time elapsed, distance traversed, and/or calories burned) for the workout session (e.g., via one or more sensors in communication with the computer system)) (in some embodiments, initiating the workout session includes recording one or more physical activity metrics at a greater frequency than prior to initiation of the workout session). In some embodiments, the first user interface (e.g., 666) includes a first option (e.g., 668*b*) that is selectable to initiate a workout session corresponding to the first custom workout. In some embodiments, the first user interface (e.g., 1477) includes one or more workout metrics corresponding to the first custom workout and/or one or more workout metrics corresponding to the workout session (e.g., one or more workout metrics recorded during the workout session and/or one or more workout metrics indicative of a level of physical activity during the workout session (e.g., heart rate, calories burned, distance traveled, and/or power output (e.g., running power and/or cycling power)).

In some embodiments, while displaying the first object (e.g., 623*b*) within the messaging user interface, the computer system receives, via the one or more input devices, one or more user inputs corresponding to selection of the first object. In response to receiving the one or more user inputs corresponding to selection of the first object, the computer system displays a second object (e.g., 668*b*) that is selectable to initiate a workout session corresponding to the first custom workout. In some embodiments, while displaying the second object, the computer system receives, via the one or more input devices, one or more user inputs corresponding to selection of the second object. In response to receiving the one or more user inputs corresponding to selection of the second object, the computer system: initiates a workout session corresponding to the first custom workout (in some embodiments, initiating the workout session includes initiating recording of one or more physical activity metrics (e.g., heartrate, workout time elapsed, distance traversed, and/or calories burned) for the workout session (e.g., via one or more sensors in communication with the computer system)) (in some embodiments, initiating the workout session includes recording one or more physical activity metrics at a greater frequency than prior to initiation of the workout session); and/or displays a workout metrics user interface (e.g., 1477) that includes one or more workout metrics corresponding to the workout session (and, in some embodiments, corresponds to the first custom workout) (e.g., a workout metrics user interface that includes one or more workout metrics that are recorded and/or measured during the workout session and/or that are indicative of a level of physical activity of the user during the workout session).

In some embodiments, while displaying the first object (e.g., 623*b*) within the messaging user interface, the computer system receives, via the one or more input devices, one or more user inputs corresponding to selection of the first object. In response to receiving the one or more user inputs corresponding to selection of the first object, the computer system: initiates a workout session corresponding to the first custom workout (in some embodiments, initiating the workout session includes initiating recording of one or more physical activity metrics (e.g., heartrate, workout time elapsed, distance traversed, and/or calories burned) for the workout session (e.g., via one or more sensors in communication with the computer system)) (in some embodiments, initiating the workout session includes recording one or more physical activity metrics at a greater frequency than prior to initiation of the workout session); and/or displays a workout metrics user interface (e.g., 1477) that includes one or more workout metrics corresponding to the workout session (and, in some embodiments, corresponds to the first custom workout) (e.g., a workout metrics user interface that includes one or more workout metrics that are recorded and/or measured during the workout session and/or that are indicative of a level of physical activity of the user during the workout session).

In some embodiments, the first custom workout comprises a plurality of intervals (e.g., FIG. 6P), including: a first interval having a first interval type (e.g., work, recover, cool down, and/or warm up); and a second interval having a second interval type (e.g., work, recover, cool down, and/or warm up) different from the first interval type; and the first set of user inputs includes: one or more user inputs (e.g., one or more touch inputs, one or more non-touch inputs, and/or one or more gestures) corresponding to a user request to add the first interval having the first interval type to the first custom workout; and one or more user inputs (e.g., one or more touch inputs, one or more non-touch inputs, and/or one or more gestures) corresponding to a user request to add the second interval having the second interval type to the first custom workout. Enabling users to create custom workouts, and share custom workouts with one another via a messaging user interface, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first interval has a first time-based duration (e.g., 1408*f*) (e.g., during the custom workout, the first interval ends, and a next interval begins, after a user-defined and/or predefined duration of time). Enabling users to create custom workouts having intervals with custom time-based durations enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first interval has a first distance-based duration (e.g., 1408*c*) (e.g., during the custom workout, the first interval ends, and a next interval begins, after a user traverses and/or travels a user-defined and/or predefined distance). Enabling users to create custom workouts having intervals with custom distance-based durations enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first interval has a first calorie-based duration (e.g., 1442*c*) (e.g., during the custom workout, the first interval ends, and a next interval begins, after a user burns and/or expends a user-defined and/or predefined number of calories). Enabling users to create custom workouts having intervals with custom calorie-based durations enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the second interval has a second time-based duration (e.g., 1408*b*) (e.g., during the custom workout, the second interval ends, and a next interval begins, after a user-defined and/or predefined duration of time) (e.g., a second time-based duration different from the first time-based duration). Enabling users to create custom workouts having intervals with custom time-based durations enhances the operability of the system and makes the user-system interface more efficient (e.g., by helping the user to provide proper inputs and reducing errors) which, additionally, reduces power usage and improves battery life of the device by enabling the user to use the system more quickly and efficiently In some embodiments, the second interval has a second distance-based duration (e.g., 1406*c*) (e.g., during the custom workout, the second interval ends, and a next interval begins, after a user traverses and/or travels a user-defined and/or predefined distance) (e.g., a second distance-based duration different from the first distance-based duration). Enabling users to create custom workouts having intervals with custom distance-based durations enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the second interval has a second calorie-based duration (e.g., 1442*c*) (e.g., during the custom workout, the second interval ends, and a next interval begins, after a user burns and/or expends a user-defined and/or predefined number of calories) (e.g., a second calorie-based duration different from the first calorie-based duration). Enabling users to create custom workouts having intervals with custom calorie-based durations enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system displays, via the one or more display generation components, a first user interface (e.g., 1404), including concurrently displaying: a start workout object (e.g., 1406*d*); and a share workout object (e.g., 1420*g*); while displaying the first user interface, receiving, via the one or more input devices, a selection input (e.g., one or more touch inputs, one or more non-touch inputs, and/or one or more gestures)); and in response to receiving the selection input: in accordance with a determination that the selection input corresponds to the share workout object (e.g., 1420*g*) (e.g., the selection input is indicative of user selection of the share workout object): the computer system displays, via the one or more display generation components, a workout sharing user interface (e.g., 620) that includes one or more options (e.g., 622*a*-622*d*) for sharing the first custom workout to one or more remote users (e.g., one or more remote users separate from and/or different from the user of the computer system); and in accordance with a determination that the selection input corresponds to the start workout object (e.g., 1406*d*) (e.g., the selection input is indicative of user selection of the start workout object): the computer system initiates a workout session corresponding to the first custom workout, including initiating recording (e.g., tracking and/or measuring) of one or more physical activity metrics for the workout session corresponding to the first custom workout (e.g., one or more physical activity metrics indicative of a physical activity level of the user during the workout session (e.g., heart rate, calories burned, steps taken, and/or distance traversed)); and displaying a first workout session user interface (e.g., 1476) indicative of an active workout session (e.g., indicative of a currently active and/or in-progress workout session) (in some embodiments, the first workout session user interface displays one or more workout performance metrics that are indicative of a physical activity level of the user during the current workout session). Providing an option to share a custom workout, and an option to start the custom workout, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system displays, via the one or more display generation components, a first respective user interface (e.g., 1404), including concurrently displaying: a delete workout object (e.g., 1420*h*); and a share workout object (e.g., 1420*g*); while displaying the first user interface, receiving, via the one or more input devices, a first selection input (e.g., one or more touch inputs, one or more non-touch inputs, and/or one or more gestures)). In response to receiving the first selection input: in accordance with a determination that the first selection input corresponds to the share workout object (e.g., 1420*g*) (e.g., the selection input is indicative of user selection of the share workout object): the computer system displays, via the one or more display generation components, a workout sharing user interface (e.g., 620) that includes one or more options for sharing the first custom workout to one or more remote users (e.g., one or more remote users separate from and/or different from the user of the computer system); and in accordance with a determination that the first selection input corresponds to the delete workout object (e.g., 1420*h*) (e.g., the selection input is indicative of user selection of the delete workout object): the computer system initiates a process for deleting (e.g., removing) the first custom workout from the computer system (in some embodiments, deleting the first custom workout from the computer system; in some embodiments, displaying a selectable object that is selectable to delete the first custom workout from the computer system). Providing an option to share a custom workout, and an option to delete the custom workout, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first asynchronous messaging session includes a plurality of external participants different from a user of the computer system (e.g., a plurality of external participants that have transmitted messages into the asynchronous messaging session and/or have received messages transmitted into the asynchronous messaging session).

Enabling users to share custom workouts with one another via a messaging user interface enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the second set of user inputs, the computer system causes the first object (e.g., 623*b*) corresponding to the first custom workout to be displayed on one or more external devices (e.g., 650) separate from the computer system that are associated with participants in the first asynchronous messaging session (e.g., within respective messaging user interfaces corresponding to the first asynchronous messaging session that are displayed on the one or more external devices). Enabling users to share custom workouts with one another via a messaging user interface enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first object (e.g., 623*b*) corresponding to the first custom workout is selectable on a first external device of the one or more external devices to cause the first external device (e.g., 650) to display a first selectable option (e.g., 668*b*) that is selectable to initiate a process for initiating a workout session corresponding to the first custom workout on the first external device (in some embodiments, the first selectable option is selectable to initiate a workout session corresponding to the first custom workout on the first external device). Enabling users to share custom workouts with one another via a messaging user interface, and to initiate the workout with one or more user inputs from the messaging user interface, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first object (e.g., 623*b*) corresponding to the first custom workout is selectable on a second external device (e.g., 650) of the one or more external devices to cause the second external device to display a second selectable option (e.g., 674*c*) that is selectable to initiate a process for adding the first custom workout to the second external device (e.g., selectable to add the first custom workout to a set of workouts that are stored on the second external device, selectable to add the first custom workout to a workout selection user interface that is accessible and/or displayable on the second external device, selectable to make the first custom workout accessible within a fitness application installed on the second external device, and/or selectable to save the first custom workout to the second external device). Enabling users to share custom workouts with one another via a messaging user interface, and to add the workout to a device with one or more user inputs from the messaging user interface, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

Note that details of the processes described above with respect to method 750 (e.g., FIG. 7B) are also applicable in an analogous manner to the methods described above and/or below. For example, method 750 optionally includes one or more of the characteristics of the various methods described above with reference to method 700. For example, in some embodiments, the computer system recited in method 700 receives the first custom workout shared by the computer system in method 750. For brevity, these details are not repeated below.

FIGS. 8A-8K illustrate exemplary user interfaces for accessing workout content, in accordance with some embodiments. The user interfaces in these figures are used to illustrate the processes described below, including the processes in FIG. 9.

Figure 8A:
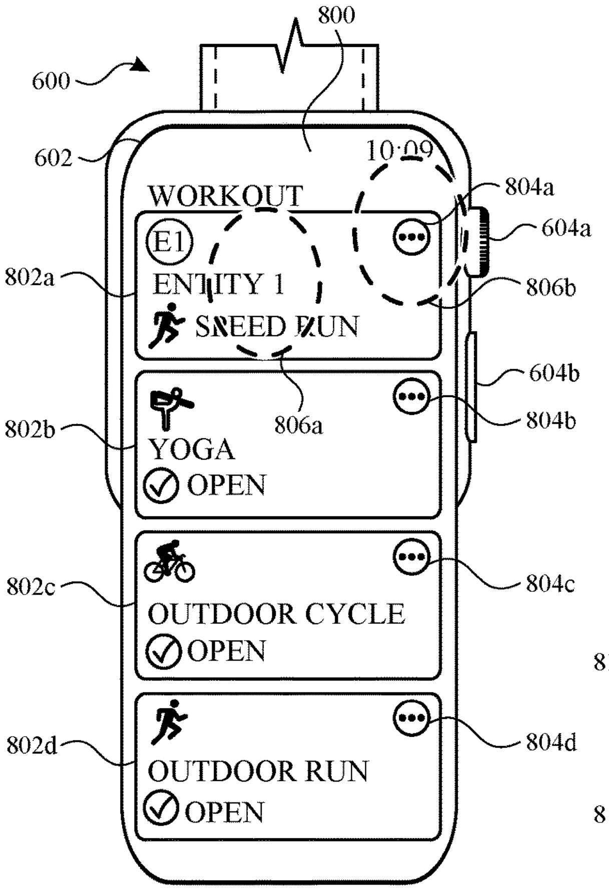
FIGS. 8A-8K illustrate exemplary user interfaces for accessing workout content, in accordance with some embodiments.
Figure 9:
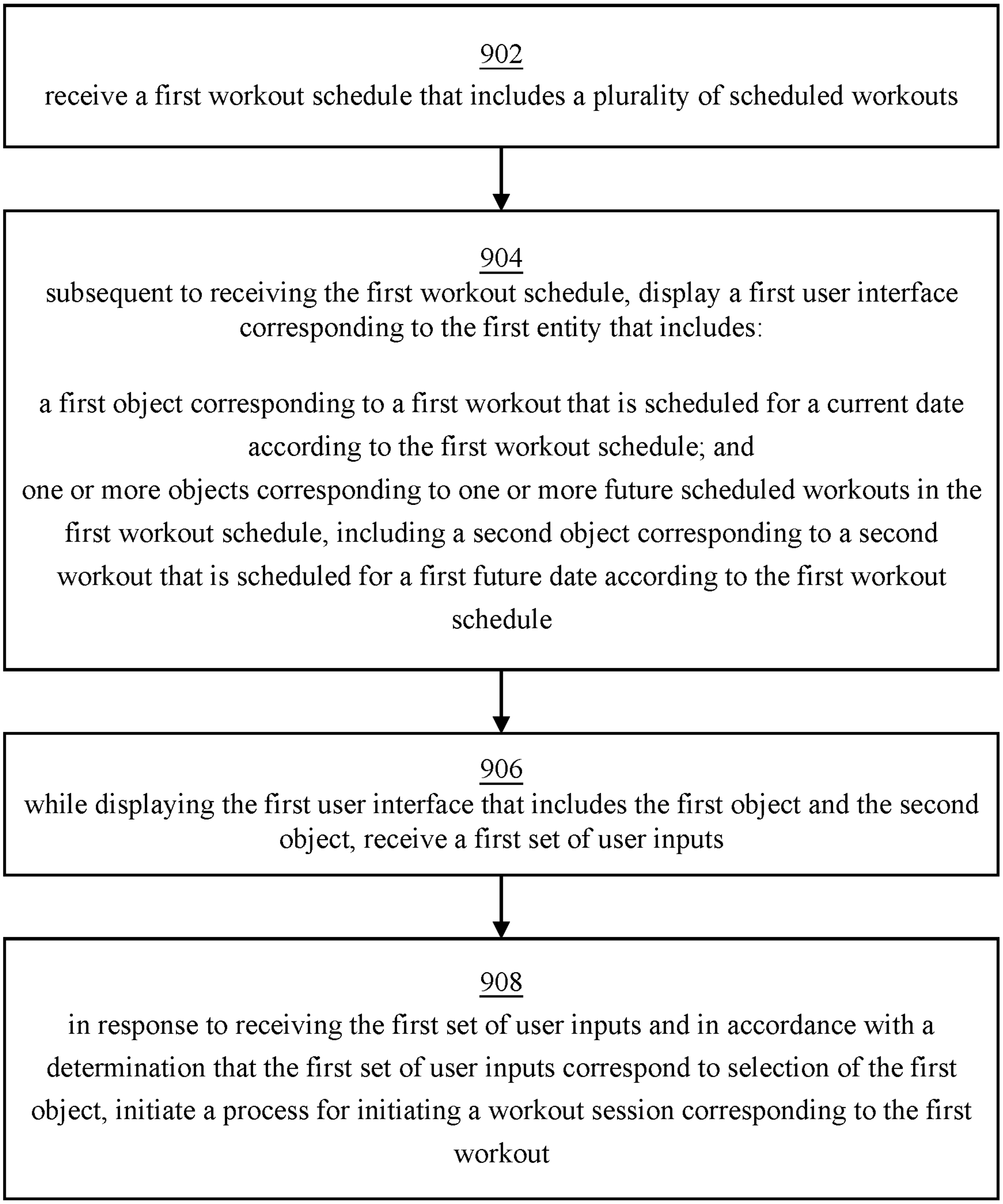
FIG. 9 illustrates a flow diagram depicting a method for accessing workout content, in accordance with some embodiments.

FIG. 8A illustrates electronic device 600, which is a smart watch with touch-sensitive display 602, rotatable and depressible input mechanism 604*a*, and button 604*b*. In FIG. 8A, electronic device 600 displays workout selection user interface 800. Workout selection user interface 800 includes a plurality of workout representations 802*a*-802*d* corresponding to different workouts. In some embodiments, each workout representation is selectable to initiate a workout session for the corresponding workout. Workout selection user interface 800 also includes options 804*a*-804*d* that correspond to the plurality of workout representations 802*a*-802*d*, and are selectable to view more information about a particular workout and/or to modify one or more aspects of the selected workout. In FIG. 8A, workout representation 802*a* is representative of a first workout that has been shared to electronic device 600 (e.g., by a remote electronic device and/or a remote entity). In FIG. 8A, workout representation 802*a* is part of a workout schedule that is shared to electronic device 600 by an entity, Entity 1. Workout representation 802*a* corresponds to a workout (e.g., a speed run workout) that is scheduled for the current day according to the workout schedule shared by Entity 1. At FIG. 8A, electronic device 600 detects user input 806*a* corresponding to selection of workout representation 802*a*, and user input 806*b* corresponding to selection of option 804*a*.

Figure 8C:
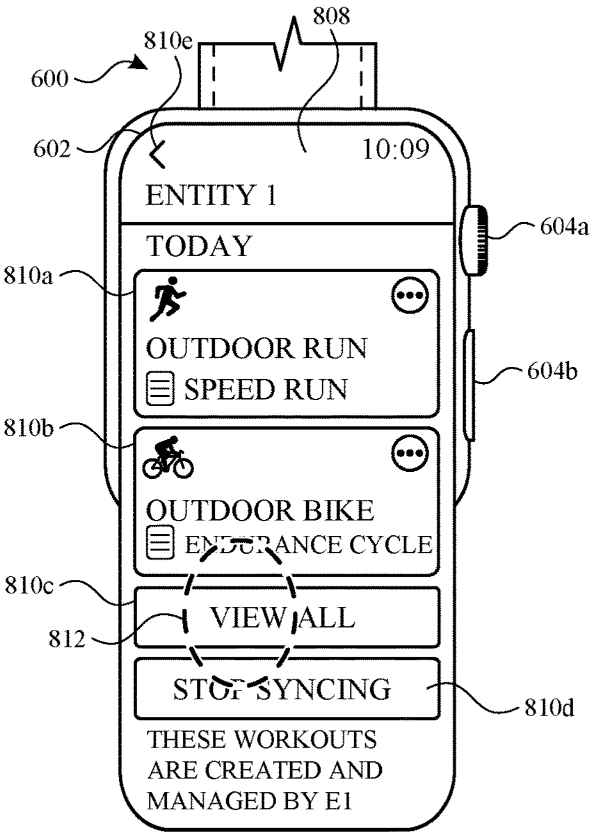
Figure 8B:
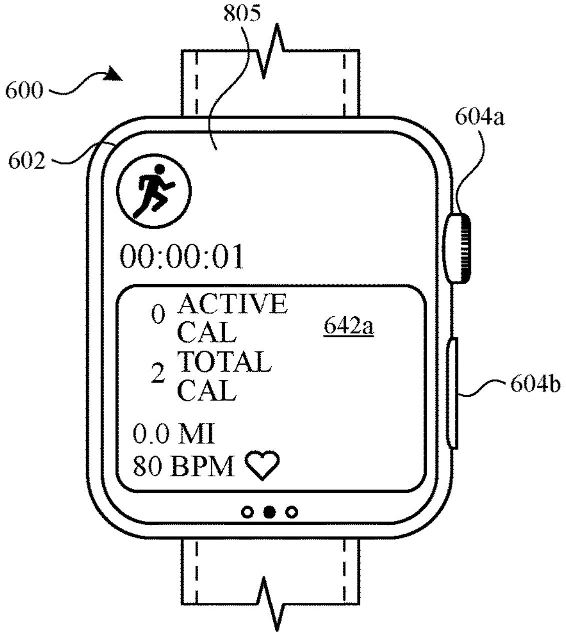

At FIG. 8B, in response to user input 806*a*, electronic device 600 initiates a workout session corresponding to workout representation 802*a* (e.g., a speed run workout), and displays in-workout user interface 805 indicative of an active workout session. In-workout user interface 805 includes workout metrics 642*a* corresponding to (e.g., collected during and/or measured during) the workout session.

At FIG. 8C, in response to user input 806*b*, electronic device 800 displays user interface 808, which displays information corresponding to the workout schedule shared by Entity 1. User interface 808 includes workout representation 810*a*, which corresponds to a first workout (e.g., a speed run workout) scheduled for the current day based on the workout schedule shared by Entity 1; and workout representation 810*b*, which corresponds to a second workout (e.g., and outdoor bike workout) scheduled for the current day according to the workout schedule shared by Entity 1. Workout representation 810*a* is selectable to initiate a speed run workout session (e.g., and display user interface 805 as shown in FIG. 8B), and workout representation 810*b* is selectable to initiate an outdoor bike workout session (and display a biking metrics user interface). User interface 808 also includes options 810*c*-810*e*. Option 810*c* is selectable to view more information about the workout schedule from received from Entity 1 and/or shared by Entity 1. Option 810*d* is selectable to stop receiving workout schedule information from Entity 1. Option 810*e* is selectable to return to user interface 800. At FIG. 8C, electronic device 600 detects user input 812 corresponding to selection of option 810*c*.

Figure 8D:
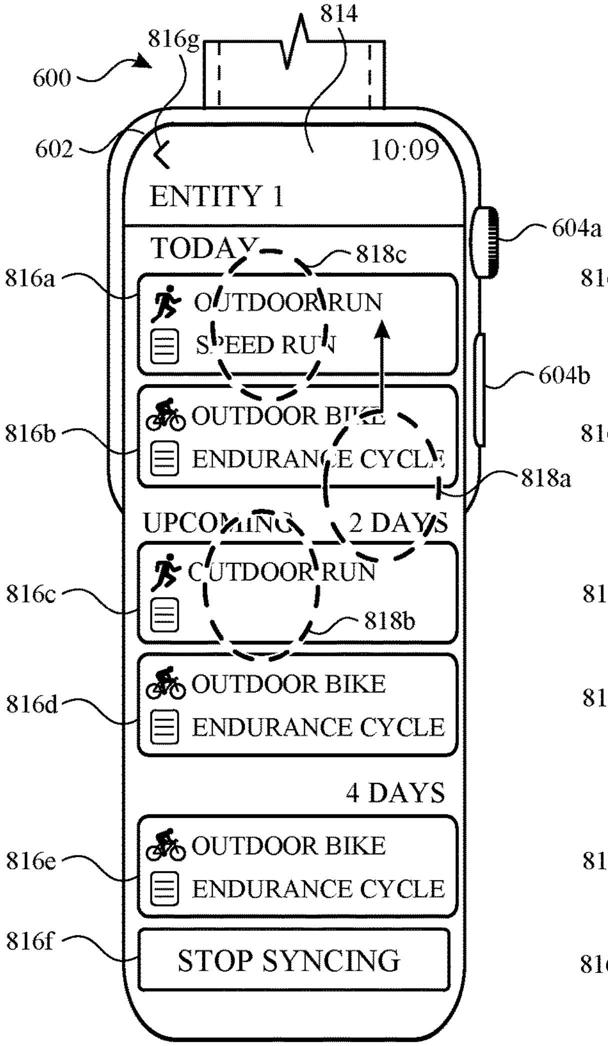

At FIG. 8D, in response to user input 812, electronic device 600 displays workout schedule user interface 814. Workout schedule user interface 814 displays workout representations corresponding to workouts scheduled in the workout schedule provided by Entity 1, including workout representations 816*a*-816*b* corresponding to workouts scheduled for the current day, and workout representations 816*c*-816*f* corresponding to workouts scheduled for future dates. Work schedule user interface 814 also includes option 816*f*, that is selectable to stop receiving workout schedule information from Entity 1, and option 816*g* that is selectable to return to user interface 808. At FIG. 8D, electronic device 800 detects user input 818*c*, corresponding to selection of workout representation 816*a*, user input 818*b* corresponding to selection of workout representation 816*c*, and user input 818*a*, which is a swipe up input. Each of these inputs will be discussed below.

Figure 8E:
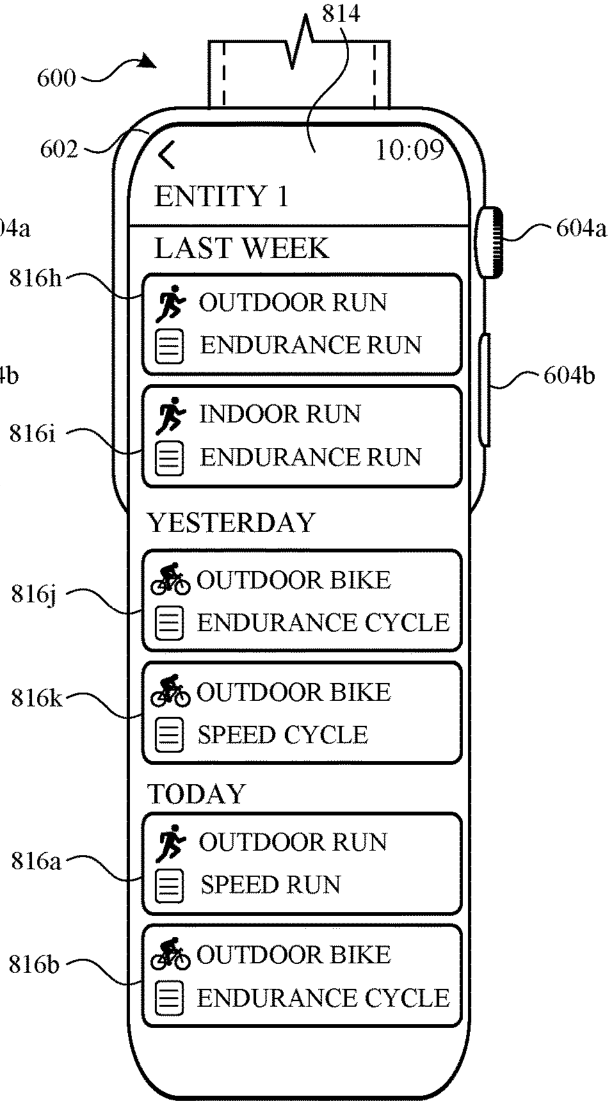

At FIG. 8E, in response to user input 818*a*, electronic device 600 displays scrolling of workout schedule user interface 814, to reveal workout representations 816*h*-816*k* corresponding to past workouts that were scheduled on previous days according to the workout schedule shared by Entity 1.

Figure 8F:
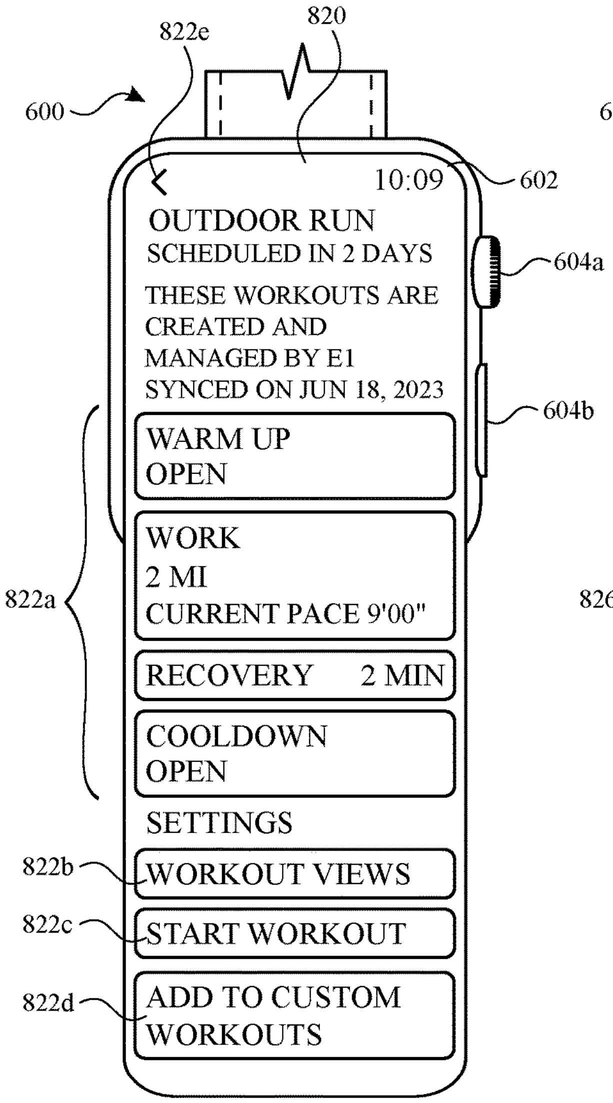

At FIG. 8F, in response to user input 818*b*, electronic device 600 displays user information 820, which provides information about the workout corresponding to workout representation 816*c*. The workout corresponding to workout representation 816*c* is scheduled for two days in the future. User interface 820 displays workout information 822*a*, which displays information about one or more workout intervals and/or segments that make up the workout. User interface 820 also includes options 822*b*-822*e*. Option 822*b* is selectable to modify one or more workout metrics user interfaces that are displayed and/or accessible during the workout. Option 822*c* is selectable to initiate a workout session corresponding to the scheduled workout. Option 822*d* is selectable to add the scheduled workout to a set of saved custom workouts saved on electronic device 600 and/or associated with the user of electronic device 600. Option 822*e* is selectable to return to user interface 814.

Figure 8G:
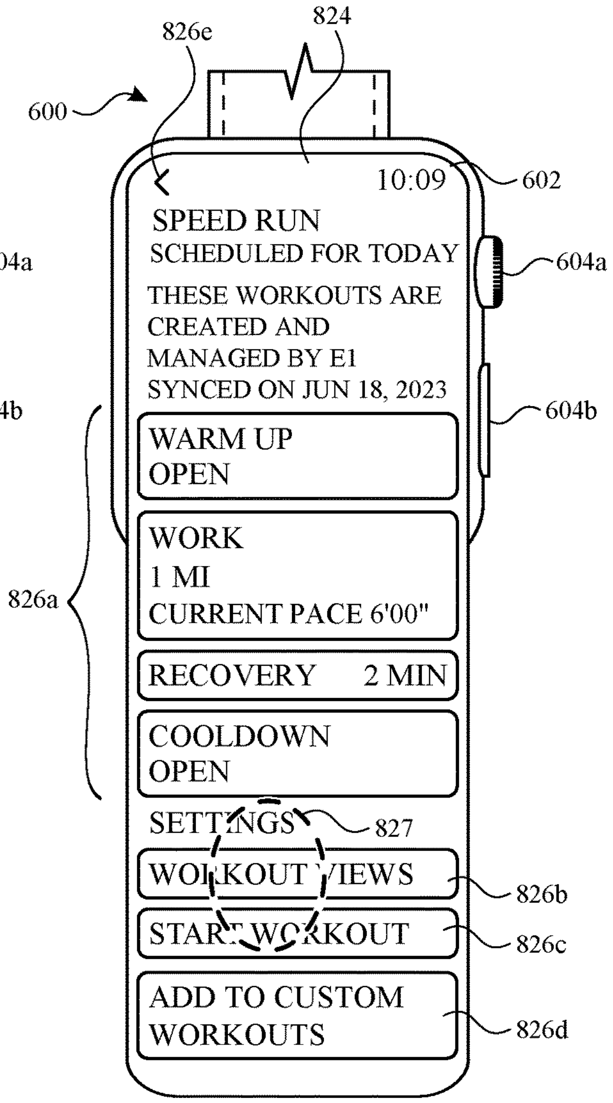

At FIG. 8G, in response to user input 818*c*, electronic device 600 displays user information 824, which provides information about the workout corresponding to workout representation 816*a*. The workout corresponding to workout representation 816*a* is scheduled for the current day. User interface 824 displays workout information 826*a*, which displays information about one or more workout intervals and/or segments that make up the workout. User interface 824 also includes options 826*b*-826*e*. Option 826*b* is selectable to modify one or more workout metrics user interfaces that are displayed and/or accessible during the workout. Option 826*c* is selectable to initiate a workout session corresponding to the scheduled workout. Option 826*d* is selectable to add the scheduled workout to a set of saved custom workouts saved on electronic device 600 and/or associated with the user of electronic device 600. Option 826*e* is selectable to return to user interface 814. At FIG. 8G, electronic device 600 detects user input 827 corresponding to selection of option 826*b*.

Figure 8H:
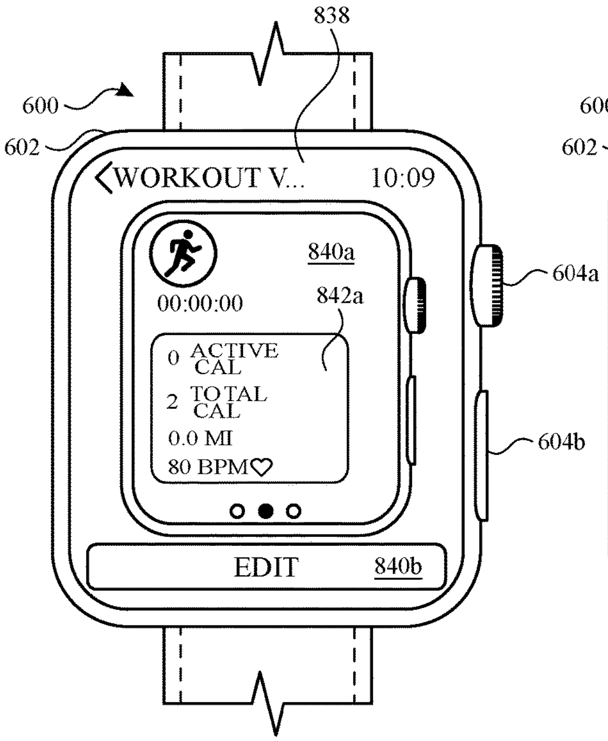

At FIG. 8H, in response to user input 827, electronic device 600 displays metrics preview user interface 838. In some embodiments, during a workout session, electronic device 600 displays an in-workout user interface that includes one or more workout metrics (e.g., physical activity metrics) indicative of the user's physical activity level during the workout. In some embodiments, users are able to modify workout metrics that are accessible (e.g., that the user can view) during their workouts. In FIG. 8H, metrics preview user interface 838 displays preview 840*a* which provides the user with an animation that displays for the user one or more metrics user interfaces that are currently set to be displayed (e.g., currently enabled and/or currently accessible) during the speed run workout.

Figure 8I:
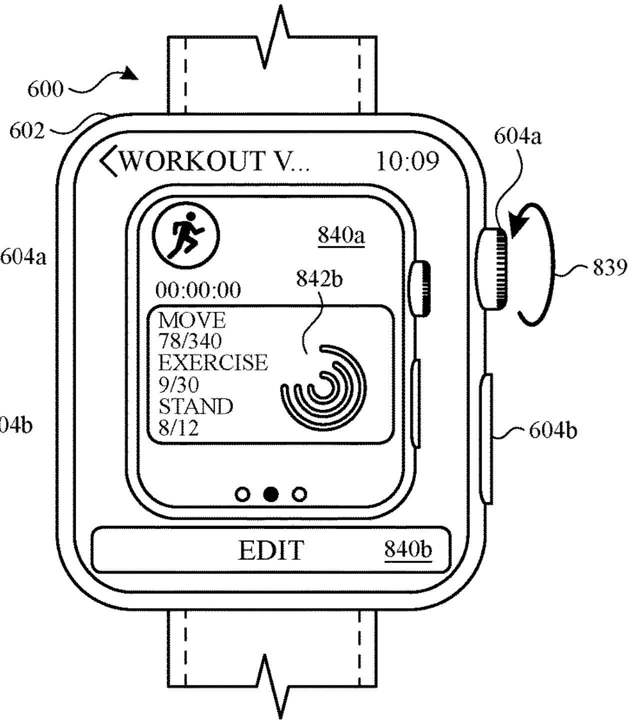
Figure 8J:
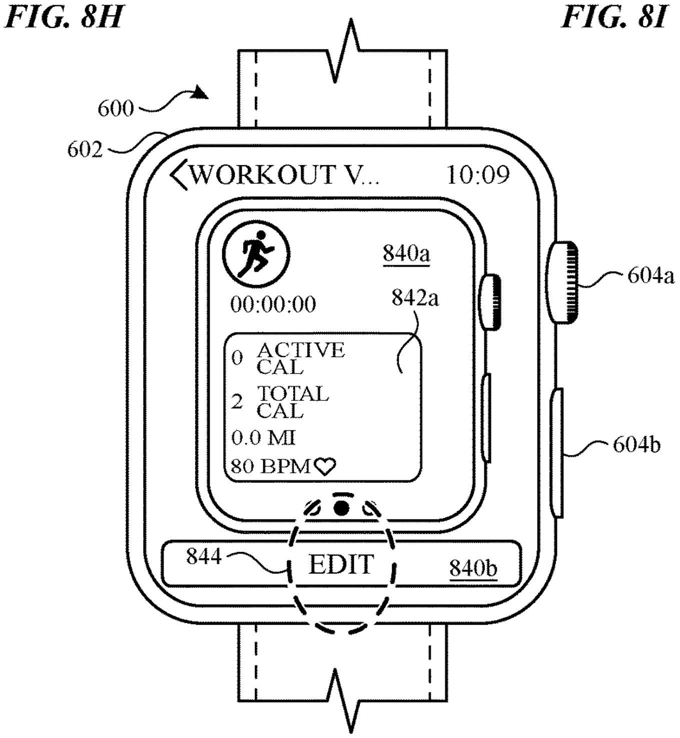

In FIG. 8H, preview 840*a* displays first workout metrics user interface 842*a*, which presents a first set of workout metrics. In FIG. 8I, the animation of preview 840*a* progresses (e.g., without user input) to show second workout metrics user interface 842*b*, which presents a second set of workout metrics. By displaying the animation of preview 840*a*, a user is able to see which workout metrics are currently enabled for the speed run workout, and can then decide if he or she would like to modify those metrics. In the depicted embodiment, preview 840*a* is also scrollable by a user so that the user can manually view the workout metrics user interfaces that are currently enabled. In FIG. 8I, electronic device 600 detects user input 839, which is a counterclockwise rotation of rotatable input mechanism 604*a*. At FIG. 8J, in response to user input 839, electronic device 600 ceases display of workout metrics user interface 842*b* and displays workout metrics user interface 842*a*.

Metrics preview user interface 838 also includes option 840*b* that is selectable to modify workout metrics that are accessible during a workout session. At FIG. 8J, electronic device 600 detects user input 844 (e.g., a tap input) corresponding to selection of option 840*b*.

Figure 8K:
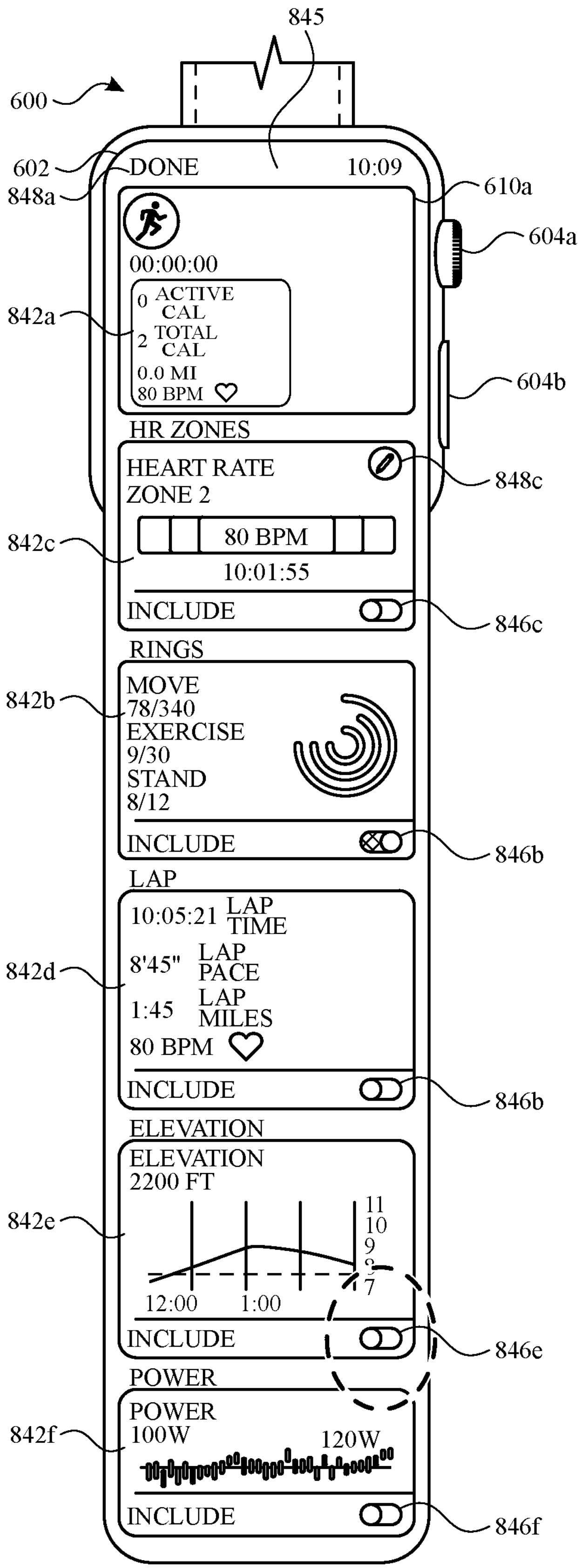

At FIG. 8K, electronic device 600 displays metrics setting user interface 845. Metrics setting user interface 845 corresponds to the speed run workout (or, in some embodiments, corresponds generally to running workouts and/or an outdoor run modality), and displays a set of workout metrics user interfaces 842*a*-842*f* that are available for display during the speed run workout. Each workout metrics user interface displays a different set of workout metrics. For example, workout metrics user interface 842*a* displays active calorie information, total calorie information, distance traversed during the workout, and heartrate information. Workout metrics user interface 842*c* displays heart rate zone information indication the user's current heart rate zone during a workout session. Workout metrics user interface 842*d* displays lap information. Workout metrics user interface 842*e* displays elevation information. Workout metrics user interface 842*f* displays run power information. Workout metrics user interface 842*b* displays a move goal representation (e.g., the outmost ring of the three concentric rings), which is an indication of the user's progress towards a daily calories goal for a current calendar day, and includes physical activity information for the user that precedes the workout session. Workout metrics user interface 842*b* also displays an exercise goal representation (e.g., a middle ring of the three concentric rings), which is an indication of the user's progress towards a daily exercise minutes goal for the current calendar day (e.g., a target number of minutes of exercise for each calendar day), and includes physical activity information for the user that precedes the workout session. Workout metrics user interface 842*b* also displays a stand goal representation (e.g., an innermost ring of the three concentric rings), which is an indication of the user's progress towards a daily stand goal for the current calendar day (e.g., a target number of hours each day during which the user stood for a threshold number of minutes), which also includes physical activity information for the user that precedes the workout session.

Workout metrics user interfaces 842_b_-842_f_ include corresponding toggles 846_b_-846_f_ that are selectable to selectively enable or disable the corresponding workout metrics user interface. If a workout metrics user interface is enabled, a user is able to view the workout metrics user interface during the speed run workout session, and if a workout metrics user interface is disabled, a user is not able to view the workout metrics user interface during speed run workout session. In FIG. 8K, workout metrics user interface 842_a_ does not have a corresponding toggle. This is because, in the depicted embodiment, workout metrics user interface 842_a_ represents a default workout metrics user interface for the speed run workout (and/or for running workouts generally) and is therefore displayed by default and cannot be disabled. In the depicted embodiment, metrics setting user interface 845 corresponds to the speed run workout (and/or running workouts generally), and displays workout metrics user interfaces that are available for the speed run workout. Different workouts and/or different work modality types will, in various embodiments, have different metrics setting user interfaces that display at least some different workout metrics user interfaces from what is presented in metrics setting user interface 845. In some embodiments, enabled workout metrics user interfaces can also be reordered to change the order in which they are displayed during a speed run workout session. For example, enabled workout metrics user interfaces can be ordered using a touch and drag user input to move a workout metrics user interface to a different position within user interface 845.

FIG. 9 is a flow diagram illustrating a method for accessing workout content using a computer system in accordance with some embodiments. Method 900 is performed at a computer system (e.g., 100, 300, 500, 600, and/or 650) (e.g., a smart phone, a smart watch, a tablet, a laptop, a desktop, a wearable device, and/or head-mounted device) that is in communication with one or more display generation components (e.g., a display, a touch-sensitive display, a monitor, a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). Some operations in method 900 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 900 provides an intuitive way for accessing workout content. The method reduces the cognitive burden on a user for accessing workout content, thereby creating a more efficient human-machine interface. For battery-operated computing devices, enabling a user to access workout content faster and more efficiently conserves power and increases the time between battery charges.

The computer system (e.g., 600) receives (902), from a first entity (e.g., a first entity separate from and/or different from a user of the computer system), a first workout schedule (e.g., FIGS. 8D-8E) that includes a plurality of scheduled workouts.

Subsequent to receiving the first workout schedule, the computer system displays (904), via the one or more display generation components, a first user interface (e.g., 814) corresponding to the first entity (e.g., that corresponds uniquely to the first entity and/or is associated with the first entity) that includes: a first object (e.g., 816_a_ and/or 816_b_) corresponding to a first workout (e.g., a first workout that corresponds to a first workout type (e.g., workout modality (e.g., cycling, running, swimming, HIIT, yoga, strength and/or core) and/or a first workout duration) that is scheduled for a current date (e.g., the current date when the first user interface is being displayed, a current day, and/or a workout scheduled to be completed today) according to the first workout schedule; and one or more objects corresponding to one or more future scheduled workouts (e.g., 816_c_-816_e_) in the first workout schedule, including a second object corresponding to a second workout (e.g., a second workout different from the first workout, a second workout that corresponds to a second workout type (e.g., workout modality (e.g., cycling, running, swimming, HIIT, yoga, strength and/or core) and/or a second workout duration) that is scheduled for a first future date (e.g., a first date in the future and/or a first date that is later than the current date) according to the first workout schedule; and while displaying the first user interface (e.g., 814) that includes the first object and the second object, receiving (906), via the one or more input devices, a first set of user inputs (e.g., one or more touch inputs, one or more non-touch inputs, and/or one or more gestures)).

In response to receiving the first set of user inputs: in accordance with a determination that the first set of user inputs correspond to selection of the first object (e.g., 816_a_ and/or 816_b_) (e.g., and do not correspond to selection of the second object), the computer system initiates (908) a process for initiating a workout session corresponding to the first workout. Enabling users to receive and view information pertaining to a workout schedule shared by a third party enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, initiating the process for initiating a workout session corresponding to the first workout includes displaying a selectable object (e.g., 822_c_ and/or

826*c*) that is selectable to initiate a workout session corresponding to the first workout. In some embodiments, initiating the process for initiating the workout session corresponding to the first workout includes initiating a workout session corresponding to the first workout. In some embodiments, initiating the workout session includes initiating recording of one or more physical activity metrics (e.g., heartrate, workout time elapsed, distance traversed, and/or calories burned) for the workout session (e.g., via one or more sensors in communication with the computer system). In some embodiments, initiating the workout session includes recording one or more physical activity metrics at a greater frequency than prior to initiation of the workout session.

In some embodiments, in response to receiving the first set of user inputs: in accordance with a determination that the first set of user inputs correspond to selection of the second object (e.g., 816*c*, 816*d*, and/or 816*e*) (e.g., and do not correspond to selection of the first object), the computer system initiates a process for initiating a workout session corresponding to the second workout. In some embodiments, initiating the process for initiating a workout session corresponding to the second workout includes displaying a second selectable object (e.g., 822*c*) that is selectable to initiate a workout session corresponding to the second workout. In some embodiments, initiating the process for initiating the workout session corresponding to the second workout includes initiating a workout session corresponding to the second workout. In some embodiments, initiating the workout session includes initiating recording of one or more physical activity metrics (e.g., heartrate, workout time elapsed, distance traversed, and/or calories burned) for the workout session (e.g., via one or more sensors in communication with the computer system). In some embodiments, initiating the workout session includes recording one or more physical activity metrics at a greater frequency than prior to initiation of the workout session.

In some embodiments, the first user interface (e.g., 814) corresponding to the first entity further includes: one or more objects correspond to one or more past workouts (e.g., 816*h*-816*k*) in the first workout scheduling, including a third option corresponding to a third workout (e.g., a third workout different from the first workout and/or the second workout, a third workout that corresponds to a third workout type (e.g., workout modality (e.g., cycling, running, swimming, HIIT, yoga, strength and/or core) and/or a third workout duration) that was scheduled for a first past date (e.g., a first date in the past and/or a first date that is earlier than the current date) according to the first workout schedule. Enabling users to receive and view information pertaining to a workout schedule shared by a third party, including past and future workouts, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the first set of user inputs: in accordance with a determination that the first set of user inputs correspond to selection of the first object (e.g., 816*a* and/or 816*b*), the computer system displays, via the one or more display generation components, a start workout object (e.g., 826*c*); while displaying the start workout object, the computer system receives, via the one or more input devices, a selection input (e.g., one or more touch inputs, one or more non-touch inputs, one or more mechanical inputs, and/or one or more gesture inputs) corresponding to selection of the start workout object; and in response to receiving the selection input corresponding to selection of the start workout object: the computer system initiates a workout session corresponding to the first workout, including initiating recording (e.g., tracking and/or measuring) of one or more physical activity metrics for the workout session corresponding to the first workout (e.g., one or more physical activity metrics indicative of a physical activity level of the user during the workout session (e.g., heart rate, calories burned, steps taken, and/or distance traversed)); and the computer system displays a first workout session user interface indicative of an active workout session (e.g., indicative of a currently active and/or in-progress workout session) (in some embodiments, the first workout session user interface displays one or more workout performance metrics that are indicative of a physical activity level of the user during the current workout session). Enabling users to receive and view information pertaining to a workout schedule shared by a third party, and to initiate workout sessions from the workout schedule, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the first set of user inputs: in accordance with a determination that the first set of user inputs correspond to selection of the first object (e.g., 816*a* and/or 816*b*), the computer system displays, concurrently with the start workout object, (e.g., 826*c*) a workout views object (e.g., 826*b*) that is selectable to initiate a process for modifying (e.g., customizing and/or editing) one or more workout metrics user interfaces that are displayed (e.g., are displayable and/or accessible) during a workout session corresponding to the first workout. Enabling users to receive and view information pertaining to a workout schedule shared by a third party, and to modify one or more workout metrics user interfaces, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the first set of user inputs: in accordance with a determination that the first set of user inputs correspond to selection of the first object (e.g., 816*a* and/or 816*b*), the computer system displays, concurrently with the start workout object (e.g., 826*c*), an add workout object (e.g., 826*d*) that is selectable to initiate a process for adding the first workout to a first set of workouts (e.g., a first set of workouts that is accessible in a fitness application installed on the computer system, a first set of workouts that does not include the first workout, and/or a first set of workouts that is displayed within a user interface (e.g., a user interface in a fitness application installed on the computer system)). Enabling users to receive and view information pertaining to a workout schedule shared by a third party, and to save workouts from the workout schedule, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the first set of user inputs: in accordance with a determination that the first set of user inputs correspond to selection of the second object (e.g., 816_c_, 816_d_, and/or 816_e_), the computer system displays, via the one or more display generation components, the first future date (e.g., in some embodiments, the first future date is displayed in user interface 820) (e.g., displaying a first indication that identifies the first future date (e.g., day, month, and/or year)). Enabling users to receive and view information pertaining to a workout schedule shared by a third party enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the first set of user inputs: in accordance with a determination that the first set of user inputs correspond to selection of the second object (e.g., 816_c_, 816_d_, and/or 816_c_), the computer system displays, via the one or more display generation components, a second start workout object (e.g., 822_c_); while displaying the second start workout object, receiving, via the one or more input devices, a selection input (e.g., one or more touch inputs, one or more non-touch inputs, one or more mechanical inputs, and/or one or more gesture inputs) corresponding to selection of the second start workout object; and in response to receiving the selection input corresponding to selection of the second start workout object: the computer system initiates a workout session corresponding to the second workout, including initiating recording (e.g., tracking and/or measuring) of one or more physical activity metrics for the workout session corresponding to the second workout (e.g., one or more physical activity metrics indicative of a physical activity level of the user during the workout session (e.g., heart rate, calories burned, steps taken, and/or distance traversed)); and the computer system displays a second workout session user interface indicative of an active workout session (e.g., indicative of a currently active and/or in-progress workout session) (in some embodiments, the first workout session user interface displays one or more workout performance metrics that are indicative of a physical activity level of the user during the current workout session). Enabling users to receive and view information pertaining to a workout schedule shared by a third party, and to initiate workout sessions from the workout schedule, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the first set of user inputs: in accordance with a determination that the first set of user inputs correspond to selection of the second object (e.g., 816_c_, 816_d_, and/or 816_e_), the computer system displays, concurrently with the second start workout object, a second workout views object (e.g., 822_b_) that is selectable to initiate a process for modifying (e.g., customizing and/or editing) one or more workout metrics user interfaces that are displayed (e.g., are displayable and/or accessible) during a workout session corresponding to the second workout. Enabling users to receive and view information pertaining to a workout schedule shared by a third party, and to modify one or more workout metrics user interfaces, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the first set of user inputs: in accordance with a determination that the first set of user inputs correspond to selection of the second object (e.g., 816_c_, 816_d_, and/or 816_e_), the computer system displays, concurrently with the second start workout object (e.g., 822_c_), a second add workout object (e.g., 822_d_) that is selectable to initiate a process for adding the second workout to a second set of workouts (e.g., the first set of workouts (e.g., a second set of workouts that is accessible in a fitness application installed on the computer system, a second set of workouts that does not include the second workout, and/or a second set of workouts that is displayed within a user interface (e.g., a user interface in a fitness application installed on the computer system)). Enabling users to receive and view information pertaining to a workout schedule shared by a third party, and to save workouts from the workout schedule, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first user interface (e.g., 814) corresponding to the first entity further comprises a stop sync option (e.g., 816_f_) that is selectable to stop receiving workout schedule information from the first entity (e.g., stop downloading workout schedule information from the first entity onto the computer system). Enabling users to receive and view information pertaining to a workout schedule shared by a third party, and to selectively stop receiving workout schedule information from the third party, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, prior to displaying the first user interface (e.g., 814) corresponding to the first entity, the computer system displays, via the one or more display generation components, a workout selection user interface (e.g. 800) that includes a first plurality of workout platters (e.g., 802_a_-802_d_) corresponding to a first plurality of different workouts, including: a first workout platter (e.g., 802_b_-802_d_) (e.g., user interface object and/or affordance) associated with a fourth workout different from the first workout and the second workout (in some embodiments, a fourth workout of a fourth workout type (e.g., a fourth workout modality and/or a fourth workout goal type)) and that is not associated with the first entity (e.g., was not received from the first entity and/or is not included in the first workout schedule received from the first entity), a second workout platter (e.g., 802_a_-802_d_) (e.g., user interface object and/or affordance) associated with a fifth workout different from the first workout the second workout, and fourth workout (in some embodiments, a fifth workout of a fifth workout type (e.g., a fifth workout modality and/or a fifth workout goal type)) and that is not associated with the first entity (e.g., was not received from the first entity and/or is not included in the first workout schedule received from the first entity), and a third workout platter (e.g., 802_a_) that corresponds to (e.g., is associated with) the first entity. In some embodiments, selection of the third workout platter initiates a workout session corresponding to the first workout (e.g., initiates a workout session corresponding to a workout that is scheduled for the current date according to the first workout schedule from the first entity). In some embodiments, selection of the third workout platter results in display of the first user interface. In some embodiments, selection of a first region of the third workout platter initiates a workout session corresponding to the first workout (e.g., initiates a workout session corresponding to a workout that is scheduled for the current date according to the first workout schedule from the first entity) and selection of a second region of the third workout platter results in display of the first user interface. Providing users with a workout selection user interface for initiating workouts of different types, including workouts from a third party and/or workouts in a workout schedule, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the workout selection user interface (e.g., 800), the computer system receives, via the one or more input devices, a selection input corresponding to selection of the third workout platter (e.g., 802*a*); and in response to receiving the selection input corresponding to selection of the third workout platter, the computer system displays, via the one or more display generation components, the first user interface (e.g., 814) corresponding to the first entity. Providing users with a workout selection user interface for initiating workouts of different types, including workouts from a third party and/or workouts in a workout schedule, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the workout selection user interface (e.g., 800), the computer system receives via the one or more input devices, a selection input corresponding to selection of the third workout platter (e.g., 802*a*); and in response to receiving the selection input corresponding to selection of the third workout platter: the computer system initiates a workout session corresponding to the first workout, including initiating recording (e.g., tracking and/or measuring) of one or more physical activity metrics for the workout session corresponding to the first workout (e.g., one or more physical activity metrics indicative of a physical activity level of the user during the workout session (e.g., heart rate, calories burned, steps taken, and/or distance traversed)); and the computer system displays a first workout session user interface (e.g., 805) indicative of an active workout session (e.g., indicative of a currently active and/or in-progress workout session) (in some embodiments, the first workout session user interface displays one or more workout performance metrics that are indicative of a physical activity level of the user during the current workout session). Providing users with a workout selection user interface for initiating workouts of different types, including workouts from a third party and/or workouts in a workout schedule, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

Note that details of the processes described above with respect to method 900 (e.g., FIG. 9) are also applicable in an analogous manner to the methods described above. For example, method 900 optionally includes one or more of the characteristics of the various methods described above with reference to method 700 and method 750. For example, in some embodiments, the computer system recited in method 700 and/or method 750 is the computer system recited in method 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of workout content. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted workout content that is of greater interest to the user. Accordingly, use of such personal information data enables users to have calculated control of the delivered workout content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of workout content delivery services, the present technology can be configured to allow users to select to "opt in" or "opt out" of participation in the collection of personal information data during registration for services or anytime thereafter. In another example, users can select not to provide workout-associated data for targeted content delivery services. In yet another example, users can select to limit the length of time workout-associated data is maintained or entirely prohibit the development of a baseline workout profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, workout content can be selected and delivered to users by inferring preferences based on non-personal information data or a bare minimum amount of personal information, such as the content being requested by the device associated with a user, other non-personal information available to the workout content delivery services, or publicly available information.

What is claimed is:

1. A computer system configured to communicate with one or more display generation components and one or more input devices, wherein the computer system is associated with a first user, comprising:

one or more processors; and memory storing one or more programs configured to be executed by the one or more processors, the one or more programs including instructions for:

receiving, from a first entity, a first workout schedule that includes a plurality of scheduled workouts, wherein the first entity is different from the first user of the computer system;

subsequent to receiving the first workout schedule, displaying, via the one or more display generation components, a first user interface corresponding to the first entity that includes:

an indication of the first entity from which the first workout schedule was received;

a first object corresponding to a first workout that is scheduled for a current date according to the first workout schedule, wherein the first workout corresponds to a first workout type; and one or more objects corresponding to one or more future scheduled workouts in the first workout schedule, including a second object corresponding to a second workout that is scheduled for a first future date according to the first workout schedule, wherein the second workout corresponds to a second workout type, different from the first workout type; and while displaying the first user interface that includes the first object and the second object, receiving, via the one or more input devices, a first set of user inputs; and in response to receiving the first set of user inputs:

in accordance with a determination that the first set of user inputs correspond to selection of the first object, initiating a process for initiating a workout session corresponding to the first workout.

2. The computer system of claim 1, wherein the first user interface corresponding to the first entity further includes:

one or more objects correspond to one or more past workouts in the first workout schedule, including a third option corresponding to a third workout that was scheduled for a first past date according to the first workout schedule.

3. The computer system of claim 1, the one or more programs further including instructions for:

in response to receiving the first set of user inputs:

in accordance with a determination that the first set of user inputs correspond to selection of the first object, displaying, via the one or more display generation components, a start workout object;

while displaying the start workout object, receiving, via the one or more input devices, a selection input corresponding to selection of the start workout object; and in response to receiving the selection input corresponding to selection of the start workout object:

initiating a workout session corresponding to the first workout, including initiating recording of one or more physical activity metrics for the workout session corresponding to the first workout; and displaying a first workout session user interface indicative of an active workout session.

4. The computer system of claim 3, the one or more programs further including instructions for:

in response to receiving the first set of user inputs:

in accordance with a determination that the first set of user inputs correspond to selection of the first object, displaying, concurrently with the start workout object, a workout views object that is selectable to initiate a process for modifying one or more workout metrics user interfaces that are displayed during a workout session corresponding to the first workout.

5. The computer system of claim 3, the one or more programs further including instructions for:

in response to receiving the first set of user inputs:

in accordance with a determination that the first set of user inputs correspond to selection of the first object, displaying, concurrently with the start workout object, an add workout object that is selectable to initiate a process for adding the first workout to a first set of workouts.

6. The computer system of claim 1, the one or more programs further including instructions for:

in response to receiving the first set of user inputs:

in accordance with a determination that the first set of user inputs correspond to selection of the second object, displaying, via the one or more display generation components, the first future date.

7. The computer system of claim 1, the one or more programs further including instructions for:

in response to receiving the first set of user inputs:

in accordance with a determination that the first set of user inputs correspond to selection of the second object, displaying, via the one or more display generation components, a second start workout object;

while displaying the second start workout object, receiving, via the one or more input devices, a selection input corresponding to selection of the second start workout object; and in response to receiving the selection input corresponding to selection of the second start workout object:

initiating a workout session corresponding to the second workout, including initiating recording of one or more physical activity metrics for the workout session corresponding to the second workout; and displaying a second workout session user interface indicative of an active workout session.

8. The computer system of claim 7, the one or more programs further including instructions for:

in response to receiving the first set of user inputs:

in accordance with a determination that the first set of user inputs correspond to selection of the second object, displaying, concurrently with the second start workout object, a second workout views object that is selectable to initiate a process for modifying one or more workout metrics user interfaces that are displayed during a workout session corresponding to the second workout.

9. The computer system of claim 7, the one or more programs further including instructions for:

in response to receiving the first set of user inputs:

in accordance with a determination that the first set of user inputs correspond to selection of the second object, displaying, concurrently with the second start workout object, a second add workout object that is selectable to initiate a process for adding the second workout to a second set of workouts.

10. The computer system of claim 1, wherein the first user interface corresponding to the first entity further comprises a stop sync option that is selectable to stop receiving workout schedule information from the first entity.

11. The computer system of claim 1, the one or more programs further including instructions for:

prior to displaying the first user interface corresponding to the first entity, displaying, via the one or more display generation components, a workout selection user interface that includes a first plurality of workout platters corresponding to a first plurality of different workouts, including:

a first workout platter associated with a fourth workout different from the first workout and the second workout and that is not associated with the first entity, a second workout platter associated with a fifth workout different from the first workout the second workout, and fourth workout that is not associated with the first entity, and a third workout platter that corresponds to the first entity.

12. The computer system of claim 11, the one or more programs further including instructions for:

while displaying the workout selection user interface, receiving, via the one or more input devices, a selection input corresponding to selection of the third workout platter; and in response to receiving the selection input corresponding to selection of the third workout platter, displaying, via the one or more display generation components, the first user interface corresponding to the first entity.

13. The computer system of claim 11, the one or more programs further including instructions for:

while displaying the workout selection user interface, receiving, via the one or more input devices, a selection input corresponding to selection of the third workout platter; and in response to receiving the selection input corresponding to selection of the third workout platter:

initiating a workout session corresponding to the first workout, including initiating recording of one or more physical activity metrics for the workout session corresponding to the first workout; and displaying a first workout session user interface indicative of an active workout session.

14. A non-transitory computer-readable storage medium storing one or more programs configured to be executed by one or more processors of a computer system that is in communication with one or more display generation components and one or more input devices, wherein the computer system is associated with a first user, the one or more programs including instructions for:

receiving, from a first entity, a first workout schedule that includes a plurality of scheduled workouts, wherein the first entity is different from the first user of the computer system;

subsequent to receiving the first workout schedule, displaying, via the one or more display generation components, a first user interface corresponding to the first entity that includes:

an indication of the first entity from which the first workout schedule was received;

a first object corresponding to a first workout that is scheduled for a current date according to the first workout schedule, wherein the first workout corresponds to a first workout type; and one or more objects corresponding to one or more future scheduled workouts in the first workout schedule, including a second object corresponding to a second workout that is scheduled for a first future date according to the first workout schedule, wherein the second workout corresponds to a second workout type, different from the first workout type; and while displaying the first user interface that includes the first object and the second object, receiving, via the one or more input devices, a first set of user inputs; and in response to receiving the first set of user inputs:

in accordance with a determination that the first set of user inputs correspond to selection of the first object, initiating a process for initiating a workout session corresponding to the first workout.

15. The non-transitory computer-readable storage medium of claim 14, wherein the first user interface corresponding to the first entity further includes:

one or more objects correspond to one or more past workouts in the first workout schedule, including a third option corresponding to a third workout that was scheduled for a first past date according to the first workout schedule.

16. The non-transitory computer-readable storage medium of claim 14, the one or more programs further including instructions for:

in response to receiving the first set of user inputs:

in accordance with a determination that the first set of user inputs correspond to selection of the first object, displaying, via the one or more display generation components, a start workout object;

while displaying the start workout object, receiving, via the one or more input devices, a selection input corresponding to selection of the start workout object; and in response to receiving the selection input corresponding to selection of the start workout object:

initiating a workout session corresponding to the first workout, including initiating recording of one or more physical activity metrics for the workout session corresponding to the first workout; and displaying a first workout session user interface indicative of an active workout session.

17. The non-transitory computer-readable storage medium of claim 16, the one or more programs further including instructions for:

in response to receiving the first set of user inputs:

in accordance with a determination that the first set of user inputs correspond to selection of the first object, displaying, concurrently with the start workout object, a workout views object that is selectable to initiate a process for modifying one or more workout metrics user interfaces that are displayed during a workout session corresponding to the first workout.

18. The non-transitory computer-readable storage medium of claim 16, the one or more programs further including instructions for:

in response to receiving the first set of user inputs:

in accordance with a determination that the first set of user inputs correspond to selection of the first object, displaying, concurrently with the start workout object, an add workout object that is selectable to initiate a process for adding the first workout to a first set of workouts.

19. The non-transitory computer-readable storage medium of claim 14, the one or more programs further including instructions for:

in response to receiving the first set of user inputs:

in accordance with a determination that the first set of user inputs correspond to selection of the second object, displaying, via the one or more display generation components, the first future date.

20. The non-transitory computer-readable storage medium of claim 14, the one or more programs further including instructions for:

in response to receiving the first set of user inputs:

in accordance with a determination that the first set of user inputs correspond to selection of the second object, displaying, via the one or more display generation components, a second start workout object;

while displaying the second start workout object, receiving, via the one or more input devices, a selection input corresponding to selection of the second start workout object; and in response to receiving the selection input corresponding to selection of the second start workout object:

initiating a workout session corresponding to the second workout, including initiating recording of one or more physical activity metrics for the workout session corresponding to the second workout; and displaying a second workout session user interface indicative of an active workout session.

21. The non-transitory computer-readable storage medium of claim 20, the one or more programs further including instructions for:

in response to receiving the first set of user inputs:

in accordance with a determination that the first set of user inputs correspond to selection of the second object, displaying, concurrently with the second start workout object, a second workout views object that is selectable to initiate a process for modifying one or more workout metrics user interfaces that are displayed during a workout session corresponding to the second workout.

22. The non-transitory computer-readable storage medium of claim 20, the one or more programs further including instructions for:

in response to receiving the first set of user inputs:

in accordance with a determination that the first set of user inputs correspond to selection of the second object, displaying, concurrently with the second start workout object, a second add workout object that is selectable to initiate a process for adding the second workout to a second set of workouts.

23. The non-transitory computer-readable storage medium of claim 14, wherein the first user interface corresponding to the first entity further comprises a stop sync option that is selectable to stop receiving workout schedule information from the first entity.

24. The non-transitory computer-readable storage medium of claim 14, the one or more programs further including instructions for:

prior to displaying the first user interface corresponding to the first entity, displaying, via the one or more display generation components, a workout selection user interface that includes a first plurality of workout platters corresponding to a first plurality of different workouts, including:

a first workout platter associated with a fourth workout different from the first workout and the second workout and that is not associated with the first entity, a second workout platter associated with a fifth workout different from the first workout the second workout, and fourth workout that is not associated with the first entity, and a third workout platter that corresponds to the first entity.

25. The non-transitory computer-readable storage medium of claim 24, the one or more programs further including instructions for:

while displaying the workout selection user interface, receiving, via the one or more input devices, a selection input corresponding to selection of the third workout platter; and in response to receiving the selection input corresponding to selection of the third workout platter, displaying, via the one or more display generation components, the first user interface corresponding to the first entity.

26. The non-transitory computer-readable storage medium of claim 24, the one or more programs further including instructions for:

while displaying the workout selection user interface, receiving, via the one or more input devices, a selection input corresponding to selection of the third workout platter; and in response to receiving the selection input corresponding to selection of the third workout platter:

initiating a workout session corresponding to the first workout, including initiating recording of one or more physical activity metrics for the workout session corresponding to the first workout; and displaying a first workout session user interface indicative of an active workout session.

27. A method, comprising:

at a computer system that is in communication with one or more display generation components and one or more input devices, wherein the computer system is associated with a first user:

receiving, from a first entity, a first workout schedule that includes a plurality of scheduled workouts, wherein the first entity is different from the first user of the computer system;

subsequent to receiving the first workout schedule, displaying, via the one or more display generation components, a first user interface corresponding to the first entity that includes:

an indication of the first entity from which the first workout schedule was received;

a first object corresponding to a first workout that is scheduled for a current date according to the first workout schedule, wherein the first workout corresponds to a first workout type; and one or more objects corresponding to one or more future scheduled workouts in the first workout schedule, including a second object corresponding to a second workout that is scheduled for a first future date according to the first workout schedule, wherein the second workout corresponds to a second workout type, different from the first workout type; and while displaying the first user interface that includes the first object and the second object, receiving, via the one or more input devices, a first set of user inputs; and in response to receiving the first set of user inputs:

in accordance with a determination that the first set of user inputs correspond to selection of the first object, initiating a process for initiating a workout session corresponding to the first workout.

28. The method of claim 27, wherein the first user interface corresponding to the first entity further includes:

one or more objects correspond to one or more past workouts in the first workout schedule, including a third option corresponding to a third workout that was scheduled for a first past date according to the first workout schedule.

29. The method of claim 27, further comprising:

in response to receiving the first set of user inputs:

in accordance with a determination that the first set of user inputs correspond to selection of the first object, displaying, via the one or more display generation components, a start workout object;

while displaying the start workout object, receiving, via the one or more input devices, a selection input corresponding to selection of the start workout object; and in response to receiving the selection input corresponding to selection of the start workout object:

initiating a workout session corresponding to the first workout, including initiating recording of one or more physical activity metrics for the workout session corresponding to the first workout; and displaying a first workout session user interface indicative of an active workout session.

30. The method of claim 29, further comprising:

in response to receiving the first set of user inputs:

in accordance with a determination that the first set of user inputs correspond to selection of the first object, displaying, concurrently with the start workout object, a workout views object that is selectable to initiate a process for modifying one or more workout metrics user interfaces that are displayed during a workout session corresponding to the first workout.

31. The method of claim 29, further comprising:

in response to receiving the first set of user inputs:

in accordance with a determination that the first set of user inputs correspond to selection of the first object, displaying, concurrently with the start workout object, an add workout object that is selectable to initiate a process for adding the first workout to a first set of workouts.

32. The method of claim 27, further comprising:

in response to receiving the first set of user inputs:

in accordance with a determination that the first set of user inputs correspond to selection of the second object, displaying, via the one or more display generation components, the first future date.

33. The method of claim 27, further comprising:

in response to receiving the first set of user inputs:

in accordance with a determination that the first set of user inputs correspond to selection of the second object, displaying, via the one or more display generation components, a second start workout object;

while displaying the second start workout object, receiving, via the one or more input devices, a selection input corresponding to selection of the second start workout object; and in response to receiving the selection input corresponding to selection of the second start workout object:

initiating a workout session corresponding to the second workout, including initiating recording of one or more physical activity metrics for the workout session corresponding to the second workout; and displaying a second workout session user interface indicative of an active workout session.

34. The method of claim 33, further comprising:

in response to receiving the first set of user inputs:

in accordance with a determination that the first set of user inputs correspond to selection of the second object, displaying, concurrently with the second start workout object, a second workout views object that is selectable to initiate a process for modifying one or more workout metrics user interfaces that are displayed during a workout session corresponding to the second workout.

35. The method of claim 33, further comprising:

in response to receiving the first set of user inputs:

in accordance with a determination that the first set of user inputs correspond to selection of the second object, displaying, concurrently with the second start workout object, a second add workout object that is selectable to initiate a process for adding the second workout to a second set of workouts.

36. The method of claim 27, wherein the first user interface corresponding to the first entity further comprises a stop sync option that is selectable to stop receiving workout schedule information from the first entity.

37. The method of claim 27, further comprising:

prior to displaying the first user interface corresponding to the first entity, displaying, via the one or more display generation components, a workout selection user interface that includes a first plurality of workout platters corresponding to a first plurality of different workouts, including:

a first workout platter associated with a fourth workout different from the first workout and the second workout and that is not associated with the first entity, a second workout platter associated with a fifth workout different from the first workout the second workout, and fourth workout that is not associated with the first entity, and a third workout platter that corresponds to the first entity.

38. The method of claim 37, further comprising:

while displaying the workout selection user interface, receiving, via the one or more input devices, a selection input corresponding to selection of the third workout platter; and in response to receiving the selection input corresponding to selection of the third workout platter, displaying, via the one or more display generation components, the first user interface corresponding to the first entity.

39. The method of claim 37, further comprising:

while displaying the workout selection user interface, receiving, via the one or more input devices, a selection input corresponding to selection of the third workout platter; and in response to receiving the selection input corresponding to selection of the third workout platter:

initiating a workout session corresponding to the first workout, including initiating recording of one or more physical activity metrics for the workout session corresponding to the first workout; and displaying a first workout session user interface indicative of an active workout session.

* * * * *